United States Patent
Babaei et al.

(10) Patent No.: US 11,006,305 B2
(45) Date of Patent: May 11, 2021

(54) PHYSICAL AND MAC LAYER PROCESSES IN A WIRELESS DEVICE

(71) Applicants: Alireza Babaei, Fairfax, VA (US); Esmael Dinan, McLean, VA (US); Hyoungsuk Jeon, Centreville, VA (US); Hua Zhou, Herndon, VA (US)

(72) Inventors: Alireza Babaei, Fairfax, VA (US); Esmael Dinan, McLean, VA (US); Hyoungsuk Jeon, Centreville, VA (US); Hua Zhou, Herndon, VA (US)

(73) Assignee: Ofinno, LLC, Reston, VA (US)

( * ) Notice: Subject to any disclaimer, the term of this patent is extended or adjusted under 35 U.S.C. 154(b) by 191 days.

(21) Appl. No.: 16/243,566

(22) Filed: Jan. 9, 2019

(65) Prior Publication Data
US 2019/0215712 A1    Jul. 11, 2019

Related U.S. Application Data

(60) Provisional application No. 62/615,287, filed on Jan. 9, 2018, provisional application No. 62/630,436, filed on Feb. 14, 2018.

(51) Int. Cl.
*H04W 4/00* (2018.01)
*H04W 24/10* (2009.01)
(Continued)

(52) U.S. Cl.
CPC .......... *H04W 24/10* (2013.01); *H04L 1/1812* (2013.01); *H04L 5/001* (2013.01); *H04L 5/0053* (2013.01);
(Continued)

(58) Field of Classification Search
None
See application file for complete search history.

(56) References Cited

U.S. PATENT DOCUMENTS

2011/0249578 A1* 10/2011 Nayeb Nazar ........ H04W 72/10
                                                    370/252
2013/0039231 A1*  2/2013 Wang ...................... H04L 5/001
                                                    370/280
(Continued)

FOREIGN PATENT DOCUMENTS

EP    2901602 A1    8/2015
WO    2009154412 A2  12/2009

OTHER PUBLICATIONS

R1-113775; 3GPP TSG RAN WG1 #67; San Francisco, USA, Nov. 14-18, 2011; Source: Texas Instruments; Title: Discussion of RA procedure on a SCell; Agenda Item: 5; Document for: Discussion and Decision.
(Continued)

*Primary Examiner* — Bob A Phunkulh
(74) *Attorney, Agent, or Firm* — David Grossman; Kavon Nasabzadeh; Philip Smith

(57) ABSTRACT

A wireless device receives one or more messages from a base station. The one or more messages comprise: first configuration parameters of one or more cells grouped into a timing advance group; second configuration parameters of a time alignment timer for the timing advance group; and third configuration parameters of semi-persistent channel state information (CSI) reports for transmission via a first cell of the one or more cells. A downlink control information is received. The downlink control information indicates activation of a plurality of resources of the first cell for the semi-persistent CSI reports. A semi-persistent CSI report, of the semi-persistent CSI reports, is transmitted via a first resource of the plurality of resources. In response to the time alignment timer expiring, second resources of the plurality of resources that occur after the time alignment timer expires are cleared.

20 Claims, 58 Drawing Sheets

US 11,006,305 B2
Page 2

(51) Int. Cl.
| | |
|---|---|
| H04W 72/04 | (2009.01) |
| H04L 5/00 | (2006.01) |
| H04W 56/00 | (2009.01) |
| H04L 1/18 | (2006.01) |
| H04L 12/24 | (2006.01) |
| H04W 72/14 | (2009.01) |
| H04W 74/08 | (2009.01) |
| H04W 72/08 | (2009.01) |

(52) U.S. Cl.
CPC .......... *H04L 5/0057* (2013.01); *H04L 5/0092* (2013.01); *H04L 41/0896* (2013.01); *H04W 56/0045* (2013.01); *H04W 72/042* (2013.01); *H04W 72/14* (2013.01); *H04W 74/0833* (2013.01); *H04W 72/085* (2013.01)

(56) References Cited

U.S. PATENT DOCUMENTS

| | | | | |
|---|---|---|---|---|
| 2013/0201973 | A1* | 8/2013 | Ye | H04W 72/0406 370/336 |
| 2013/0250929 | A1 | 9/2013 | Dinan | |
| 2013/0322276 | A1* | 12/2013 | Pelletier | H04W 72/0453 370/252 |
| 2014/0050205 | A1* | 2/2014 | Ahn | H04B 17/318 370/336 |
| 2015/0098400 | A1* | 4/2015 | Lee | H04W 56/0045 370/329 |
| 2015/0146635 | A1* | 5/2015 | Filipovich | H04W 74/0833 370/329 |
| 2016/0021628 | A1* | 1/2016 | Jang | H04W 74/0833 370/328 |
| 2016/0219547 | A1* | 7/2016 | Seo | H04W 56/0045 |
| 2016/0227519 | A1* | 8/2016 | Nimbalker | H04L 5/0057 |
| 2016/0270064 | A1 | 9/2016 | Dinan | |
| 2016/0270071 | A1 | 9/2016 | Dinan | |
| 2017/0013565 | A1* | 1/2017 | Pelletier | H04W 52/343 |
| 2017/0374687 | A1* | 12/2017 | Lee | H04L 5/001 |
| 2018/0054834 | A1* | 2/2018 | Lee | H04W 74/085 |
| 2018/0077749 | A1* | 3/2018 | Yamada | H04L 5/0053 |
| 2018/0288760 | A1* | 10/2018 | Lee | H04W 72/0413 |
| 2019/0036746 | A1* | 1/2019 | Hwang | H04L 27/22 |
| 2019/0297549 | A1* | 9/2019 | Suzuki | H04W 36/08 |
| 2019/0379431 | A1* | 12/2019 | Park | H04W 72/04 |
| 2019/0380114 | A1* | 12/2019 | Yokomakura | H04L 5/0057 |
| 2020/0266866 | A1* | 8/2020 | Takeda | H04W 72/02 |

OTHER PUBLICATIONS

R1-1707123; 3GPP TSG RAN WG1 Meeting #89; Hangzhou, China, May 15-19, 2017; Source: ZTE; Title: On CSI framework details; Agenda Item: 7.12.3.1; Document for: Discussion and Decision.
3GPP TS 38.211 V15.0.0 (Dec. 2017); 3rd Generation Partnership Project; Technical Specification Group Radio Access Network; NR; Physical channels and modulation (Release 15).
3GPP TS 38.212 V15.0.0 (Dec. 2017); 3rd Generation Partnership Project; Technical Specification Group Radio Access Network; NR; Multiplexing and channel coding (Release 15).
3GPP TS 38.213 V15.0.0 (Dec. 2017); 3rd Generation Partnership Project; Technical Specification Group Radio Access Network; NR; Physical layer procedures for control (Release 15).
3GPP TS 38.214 V15.0.0 (Dec. 2017); 3rd Generation Partnership Project; Technical Specification Group Radio Access Network; NR; Physical layer procedures for data (Release 15).
3GPP TS 38.300 V15.0.0 (Dec. 2017); 3rd Generation Partnership Project; Technical Specification Group Radio Access Network; NR; NR and NG-RAN Overall Description; Stage 2 (Release 15).
3GPP TS 38.321 V15.0.0 (Dec. 2017); 3rd Generation Partnership Project; Technical Specification Group Radio Access Network; NR; Medium Access Control (MAC) protocol specification (Release 15).
3GPP TS 38.331 V15.0.0 (Dec. 2017); 3rd Generation Partnership Project; Technical Specification Group Radio Access Network NR Radio Resource Control (RRC) protocol specification (Release 15).
International Application Published Under the Patent Cooperation Treaty (PCT); Apr. 3, 2014; WO 2014/052375 A1.
3GPP TSG-RAN WG2 Meeting #100 R2-1714117 Reno, USA, Nov. 27-Dec. 1, 2017 Agenda Item: 11.1.3 Source: Sesssion Chair (InterDigital); Title: Report from LTE and NR User Plane Break-Out Session; Document or Approval.
3GPP TSG RAN WG1 #67; San Francisco, USA, Nov. 14-18, 2011; Source: Texas Instruments; Title: Discussion of RA procedure on a SCell; Agenda Item: 5; Document for: Discussion and Decision.
3GPP TSG RAN WG1 Meeting #89; Hangzhou, China, May 15-19, 2017; Source: ZTE; Title: On CSI framework details; Agenda Item: 7.1.2.3.1; Document for Discussion and Decision.
3GPP TSG-RAN WG1 NR Ad Hoc #3 R1-1716357; Nagoya, Japan, Sep. 18-21, 2017 Source: Ericsson; Title: On semi-persistent CSI reporting on PUSCH; Agenda Item: 6.2.2.6; Document for: Discussion and Decision.
3GPP TSG RAN WG1 Meeting #90bis R1-1717300 Prague, Czech Republic, Oct. 9-13, 2017; Agenda Item: 7.2.2.2; Source: Huawei, HiSilicon; Title: Details of CSI reporting on PUCCH/PUSCH; Document for: Discussion and Decision.
3GPP TSG RAN WG1 Meeting #90b; R1-1717367 Prague, Czech Republic Oct. 9-13, 2017; Source: Intel Corporation ¬¬; Title: Remaining issues on CSI reporting; Agenda item: 7.2.2.2; Document for: Discussion and Decision.
3GPP TSG RAN WG1 Meeting #90bis; R1-1717423 Prague, Czech Republic, Oct. 9-13, 2017; Source: ZTE, Sanechips Title: Remaining details on CSI reporting; Agenda Item: 7.2.2.2; Document for: Discussion and Decision.
3GPP TSG RAN WG1 Meeting #90bis R1-1717471 Prague, CZ, Oct. 9-13, 2017; Source: vivo ;Title: Discussion on CSI reporting ; Agenda Item: 7.2.2.2; Document for: Discussion and Decision.
3GPP TSG RAN WG1 Meeting 90bis; R1-1717811 Prague, CZ, Oct. 9-13, 2017; Source: CATT ;Title: Remaining issues on CSI reporting ;Agenda Item: 7.2.2.2; Document for: Discussion and Decision.
3GPP TSG RAN WG1 Meeting #90bis R1-1717940; Prague, Czech Republic, Oct. 9-13, 2017 Agenda Item: 7.2.2.2; Source: LG Electronics; Title: Discussions on CSI reporting ; Document for: Discussion/ Decision.
3GPP TSG RAN WG1 Meeting 90bis R1-1718191 Prague, CZ, Oct. 9-13, 2017; Source: NTT DOCOMO Title: Remaining Issues on Feedback Design for CSI Type I and Type II; Agenda Item: 7.2.2.2; Document for Discussion.
3GPP TSG RAN WG1 Meeting 90bis R1-1718337 Prague, CZ, Oct. 9-13, 2017; Source: MediaTek Inc. ;Title: Remaining details for CSI reporting ; Agenda Item: 7.2.2.2; Document for: Discussion.
3GPP TSG RAN WG1 Meeting 90bis R1-1718432 Prague, CZ, Oct 9-13, 2017; Source: Ericsson; Title: On remaining details of CSI reporting; Agenda Item: 7.2.2.2; Document for: Discussion and Decision.
3GPP TSG-RAN WG1 #90bis R1-1718442 Prague, Czech Republic, Oct. 9-13, 2017 Source: Ericsson Title: On semi-persistent CSI reporting on PUSCH Agenda Item: 7.2.2.6 Document for: Discussion and Decision.
3GPP TSG RAN WG1 Meeting 90bis R1-1718443 Prague, CZ, Oct. 9-13, 2017 Source: Ericsson Title: On aperiodic and semi-persistent CSI reporting on PUCCH Agenda Item: 7.2.2.1 Document for: Discussion and Decision.
3GPP TSG RAN WG1 Meeting #90bis R1-1718481 Prague, Czech Republic, Oct. 9-13, 2017 Agenda Item: 7.2.2.2 Source: InterDigital, Inc. Title: Remaining issues on CSI reporting Document for: Discussion and Decision.
3GPP TSG RAN WG1 Meeting 90bis R1-1718510 Prague, CZ, Oct. 9-13, 2017 Agenda item: 7.2.2.2 Source: Nokia, Nokia Shanghai Bell Title: Remaining details on CSI reporting for Type II and Type I codebook Document for: Discussion and Decision.
3GPP TSG RAN WG1 Meeting 90bis R1-1718540 Oct. 9-13, 2017 Prague, Czech Agenda item: 7.2.2.2 Source: Qualcomm Incorporated Title: On Remaining Issues of CSI Reporting Document for: Discussion/Decision.

(56) References Cited

OTHER PUBLICATIONS

3GPP TSG RAN WG1 Meeting #90bis R1-1718910 Prague, CZ, Oct. 9-13, 2017 Source: ZTE, Sanechips Title: Summary of CSI measurement Agenda Item: 7.2.2.1 Document for: Discussion and Decision.
3GPP TSG RAN WG1 Meeting 90bis R1-1719142 Prague, CZ, Oct. 9-13, 2017 Agenda Item: 7.2.2.2 Source: Ericsson Title: Offline session notes CSI reporting (AI 7.2.2.2) Document for: Discussion and Decision.
3GPP TSG RAN WG1 Meeting #91 R1-1719425 Reno, USA, Nov. 27-Dec. 1, 2017 Agenda Item: 7.2.2.2 Source: Huawei, HiSilicon Title: Remaining issues for CSI reporting Document for: Discussion and decision.
3GPP TSG RAN WG1 Meeting #91 R1-1719532 Reno, USA, Nov. 27-Dec. 1, 2017 Source: ZTE, Sanechips Title: Remaining details on CSI reporting Agenda Item: 7.2.2.2 Document for: Discussion and Decision.
3GPP TSG RAN WG1 Meeting 91 R1-1719564 Reno, USA, Nov. 27-Dec. 1, 2017 Agenda Item: 7.2.2.2 Source: MediaTek Inc. Title: Remaining details for CSI reporting Document for: Discussion.
3GPP TSG RAN WG1 Meeting #91 R1-1719696 Reno, USA, Nov. 27-Dec. 1, 2017 Agenda Item: 7.2.2.2 Source: Spreadtrum Communications Title: Remaining issues on CSI feedback Document for: Discussion and decision.
3GPP TSG RAN WG1 Meeting #91 R1-1719768 Reno, USA, Nov. 27-Dec. 1, 2017 Source: vivo Title: Remaining details on CSI reporting Agenda Item: 7.2.2.2 Document for: Discussion and Decision.
3GPP TSG RAN WG1 Meeting #91 R1-1719906 Reno, USA, Nov. 27-Dec. 1, 2017 Agenda Item: 7.2.2.2 Source: LG Electronics Title: Discussions on CSI reporting Document for Discussion/Decision.
3GPP TSG RAN WG1 #91 R1-1720070 Reno, Nevada, USA Nov. 27-Dec. 1, 2017 Source: Intel Corporation ¬¬ Title: Remaining issues on CSI reporting Agenda item: 7.2.2.2 Document for: Discussion and Decision.
3GPP TSG RAN WG1 Meeting 91 R1-1720181 Reno, USA, Nov. 27-Dec. 1, 2017 Source: CATT Title: Remaining details on CSI reporting Agenda Item: 7.2.2.2 Document for: Discussion and Decision.
3GPP TSG RAN WG1 WG1#91 Meeting R1-1720612 Reno, Nevada, USA, Nov. 27-Dec. 1, 2017 Source: Sharp, APT Title: Remaining issues on CSI reporting Agenda Item: 7.2.2.2 Document for: Discussion and Decision.
3GPP TSG RAN WG1 Meeting #91 R1- 1720628 Reno, USA, Nov. 27-Dec. 1, 2017 Agenda Item: 7.2.2.2 Source: InterDigital, Inc. Title: Remaining issues on CSI reporting Document for: Discussion and Decision.
3GPP TSG RAN WG1 Meeting #91 R1-1720661 Nov. 27-Dec. 1, 2017 Reno, Nevada, USA Agenda item: 7.2.2.2 Source: Qualcomm Incorporated Title: Remaining Details on CSI Reporting Document for: Discussion/Decision.
3GPP TSG-RAN WG1 #91 R1-1720734; Reno, USA, Nov. 27-Dec. 1, 2017 Source: Ericsson Title: On remaining details of CSI reporting Agenda Item: 7.2.2.2 Document for: Discussion and Decision.
3GPP TSG-RAN WG1 #91 R1-1720746; Reno, USA, Nov. 27-Dec. 1, 2017 Source: Ericsson Title: On semi-persistent CSI reporting on PUSCH Agenda Item: 7.2.2.6 Document for: Discussion and Decision.
3GPP TSG RAN WG1 Meeting 91 R1-1720802 Reno, USA, Nov. 27-Dec. 1, 2017 Source: NTT DOCOMO Title: Remaining Issues on CSI reporting Agenda Item: 7.2.2.2 Document for: Discussion.
3GPP TSG RAN WG1 Meeting 91 R1-1720889 Reno, USA, Nov. 27-Dec. 1, 2017 Agenda item: 7.2.2.2 Source: Nokia, Nokia Shanghai Bell Title: Remaining details on CSI reporting Document for: Discussion and Decision.
3GPP TSG-RAN WG1 #91 R1-1721451 Reno, USA, Nov. 27-Dec. 1, 2017 Source: Ericsson Title: Summary of views on CSI reporting Agenda Item: 7.2.2.2 Document for: Discussion and Decision.
3GPP TSG-RAN WG2 Meeting #100 R2-1713879 Reno, USA, Nov. 27-Dec. 1, 2017 Agenda Item : 10.3.1.2 (NR_newRAT-Core) Source : LG Electronics Inc. Title : Summary of E-mail discussion on [99bis#43][NR UP/ MAC] Impact of BWP Document for : Discussion and Decision.
3GPP TSG-RAN2 AH-1801 R2-1800085 Vancouver, Canada, Jan. 22-Jan. 26, 2018 Agenda item: 10.3.1.2 Source: Samsung Title: Issues/Corrections for BWP Inactivity Timer Operation Document for: Discussion & Decision.
International Application Published Under the Patent Cooperation Treaty (PCT); International Publication Date: Dec. 23, 2009; International Publication No. WO 2009/154412 A2.

\* cited by examiner

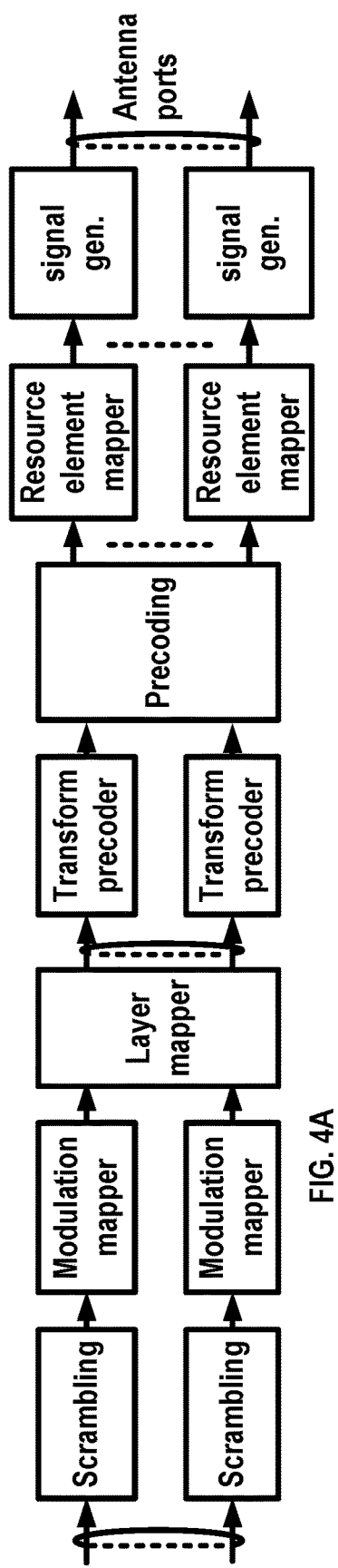
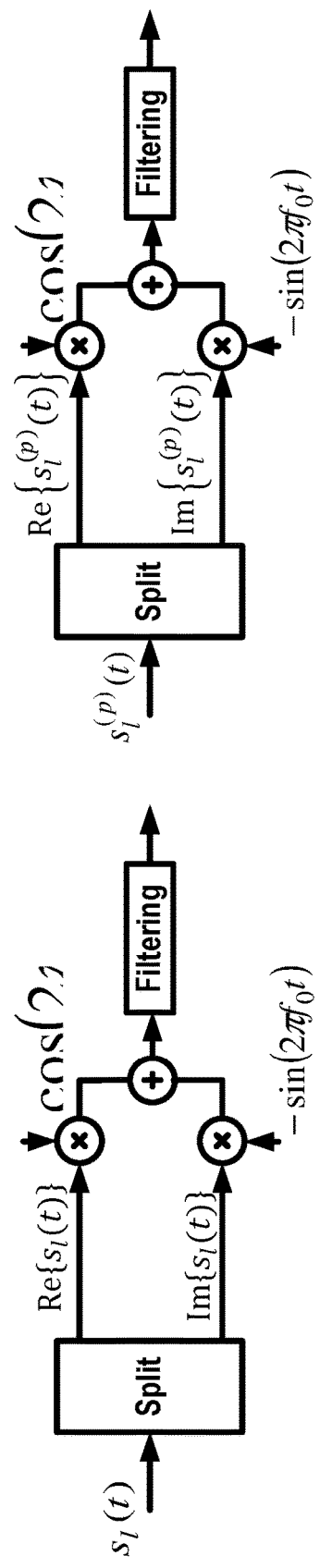
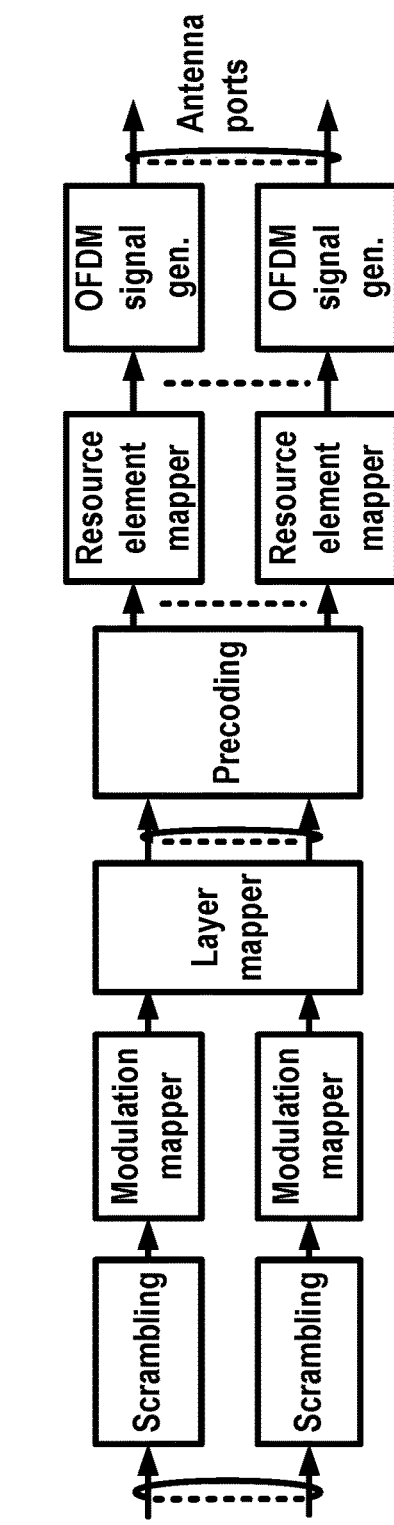
FIG. 4A
FIG. 4B
FIG. 4C
FIG. 4D

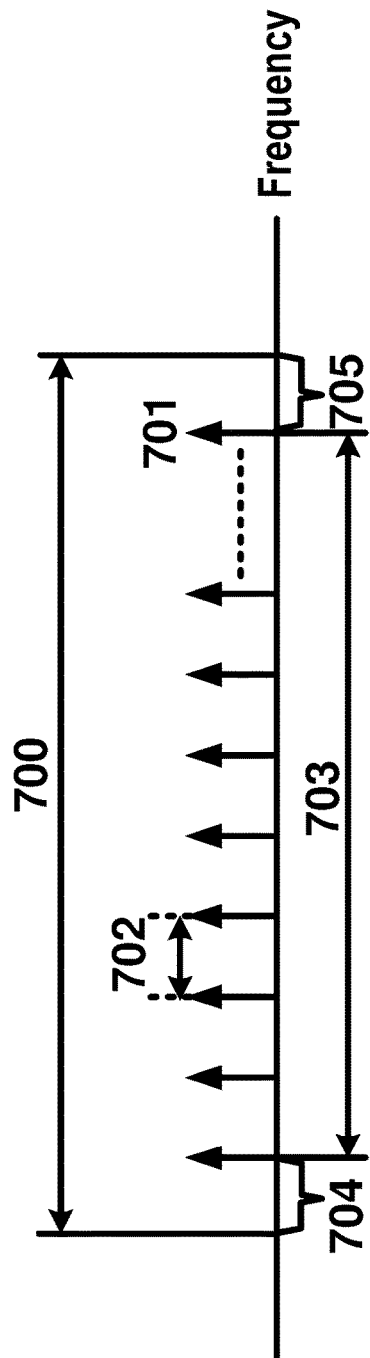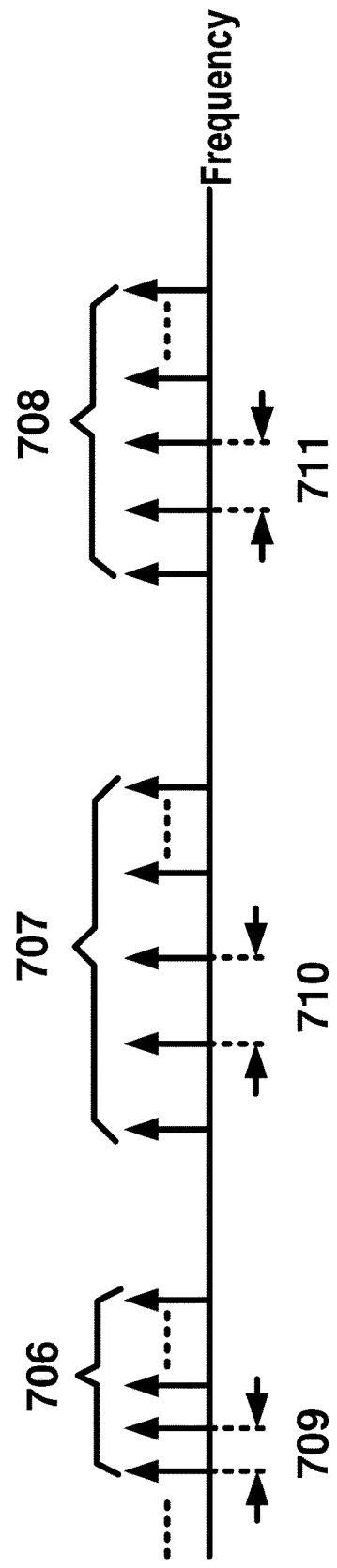
FIG. 7A
FIG. 7B

MAC RAR

MAC RAR for PRACH enhanced coverage level 2 or 3

MAC RAR for NB-IoT UEs

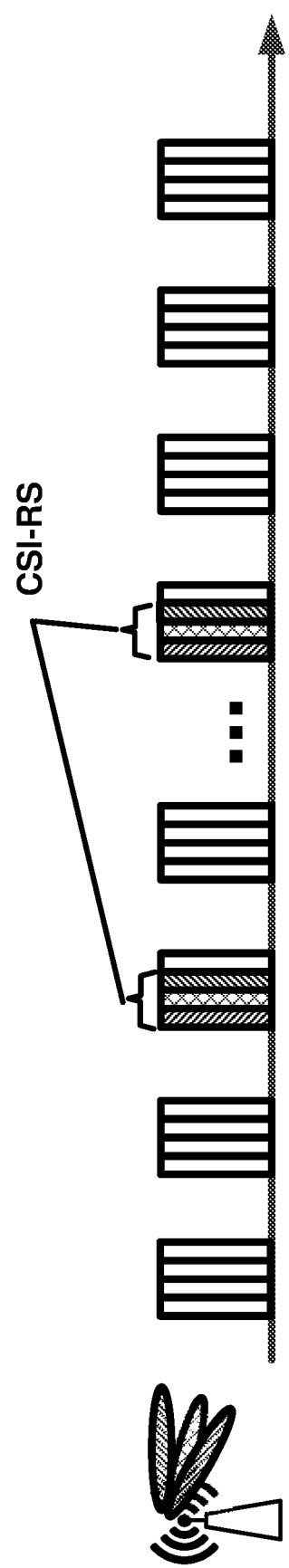

| Value of CSI request field | Description |
|---|---|
| '000' | No aperiodic CSI report is triggered |
| '001' | Aperiodic CSI report is triggered for a 1$^{st}$ set of {CSI process, CSI-RS resource} configured by higher layers for serving cell $c$ |
| '010' | Aperiodic CSI report is triggered for a 2$^{nd}$ set of {CSI process, CSI-RS resource} configured by higher layers for serving cell $c$ |
| '011' | Aperiodic CSI report is triggered for a 3$^{rd}$ set of {CSI process, CSI-RS resource} configured by higher layers for serving cell $c$ |
| '100' | Aperiodic CSI report is triggered for a 4$^{th}$ set of {CSI process, CSI-RS resource} configured by higher layers for serving cell $c$ |
| '101' | Aperiodic CSI report is triggered for a 5$^{th}$ set of {CSI process, CSI-RS resource} configured by higher layers for serving cell $c$ |
| '110' | Aperiodic CSI report is triggered for a 6$^{th}$ set of {CSI process, CSI-RS resource} configured by higher layers for serving cell $c$ |
| '111' | Aperiodic CSI report is triggered for a 7$^{th}$ set of {CSI process, CSI-RS resource} configured by higher layers for serving cell $c$ |

CSI Request field for PDCCH/EPDCCH with uplink DCI format in UE specific search space

FIG. 23

Activation/Deactivation MAC Control Element with one oct

Activation/Deactivation MAC Control Element with 4 octs

| CSI-RS Configuration | Periodic CSI Reporting | Semi-Persistent CSI Reporting | Aperiodic CSI Reporting |
|---|---|---|---|
| Periodic CSI-RS | No dynamic triggering/activation | Reporting on PUCCH: the UE receives a selection command [10, TS 38.321] Reporting on PUSCH: DCI | DCI |
| Semi-Persistent CSI-RS | Not Supported | Reporting on PUCCH: the UE receives a selection command [10, TS 38.321] Reporting on PUSCH: DCI | DCI |
| Aperiodic CSI-RS | Not Supported | Not Supported | DCI |

FIG. 31

```
┌─────────────────────────────────────────────────────────┐
│ Receive, by a wireless device from a base station,      │
│ message(s) comprising: 1st configuration parameters of  │
│ cell(s) grouped into a TAG 2nd configuration parameters │
│ of a time alignment timer for the TAG 3rd configuration │
│ parameters of semi-persistent CSI reports for           │
│ transmission via a 1st cell of the cell(s)              │
│                        4910                             │
└─────────────────────────────────────────────────────────┘
                            │
                            ▼
┌─────────────────────────────────────────────────────────┐
│ Receive a 1st DCI indicating activation of a resources  │
│ of the 1st cell for the semi-persistent CSI reports     │
│                        4920                             │
└─────────────────────────────────────────────────────────┘
                            │
                            ▼
┌─────────────────────────────────────────────────────────┐
│ Transmit a semi-persistent CSI report, of the           │
│ semi-persistent CSI reports, via a 1st resource of      │
│ the resource                                            │
│                        4930                             │
└─────────────────────────────────────────────────────────┘
                            │
                            ▼
              ⟨ Time alignment timer expiring? ⟩
                            4940
                            │ Yes
                            ▼
┌─────────────────────────────────────────────────────────┐
│ Clear 2nd resources of the resources that occur after   │
│ the time alignment timer expires                        │
│                        4950                             │
└─────────────────────────────────────────────────────────┘
```

FIG. 49

Transmit, to a wireless device, message(s) comprising: 1st configuration parameters of cell(s) grouped into a TAG; 2nd configuration parameters of a time alignment timer for the TAG; and 3rd configuration parameters of semi-persistent CSI)reports for transmission via a 1st cell of the cell(s)
5010

Transmit a 1st DCI indicating activation of a resources of the 1st cell for the semi-persistent CSI reports
5020

Receive a semi-persistent CSI report, of the semi-persistent CSI reports, via a 1st resource of the resources
5030

Time alignment timer expiring?
5040

Yes

Clear 2nd resources of the resources that occur after the time alignment timer expires
5050

FIG. 50

Receive message(s) comprising: 1st configuration parameters of a cells comprising a primary cell and a secondary cell; and bandwidth part configuration parameters comprising a value for a bandwidth part inactivity timer
5310

Receive a DCI, on an active bandwidth part of the primary cell, indicating a resource assignment
5320

Determine that no random access procedure is ongoing on the secondary cell
5330

Start the bandwidth part inactivity timer of the active bandwidth part of the primary cell
5340

Bandwidth part inactivity timer expire?
5350

Yes

Switch from the active bandwidth part to a default bandwidth part
5360

FIG. 53

PHYSICAL AND MAC LAYER PROCESSES IN A WIRELESS DEVICE

This application claims the benefit of U.S. Provisional Application No. 62/615,287, filed Jan. 9, 2018, and U.S. Provisional Application No. 62/630,436, filed Feb. 14, 2018, which are hereby incorporated by reference in their entirety.

BRIEF DESCRIPTION OF THE SEVERAL VIEWS OF THE DRAWINGS

Examples of several of the various embodiments of the present disclosure are described herein with reference to the drawings.

FIG. 4A, FIG. 4B, FIG. 4C and FIG. 4D are example diagrams for uplink and downlink signal transmission as per an aspect of an embodiment of the present disclosure.

FIG. 7A and FIG. 7B are diagrams depicting example sets of OFDM subcarriers as per an aspect of an embodiment of the present disclosure.

FIG. 21 is an example CSI-RS transmission in a multi-beam system as per aspects of an embodiment of the present disclosure.

FIG. 23 is an example of CSI request file for PDCCH/EPDCCH with uplink DCI format in UE specific search space as per aspects of an embodiment of the present disclosure.

FIG. 31 is an example Triggering/Activation of CSI Reporting for the possible CSI-RS Configurations as per an aspect of an embodiment of the present disclosure.

FIG. 49 is an example flow diagram of an aspect of an embodiment of the present invention disclosure.

FIG. 50 is an example flow diagram of an aspect of an embodiment of the present invention disclosure.

FIG. 53 is an example flow diagram of an aspect of an embodiment of the present invention disclosure.

DETAILED DESCRIPTION OF EMBODIMENTS

Figure 1:
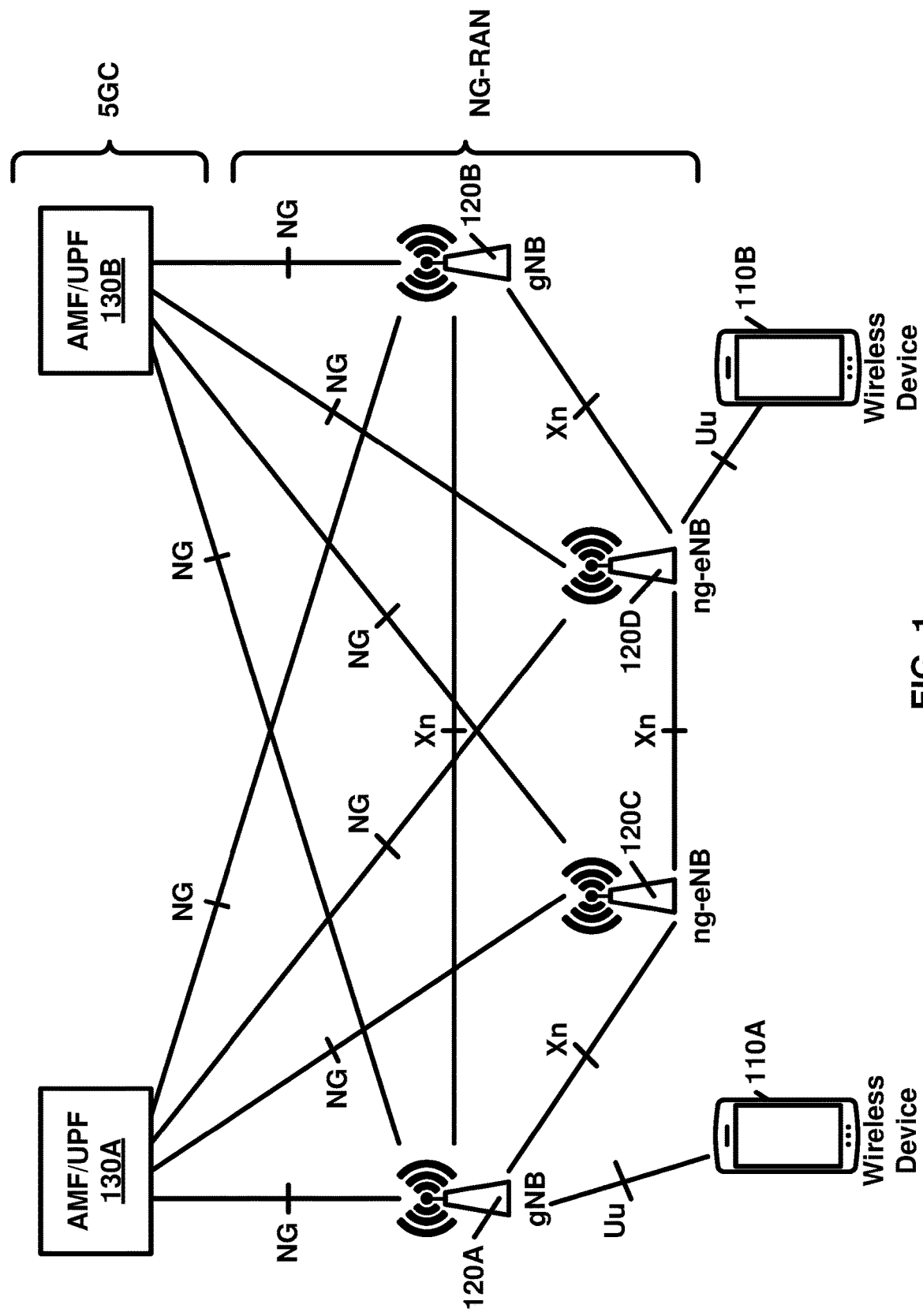
FIG. 1 is a diagram of an example RAN architecture as per an aspect of an embodiment of the present disclosure.

Example embodiments of the present disclosure enable operation of several physical layer and MAC layer processes. Embodiments of the technology disclosed herein may be employed in the technical field of multicarrier communication systems. More particularly, the embodiments of the technology disclosed herein may relate to CSI transmission, random access and bandwidth part operation in a multicarrier communication systems.

The following Acronyms are used throughout the present disclosure:
3GPP 3rd Generation Partnership Project
5GC 5G Core Network
ACK Acknowledgement
AMF Access and Mobility Management Function
ARQ Automatic Repeat Request
AS Access Stratum
ASIC Application-Specific Integrated Circuit
BA Bandwidth Adaptation
BCCH Broadcast Control Channel
BCH Broadcast Channel
BPSK Binary Phase Shift Keying
BWP Bandwidth Part
CA Carrier Aggregation
CC Component Carrier
CCCH Common Control CHannel
CDMA Code Division Multiple Access
CN Core Network
CP Cyclic Prefix
CP-OFDM Cyclic Prefix-Orthogonal Frequency Division Multiplex
C-RNTI Cell-Radio Network Temporary Identifier
CS Configured Scheduling
CSI Channel State Information
CSI-RS Channel State Information-Reference Signal
CQI Channel Quality Indicator
CSS Common Search Space
CU Central Unit
DC Dual Connectivity
DCCH Dedicated Control Channel
DCI Downlink Control Information
DL Downlink
DL-SCH Downlink Shared CHannel
DM-RS DeModulation Reference Signal
DRB Data Radio Bearer
DRX Discontinuous Reception
DTCH Dedicated Traffic Channel
DU Distributed Unit
EPC Evolved Packet Core
E-UTRA Evolved UMTS Terrestrial Radio Access
E-UTRAN Evolved-Universal Terrestrial Radio Access Network
FDD Frequency Division Duplex
FPGA Field Programmable Gate Arrays
F1-C F1-Control plane
F1-U F1-User plane
gNB next generation Node B
HARQ Hybrid Automatic Repeat reQuest
HDL Hardware Description Languages
IE Information Element
IP Internet Protocol
LCID Logical Channel Identifier
LTE Long Term Evolution
MAC Media Access Control
MCG Master Cell Group
MCS Modulation and Coding Scheme
MeNB Master evolved Node B
MIB Master Information Block
MME Mobility Management Entity
MN Master Node
NACK Negative Acknowledgement
NAS Non-Access Stratum
NG CP Next Generation Control Plane
NGC Next Generation Core
NG-C NG-Control plane
ng-eNB next generation evolved Node B NG-U NG-User plane
NR New Radio
NR MAC New Radio MAC
NR PDCP New Radio PDCP
NR PHY New Radio PHYsical
NR RLC New Radio RLC
NR RRC New Radio RRC
NSSAI Network Slice Selection Assistance Information
O&M Operation and Maintenance
OFDM orthogonal Frequency Division Multiplexing
PBCH Physical Broadcast CHannel
PCC Primary Component Carrier
PCCH Paging Control CHannel
PCell Primary Cell
PCH Paging CHannel
PDCCH Physical Downlink Control CHannel
PDCP Packet Data Convergence Protocol
PDSCH Physical Downlink Shared CHannel
PDU Protocol Data Unit
PHICH Physical HARQ Indicator CHannel
PHY PHYsical
PLMN Public Land Mobile Network
PMI Precoding Matrix Indicator
PRACH Physical Random Access CHannel
PRB Physical Resource Block
PSCell Primary Secondary Cell
PSS Primary Synchronization Signal
pTAG primary Timing Advance Group
PT-RS Phase Tracking Reference Signal
PUCCH Physical Uplink Control CHannel
PUSCH Physical Uplink Shared CHannel
QAM Quadrature Amplitude Modulation
QFI Quality of Service Indicator
QoS Quality of Service
QPSK Quadrature Phase Shift Keying
RA Random Access
RACH Random Access CHannel
RAN Radio Access Network
RAT Radio Access Technology
RA-RNTI Random Access-Radio Network Temporary Identifier
RB Resource Blocks
RBG Resource Block Groups
RI Rank indicator
RLC Radio Link Control
RRC Radio Resource Control
RS Reference Signal
RSRP Reference Signal Received Power
SCC Secondary Component Carrier
SCell Secondary Cell
SCG Secondary Cell Group
SC-FDMA Single Carrier-Frequency Division Multiple Access
SDAP Service Data Adaptation Protocol
SDU Service Data Unit
SeNB Secondary evolved Node B
SFN System Frame Number
S-GW Serving GateWay
SI System Information
SIB System Information Block
SMF Session Management Function
SN Secondary Node
SpCell Special Cell
SRB Signaling Radio Bearer
SRS Sounding Reference Signal
SS Synchronization Signal
SSS Secondary Synchronization Signal
sTAG secondary Timing Advance Group
TA Timing Advance
TAG Timing Advance Group
TAI Tracking Area Identifier
TAT Time Alignment Timer
TB Transport Block
TC-RNTI Temporary Cell-Radio Network Temporary Identifier
TDD Time Division Duplex
TDMA Time Division Multiple Access
TTI Transmission Time Interval
UCI Uplink Control Information
UE User Equipment
UL Uplink
UL-SCH Uplink Shared CHannel
UPF User Plane Function
UPGW User Plane Gateway
VHDL VHSIC Hardware Description Language
Xn-C Xn-Control plane
Xn-U Xn-User plane Example embodiments of the disclosure may be implemented using various physical layer modulation and transmission mechanisms. Example transmission mechanisms may include, but are not limited to: Code Division Multiple Access (CDMA), Orthogonal Frequency Division Multiple Access (OFDMA), Time Division Multiple Access (TDMA), Wavelet technologies, and/or the like. Hybrid transmission mechanisms such as TDMA/CDMA, and OFDM/CDMA may also be employed. Various modulation schemes may be applied for signal transmission in the physical layer. Examples of modulation schemes include, but are not limited to: phase, amplitude, code, a combination of these, and/or the like. An example radio transmission method may implement Quadrature Amplitude Modulation (QAM) using Binary Phase Shift Keying (BPSK), Quadrature Phase Shift Keying (QPSK), 16-QAM, 64-QAM, 256-QAM, and/or the like. Physical radio transmission may be enhanced by dynamically or semi-dynamically changing the modulation and coding scheme depending on transmission requirements and radio conditions.

FIG. 1 is an example Radio Access Network (RAN) architecture as per an aspect of an embodiment of the present disclosure. As illustrated in this example, a RAN node may be a next generation Node B (gNB) (e.g. 120A, 120B) providing New Radio (NR) user plane and control plane protocol terminations towards a first wireless device (e.g. 110A). In an example, a RAN node may be a next generation evolved Node B (ng-eNB) (e.g. 120C, 120D), providing Evolved UMTS Terrestrial Radio Access (E-UTRA) user plane and control plane protocol terminations towards a second wireless device (e.g. 110B). The first wireless device may communicate with a gNB over a Uu interface. The second wireless device may communicate with a ng-eNB over a Uu interface.

A gNB or an ng-eNB may host functions such as radio resource management and scheduling, IP header compression, encryption and integrity protection of data, selection of Access and Mobility Management Function (AMF) at User Equipment (UE) attachment, routing of user plane and control plane data, connection setup and release, scheduling and transmission of paging messages (originated from the AMF), scheduling and transmission of system broadcast information (originated from the AMF or Operation and Maintenance (O&M)), measurement and measurement reporting configuration, transport level packet marking in the uplink, session management, support of network slicing, Quality of Service (QoS) flow management and mapping to data radio bearers, support of UEs in RRC_INACTIVE state, distribution function for Non-Access Stratum (NAS) messages, RAN sharing, dual connectivity or tight interworking between NR and E-UTRA.

In an example, one or more gNBs and/or one or more ng-eNBs may be interconnected with each other by means of Xn interface. A gNB or an ng-eNB may be connected by means of NG interfaces to 5G Core Network (5GC). In an example, 5GC may comprise one or more AMF/User Plan Function (UPF) functions (e.g. 130A or 130B). A gNB or an ng-eNB may be connected to a UPF by means of an NG-User plane (NG-U) interface. The NG-U interface may provide delivery (e.g. non-guaranteed delivery) of user plane Protocol Data Units (PDUs) between a RAN node and the UPF. A gNB or an ng-eNB may be connected to an AMF by means of an NG-Control plane (NG-C) interface. The NG-C interface may provide functions such as NG interface management, UE context management, UE mobility management, transport of NAS messages, paging, PDU session management, configuration transfer or warning message transmission.

In an example, a UPF may host functions such as anchor point for intra-/inter-Radio Access Technology (RAT) mobility (when applicable), external PDU session point of interconnect to data network, packet routing and forwarding, packet inspection and user plane part of policy rule enforcement, traffic usage reporting, uplink classifier to support routing traffic flows to a data network, branching point to support multi-homed PDU session, QoS handling for user plane, e.g. packet filtering, gating, Uplink (UL)/Downlink (DL) rate enforcement, uplink traffic verification (e.g. Service Data Flow (SDF) to QoS flow mapping), downlink packet buffering and/or downlink data notification triggering.

In an example, an AMF may host functions such as NAS signaling termination, NAS signaling security, Access Stratum (AS) security control, inter Core Network (CN) node signaling for mobility between $3^{rd}$ Generation Partnership Project (3GPP) access networks, idle mode UE reachability (e.g., control and execution of paging retransmission), registration area management, support of intra-system and inter-system mobility, access authentication, access authorization including check of roaming rights, mobility management control (subscription and policies), support of network slicing and/or Session Management Function (SMF) selection.

Figure 2A:
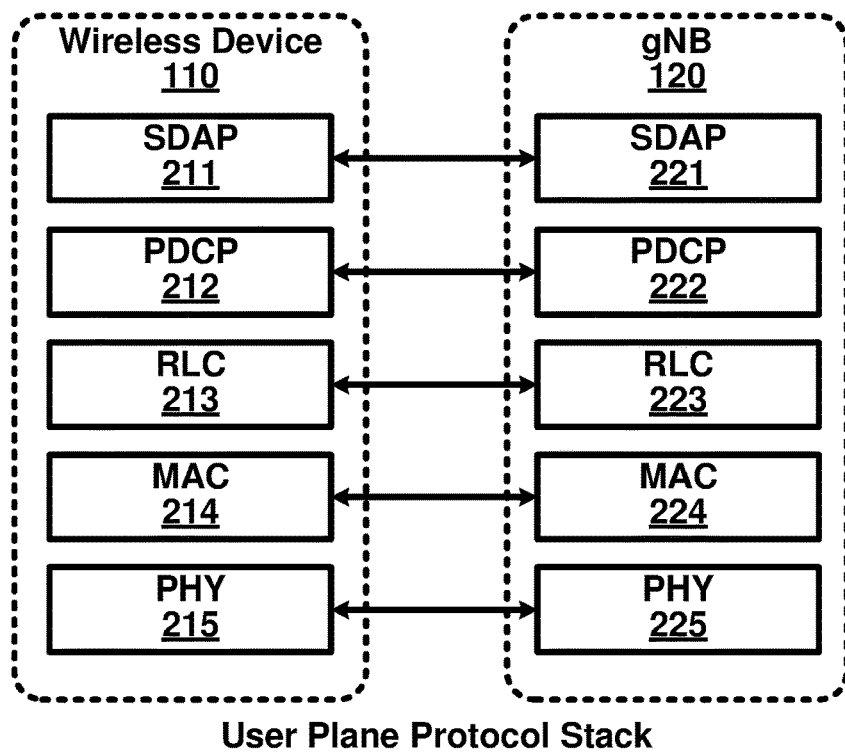
FIG. 2A is a diagram of an example user plane protocol stack as per an aspect of an embodiment of the present disclosure.

FIG. 2A is an example user plane protocol stack, where Service Data Adaptation Protocol (SDAP) (e.g. 211 and 221), Packet Data Convergence Protocol (PDCP) (e.g. 212 and 222), Radio Link Control (RLC) (e.g. 213 and 223) and Media Access Control (MAC) (e.g. 214 and 224) sublayers and Physical (PHY) (e.g. 215 and 225) layer may be terminated in wireless device (e.g. 110) and gNB (e.g. 120) on the network side. In an example, a PHY layer provides transport services to higher layers (e.g. MAC, RRC, etc.). In an example, services and functions of a MAC sublayer may comprise mapping between logical channels and transport channels, multiplexing/demultiplexing of MAC Service Data Units (SDUs) belonging to one or different logical channels into/from Transport Blocks (TBs) delivered to/from the PHY layer, scheduling information reporting, error correction through Hybrid Automatic Repeat request (HARQ) (e.g. one HARQ entity per carrier in case of Carrier Aggregation (CA)), priority handling between UEs by means of dynamic scheduling, priority handling between logical channels of one UE by means of logical channel prioritization, and/or padding. A MAC entity may support one or multiple numerologies and/or transmission timings. In an example, mapping restrictions in a logical channel prioritization may control which numerology and/or transmission timing a logical channel may use. In an example, an RLC sublayer may supports transparent mode (TM), unacknowledged mode (UM) and acknowledged mode (AM) transmission modes. The RLC configuration may be per logical channel with no dependency on numerologies and/or Transmission Time Interval (TTI) durations. In an example, Automatic Repeat Request (ARQ) may operate on any of the numerologies and/or TTI durations the logical channel is configured with. In an example, services and functions of the PDCP layer for the user plane may comprise sequence numbering, header compression and decompression, transfer of user data, reordering and duplicate detection, PDCP PDU routing (e.g. in case of split bearers), retransmission of PDCP SDUs, ciphering, deciphering and integrity protection, PDCP SDU discard, PDCP re-establishment and data recovery for RLC AM, and/or duplication of PDCP PDUs. In an example, services and functions of SDAP may comprise mapping between a QoS flow and a data radio bearer. In an example, services and functions of SDAP may comprise mapping Quality of Service Indicator (QFI) in DL and UL packets. In an example, a protocol entity of SDAP may be configured for an individual PDU session.

Figure 2B:
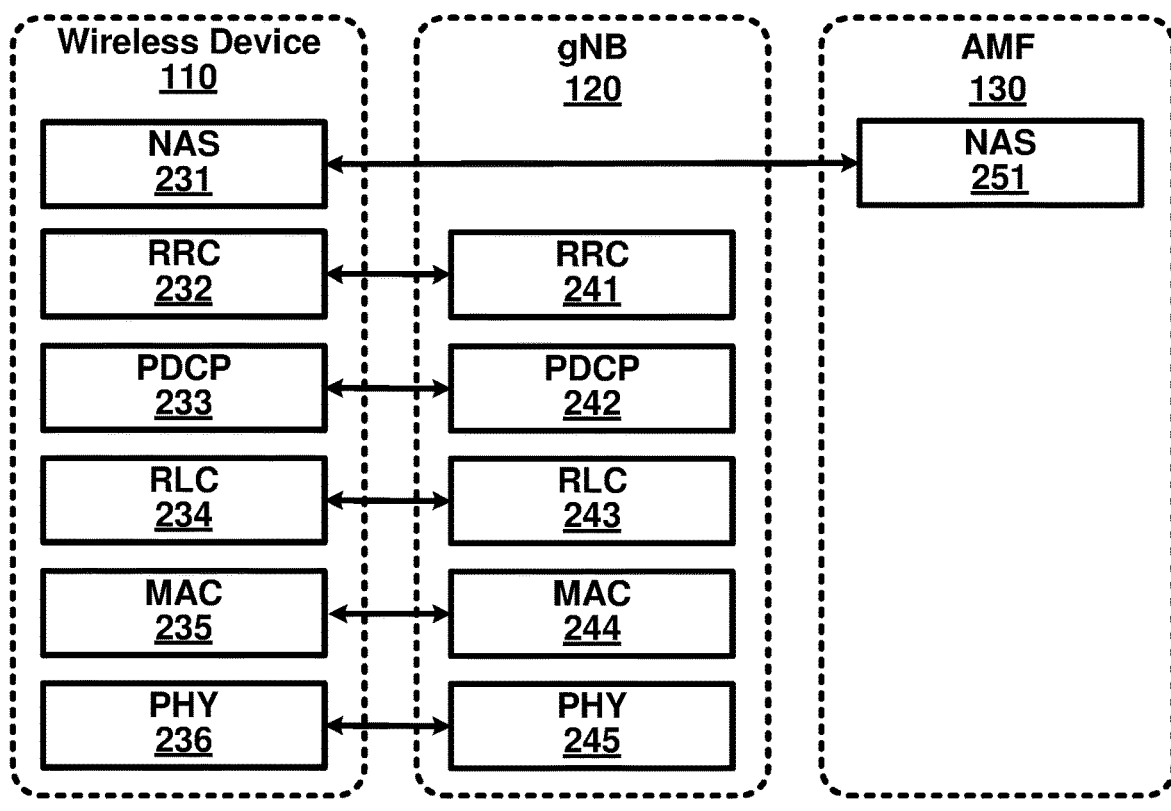
FIG. 2B is a diagram of an example control plane protocol stack as per an aspect of an embodiment of the present disclosure.

FIG. 2B is an example control plane protocol stack where PDCP (e.g. 233 and 242), RLC (e.g. 234 and 243) and MAC (e.g. 235 and 244) sublayers and PHY (e.g. 236 and 245) layer may be terminated in wireless device (e.g. 110) and gNB (e.g. 120) on a network side and perform service and functions described above. In an example, RRC (e.g. 232 and 241) may be terminated in a wireless device and a gNB on a network side. In an example, services and functions of RRC may comprise broadcast of system information related to AS and NAS, paging initiated by 5GC or RAN, establishment, maintenance and release of an RRC connection between the UE and RAN, security functions including key management, establishment, configuration, maintenance and release of Signaling Radio Bearers (SRBs) and Data Radio Bearers (DRBs), mobility functions, QoS management functions, UE measurement reporting and control of the reporting, detection of and recovery from radio link failure, and/or NAS message transfer to/from NAS from/to a UE. In an example, NAS control protocol (e.g. 231 and 251) may be terminated in the wireless device and AMF (e.g. 130) on a network side and may perform functions such as authentication, mobility management between a UE and a AMF for 3GPP access and non-3GPP access, and session management between a UE and a SMF for 3GPP access and non-3GPP access.

In an example, a base station may configure a plurality of logical channels for a wireless device. A logical channel in the plurality of logical channels may correspond to a radio bearer and the radio bearer may be associated with a QoS requirement. In an example, a base station may configure a logical channel to be mapped to one or more TTIs/numerologies in a plurality of TTIs/numerologies. The wireless device may receive a Downlink Control Information (DCI) via Physical Downlink Control CHannel (PDCCH) indicating an uplink grant. In an example, the uplink grant may be for a first TTI/numerology and may indicate uplink resources for transmission of a transport block. The base station may configure each logical channel in the plurality of logical channels with one or more parameters to be used by a logical channel prioritization procedure at the MAC layer of the wireless device. The one or more parameters may comprise priority, prioritized bit rate, etc. A logical channel in the plurality of logical channels may correspond to one or more buffers comprising data associated with the logical channel. The logical channel prioritization procedure may allocate the uplink resources to one or more first logical channels in the plurality of logical channels and/or one or more MAC Control Elements (CEs). The one or more first logical channels may be mapped to the first TTI/numerology. The MAC layer at the wireless device may multiplex one or more MAC CEs and/or one or more MAC SDUs (e.g., logical channel) in a MAC PDU (e.g., transport block). In an example, the MAC PDU may comprise a MAC header comprising a plurality of MAC sub-headers. A MAC sub-header in the plurality of MAC sub-headers may correspond to a MAC CE or a MAC SUD (logical channel) in the one or more MAC CEs and/or one or more MAC SDUs. In an example, a MAC CE or a logical channel may be configured with a Logical Channel IDentifier (LCID). In an example, LCID for a logical channel or a MAC CE may be fixed/pre-configured. In an example, LCID for a logical channel or MAC CE may be configured for the wireless device by the base station. The MAC sub-header corresponding to a MAC CE or a MAC SDU may comprise LCID associated with the MAC CE or the MAC SDU.

In an example, a base station may activate and/or deactivate and/or impact one or more processes (e.g., set values of one or more parameters of the one or more processes or start and/or stop one or more timers of the one or more processes) at the wireless device by employing one or more MAC commands. The one or more MAC commands may comprise one or more MAC control elements. In an example, the one or more processes may comprise activation and/or deactivation of PDCP packet duplication for one or more radio bearers. The base station may transmit a MAC CE comprising one or more fields, the values of the fields indicating activation and/or deactivation of PDCP duplication for the one or more radio bearers. In an example, the one or more processes may comprise Channel State Information (CSI) transmission of on one or more cells. The base station may transmit one or more MAC CEs indicating activation and/or deactivation of the CSI transmission on the one or more cells. In an example, the one or more processes may comprise activation or deactivation of one or more secondary cells. In an example, the base station may transmit a MA CE indicating activation or deactivation of one or more secondary cells. In an example, the base station may transmit one or more MAC CEs indicating starting and/or stopping one or more Discontinuous Reception (DRX) timers at the wireless device. In an example, the base station may transmit one or more MAC CEs indicating one or more timing advance values for one or more Timing Advance Groups (TAGs).

Figure 3:
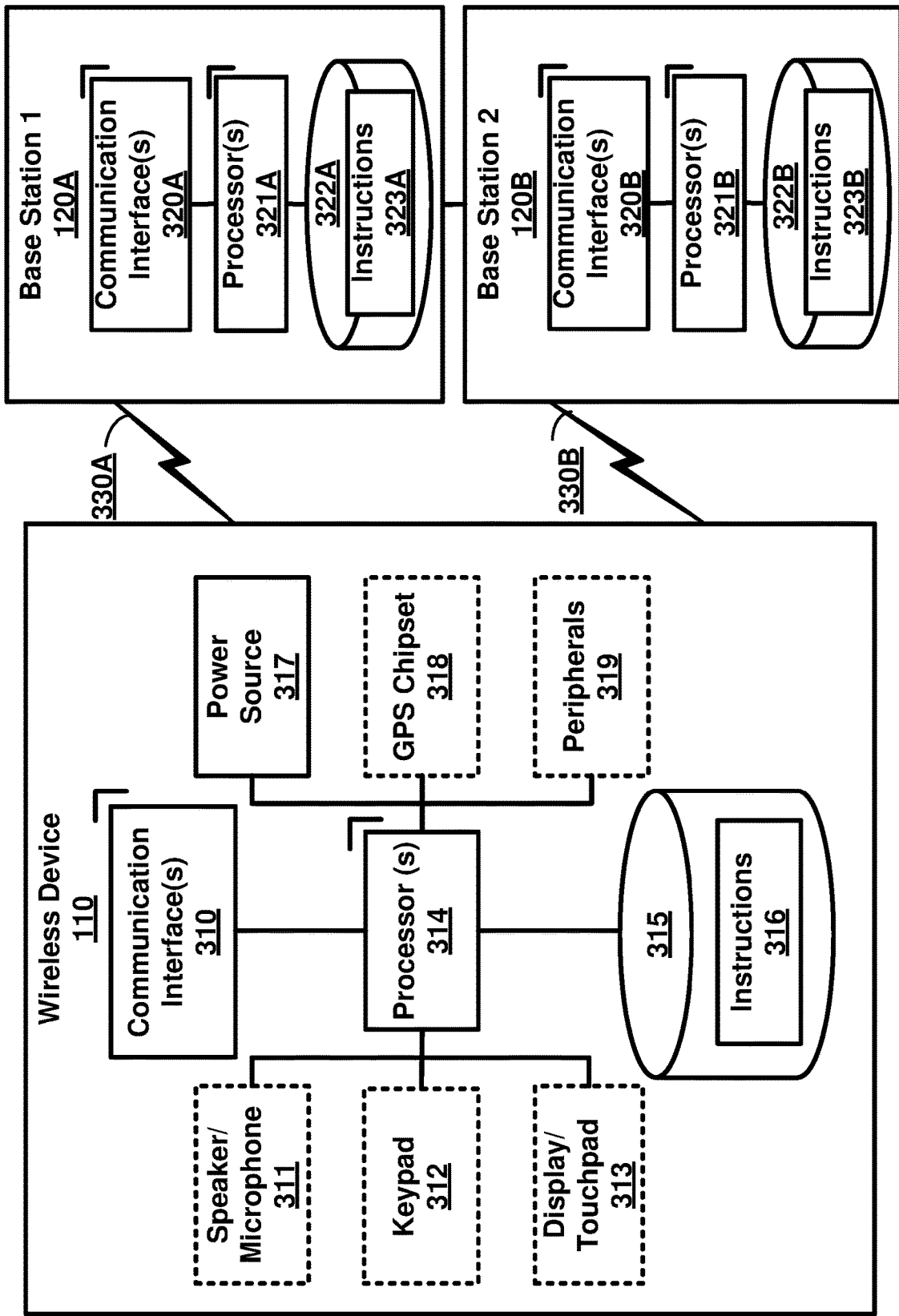
FIG. 3 is a diagram of an example wireless device and two base stations as per an aspect of an embodiment of the present disclosure.

FIG. 3 is a block diagram of base stations (base station 1, 120A, and base station 2, 120B) and a wireless device 110. A wireless device may be called an UE. A base station may be called a NB, eNB, gNB, and/or ng-eNB. In an example, a wireless device and/or a base station may act as a relay node. The base station 1, 120A, may comprise at least one communication interface 320A (e.g. a wireless modem, an antenna, a wired modem, and/or the like), at least one processor 321A, and at least one set of program code instructions 323A stored in non-transitory memory 322A and executable by the at least one processor 321A. The base station 2, 120B, may comprise at least one communication interface 320B, at least one processor 321B, and at least one set of program code instructions 323B stored in non-transitory memory 322B and executable by the at least one processor 321B.

A base station may comprise many sectors for example: 1, 2, 3, 4, or 6 sectors. A base station may comprise many cells, for example, ranging from 1 to 50 cells or more. A cell may be categorized, for example, as a primary cell or secondary cell. At Radio Resource Control (RRC) connection establishment/re-establishment/handover, one serving cell may provide the NAS (non-access stratum) mobility information (e.g. Tracking Area Identifier (TAI)). At RRC connection re-establishment/handover, one serving cell may provide the security input. This cell may be referred to as the Primary Cell (PCell). In the downlink, a carrier corresponding to the PCell may be a DL Primary Component Carrier (PCC), while in the uplink, a carrier may be an UL PCC. Depending on wireless device capabilities, Secondary Cells (SCells) may be configured to form together with a PCell a set of serving cells. In a downlink, a carrier corresponding to an SCell may be a downlink secondary component carrier (DL SCC), while in an uplink, a carrier may be an uplink secondary component carrier (UL SCC). An SCell may or may not have an uplink carrier.

A cell, comprising a downlink carrier and optionally an uplink carrier, may be assigned a physical cell ID and a cell index. A carrier (downlink or uplink) may belong to one cell. The cell ID or cell index may also identify the downlink carrier or uplink carrier of the cell (depending on the context it is used). In the disclosure, a cell ID may be equally referred to a carrier ID, and a cell index may be referred to a carrier index. In an implementation, a physical cell ID or a cell index may be assigned to a cell. A cell ID may be determined using a synchronization signal transmitted on a downlink carrier. A cell index may be determined using RRC messages. For example, when the disclosure refers to a first physical cell ID for a first downlink carrier, the disclosure may mean the first physical cell ID is for a cell comprising the first downlink carrier. The same concept may apply to, for example, carrier activation. When the disclosure indicates that a first carrier is activated, the specification may equally mean that a cell comprising the first carrier is activated.

A base station may transmit to a wireless device one or more messages (e.g. RRC messages) comprising a plurality of configuration parameters for one or more cells. One or more cells may comprise at least one primary cell and at least one secondary cell. In an example, an RRC message may be broadcasted or unicasted to the wireless device. In an example, configuration parameters may comprise common parameters and dedicated parameters.

Services and/or functions of an RRC sublayer may comprise at least one of: broadcast of system information related to AS and NAS; paging initiated by 5GC and/or NG-RAN; establishment, maintenance, and/or release of an RRC connection between a wireless device and NG-RAN, which may comprise at least one of addition, modification and release of carrier aggregation; or addition, modification, and/or release of dual connectivity in NR or between E-UTRA and NR. Services and/or functions of an RRC sublayer may further comprise at least one of security functions comprising key management; establishment, configuration, maintenance, and/or release of Signaling Radio Bearers (SRBs) and/or Data Radio Bearers (DRBs); mobility functions which may comprise at least one of a handover (e.g. intra NR mobility or inter-RAT mobility) and a context transfer; or a wireless device cell selection and reselection and control of cell selection and reselection. Services and/or functions of an RRC sublayer may further comprise at least one of QoS management functions; a wireless device measurement configuration/reporting; detection of and/or recovery from radio link failure; or NAS message transfer to/from a core network entity (e.g. AMF, Mobility Management Entity (MME)) from/to the wireless device.

An RRC sublayer may support an RRC_Idle state, an RRC_Inactive state and/or an RRC_Connected state for a wireless device. In an RRC_Idle state, a wireless device may perform at least one of: Public Land Mobile Network (PLMN) selection; receiving broadcasted system information; cell selection/re-selection; monitoring/receiving a paging for mobile terminated data initiated by 5GC; paging for mobile terminated data area managed by 5GC; or DRX for CN paging configured via NAS. In an RRC_Inactive state, a wireless device may perform at least one of: receiving broadcasted system information; cell selection/re-selection; monitoring/receiving a RAN/CN paging initiated by NG-RAN/5GC; RAN-based notification area (RNA) managed by NG-RAN; or DRX for RAN/CN paging configured by NG-RAN/NAS. In an RRC_Idle state of a wireless device, a base station (e.g. NG-RAN) may keep a 5GC-NG-RAN connection (both C/U-planes) for the wireless device; and/or store a UE AS context for the wireless device. In an RRC_Connected state of a wireless device, a base station (e.g. NG-RAN) may perform at least one of: establishment of 5GC-NG-RAN connection (both C/U-planes) for the wireless device; storing a UE AS context for the wireless device; transmit/receive of unicast data to/from the wireless device; or network-controlled mobility based on measurement results received from the wireless device. In an RRC_Connected state of a wireless device, an NG-RAN may know a cell that the wireless device belongs to.

System information (SI) may be divided into minimum SI and other SI. The minimum SI may be periodically broadcast. The minimum SI may comprise basic information required for initial access and information for acquiring any other SI broadcast periodically or provisioned on-demand, i.e. scheduling information. The other SI may either be broadcast, or be provisioned in a dedicated manner, either triggered by a network or upon request from a wireless device. A minimum SI may be transmitted via two different downlink channels using different messages (e.g. MasterInformationBlock and SystemInformationBlockType1). Another SI may be transmitted via SystemInformationBlockType2. For a wireless device in an RRC_Connected state, dedicated RRC signaling may be employed for the request and delivery of the other SI. For the wireless device in the RRC_Idle state and/or the RRC_Inactive state, the request may trigger a random-access procedure.

A wireless device may report its radio access capability information which may be static. A base station may request what capabilities for a wireless device to report based on band information. When allowed by a network, a temporary capability restriction request may be sent by the wireless device to signal the limited availability of some capabilities (e.g. due to hardware sharing, interference or overheating) to the base station. The base station may confirm or reject the request. The temporary capability restriction may be transparent to 5GC (e.g., only static capabilities may be stored in 5GC).

When CA is configured, a wireless device may have an RRC connection with a network. At RRC connection establishment/re-establishment/handover procedure, one serving cell may provide NAS mobility information, and at RRC connection re-establishment/handover, one serving cell may provide a security input. This cell may be referred to as the PCell. Depending on the capabilities of the wireless device, SCells may be configured to form together with the PCell a set of serving cells. The configured set of serving cells for the wireless device may comprise one PCell and one or more SCells.

The reconfiguration, addition and removal of SCells may be performed by RRC. At intra-NR handover, RRC may also add, remove, or reconfigure SCells for usage with the target PCell. When adding a new SCell, dedicated RRC signaling may be employed to send all required system information of the SCell i.e. while in connected mode, wireless devices may not need to acquire broadcasted system information directly from the SCells.

The purpose of an RRC connection reconfiguration procedure may be to modify an RRC connection, (e.g. to establish, modify and/or release RBs, to perform handover, to setup, modify, and/or release measurements, to add, modify, and/or release SCells and cell groups). As part of the RRC connection reconfiguration procedure, NAS dedicated information may be transferred from the network to the wireless device. The RRCConnectionReconfiguration message may be a command to modify an RRC connection. It may convey information for measurement configuration, mobility control, radio resource configuration (e.g. RBs, MAC main configuration and physical channel configuration) comprising any associated dedicated NAS information and security configuration. If the received RRC Connection Reconfiguration message includes the sCellToReleaseList, the wireless device may perform an SCell release. If the received RRC Connection Reconfiguration message includes the sCellToAddModList, the wireless device may perform SCell additions or modification.

An RRC connection establishment (or reestablishment, resume) procedure may be to establish (or reestablish, resume) an RRC connection. an RRC connection establishment procedure may comprise SRB1 establishment. The RRC connection establishment procedure may be used to transfer the initial NAS dedicated information/message from a wireless device to E-UTRAN. The RRCConnectionReestablishment message may be used to re-establish SRB1.

A measurement report procedure may be to transfer measurement results from a wireless device to NG-RAN. The wireless device may initiate a measurement report procedure after successful security activation. A measurement report message may be employed to transmit measurement results.

The wireless device 110 may comprise at least one communication interface 310 (e.g. a wireless modem, an antenna, and/or the like), at least one processor 314, and at least one set of program code instructions 316 stored in non-transitory memory 315 and executable by the at least one processor 314. The wireless device 110 may further comprise at least one of at least one speaker/microphone 311, at least one keypad 312, at least one display/touchpad 313, at least one power source 317, at least one global positioning system (GPS) chipset 318, and other peripherals 319.

The processor 314 of the wireless device 110, the processor 321A of the base station 1 120A, and/or the processor 321B of the base station 2 120B may comprise at least one of a general-purpose processor, a digital signal processor (DSP), a controller, a microcontroller, an application specific integrated circuit (ASIC), a field programmable gate array (FPGA) and/or other programmable logic device, discrete gate and/or transistor logic, discrete hardware components, and the like. The processor 314 of the wireless device 110, the processor 321A in base station 1 120A, and/or the processor 321B in base station 2 120B may perform at least one of signal coding/processing, data processing, power control, input/output processing, and/or any other functionality that may enable the wireless device 110, the base station 1 120A and/or the base station 2 120B to operate in a wireless environment.

The processor 314 of the wireless device 110 may be connected to the speaker/microphone 311, the keypad 312, and/or the display/touchpad 313. The processor 314 may receive user input data from and/or provide user output data to the speaker/microphone 311, the keypad 312, and/or the display/touchpad 313. The processor 314 in the wireless device 110 may receive power from the power source 317 and/or may be configured to distribute the power to the other components in the wireless device 110. The power source 317 may comprise at least one of one or more dry cell batteries, solar cells, fuel cells, and the like. The processor 314 may be connected to the GPS chipset 318. The GPS chipset 318 may be configured to provide geographic location information of the wireless device 110.

The processor 314 of the wireless device 110 may further be connected to other peripherals 319, which may comprise one or more software and/or hardware modules that provide additional features and/or functionalities. For example, the peripherals 319 may comprise at least one of an accelerometer, a satellite transceiver, a digital camera, a universal serial bus (USB) port, a hands-free headset, a frequency modulated (FM) radio unit, a media player, an Internet browser, and the like.

The communication interface 320A of the base station 1, 120A, and/or the communication interface 320B of the base station 2, 120B, may be configured to communicate with the communication interface 310 of the wireless device 110 via a wireless link 330A and/or a wireless link 330B respectively. In an example, the communication interface 320A of the base station 1, 120A, may communicate with the communication interface 320B of the base station 2 and other RAN and core network nodes.

The wireless link 330A and/or the wireless link 330B may comprise at least one of a bi-directional link and/or a directional link. The communication interface 310 of the wireless device 110 may be configured to communicate with the communication interface 320A of the base station 1 120A and/or with the communication interface 320B of the base station 2 120B. The base station 1 120A and the wireless device 110 and/or the base station 2 120B and the wireless device 110 may be configured to send and receive transport blocks via the wireless link 330A and/or via the wireless link 330B, respectively. The wireless link 330A and/or the wireless link 330B may employ at least one frequency carrier. According to some of various aspects of embodiments, transceiver(s) may be employed. A transceiver may be a device that comprises both a transmitter and a receiver. Transceivers may be employed in devices such as wireless devices, base stations, relay nodes, and/or the like. Example embodiments for radio technology implemented in the communication interface 310, 320A, 320B and the wireless link 330A, 330B are illustrated in FIG. 4A, FIG. 4B, FIG. 4C, FIG. 4D, FIG. 6, FIG. 7A, FIG. 7B, FIG. 8, and associated text.

In an example, other nodes in a wireless network (e.g. AMF, UPF, SMF, etc.) may comprise one or more communication interfaces, one or more processors, and memory storing instructions.

A node (e.g. wireless device, base station, AMF, SMF, UPF, servers, switches, antennas, and/or the like) may comprise one or more processors, and memory storing instructions that when executed by the one or more processors causes the node to perform certain processes and/or functions. Example embodiments may enable operation of single-carrier and/or multi-carrier communications. Other example embodiments may comprise a non-transitory tangible computer readable media comprising instructions executable by one or more processors to cause operation of single-carrier and/or multi-carrier communications. Yet other example embodiments may comprise an article of manufacture that comprises a non-transitory tangible computer readable machine-accessible medium having instructions encoded thereon for enabling programmable hardware to cause a node to enable operation of single-carrier and/or multi-carrier communications. The node may include processors, memory, interfaces, and/or the like.

An interface may comprise at least one of a hardware interface, a firmware interface, a software interface, and/or a combination thereof. The hardware interface may comprise connectors, wires, electronic devices such as drivers, amplifiers, and/or the like. The software interface may comprise code stored in a memory device to implement protocol(s), protocol layers, communication drivers, device drivers, combinations thereof, and/or the like. The firmware interface may comprise a combination of embedded hardware and code stored in and/or in communication with a memory device to implement connections, electronic device operations, protocol(s), protocol layers, communication drivers, device drivers, hardware operations, combinations thereof, and/or the like.

FIG. 4A, FIG. 4B, FIG. 4C and FIG. 4D are example diagrams for uplink and downlink signal transmission as per an aspect of an embodiment of the present disclosure. FIG. 4A shows an example uplink transmitter for at least one physical channel. A baseband signal representing a physical uplink shared channel may perform one or more functions. The one or more functions may comprise at least one of: scrambling; modulation of scrambled bits to generate complex-valued symbols; mapping of the complex-valued modulation symbols onto one or several transmission layers; transform precoding to generate complex-valued symbols; precoding of the complex-valued symbols; mapping of precoded complex-valued symbols to resource elements; generation of complex-valued time-domain Single Carrier-Frequency Division Multiple Access (SC-FDMA) or CP-OFDM signal for an antenna port; and/or the like. In an example, when transform precoding is enabled, a SC-FDMA signal for uplink transmission may be generated. In an example, when transform precoding is not enabled, an CP-OFDM signal for uplink transmission may be generated by FIG. 4A. These functions are illustrated as examples and it is anticipated that other mechanisms may be implemented in various embodiments.

An example structure for modulation and up-conversion to the carrier frequency of the complex-valued SC-FDMA or CP-OFDM baseband signal for an antenna port and/or the complex-valued Physical Random Access CHannel (PRACH) baseband signal is shown in FIG. 4B. Filtering may be employed prior to transmission.

An example structure for downlink transmissions is shown in FIG. 4C. The baseband signal representing a downlink physical channel may perform one or more functions. The one or more functions may comprise: scrambling of coded bits in a codeword to be transmitted on a physical channel; modulation of scrambled bits to generate complex-valued modulation symbols; mapping of the complex-valued modulation symbols onto one or several transmission layers; precoding of the complex-valued modulation symbols on a layer for transmission on the antenna ports; mapping of complex-valued modulation symbols for an antenna port to resource elements; generation of complex-valued time-domain OFDM signal for an antenna port; and/or the like. These functions are illustrated as examples and it is anticipated that other mechanisms may be implemented in various embodiments.

In an example, a gNB may transmit a first symbol and a second symbol on an antenna port, to a wireless device. The wireless device may infer the channel (e.g., fading gain, multipath delay, etc.) for conveying the second symbol on the antenna port, from the channel for conveying the first symbol on the antenna port. In an example, a first antenna port and a second antenna port may be quasi co-located if one or more large-scale properties of the channel over which a first symbol on the first antenna port is conveyed may be inferred from the channel over which a second symbol on a second antenna port is conveyed. The one or more large-scale properties may comprise at least one of: delay spread; doppler spread; doppler shift; average gain; average delay; and/or spatial Receiving (Rx) parameters.

An example modulation and up-conversion to the carrier frequency of the complex-valued OFDM baseband signal for an antenna port is shown in FIG. 4D. Filtering may be employed prior to transmission.

Figure 5A:
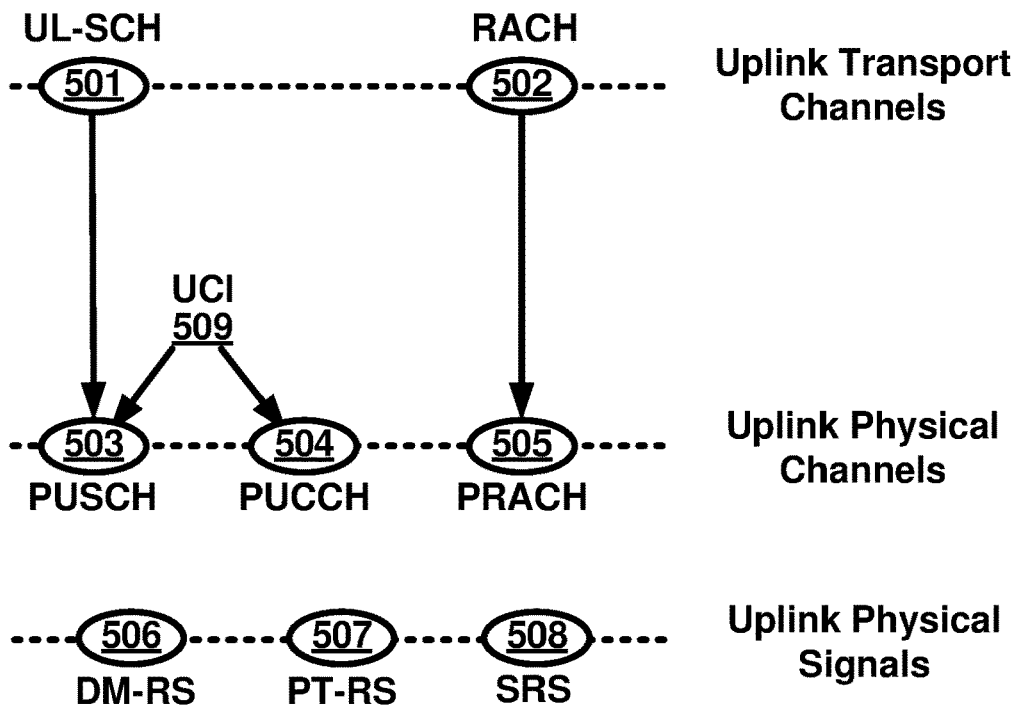
FIG. 5A is a diagram of an example uplink channel mapping and example uplink physical signals as per an aspect of an embodiment of the present disclosure.
Figure 5B:
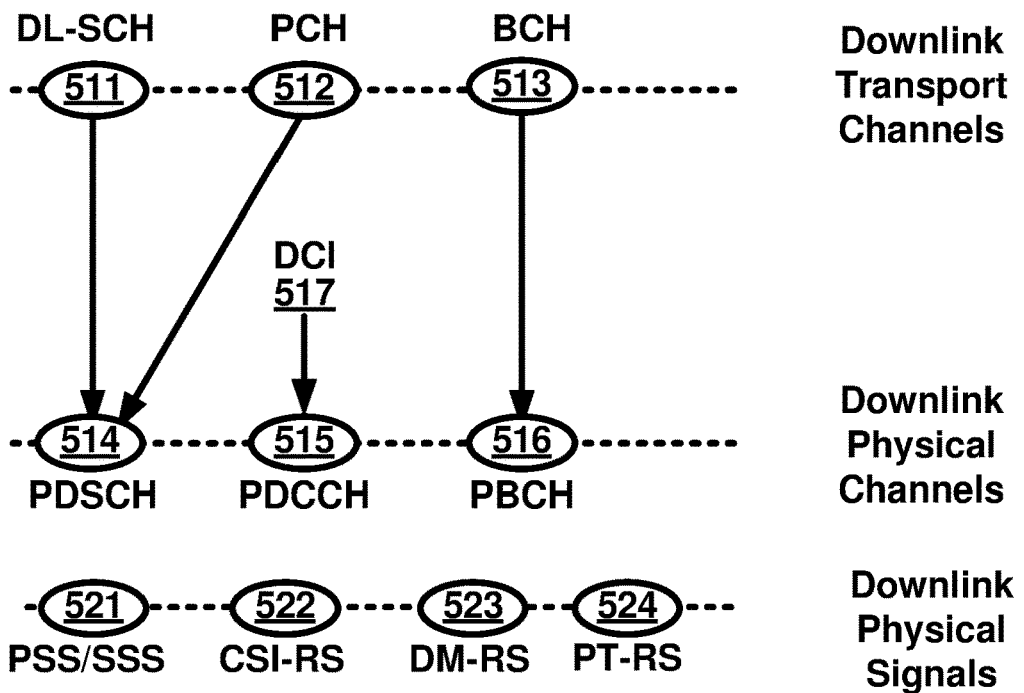
FIG. 5B is a diagram of an example downlink channel mapping and example downlink physical signals as per an aspect of an embodiment of the present disclosure.

FIG. 5A is a diagram of an example uplink channel mapping and example uplink physical signals. FIG. 5B is a diagram of an example downlink channel mapping and a downlink physical signals. In an example, a physical layer may provide one or more information transfer services to a MAC and/or one or more higher layers. For example, the physical layer may provide the one or more information transfer services to the MAC via one or more transport channels. An information transfer service may indicate how and with what characteristics data are transferred over the radio interface.

In an example embodiment, a radio network may comprise one or more downlink and/or uplink transport channels. For example, a diagram in FIG. 5A shows example uplink transport channels comprising Uplink-Shared CHannel (UL-SCH) 501 and Random Access CHannel (RACH) 502. A diagram in FIG. 5B shows example downlink transport channels comprising Downlink-Shared CHannel (DL-SCH) 511, Paging CHannel (PCH) 512, and Broadcast CHannel (BCH) 513. A transport channel may be mapped to one or more corresponding physical channels. For example, UL-SCH 501 may be mapped to Physical Uplink Shared CHannel (PUSCH) 503. RACH 502 may be mapped to PRACH 505. DL-SCH 511 and PCH 512 may be mapped to Physical Downlink Shared CHannel (PDSCH) 514. BCH 513 may be mapped to Physical Broadcast CHannel (PBCH) 516.

There may be one or more physical channels without a corresponding transport channel. The one or more physical channels may be employed for Uplink Control Information (UCI) 509 and/or Downlink Control Information (DCI) 517. For example, Physical Uplink Control CHannel (PUCCH) 504 may carry UCI 509 from a UE to a base station. For example, Physical Downlink Control CHannel (PDCCH) 515 may carry DCI 517 from a base station to a UE. NR may support UCI 509 multiplexing in PUSCH 503 when UCI 509 and PUSCH 503 transmissions may coincide in a slot at least in part. The UCI 509 may comprise at least one of CSI, Acknowledgement (ACK)/Negative Acknowledgement (NACK), and/or scheduling request. The DCI 517 on PDCCH 515 may indicate at least one of following: one or more downlink assignments and/or one or more uplink scheduling grants In uplink, a UE may transmit one or more Reference Signals (RSs) to a base station. For example, the one or more RSs may be at least one of Demodulation-RS (DM-RS) 506, Phase Tracking-RS (PT-RS) 507, and/or Sounding RS (SRS) 508. In downlink, a base station may transmit (e.g., unicast, multicast, and/or broadcast) one or more RSs to a UE. For example, the one or more RSs may be at least one of Primary Synchronization Signal (PSS)/Secondary Synchronization Signal (SSS) 521, CSI-RS 522, DM-RS 523, and/or PT-RS 524.

In an example, a UE may transmit one or more uplink DM-RSs 506 to a base station for channel estimation, for example, for coherent demodulation of one or more uplink physical channels (e.g., PUSCH 503 and/or PUCCH 504). For example, a UE may transmit a base station at least one uplink DM-RS 506 with PUSCH 503 and/or PUCCH 504, wherein the at least one uplink DM-RS 506 may be spanning a same frequency range as a corresponding physical channel. In an example, a base station may configure a UE with one or more uplink DM-RS configurations. At least one DM-RS configuration may support a front-loaded DM-RS pattern. A front-loaded DM-RS may be mapped over one or more OFDM symbols (e.g., 1 or 2 adjacent OFDM symbols). One or more additional uplink DM-RS may be configured to transmit at one or more symbols of a PUSCH and/or PUCCH. A base station may semi-statistically configure a UE with a maximum number of front-loaded DM-RS symbols for PUSCH and/or PUCCH. For example, a UE may schedule a single-symbol DM-RS and/or double symbol DM-RS based on a maximum number of front-loaded DM-RS symbols, wherein a base station may configure the UE with one or more additional uplink DM-RS for PUSCH and/or PUCCH. A new radio network may support, e.g., at least for CP-OFDM, a common DM-RS structure for DL and UL, wherein a DM-RS location, DM-RS pattern, and/or scrambling sequence may be same or different.

In an example, whether uplink PT-RS 507 is present or not may depend on a RRC configuration. For example, a presence of uplink PT-RS may be UE-specifically configured. For example, a presence and/or a pattern of uplink PT-RS 507 in a scheduled resource may be UE-specifically configured by a combination of RRC signaling and/or association with one or more parameters employed for other purposes (e.g., Modulation and Coding Scheme (MCS)) which may be indicated by DCI. When configured, a dynamic presence of uplink PT-RS 507 may be associated with one or more DCI parameters comprising at least MCS. A radio network may support plurality of uplink PT-RS densities defined in time/frequency domain. When present, a frequency domain density may be associated with at least one configuration of a scheduled bandwidth. A UE may assume a same precoding for a DMRS port and a PT-RS port. A number of PT-RS ports may be fewer than a number of DM-RS ports in a scheduled resource. For example, uplink PT-RS 507 may be confined in the scheduled time/frequency duration for a UE.

In an example, a UE may transmit SRS 508 to a base station for channel state estimation to support uplink channel dependent scheduling and/or link adaptation. For example, SRS 508 transmitted by a UE may allow for a base station to estimate an uplink channel state at one or more different frequencies. A base station scheduler may employ an uplink channel state to assign one or more resource blocks of good quality for an uplink PUSCH transmission from a UE. A base station may semi-statistically configure a UE with one or more SRS resource sets. For an SRS resource set, a base station may configure a UE with one or more SRS resources. An SRS resource set applicability may be configured by a higher layer (e.g., RRC) parameter. For example, when a higher layer parameter indicates beam management, a SRS resource in each of one or more SRS resource sets may be transmitted at a time instant. A UE may transmit one or more SRS resources in different SRS resource sets simultaneously. A new radio network may support aperiodic, periodic and/or semi-persistent SRS transmissions. A UE may transmit SRS resources based on one or more trigger types, wherein the one or more trigger types may comprise higher layer signaling (e.g., RRC) and/or one or more DCI formats (e.g., at least one DCI format may be employed for a UE to select at least one of one or more configured SRS resource sets. An SRS trigger type 0 may refer to an SRS triggered based on a higher layer signaling. An SRS trigger type 1 may refer to an SRS triggered based on one or more DCI formats. In an example, when PUSCH 503 and SRS 508 are transmitted in a same slot, a UE may be configured to transmit SRS 508 after a transmission of PUSCH 503 and corresponding uplink DM-RS 506.

In an example, a base station may semi-statistically configure a UE with one or more SRS configuration parameters indicating at least one of following: a SRS resource configuration identifier, a number of SRS ports, time domain behavior of SRS resource configuration (e.g., an indication of periodic, semi-persistent, or aperiodic SRS), slot (mini-slot, and/or subframe) level periodicity and/or offset for a periodic and/or aperiodic SRS resource, a number of OFDM symbols in a SRS resource, starting OFDM symbol of a SRS resource, a SRS bandwidth, a frequency hopping bandwidth, a cyclic shift, and/or a SRS sequence ID.

In an example, in a time domain, an SS/PBCH block may comprise one or more OFDM symbols (e.g., 4 OFDM symbols numbered in increasing order from 0 to 3) within the SS/PBCH block. An SS/PBCH block may comprise PSS/SSS 521 and PBCH 516. In an example, in the frequency domain, an SS/PBCH block may comprise one or more contiguous subcarriers (e.g., 240 contiguous subcarriers with the subcarriers numbered in increasing order from 0 to 239) within the SS/PBCH block. For example, a PSS/SSS 521 may occupy 1 OFDM symbol and 127 subcarriers. For example, PBCH 516 may span across 3 OFDM symbols and 240 subcarriers. A UE may assume that one or more SS/PBCH blocks transmitted with a same block index may be quasi co-located, e.g., with respect to Doppler spread, Doppler shift, average gain, average delay, and spatial Rx parameters. A UE may not assume quasi co-location for other SS/PBCH block transmissions. A periodicity of an SS/PBCH block may be configured by a radio network (e.g., by an RRC signaling) and one or more time locations where the SS/PBCH block may be sent may be determined by sub-carrier spacing. In an example, a UE may assume a band-specific sub-carrier spacing for an SS/PBCH block unless a radio network has configured a UE to assume a different sub-carrier spacing.

In an example, downlink CSI-RS 522 may be employed for a UE to acquire channel state information. A radio network may support periodic, aperiodic, and/or semi-persistent transmission of downlink CSI-RS 522. For example, a base station may semi-statistically configure and/or reconfigure a UE with periodic transmission of downlink CSI-RS 522. A configured CSI-RS resources may be activated ad/or deactivated. For semi-persistent transmission, an activation and/or deactivation of CSI-RS resource may be triggered dynamically. In an example, CSI-RS configuration may comprise one or more parameters indicating at least a number of antenna ports. For example, a base station may configure a UE with 32 ports. A base station may semi-statistically configure a UE with one or more CSI-RS resource sets. One or more CSI-RS resources may be allocated from one or more CSI-RS resource sets to one or more UEs. For example, a base station may semi-statistically configure one or more parameters indicating CSI RS resource mapping, for example, time-domain location of one or more CSI-RS resources, a bandwidth of a CSI-RS resource, and/or a periodicity. In an example, a UE may be configured to employ a same OFDM symbols for downlink CSI-RS 522 and Control Resource Set (CORESET) when the downlink CSI-RS 522 and CORESET are spatially quasi co-located and resource elements associated with the downlink CSI-RS 522 are the outside of PRBs configured for CORESET. In an example, a UE may be configured to employ a same OFDM symbols for downlink CSI-RS 522 and SSB/PBCH when the downlink CSI-RS 522 and SSB/PBCH are spatially quasi co-located and resource elements associated with the downlink CSI-RS 522 are the outside of PRBs configured for SSB/PBCH.

In an example, a UE may transmit one or more downlink DM-RSs 523 to a base station for channel estimation, for example, for coherent demodulation of one or more downlink physical channels (e.g., PDSCH 514). For example, a radio network may support one or more variable and/or configurable DM-RS patterns for data demodulation. At least one downlink DM-RS configuration may support a front-loaded DM-RS pattern. A front-loaded DM-RS may be mapped over one or more OFDM symbols (e.g., 1 or 2 adjacent OFDM symbols). A base station may semi-statistically configure a UE with a maximum number of front-loaded DM-RS symbols for PDSCH 514. For example, a DM-RS configuration may support one or more DM-RS ports. For example, for single user-MIMO, a DM-RS configuration may support at least 8 orthogonal downlink DM-RS ports. For example, for multiuser-MIMO, a DM-RS configuration may support 12 orthogonal downlink DM-RS ports. A radio network may support, e.g., at least for CP-OFDM, a common DM-RS structure for DL and UL, wherein a DM-RS location, DM-RS pattern, and/or scrambling sequence may be same or different.

In an example, whether downlink PT-RS 524 is present or not may depend on a RRC configuration. For example, a presence of downlink PT-RS 524 may be UE-specifically configured. For example, a presence and/or a pattern of downlink PT-RS 524 in a scheduled resource may be UE-specifically configured by a combination of RRC signaling and/or association with one or more parameters employed for other purposes (e.g., MCS) which may be indicated by DCI. When configured, a dynamic presence of downlink PT-RS 524 may be associated with one or more DCI parameters comprising at least MCS. A radio network may support plurality of PT-RS densities defined in time/frequency domain. When present, a frequency domain density may be associated with at least one configuration of a scheduled bandwidth. A UE may assume a same precoding for a DMRS port and a PT-RS port. A number of PT-RS ports may be fewer than a number of DM-RS ports in a scheduled resource. For example, downlink PT-RS 524 may be confined in the scheduled time/frequency duration for a UE.

Figure 6:
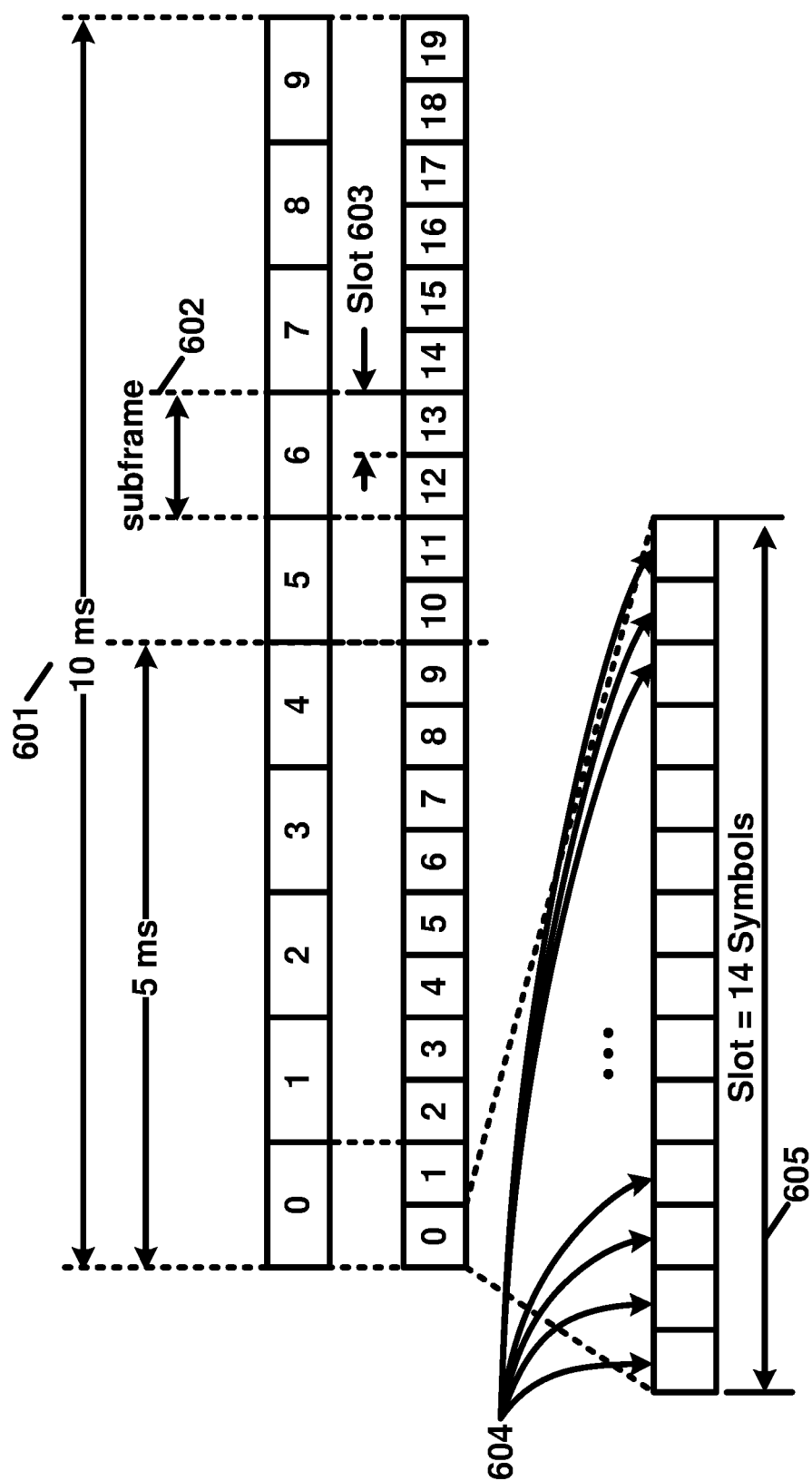
FIG. 6 is a diagram depicting an example transmission time or reception time for a carrier as per an aspect of an embodiment of the present disclosure.

FIG. 6 is a diagram depicting an example transmission time and reception time for a carrier as per an aspect of an embodiment of the present disclosure. A multicarrier OFDM communication system may include one or more carriers, for example, ranging from 1 to 32 carriers, in case of carrier aggregation, or ranging from 1 to 64 carriers, in case of dual connectivity. Different radio frame structures may be supported (e.g., for FDD and for TDD duplex mechanisms).

FIG. 6 shows an example frame timing. Downlink and uplink transmissions may be organized into radio frames 601. In this example, radio frame duration is 10 ms. In this example, a 10 ms radio frame 601 may be divided into ten equally sized subframes 602 with 1 ms duration. Subframe(s) may comprise one or more slots (e.g. slots 603 and 605) depending on subcarrier spacing and/or CP length. For example, a subframe with 15 kHz, 30 kHz, 60 kHz, 120 kHz, 240 kHz and 480 kHz subcarrier spacing may comprise one, two, four, eight, sixteen and thirty-two slots, respectively. In FIG. 6, a subframe may be divided into two equally sized slots 603 with 0.5 ms duration. For example, 10 subframes may be available for downlink transmission and 10 subframes may be available for uplink transmissions in a 10 ms interval. Uplink and downlink transmissions may be separated in the frequency domain. Slot(s) may include a plurality of OFDM symbols 604. The number of OFDM symbols 604 in a slot 605 may depend on the cyclic prefix length. For example, a slot may be 14 OFDM symbols for the same subcarrier spacing of up to 480 kHz with normal CP. A slot may be 12 OFDM symbols for the same subcarrier spacing of 60 kHz with extended CP. A slot may contain downlink, uplink, or a downlink part and an uplink part and/or alike.

FIG. 7A is a diagram depicting example sets of OFDM subcarriers as per an aspect of an embodiment of the present disclosure. In the example, a gNB may communicate with a wireless device with a carrier with an example channel bandwidth 700. Arrow(s) in the diagram may depict a subcarrier in a multicarrier OFDM system. The OFDM system may use technology such as OFDM technology, SC-FDMA technology, and/or the like. In an example, an arrow 701 shows a subcarrier transmitting information symbols. In an example, a subcarrier spacing 702, between two contiguous subcarriers in a carrier, may be any one of 15 KHz, 30 KHz, 60 KHz, 120 KHz, 240 KHz etc. In an example, different subcarrier spacing may correspond to different transmission numerologies. In an example, a transmission numerology may comprise at least: a numerology index; a value of subcarrier spacing; a type of cyclic prefix (CP). In an example, a gNB may transmit to/receive from a UE on a number of subcarriers 703 in a carrier. In an example, a bandwidth occupied by a number of subcarriers 703 (transmission bandwidth) may be smaller than the channel bandwidth 700 of a carrier, due to guard band 704 and 705. In an example, a guard band 704 and 705 may be used to reduce interference to and from one or more neighbor carriers. A number of subcarriers (transmission bandwidth) in a carrier may depend on the channel bandwidth of the carrier and the subcarrier spacing. For example, a transmission bandwidth, for a carrier with 20 MHz channel bandwidth and 15 KHz subcarrier spacing, may be in number of 1024 subcarriers.

In an example, a gNB and a wireless device may communicate with multiple CCs when configured with CA. In an example, different component carriers may have different bandwidth and/or subcarrier spacing, if CA is supported. In an example, a gNB may transmit a first type of service to a UE on a first component carrier. The gNB may transmit a second type of service to the UE on a second component carrier. Different type of services may have different service requirement (e.g., data rate, latency, reliability), which may be suitable for transmission via different component carrier having different subcarrier spacing and/or bandwidth. FIG. 7B shows an example embodiment. A first component carrier may comprise a first number of subcarriers 706 with a first subcarrier spacing 709. A second component carrier may comprise a second number of subcarriers 707 with a second subcarrier spacing 710. A third component carrier may comprise a third number of subcarriers 708 with a third subcarrier spacing 711. Carriers in a multicarrier OFDM communication system may be contiguous carriers, non-contiguous carriers, or a combination of both contiguous and non-contiguous carriers.

Figure 8:
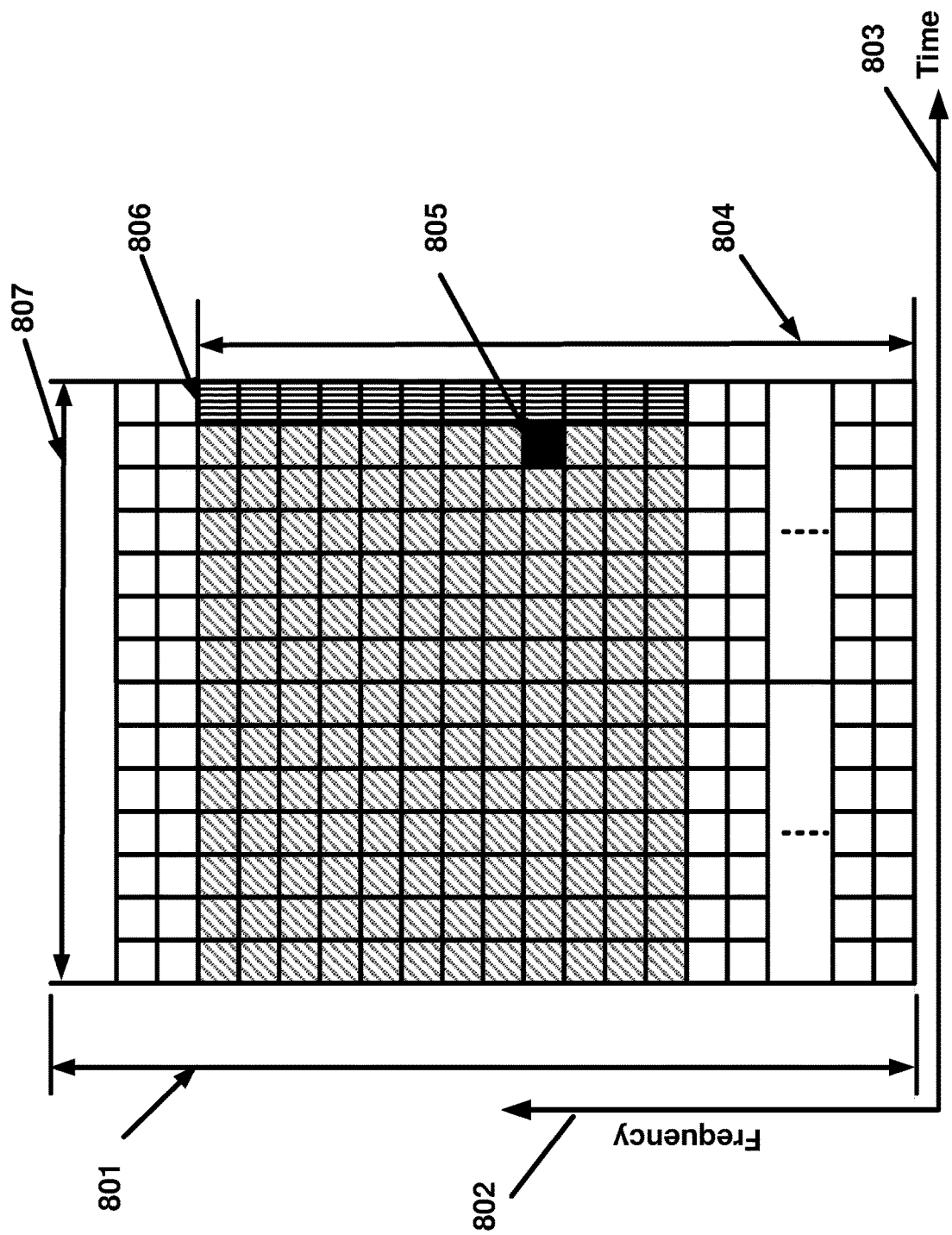
FIG. 8 is a diagram depicting example OFDM radio resources as per an aspect of an embodiment of the present disclosure.

FIG. 8 is a diagram depicting OFDM radio resources as per an aspect of an embodiment of the present disclosure. In an example, a carrier may have a transmission bandwidth 801. In an example, a resource grid may be in a structure of frequency domain 802 and time domain 803. In an example, a resource grid may comprise a first number of OFDM symbols in a subframe and a second number of resource blocks, starting from a common resource block indicated by higher-layer signaling (e.g. RRC signaling), for a transmission numerology and a carrier. In an example, in a resource grid, a resource unit identified by a subcarrier index and a symbol index may be a resource element 805. In an example, a subframe may comprise a first number of OFDM symbols 807 depending on a numerology associated with a carrier. For example, when a subcarrier spacing of a numerology of a carrier is 15 KHz, a subframe may have 14 OFDM symbols for a carrier. When a subcarrier spacing of a numerology is 30 KHz, a subframe may have 28 OFDM symbols. When a subcarrier spacing of a numerology is 60 Khz, a subframe may have 56 OFDM symbols, etc. In an example, a second number of resource blocks comprised in a resource grid of a carrier may depend on a bandwidth and a numerology of the carrier.

As shown in FIG. 8, a resource block 806 may comprise 12 subcarriers. In an example, multiple resource blocks may be grouped into a Resource Block Group (RBG) 804. In an example, a size of a RBG may depend on at least one of: a RRC message indicating a RBG size configuration; a size of a carrier bandwidth; or a size of a bandwidth part of a carrier. In an example, a carrier may comprise multiple bandwidth parts. A first bandwidth part of a carrier may have different frequency location and/or bandwidth from a second bandwidth part of the carrier.

In an example, a gNB may transmit a downlink control information comprising a downlink or uplink resource block assignment to a wireless device. A base station may transmit to or receive from, a wireless device, data packets (e.g. transport blocks) scheduled and transmitted via one or more resource blocks and one or more slots according to parameters in a downlink control information and/or RRC message(s). In an example, a starting symbol relative to a first slot of the one or more slots may be indicated to the wireless device. In an example, a gNB may transmit to or receive from, a wireless device, data packets scheduled on one or more RBGs and one or more slots.

In an example, a gNB may transmit a downlink control information comprising a downlink assignment to a wireless device via one or more PDCCHs. The downlink assignment may comprise parameters indicating at least modulation and coding format; resource allocation; and/or HARQ information related to DL-SCH. In an example, a resource allocation may comprise parameters of resource block allocation; and/or slot allocation. In an example, a gNB may dynamically allocate resources to a wireless device via a Cell-Radio Network Temporary Identifier (C-RNTI) on one or more PDCCHs. The wireless device may monitor the one or more PDCCHs in order to find possible allocation when its downlink reception is enabled. The wireless device may receive one or more downlink data package on one or more PDSCH scheduled by the one or more PDCCHs, when successfully detecting the one or more PDCCHs.

In an example, a gNB may allocate Configured Scheduling (CS) resources for down link transmission to a wireless device. The gNB may transmit one or more RRC messages indicating a periodicity of the CS grant. The gNB may transmit a DCI via a PDCCH addressed to a Configured Scheduling-RNTI (CS-RNTI) activating the CS resources. The DCI may comprise parameters indicating that the downlink grant is a CS grant. The CS grant may be implicitly reused according to the periodicity defined by the one or more RRC messages, until deactivated.

In an example, a gNB may transmit a downlink control information comprising an uplink grant to a wireless device via one or more PDCCHs. The uplink grant may comprise parameters indicating at least modulation and coding format; resource allocation; and/or HARQ information related to UL-SCH. In an example, a resource allocation may comprise parameters of resource block allocation; and/or slot allocation. In an example, a gNB may dynamically allocate resources to a wireless device via a C-RNTI on one or more PDCCHs. The wireless device may monitor the one or more PDCCHs in order to find possible resource allocation. The wireless device may transmit one or more uplink data package via one or more PUSCH scheduled by the one or more PDCCHs, when successfully detecting the one or more PDCCHs.

In an example, a gNB may allocate CS resources for uplink data transmission to a wireless device. The gNB may transmit one or more RRC messages indicating a periodicity of the CS grant. The gNB may transmit a DCI via a PDCCH addressed to a CS-RNTI activating the CS resources. The DCI may comprise parameters indicating that the uplink grant is a CS grant. The CS grant may be implicitly reused according to the periodicity defined by the one or more RRC message, until deactivated.

In an example, a base station may transmit DCI/control signaling via PDCCH. The DCI may take a format in a plurality of formats. A DCI may comprise downlink and/or uplink scheduling information (e.g., resource allocation information, HARQ related parameters, MCS), request for CSI (e.g., aperiodic CQI reports), request for SRS, uplink power control commands for one or more cells, one or more timing information (e.g., TB transmission/reception timing, HARQ feedback timing, etc.), etc. In an example, a DCI may indicate an uplink grant comprising transmission parameters for one or more transport blocks. In an example, a DCI may indicate downlink assignment indicating parameters for receiving one or more transport blocks. In an example, a DCI may be used by base station to initiate a contention-free random access at the wireless device. In an example, the base station may transmit a DCI comprising slot format indicator (SFI) notifying a slot format. In an example, the base station may transmit a DCI comprising pre-emption indication notifying the PRB(s) and/or OFDM symbol(s) where a UE may assume no transmission is intended for the UE. In an example, the base station may transmit a DCI for group power control of PUCCH or PUSCH or SRS. In an example, a DCI may correspond to an RNTI. In an example, the wireless device may obtain an RNTI in response to completing the initial access (e.g., C-RNTI). In an example, the base station may configure an RNTI for the wireless (e.g., CS-RNTI, TPC-CS-RNTI, TPC-PUCCH-RNTI, TPC-PUSCH-RNTI, TPC-SRS-RNTI). In an example, the wireless device may compute an RNTI (e.g., the wireless device may compute RA-RNTI based on resources used for transmission of a preamble). In an example, an RNTI may have a pre-configured value (e.g., P-RNTI or SI-RNTI). In an example, a wireless device may monitor a group common search space which may be used by base station for transmitting DCIs that are intended for a group of UEs. In an example, a group common DCI may correspond to an RNTI which is commonly configured for a group of UEs. In an example, a wireless device may monitor a UE-specific search space. In an example, a UE specific DCI may correspond to an RNTI configured for the wireless device.

A NR system may support a single beam operation and/or a multi-beam operation. In a multi-beam operation, a base station may perform a downlink beam sweeping to provide coverage for common control channels and/or downlink SS blocks, which may comprise at least a PSS, a SSS, and/or PBCH. A wireless device may measure quality of a beam pair link using one or more RSs. One or more SS blocks, or one or more CSI-RS resources, associated with a CSI-RS resource index (CRI), or one or more DM-RSs of PBCH, may be used as RS for measuring quality of a beam pair link. Quality of a beam pair link may be defined as a reference signal received power (RSRP) value, or a reference signal received quality (RSRQ) value, and/or a CSI value measured on RS resources. The base station may indicate whether an RS resource, used for measuring a beam pair link quality, is quasi-co-located (QCLed) with DM-RSs of a control channel. A RS resource and DM-RSs of a control channel may be called QCLed when a channel characteristics from a transmission on an RS to a wireless device, and that from a transmission on a control channel to a wireless device, are similar or same under a configured criterion. In a multi-beam operation, a wireless device may perform an uplink beam sweeping to access a cell.

In an example, a wireless device may be configured to monitor PDCCH on one or more beam pair links simultaneously depending on a capability of a wireless device. This may increase robustness against beam pair link blocking. A base station may transmit one or more messages to configure a wireless device to monitor PDCCH on one or more beam pair links in different PDCCH OFDM symbols. For example, a base station may transmit higher layer signaling (e.g. RRC signaling) or MAC CE comprising parameters related to the Rx beam setting of a wireless device for monitoring PDCCH on one or more beam pair links. A base station may transmit indication of spatial QCL assumption between an DL RS antenna port(s) (for example, cell-specific CSI-RS, or wireless device-specific CSI-RS, or SS block, or PBCH with or without DM-RSs of PBCH), and DL RS antenna port(s) for demodulation of DL control channel. Signaling for beam indication for a PDCCH may be MAC CE signaling, or RRC signaling, or DCI signaling, or specification-transparent and/or implicit method, and combination of these signaling methods.

For reception of unicast DL data channel, a base station may indicate spatial QCL parameters between DL RS antenna port(s) and DM-RS antenna port(s) of DL data channel. The base station may transmit DCI (e.g. downlink grants) comprising information indicating the RS antenna port(s). The information may indicate RS antenna port(s) which may be QCL-ed with the DM-RS antenna port(s). Different set of DM-RS antenna port(s) for a DL data channel may be indicated as QCL with different set of the RS antenna port(s).

Figure 9A:
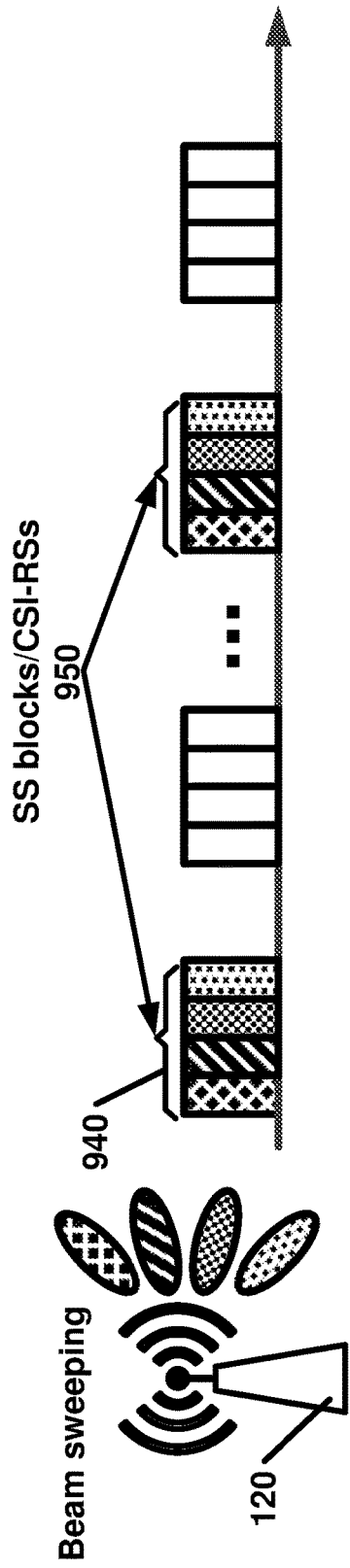
FIG. 9A is a diagram depicting an example CSI-RS and/or SS block transmission in a multi-beam system.

FIG. 9A is an example of beam sweeping in a DL channel. In an RRC_INACTIVE state or RRC_IDLE state, a wireless device may assume that SS blocks form an SS burst 940, and an SS burst set 950. The SS burst set 950 may have a given periodicity. For example, in a multi-beam operation, a base station 120 may transmit SS blocks in multiple beams, together forming a SS burst 940. One or more SS blocks may be transmitted on one beam. If multiple SS bursts 940 are transmitted with multiple beams, SS bursts together may form SS burst set 950.

A wireless device may further use CSI-RS in the multi-beam operation for estimating a beam quality of a links between a wireless device and a base station. A beam may be associated with a CSI-RS. For example, a wireless device may, based on a RSRP measurement on CSI-RS, report a beam index, as indicated in a CRI for downlink beam selection, and associated with a RSRP value of a beam. A CSI-RS may be transmitted on a CSI-RS resource including at least one of one or more antenna ports, one or more time or frequency radio resources. A CSI-RS resource may be configured in a cell-specific way by common RRC signaling, or in a wireless device-specific way by dedicated RRC signaling, and/or L1/L2 signaling. Multiple wireless devices covered by a cell may measure a cell-specific CSI-RS resource. A dedicated subset of wireless devices covered by a cell may measure a wireless device-specific CSI-RS resource.

A CSI-RS resource may be transmitted periodically, or using aperiodic transmission, or using a multi-shot or semi-persistent transmission. For example, in a periodic transmission in FIG. 9A, a base station 120 may transmit configured CSI-RS resources 940 periodically using a configured periodicity in a time domain. In an aperiodic transmission, a configured CSI-RS resource may be transmitted in a dedicated time slot. In a multi-shot or semi-persistent transmission, a configured CSI-RS resource may be transmitted within a configured period. Beams used for CSI-RS transmission may have different beam width than beams used for SS-blocks transmission.

Figure 9B:
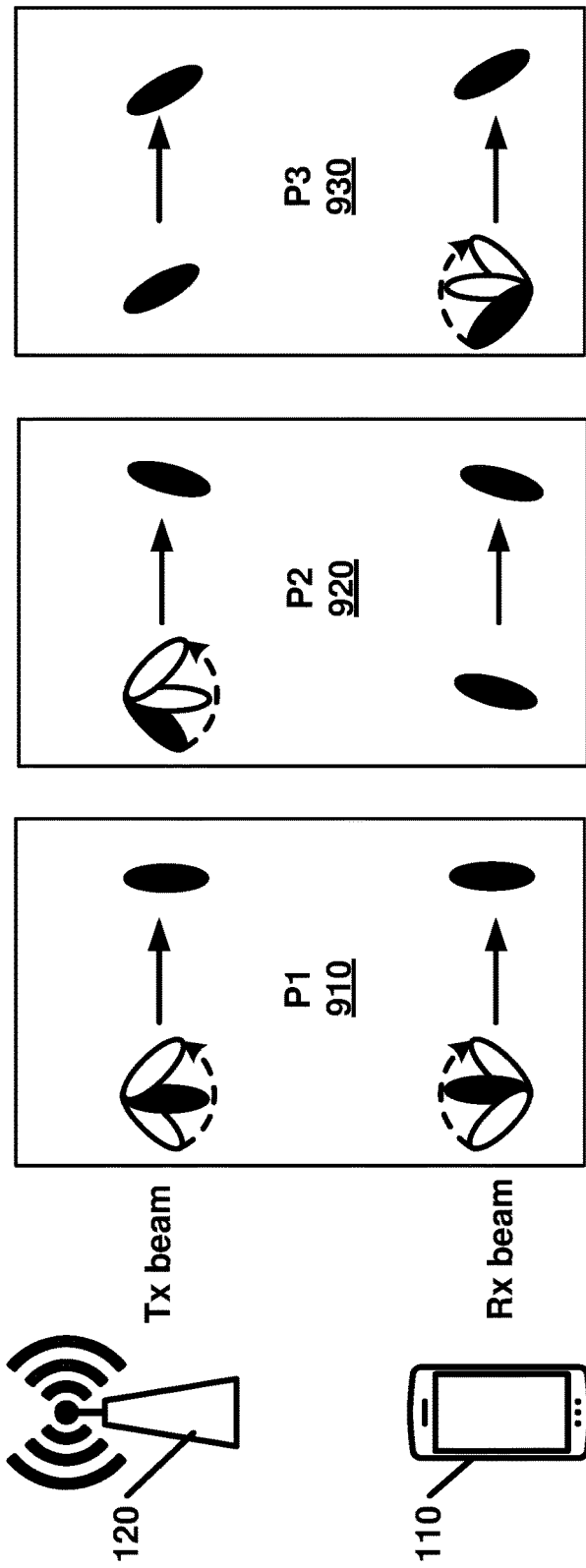
FIG. 9B is a diagram depicting an example downlink beam management procedure as per an aspect of an embodiment of the present disclosure.

FIG. 9B is an example of a beam management procedure in an example new radio network. A base station 120 and/or a wireless device 110 may perform a downlink L1/L2 beam management procedure. One or more of the following downlink L1/L2 beam management procedures may be performed within one or more wireless devices 110 and one or more base stations 120. In an example, a P-1 procedure 910 may be used to enable the wireless device 110 to measure one or more Transmission (Tx) beams associated with the base station 120 to support a selection of a first set of Tx beams associated with the base station 120 and a first set of Rx beam(s) associated with a wireless device 110. For beamforming at a base station 120, a base station 120 may sweep a set of different TX beams. For beamforming at a wireless device 110, a wireless device 110 may sweep a set of different Rx beams. In an example, a P-2 procedure 920 may be used to enable a wireless device 110 to measure one or more Tx beams associated with a base station 120 to possibly change a first set of Tx beams associated with a base station 120. A P-2 procedure 920 may be performed on a possibly smaller set of beams for beam refinement than in the P-1 procedure 910. A P-2 procedure 920 may be a special case of a P-1 procedure 910. In an example, a P-3 procedure 930 may be used to enable a wireless device 110 to measure at least one Tx beam associated with a base station 120 to change a first set of Rx beams associated with a wireless device 110.

A wireless device 110 may transmit one or more beam management reports to a base station 120. In one or more beam management reports, a wireless device 110 may indicate some beam pair quality parameters, comprising at least, one or more beam identifications; RSRP; Precoding Matrix Indicator (PMI)/Channel Quality Indicator (CQI)/Rank Indicator (RI) of a subset of configured beams. Based on one or more beam management reports, a base station 120 may transmit to a wireless device 110 a signal indicating that one or more beam pair links are one or more serving beams. A base station 120 may transmit PDCCH and PDSCH for a wireless device 110 using one or more serving beams.

In an example embodiment, new radio network may support a Bandwidth Adaptation (BA). In an example, receive and/or transmit bandwidths configured by an UE employing a BA may not be large. For example, a receive and/or transmit bandwidths may not be as large as a bandwidth of a cell. Receive and/or transmit bandwidths may be adjustable. For example, a UE may change receive and/or transmit bandwidths, e.g., to shrink during period of low activity to save power. For example, a UE may change a location of receive and/or transmit bandwidths in a frequency domain, e.g. to increase scheduling flexibility. For example, a UE may change a subcarrier spacing, e.g. to allow different services.

In an example embodiment, a subset of a total cell bandwidth of a cell may be referred to as a Bandwidth Part (BWP). A base station may configure a UE with one or more BWPs to achieve a BA. For example, a base station may indicate, to a UE, which of the one or more (configured) BWPs is an active BWP.

Figure 10:
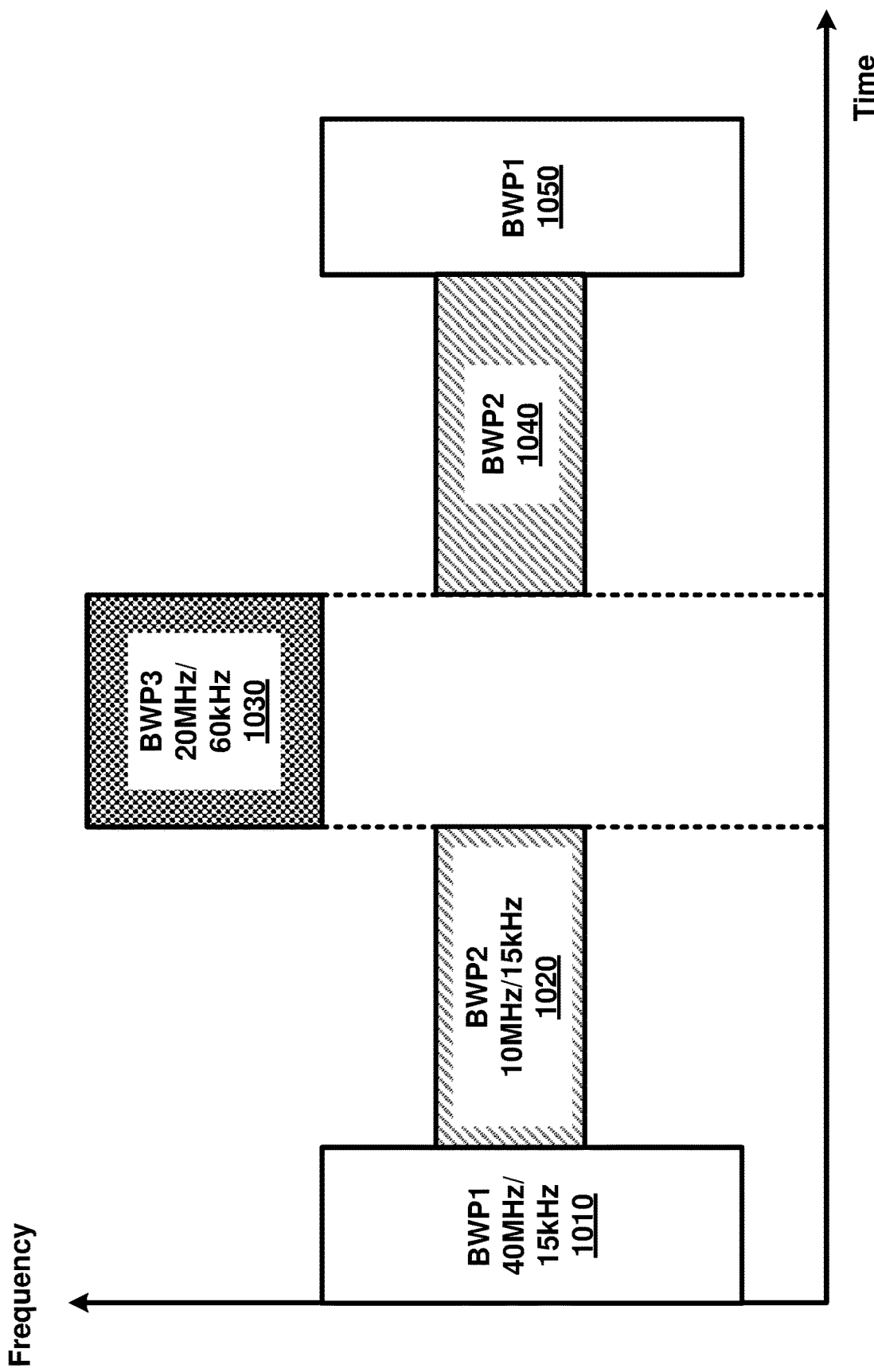
FIG. 10 is an example diagram of configured BWPs as per an aspect of an embodiment of the present disclosure.

FIG. 10 is an example diagram of 3 BWPs configured: BWP1 (1010 and 1050) with a width of 40 MHz and subcarrier spacing of 15 kHz; BWP2 (1020 and 1040) with a width of 10 MHz and subcarrier spacing of 15 kHz; BWP3 1030 with a width of 20 MHz and subcarrier spacing of 60 kHz.

In an example, a UE, configured for operation in one or more BWPs of a cell, may be configured by one or more higher layers (e.g. RRC layer) for a cell a set of one or more BWPs (e.g., at most four BWPs) for receptions by the UE (DL BWP set) in a DL bandwidth by at least one parameter DL-BWP and a set of one or more BWPs (e.g., at most four BWPs) for transmissions by a UE (UL BWP set) in an UL bandwidth by at least one parameter UL-BWP for a cell.

To enable BA on the PCell, a base station may configure a UE with one or more UL and DL BWP pairs. To enable BA on SCells (e.g., in case of CA), a base station may configure a UE at least with one or more DL BWPs (e.g., there may be none in an UL).

In an example, an initial active DL BWP may be defined by at least one of a location and number of contiguous PRBs, a subcarrier spacing, or a cyclic prefix, for a control resource set for at least one common search space. For operation on the PCell, one or more higher layer parameters may indicate at least one initial UL BWP for a random access procedure. If a UE is configured with a secondary carrier on a primary cell, the UE may be configured with an initial BWP for random access procedure on a secondary carrier.

In an example, for unpaired spectrum operation, a UE may expect that a center frequency for a DL BWP may be same as a center frequency for a UL BWP.

For example, for a DL BWP or an UL BWP in a set of one or more DL BWPs or one or more UL BWPs, respectively, a base statin may semi-statistically configure a UE for a cell with one or more parameters indicating at least one of following: a subcarrier spacing; a cyclic prefix; a number of contiguous PRBs; an index in the set of one or more DL BWPs and/or one or more UL BWPs; a link between a DL BWP and an UL BWP from a set of configured DL BWPs and UL BWPs; a DCI detection to a PDSCH reception timing; a PDSCH reception to a HARQ-ACK transmission timing value; a DCI detection to a PUSCH transmission timing value; an offset of a first PRB of a DL bandwidth or an UL bandwidth, respectively, relative to a first PRB of a bandwidth.

In an example, for a DL BWP in a set of one or more DL BWPs on a PCell, a base station may configure a UE with one or more control resource sets for at least one type of common search space and/or one UE-specific search space. For example, a base station may not configure a UE without a common search space on a PCell, or on a PSCell, in an active DL BWP.

For an UL BWP in a set of one or more UL BWPs, a base station may configure a UE with one or more resource sets for one or more PUCCH transmissions.

In an example, if a DCI comprises a BWP indicator field, a BWP indicator field value may indicate an active DL BWP, from a configured DL BWP set, for one or more DL receptions. If a DCI comprises a BWP indicator field, a BWP indicator field value may indicate an active UL BWP, from a configured UL BWP set, for one or more UL transmissions.

In an example, for a PCell, a base station may semi-statistically configure a UE with a default DL BWP among configured DL BWPs. If a UE is not provided a default DL BWP, a default BWP may be an initial active DL BWP.

In an example, a base station may configure a UE with a timer value for a PCell. For example, a UE may start a timer, referred to as BWP inactivity timer, when a UE detects a DCI indicating an active DL BWP, other than a default DL BWP, for a paired spectrum operation or when a UE detects a DCI indicating an active DL BWP or UL BWP, other than a default DL BWP or UL BWP, for an unpaired spectrum operation. The UE may increment the timer by an interval of a first value (e.g., the first value may be 1 millisecond or 0.5 milliseconds) if the UE does not detect a DCI during the interval for a paired spectrum operation or for an unpaired spectrum operation. In an example, the timer may expire when the timer is equal to the timer value. A UE may switch to the default DL BWP from an active DL BWP when the timer expires.

In an example, a base station may semi-statistically configure a UE with one or more BWPs. A UE may switch an active BWP from a first BWP to a second BWP in response to receiving a DCI indicating the second BWP as an active BWP and/or in response to an expiry of BWP inactivity timer (for example, the second BWP may be a default BWP). For example, FIG. 10 is an example diagram of 3 BWPs configured, BWP1 (1010 and 1050), BWP2 (1020 and 1040), and BWP3 (1030). BWP2 (1020 and 1040) may be a default BWP. BWP1 (1010) may be an initial active BWP. In an example, a UE may switch an active BWP from BWP1 1010 to BWP2 1020 in response to an expiry of BWP inactivity timer. For example, a UE may switch an active BWP from BWP2 1020 to BWP3 1030 in response to receiving a DCI indicating BWP3 1030 as an active BWP. Switching an active BWP from BWP3 1030 to BWP2 1040 and/or from BWP2 1040 to BWP1 1050 may be in response to receiving a DCI indicating an active BWP and/or in response to an expiry of BWP inactivity timer.

In an example, if a UE is configured for a secondary cell with a default DL BWP among configured DL BWPs and a timer value, UE procedures on a secondary cell may be same as on a primary cell using the timer value for the secondary cell and the default DL BWP for the secondary cell.

In an example, if a base station configures a UE with a first active DL BWP and a first active UL BWP on a secondary cell or carrier, a UE may employ an indicated DL BWP and an indicated UL BWP on a secondary cell as a respective first active DL BWP and first active UL BWP on a secondary cell or carrier.

Figure 11A:
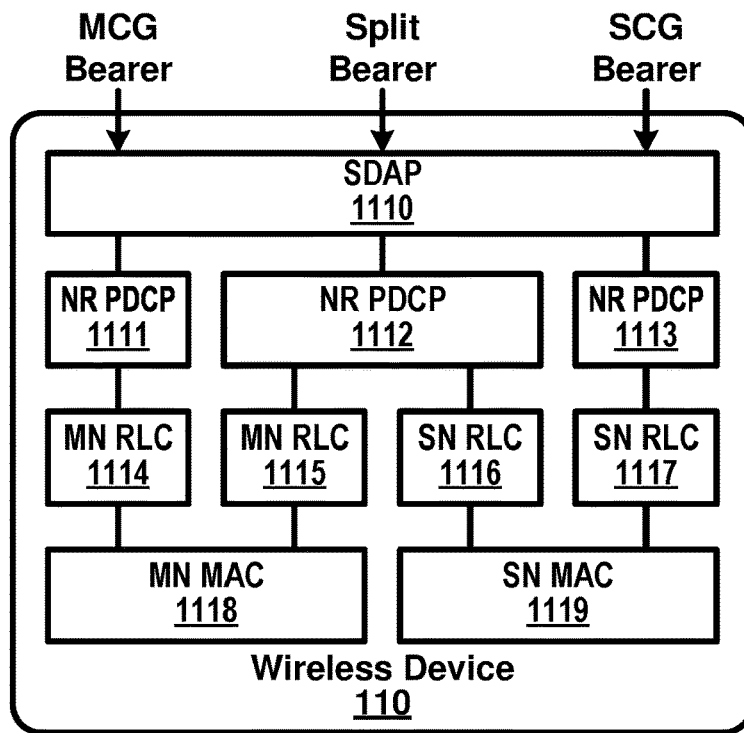
FIG. 11A, and FIG. 11B are diagrams of an example multi connectivity as per an aspect of an embodiment of the present disclosure.
Figure 11B:
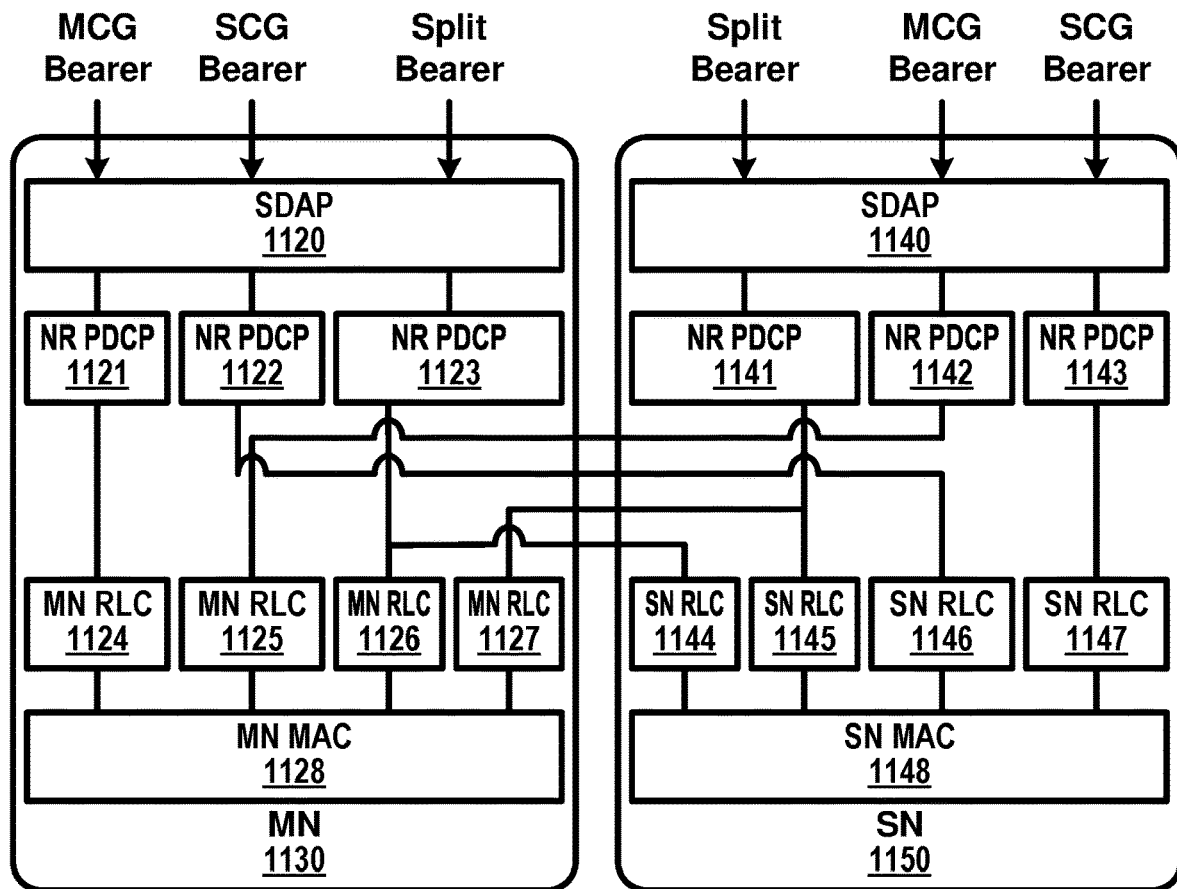

FIG. 11A and FIG. 11B show packet flows employing a multi connectivity (e.g. dual connectivity, multi connectivity, tight interworking, and/or the like). FIG. 11A is an example diagram of a protocol structure of a wireless device 110 (e.g. UE) with CA and/or multi connectivity as per an aspect of an embodiment. FIG. 11B is an example diagram of a protocol structure of multiple base stations with CA and/or multi connectivity as per an aspect of an embodiment. The multiple base stations may comprise a master node, MN 1130 (e.g. a master node, a master base station, a master gNB, a master eNB, and/or the like) and a secondary node, SN 1150 (e.g. a secondary node, a secondary base station, a secondary gNB, a secondary eNB, and/or the like). A master node 1130 and a secondary node 1150 may co-work to communicate with a wireless device 110.

When multi connectivity is configured for a wireless device 110, the wireless device 110, which may support multiple reception/transmission functions in an RRC connected state, may be configured to utilize radio resources provided by multiple schedulers of a multiple base stations. Multiple base stations may be inter-connected via a non-ideal or ideal backhaul (e.g. Xn interface, X2 interface, and/or the like). A base station involved in multi connectivity for a certain wireless device may perform at least one of two different roles: a base station may either act as a master base station or as a secondary base station. In multi connectivity, a wireless device may be connected to one master base station and one or more secondary base stations. In an example, a master base station (e.g. the MN 1130) may provide a master cell group (MCG) comprising a primary cell and/or one or more secondary cells for a wireless device (e.g. the wireless device 110). A secondary base station (e.g. the SN 1150) may provide a secondary cell group (SCG) comprising a primary secondary cell (PSCell) and/or one or more secondary cells for a wireless device (e.g. the wireless device 110).

In multi connectivity, a radio protocol architecture that a bearer employs may depend on how a bearer is setup. In an example, three different type of bearer setup options may be supported: an MCG bearer, an SCG bearer, and/or a split bearer. A wireless device may receive/transmit packets of an MCG bearer via one or more cells of the MCG, and/or may receive/transmits packets of an SCG bearer via one or more cells of an SCG. Multi-connectivity may also be described as having at least one bearer configured to use radio resources provided by the secondary base station. Multi-connectivity may or may not be configured/implemented in some of the example embodiments.

In an example, a wireless device (e.g. Wireless Device 110) may transmit and/or receive: packets of an MCG bearer via an SDAP layer (e.g. SDAP 1110), a PDCP layer (e.g. NR PDCP 1111), an RLC layer (e.g. MN RLC 1114), and a MAC layer (e.g. MN MAC 1118); packets of a split bearer via an SDAP layer (e.g. SDAP 1110), a PDCP layer (e.g. NR PDCP 1112), one of a master or secondary RLC layer (e.g. MN RLC 1115, SN RLC 1116), and one of a master or secondary MAC layer (e.g. MN MAC 1118, SN MAC 1119); and/or packets of an SCG bearer via an SDAP layer (e.g. SDAP 1110), a PDCP layer (e.g. NR PDCP 1113), an RLC layer (e.g. SN RLC 1117), and a MAC layer (e.g. MN MAC 1119).

In an example, a master base station (e.g. MN 1130) and/or a secondary base station (e.g. SN 1150) may transmit/receive: packets of an MCG bearer via a master or secondary node SDAP layer (e.g. SDAP 1120, SDAP 1140), a master or secondary node PDCP layer (e.g. NR PDCP 1121, NR PDCP 1142), a master node RLC layer (e.g. MN RLC 1124, MN RLC 1125), and a master node MAC layer (e.g. MN MAC 1128); packets of an SCG bearer via a master or secondary node SDAP layer (e.g. SDAP 1120, SDAP 1140), a master or secondary node PDCP layer (e.g. NR PDCP 1122, NR PDCP 1143), a secondary node RLC layer (e.g. SN RLC 1146, SN RLC 1147), and a secondary node MAC layer (e.g. SN MAC 1148); packets of a split bearer via a master or secondary node SDAP layer (e.g. SDAP 1120, SDAP 1140), a master or secondary node PDCP layer (e.g. NR PDCP 1123, NR PDCP 1141), a master or secondary node RLC layer (e.g. MN RLC 1126, SN RLC 1144, SN RLC 1145, MN RLC 1127), and a master or secondary node MAC layer (e.g. MN MAC 1128, SN MAC 1148).

In multi connectivity, a wireless device may configure multiple MAC entities: one MAC entity (e.g. MN MAC 1118) for a master base station, and other MAC entities (e.g. SN MAC 1119) for a secondary base station. In multi-connectivity, a configured set of serving cells for a wireless device may comprise two subsets: an MCG comprising serving cells of a master base station, and SCGs comprising serving cells of a secondary base station. For an SCG, one or more of following configurations may be applied: at least one cell of an SCG has a configured UL CC and at least one cell of a SCG, named as primary secondary cell (PSCell, PCell of SCG, or sometimes called PCell), is configured with PUCCH resources; when an SCG is configured, there may be at least one SCG bearer or one Split bearer; upon detection of a physical layer problem or a random access problem on a PSCell, or a number of NR RLC retransmissions has been reached associated with the SCG, or upon detection of an access problem on a PSCell during a SCG addition or a SCG change: an RRC connection re-establishment procedure may not be triggered, UL transmissions towards cells of an SCG may be stopped, a master base station may be informed by a wireless device of a SCG failure type, for split bearer, a DL data transfer over a master base station may be maintained; an NR RLC acknowledged mode (AM) bearer may be configured for a split bearer; PCell and/or PSCell may not be de-activated; PSCell may be changed with a SCG change procedure (e.g. with security key change and a RACH procedure); and/or a bearer type change between a split bearer and a SCG bearer or simultaneous configuration of a SCG and a split bearer may or may not be supported.

With respect to interaction between a master base station and a secondary base stations for multi-connectivity, one or more of the following may be applied: a master base station and/or a secondary base station may maintain RRM measurement configurations of a wireless device; a master base station may (e.g. based on received measurement reports, traffic conditions, and/or bearer types) may decide to request a secondary base station to provide additional resources (e.g. serving cells) for a wireless device; upon receiving a request from a master base station, a secondary base station may create/modify a container that may result in configuration of additional serving cells for a wireless device (or decide that the secondary base station has no resource available to do so); for a UE capability coordination, a master base station may provide (a part of) an AS configuration and UE capabilities to a secondary base station; a master base station and a secondary base station may exchange information about a UE configuration by employing of RRC containers (inter-node messages) carried via Xn messages; a secondary base station may initiate a reconfiguration of the secondary base station existing serving cells (e.g. PUCCH towards the secondary base station); a secondary base station may decide which cell is a PSCell within a SCG; a master base station may or may not change content of RRC configurations provided by a secondary base station; in case of a SCG addition and/or a SCG SCell addition, a master base station may provide recent (or the latest) measurement results for SCG cell(s); a master base station and secondary base stations may receive information of SFN and/or subframe offset of each other from OAM and/or via an Xn interface, (e.g. for a purpose of DRX alignment and/or identification of a measurement gap). In an example, when adding a new SCG SCell, dedicated RRC signaling may be used for sending required system information of a cell as for CA, except for a SFN acquired from a MIB of a PSCell of a SCG.

Figure 12:
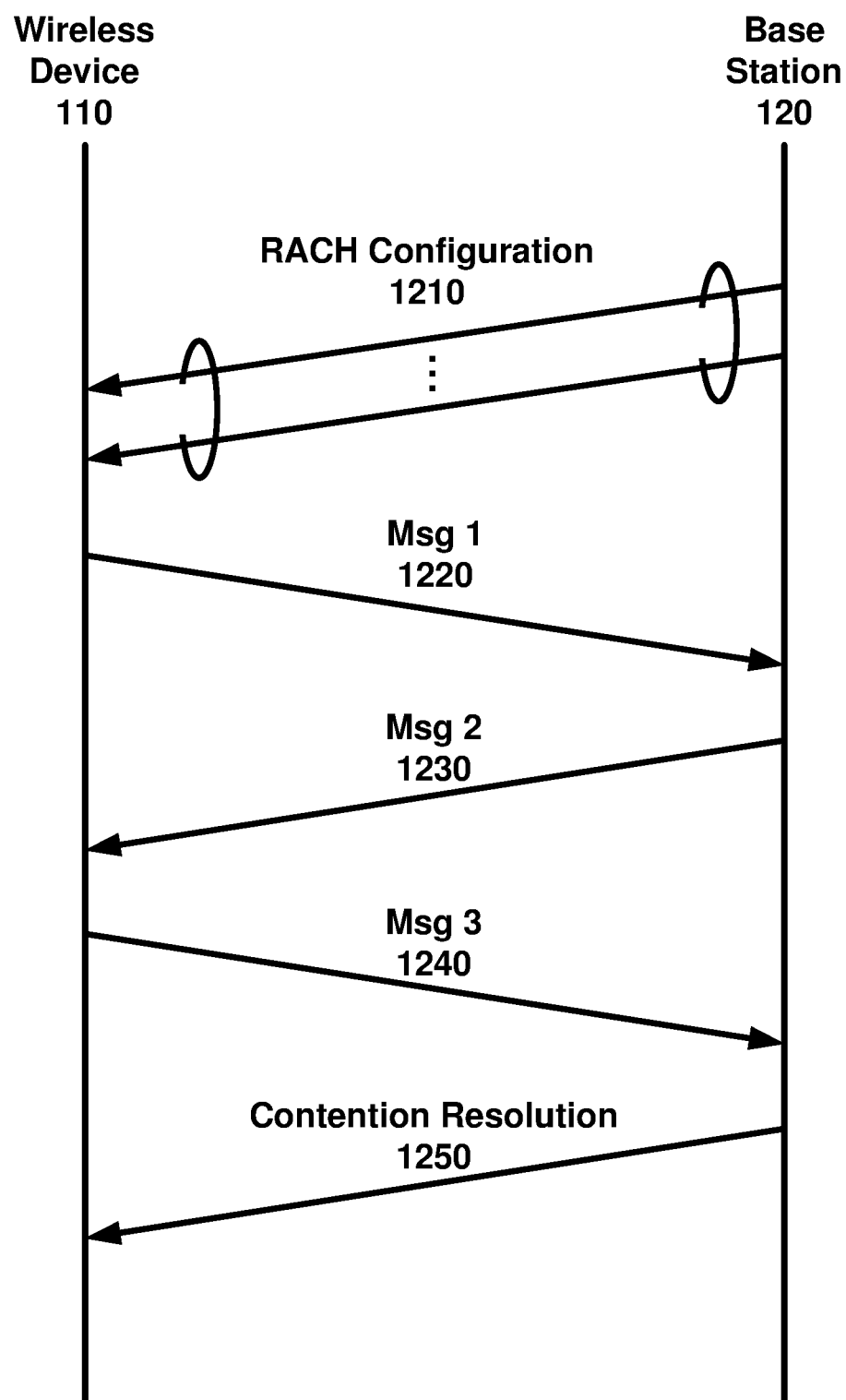
FIG. 12 is a diagram of an example random access procedure as per an aspect of an embodiment of the present disclosure.

FIG. 12 is an example diagram of a random access procedure. One or more events may trigger a random access procedure. For example, one or more events may be at least one of following: initial access from RRC_IDLE, RRC connection re-establishment procedure, handover, DL or UL data arrival during RRC_CONNECTED when UL synchronization status is non-synchronized, transition from RRC_Inactive, and/or request for other system information. For example, a PDCCH order, a MAC entity, and/or a beam failure indication may initiate a random access procedure.

In an example embodiment, a random access procedure may be at least one of a contention based random access procedure and a contention free random access procedure. For example, a contention based random access procedure may comprise, one or more Msg 1 1220 transmissions, one or more Msg2 1230 transmissions, one or more Msg3 1240 transmissions, and contention resolution 1250. For example, a contention free random access procedure may comprise one or more Msg 1 1220 transmissions and one or more Msg2 1230 transmissions.

In an example, a base station may transmit (e.g., unicast, multicast, or broadcast), to a UE, a RACH configuration 1210 via one or more beams. The RACH configuration 1210 may comprise one or more parameters indicating at least one of following: available set of PRACH resources for a transmission of a random access preamble, initial preamble power (e.g., random access preamble initial received target power), an RSRP threshold for a selection of a SS block and corresponding PRACH resource, a power-ramping factor (e.g., random access preamble power ramping step), random access preamble index, a maximum number of preamble transmission, preamble group A and group B, a threshold (e.g., message size) to determine the groups of random access preambles, a set of one or more random access preambles for system information request and corresponding PRACH resource(s), if any, a set of one or more random access preambles for beam failure recovery request and corresponding PRACH resource(s), if any, a time window to monitor RA response(s), a time window to monitor response(s) on beam failure recovery request, and/or a contention resolution timer.

In an example, the Msg1 1220 may be one or more transmissions of a random access preamble. For a contention based random access procedure, a UE may select a SS block with a RSRP above the RSRP threshold. If random access preambles group B exists, a UE may select one or more random access preambles from a group A or a group B depending on a potential Msg3 1240 size. If a random access preambles group B does not exist, a UE may select the one or more random access preambles from a group A. A UE may select a random access preamble index randomly (e.g. with equal probability or a normal distribution) from one or more random access preambles associated with a selected group. If a base station semi-statistically configures a UE with an association between random access preambles and SS blocks, the UE may select a random access preamble index randomly with equal probability from one or more random access preambles associated with a selected SS block and a selected group.

For example, a UE may initiate a contention free random access procedure based on a beam failure indication from a lower layer. For example, a base station may semi-statistically configure a UE with one or more contention free PRACH resources for beam failure recovery request associated with at least one of SS blocks and/or CSI-RSs. If at least one of SS blocks with a RSRP above a first RSRP threshold amongst associated SS blocks or at least one of CSI-RSs with a RSRP above a second RSRP threshold amongst associated CSI-RSs is available, a UE may select a random access preamble index corresponding to a selected SS block or CSI-RS from a set of one or more random access preambles for beam failure recovery request.

For example, a UE may receive, from a base station, a random access preamble index via PDCCH or RRC for a contention free random access procedure. If a base station does not configure a UE with at least one contention free PRACH resource associated with SS blocks or CSI-RS, the UE may select a random access preamble index. If a base station configures a UE with one or more contention free PRACH resources associated with SS blocks and at least one SS block with a RSRP above a first RSRP threshold amongst associated SS blocks is available, the UE may select the at least one SS block and select a random access preamble corresponding to the at least one SS block. If a base station configures a UE with one or more contention free PRACH resources associated with CSI-RSs and at least one CSI-RS with a RSRP above a second RSPR threshold amongst the associated CSI-RSs is available, the UE may select the at least one CSI-RS and select a random access preamble corresponding to the at least one CSI-RS.

A UE may perform one or more Msg1 1220 transmissions by transmitting the selected random access preamble. For example, if a UE selects an SS block and is configured with an association between one or more PRACH occasions and one or more SS blocks, the UE may determine an PRACH occasion from one or more PRACH occasions corresponding to a selected SS block. For example, if a UE selects a CSI-RS and is configured with an association between one or more PRACH occasions and one or more CSI-RSs, the UE may determine a PRACH occasion from one or more PRACH occasions corresponding to a selected CSI-RS. A UE may transmit, to a base station, a selected random access preamble via a selected PRACH occasions. A UE may determine a transmit power for a transmission of a selected random access preamble at least based on an initial preamble power and a power-ramping factor. A UE may determine a RA-RNTI associated with a selected PRACH occasions in which a selected random access preamble is transmitted. For example, a UE may not determine a RA-RNTI for a beam failure recovery request. A UE may determine an RA-RNTI at least based on an index of a first OFDM symbol and an index of a first slot of a selected PRACH occasions, and/or an uplink carrier index for a transmission of Msg1 1220.

In an example, a UE may receive, from a base station, a random access response, Msg 2 1230. A UE may start a time window (e.g., ra-ResponseWindow) to monitor a random access response. For beam failure recovery request, a base station may configure a UE with a different time window (e.g., bfr-Response Window) to monitor response on beam failure recovery request. For example, a UE may start a time window (e.g., ra-ResponseWindow or bfr-ResponseWindow) at a start of a first PDCCH occasion after a fixed duration of one or more symbols from an end of a preamble transmission. If a UE transmits multiple preambles, the UE may start a time window at a start of a first PDCCH occasion after a fixed duration of one or more symbols from an end of a first preamble transmission. A UE may monitor a PDCCH of a cell for at least one random access response identified by a RA-RNTI or for at least one response to beam failure recovery request identified by a C-RNTI while a timer for a time window is running.

In an example, a UE may consider a reception of random access response successful if at least one random access response comprises a random access preamble identifier corresponding to a random access preamble transmitted by the UE. A UE may consider the contention free random access procedure successfully completed if a reception of random access response is successful. If a contention free random access procedure is triggered for a beam failure recovery request, a UE may consider a contention free random access procedure successfully complete if a PDCCH transmission is addressed to a C-RNTI. In an example, if at least one random access response comprises only a random access preamble identifier, a UE may consider the random access procedure successfully completed and may indicate a reception of an acknowledgement for a system information request to upper layers. If a UE has signaled multiple preamble transmissions, the UE may stop transmitting remaining preambles (if any) in response to a successful reception of a corresponding random access response.

In an example, a UE may perform one or more Msg 3 1240 transmissions in response to a successful reception of random access response (e.g., for a contention based random access procedure). A UE may adjust an uplink transmission timing based on a timing advanced command indicated by a random access response and may transmit one or more transport blocks based on an uplink grant indicated by a random access response. Subcarrier spacing for PUSCH transmission for Msg3 1240 may be provided by at least one higher layer (e.g. RRC) parameter. A UE may transmit a random access preamble via PRACH and Msg3 1240 via PUSCH on a same cell. A base station may indicate an UL BWP for a PUSCH transmission of Msg3 1240 via system information block. A UE may employ HARQ for a retransmission of Msg 3 1240.

In an example, multiple UEs may perform Msg 1 1220 by transmitting a same preamble to a base station and receive, from the base station, a same random access response comprising an identity (e.g., TC-RNTI). Contention resolution 1250 may ensure that a UE does not incorrectly use an identity of another UE. For example, contention resolution 1250 may be based on C-RNTI on PDCCH or a UE contention resolution identity on DL-SCH. For example, if a base station assigns a C-RNTI to a UE, the UE may perform contention resolution 1250 based on a reception of a PDCCH transmission that is addressed to the C-RNTI. In response to detection of a C-RNTI on a PDCCH, a UE may consider contention resolution 1250 successful and may consider a random access procedure successfully completed. If a UE has no valid C-RNTI, a contention resolution may be addressed by employing a TC-RNTI. For example, if a MAC PDU is successfully decoded and a MAC PDU comprises a UE contention resolution identity MAC CE that matches the CCCH SDU transmitted in Msg3 1250, a UE may consider the contention resolution 1250 successful and may consider the random access procedure successfully completed.

Figure 13:
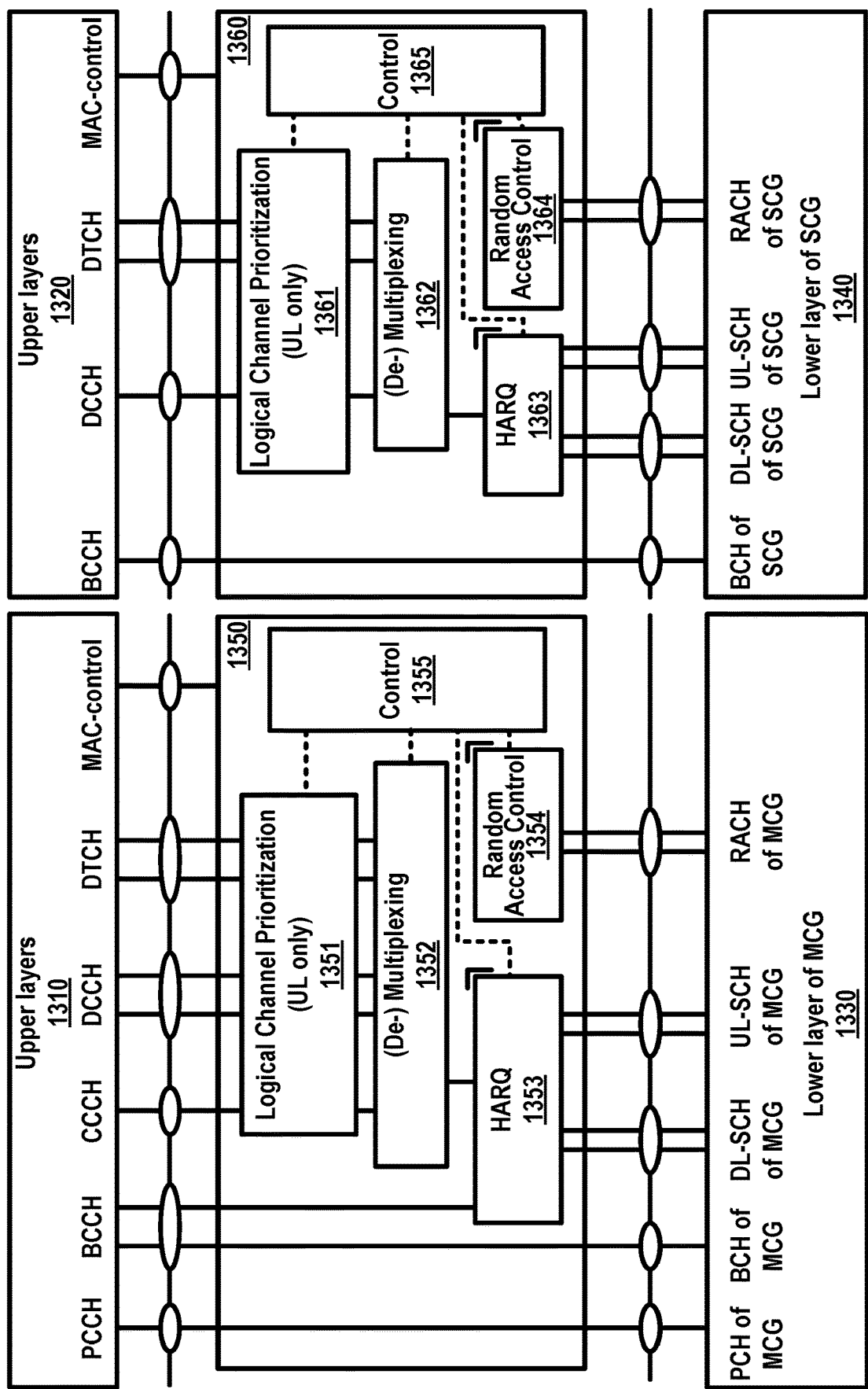
FIG. 13 is a structure of example MAC entities as per an aspect of an embodiment of the present disclosure.

FIG. 13 is an example structure for MAC entities as per an aspect of an embodiment. In an example, a wireless device may be configured to operate in a multi-connectivity mode. A wireless device in RRC_CONNECTED with multiple RX/TX may be configured to utilize radio resources provided by multiple schedulers located in a plurality of base stations. The plurality of base stations may be connected via a non-ideal or ideal backhaul over the Xn interface. In an example, a base station in a plurality of base stations may act as a master base station or as a secondary base station. A wireless device may be connected to one master base station and one or more secondary base stations. A wireless device may be configured with multiple MAC entities, e.g. one MAC entity for master base station, and one or more other MAC entities for secondary base station(s). In an example, a configured set of serving cells for a wireless device may comprise two subsets: an MCG comprising serving cells of a master base station, and one or more SCGs comprising serving cells of a secondary base station(s). FIG. 13 illustrates an example structure for MAC entities when MCG and SCG are configured for a wireless device.

In an example, at least one cell in a SCG may have a configured UL CC, wherein a cell of at least one cell may be called PSCell or PCell of SCG, or sometimes may be simply called PCell. A PSCell may be configured with PUCCH resources. In an example, when a SCG is configured, there may be at least one SCG bearer or one split bearer. In an example, upon detection of a physical layer problem or a random access problem on a PSCell, or upon reaching a number of RLC retransmissions associated with the SCG, or upon detection of an access problem on a PSCell during a SCG addition or a SCG change: an RRC connection re-establishment procedure may not be triggered, UL transmissions towards cells of an SCG may be stopped, a master base station may be informed by a UE of a SCG failure type and DL data transfer over a master base station may be maintained.

In an example, a MAC sublayer may provide services such as data transfer and radio resource allocation to upper layers (e.g. 1310 or 1320). A MAC sublayer may comprise a plurality of MAC entities (e.g. 1350 and 1360). A MAC sublayer may provide data transfer services on logical channels. To accommodate different kinds of data transfer services, multiple types of logical channels may be defined. A logical channel may support transfer of a particular type of information. A logical channel type may be defined by what type of information (e.g., control or data) is transferred. For example, BCCH, PCCH, CCCH and DCCH may be control channels and DTCH may be a traffic channel. In an example, a first MAC entity (e.g. 1310) may provide services on PCCH, BCCH, CCCH, DCCH, DTCH and MAC control elements. In an example, a second MAC entity (e.g. 1320) may provide services on BCCH, DCCH, DTCH and MAC control elements.

A MAC sublayer may expect from a physical layer (e.g. 1330 or 1340) services such as data transfer services, signaling of HARQ feedback, signaling of scheduling request or measurements (e.g. CQI). In an example, in dual connectivity, two MAC entities may be configured for a wireless device: one for MCG and one for SCG. A MAC entity of wireless device may handle a plurality of transport channels. In an example, a first MAC entity may handle first transport channels comprising a PCCH of MCG, a first BCH of MCG, one or more first DL-SCHs of MCG, one or more first UL-SCHs of MCG and one or more first RACHs of MCG. In an example, a second MAC entity may handle second transport channels comprising a second BCH of SCG, one or more second DL-SCHs of SCG, one or more second UL-SCHs of SCG and one or more second RACHs of SCG.

In an example, if a MAC entity is configured with one or more SCells, there may be multiple DL-SCHs and there may be multiple UL-SCHs as well as multiple RACHs per MAC entity. In an example, there may be one DL-SCH and UL-SCH on a SpCell. In an example, there may be one DL-SCH, zero or one UL-SCH and zero or one RACH for an SCell. A DL-SCH may support receptions using different numerologies and/or TTI duration within a MAC entity. A UL-SCH may also support transmissions using different numerologies and/or TTI duration within the MAC entity.

In an example, a MAC sublayer may support different functions and may control these functions with a control (e.g. 1355 or 1365) element. Functions performed by a MAC entity may comprise mapping between logical channels and transport channels (e.g., in uplink or downlink), multiplexing (e.g. 1352 or 1362) of MAC SDUs from one or different logical channels onto transport blocks (TB) to be delivered to the physical layer on transport channels (e.g., in uplink), demultiplexing (e.g. 1352 or 1362) of MAC SDUs to one or different logical channels from transport blocks (TB) delivered from the physical layer on transport channels (e.g., in downlink), scheduling information reporting (e.g., in uplink), error correction through HARQ in uplink or downlink (e.g. 1363), and logical channel prioritization in uplink (e.g. 1351 or 1361). A MAC entity may handle a random access process (e.g. 1354 or 1364).

Figure 14:
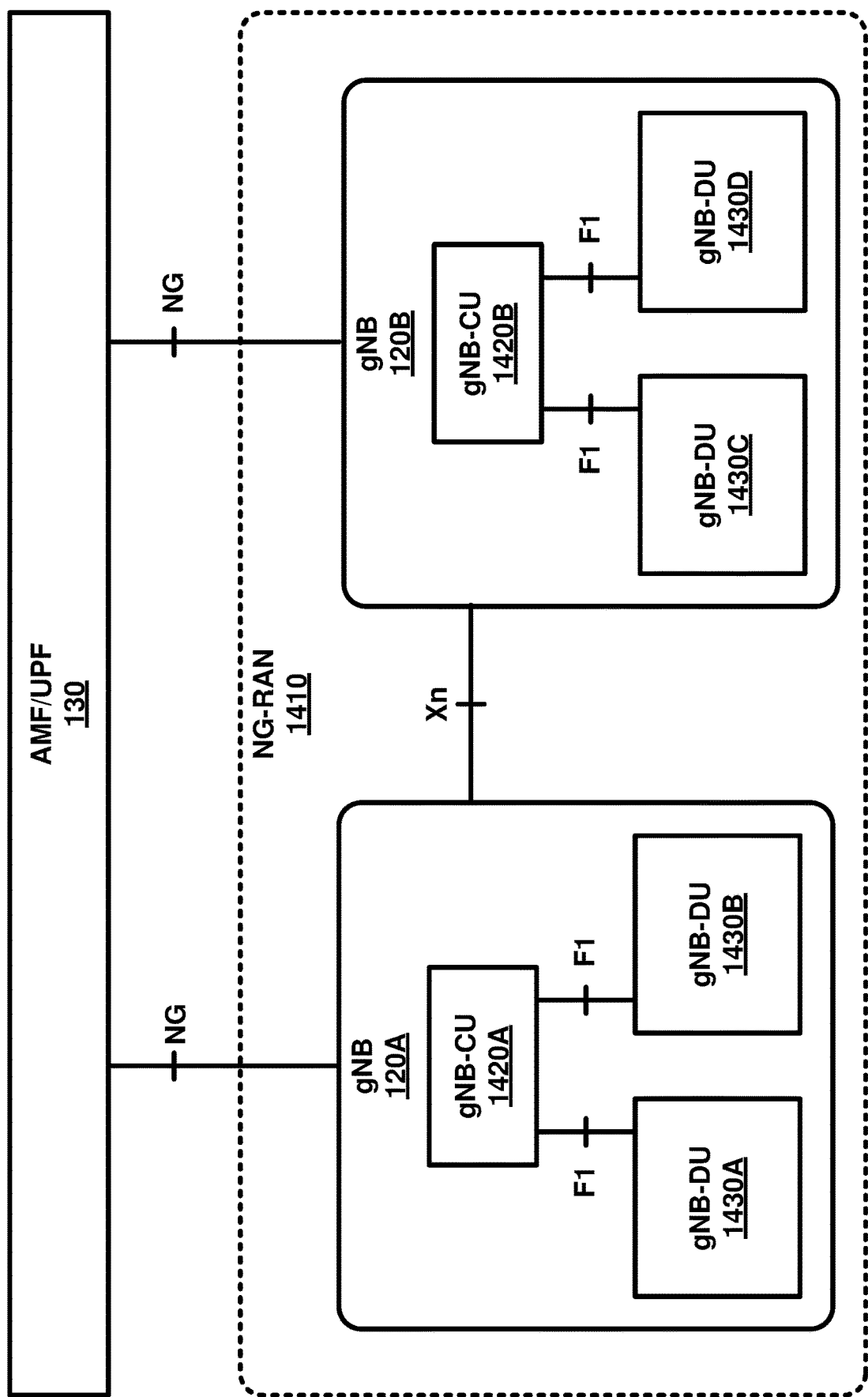
FIG. 14 is a diagram of an example RAN architecture as per an aspect of an embodiment of the present disclosure.

FIG. 14 is an example diagram of a RAN architecture comprising one or more base stations. In an example, a protocol stack (e.g. RRC, SDAP, PDCP, RLC, MAC, and PHY) may be supported at a node. A base station (e.g. gNB 120A or 120B) may comprise a base station central unit (CU) (e.g. gNB-CU 1420A or 1420B) and at least one base station distributed unit (DU) (e.g. gNB-DU 1430A, 1430B, 1430C, or 1430D) if a functional split is configured. Upper protocol layers of a base station may be located in a base station CU, and lower layers of the base station may be located in the base station DUs. An F1 interface (e.g. CU-DU interface) connecting a base station CU and base station DUs may be an ideal or non-ideal backhaul. F1-C may provide a control plane connection over an F1 interface, and F1-U may provide a user plane connection over the F1 interface. In an example, an Xn interface may be configured between base station CUs.

In an example, a base station CU may comprise an RRC function, an SDAP layer, and a PDCP layer, and base station DUs may comprise an RLC layer, a MAC layer, and a PHY layer. In an example, various functional split options between a base station CU and base station DUs may be possible by locating different combinations of upper protocol layers (RAN functions) in a base station CU and different combinations of lower protocol layers (RAN functions) in base station DUs. A functional split may support flexibility to move protocol layers between a base station CU and base station DUs depending on service requirements and/or network environments.

In an example, functional split options may be configured per base station, per base station CU, per base station DU, per UE, per bearer, per slice, or with other granularities. In per base station CU split, a base station CU may have a fixed split option, and base station DUs may be configured to match a split option of a base station CU. In per base station DU split, a base station DU may be configured with a different split option, and a base station CU may provide different split options for different base station DUs. In per UE split, a base station (base station CU and at least one base station DUs) may provide different split options for different wireless devices. In per bearer split, different split options may be utilized for different bearers. In per slice splice, different split options may be applied for different slices.

Figure 15:
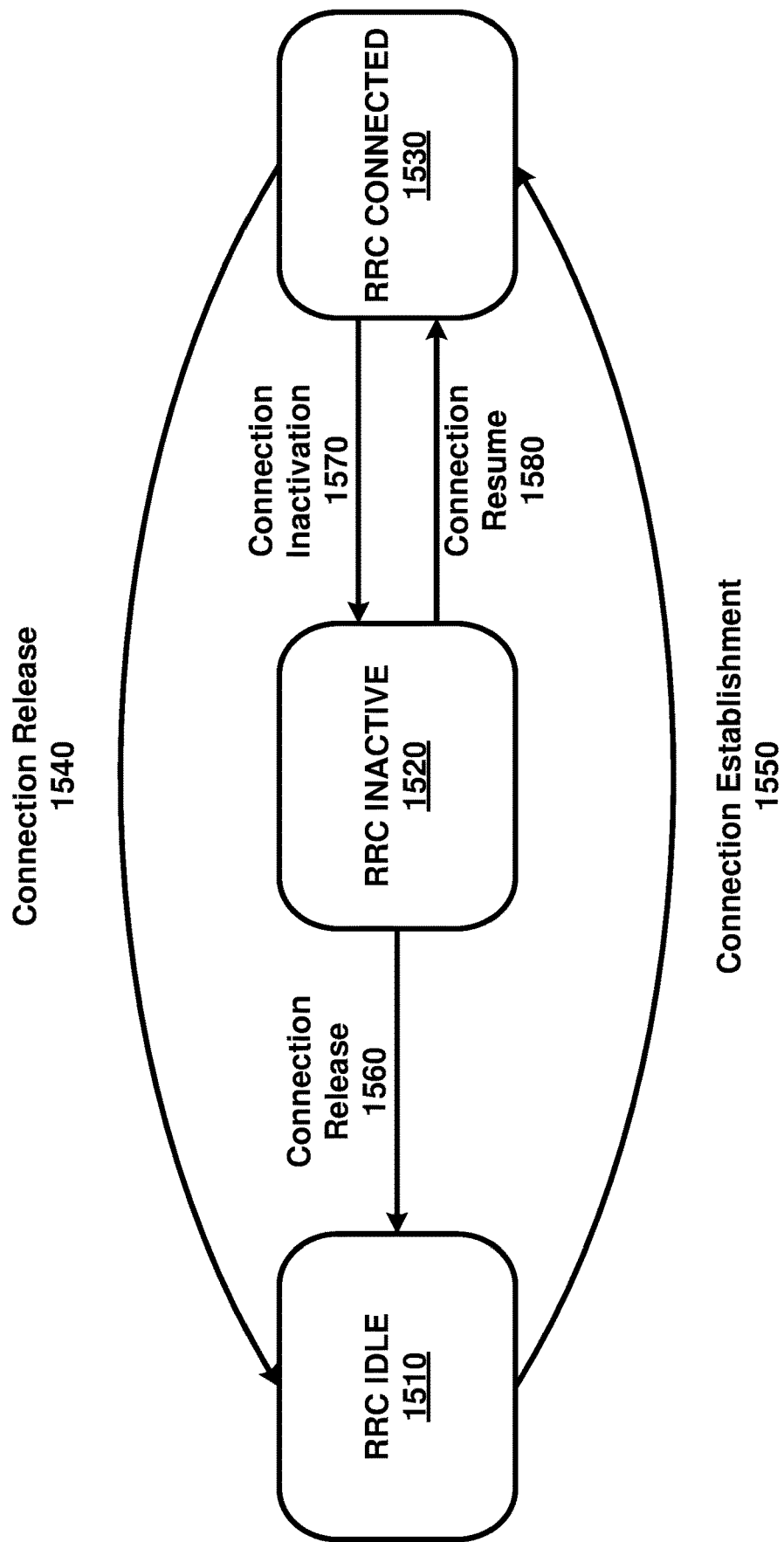
FIG. 15 is a diagram of example RRC states as per an aspect of an embodiment of the present disclosure.

FIG. 15 is an example diagram showing RRC state transitions of a wireless device. In an example, a wireless device may be in at least one RRC state among an RRC connected state (e.g. RRC Connected 1530, RRC_Connected), an RRC idle state (e.g. RRC Idle 1510, RRC_Idle), and/or an RRC inactive state (e.g. RRC Inactive 1520, RRC_Inactive). In an example, in an RRC connected state, a wireless device may have at least one RRC connection with at least one base station (e.g. gNB and/or eNB), which may have a UE context of the wireless device. A UE context (e.g. a wireless device context) may comprise at least one of an access stratum context, one or more radio link configuration parameters, bearer (e.g. data radio bearer (DRB), signaling radio bearer (SRB), logical channel, QoS flow, PDU session, and/or the like) configuration information, security information, PHY/MAC/RLC/PDCP/SDAP layer configuration information, and/or the like configuration information for a wireless device. In an example, in an RRC idle state, a wireless device may not have an RRC connection with a base station, and a UE context of a wireless device may not be stored in a base station. In an example, in an RRC inactive state, a wireless device may not have an RRC connection with a base station. A UE context of a wireless device may be stored in a base station, which may be called as an anchor base station (e.g. last serving base station).

In an example, a wireless device may transition a UE RRC state between an RRC idle state and an RRC connected state in both ways (e.g. connection release 1540 or connection establishment 1550; or connection reestablishment) and/or between an RRC inactive state and an RRC connected state in both ways (e.g. connection inactivation 1570 or connection resume 1580). In an example, a wireless device may transition its RRC state from an RRC inactive state to an RRC idle state (e.g. connection release 1560).

In an example, an anchor base station may be a base station that may keep a UE context (a wireless device context) of a wireless device at least during a time period that a wireless device stays in a RAN notification area (RNA) of an anchor base station, and/or that a wireless device stays in an RRC inactive state. In an example, an anchor base station may be a base station that a wireless device in an RRC inactive state was lastly connected to in a latest RRC connected state or that a wireless device lastly performed an RNA update procedure in. In an example, an RNA may comprise one or more cells operated by one or more base stations. In an example, a base station may belong to one or more RNAs. In an example, a cell may belong to one or more RNAs.

In an example, a wireless device may transition a UE RRC state from an RRC connected state to an RRC inactive state in a base station. A wireless device may receive RNA information from the base station. RNA information may comprise at least one of an RNA identifier, one or more cell identifiers of one or more cells of an RNA, a base station identifier, an IP address of the base station, an AS context identifier of the wireless device, a resume identifier, and/or the like.

In an example, an anchor base station may broadcast a message (e.g. RAN paging message) to base stations of an RNA to reach to a wireless device in an RRC inactive state, and/or the base stations receiving the message from the anchor base station may broadcast and/or multicast another message (e.g. paging message) to wireless devices in their coverage area, cell coverage area, and/or beam coverage area associated with the RNA through an air interface.

In an example, when a wireless device in an RRC inactive state moves into a new RNA, the wireless device may perform an RNA update (RNAU) procedure, which may comprise a random access procedure by the wireless device and/or a UE context retrieve procedure. A UE context retrieve may comprise: receiving, by a base station from a wireless device, a random access preamble; and fetching, by a base station, a UE context of the wireless device from an old anchor base station. Fetching may comprise: sending a retrieve UE context request message comprising a resume identifier to the old anchor base station and receiving a retrieve UE context response message comprising the UE context of the wireless device from the old anchor base station.

In an example embodiment, a wireless device in an RRC inactive state may select a cell to camp on based on at least a on measurement results for one or more cells, a cell where a wireless device may monitor an RNA paging message and/or a core network paging message from a base station. In an example, a wireless device in an RRC inactive state may select a cell to perform a random access procedure to resume an RRC connection and/or to transmit one or more packets to a base station (e.g. to a network). In an example, if a cell selected belongs to a different RNA from an RNA for a wireless device in an RRC inactive state, the wireless device may initiate a random access procedure to perform an RNA update procedure. In an example, if a wireless device in an RRC inactive state has one or more packets, in a buffer, to transmit to a network, the wireless device may initiate a random access procedure to transmit one or more packets to a base station of a cell that the wireless device selects. A random access procedure may be performed with two messages (e.g. 2 stage random access) and/or four messages (e.g. 4 stage random access) between the wireless device and the base station.

In an example embodiment, a base station receiving one or more uplink packets from a wireless device in an RRC inactive state may fetch a UE context of a wireless device by transmitting a retrieve UE context request message for the wireless device to an anchor base station of the wireless device based on at least one of an AS context identifier, an RNA identifier, a base station identifier, a resume identifier, and/or a cell identifier received from the wireless device. In response to fetching a UE context, a base station may transmit a path switch request for a wireless device to a core network entity (e.g. AMF, MME, and/or the like). A core network entity may update a downlink tunnel endpoint identifier for one or more bearers established for the wireless device between a user plane core network entity (e.g. UPF, S-GW, and/or the like) and a RAN node (e.g. the base station), e.g. changing a downlink tunnel endpoint identifier from an address of the anchor base station to an address of the base station.

In an example embodiment, with operation in bandwidth parts (BWPs) of a serving cell, a UE may be configured by higher layers for the serving cell, a set of bandwidth parts (BWPs) for receptions by the UE (DL BWP set), or a set of BWPs for transmissions by the UE (UL BWP set). In an example, for a DL BWP or UL BWP in a set of DL BWPs or UL BWPs, respectively, the UE may be configured at least one of following for the serving cell: a subcarrier spacing (SCS) for DL and/or UL BWP, a cyclic (CP) prefix for DL and/or UL BWP, a number of contiguous PRBs for DL and/or UL BWP, an offset of the first PRB for DL and/or UL in the number of contiguous PRBs relative to the first PRB of a reference location, or Q control resource sets if the BWP is a DL BWP.

In an example embodiment, for each serving cell, higher layer signaling may configure a UE with Q control resource sets. In an example, for control resource set q, 0≤q<Q, the configuration may comprise at least one of following: a first OFDM symbol, a number of consecutive OFDM symbols, a set of resource blocks, a CCE-to-REG mapping, a REG bundle size, in case of interleaved CCE-to-REG mapping, or antenna port quasi-collocation.

In an example embodiment, a control resource set may comprise a set of CCEs numbered from 0 to $N_{CCE,q}-1$ where $N_{CCE,q}$ may be the number of CCEs in control resource set q.

In an example embodiment, the sets of PDCCH candidates that a UE monitors may be defined in terms of PDCCH UE-specific search spaces. A PDCCH UE-specific search space at CCE aggregation level L∈{1, 2, 4, 8} may be defined by a set of PDCCH candidates for CCE aggregation level L. In an example, for a DCI format, a UE may be configured per serving cell by one or more higher layer parameters a number of PDCCH candidates per CCE aggregation level L.

In an example embodiment, in non-DRX mode operation, a UE may monitor one or more PDCCH candidate in control resource set q according to a periodicity of $W_{PDCCH}$, q symbols that may be configured by one or more higher layer parameters for control resource set q.

In an example embodiment, if a UE is configured with higher layer parameter, e.g., cif-InSchedulingCell, the carrier indicator field value may correspond to cif-InSchedulingCell.

In an example embodiment, for the serving cell on which a UE may monitor one or more PDCCH candidate in a UE-specific search space, if the UE is not configured with a carrier indicator field, the UE may monitor the one or more PDCCH candidates without carrier indicator field. In an example, for the serving cell on which a UE may monitor one or more PDCCH candidates in a UE-specific search space, if a UE is configured with a carrier indicator field, the UE may monitor the one or more PDCCH candidates with carrier indicator field.

In an example embodiment, a UE may not monitor one or more PDCCH candidates on a secondary cell if the UE is configured to monitor one or more PDCCH candidates with carrier indicator field corresponding to that secondary cell in another serving cell. For example, for the serving cell on which the UE may monitor one or more PDCCH candidates, the UE may monitor the one or more PDCCH candidates at least for the same serving cell.

In an example embodiment, a UE may receive PDCCH and PDSCH in a DL BWP according to a configured SCS and CP length for the DL BWP. A UE may transmit PUCCH and PUSCH in an UL BWP according to a configured SCS and CP length for the UL BWP.

In an example embodiment, a UE may be configured, by one or more higher layer parameters, a DL BWP from a configured DL BWP set for DL receptions. A UE may be configured by one or more higher layer parameters, an UL BWP from a configured UL BWP set for UL transmissions. If a DL BWP index field is configured in a DCI format scheduling PDSCH reception to a UE, the DL BWP index field value may indicate the DL BWP, from the configured DL BWP set, for DL receptions. If an UL-BWP index field is configured in a DCI format scheduling PUSCH transmission from a UE, the UL-BWP index field value may indicate the UL BWP, from the configured UL BWP set, for UL transmissions.

In an example embodiment, for TDD, a UE may expect that the center frequency for the DL BWP is same as the center frequency for the UL BWP.

In an example embodiment, a UE may not monitor PDCCH when the UE performs measurements over a bandwidth that is not within the DL BWP for the UE.

In an example embodiment, for an initial active DL BWP, UE may identify the bandwidth and frequency of the initial active DL BWP in response to receiving the NR-PBCH.

In an example embodiment, a bandwidth of an initial active DL BWP may be confined within the UE minimum bandwidth for the given frequency band. For example, for flexible for DL information scheduling, the bandwidth may be indicated in PBCH, and/or some bandwidth candidates may be predefined. For example, x bits may be employed for indication.

In an example embodiment, a frequency location of initial active DL BWP may be derived from the bandwidth and SS block, e.g. center frequency of the initial active DL BWP. For example, a SS block may have a frequency offset, as the edge of SS block PRB and data PRB boundary may not be aligned. Predefining the frequency location of SS block and initial active DL BWP may reduce the PBCH payload size, additional bits are not needed for indication of frequency location of initial active DL BWP.

In an example, for the paired UL BWP, the bandwidth and frequency location may be informed in RMSI.

In an example embodiment, for a UE, gNB may configure a set of BWPs by RRC. The UE may transmit or receive in an active BWP from the configured BWPs in a given time instance. For example, an activation/deactivation of DL bandwidth part by means of timer for a UE to switch its active DL bandwidth part to a default DL bandwidth part may be supported. In this case, when the timer expires, e.g. the UE has not received scheduling DCI for X ms, the UE may switch to the default DL BWP.

In an example, a new timer, e.g., BWPDeactivationTimer, may be defined to deactivate the original BWP and switch to the default BWP. The BWPDeactivationTimer may be started when the original BWP is activated by the activation/deactivation DCI. If PDCCH on the original BWP is received, a UE may restart the BWPDeactivationTimer associated with the original BWP. For example, if the BWPDeactivationTimer expires, a UE may deactivate the original BWP and switch to the default BWP, may stop the BWPDeactivationTimer for the original BWP, and may (or may not) flush all HARQ buffers associated with the original BWP.

In an example embodiment, gNB and UE may have different understanding of the starting of the timer since the UE may miss scheduling grants. In an example, the UE may be triggered to switch to the default BWP, but gNB may schedules the UE in the previous active BWP. For example, in the case that the default BWP is nested within other BWPs, gNB may restrict the location of the CORESET of BWP2 to be within BWP1 (e.g., the narrow band BWP1 may be the default BWP). Then the UE may receive CORESET and switch back to BWP2 if it mistakenly switches to the default BWP.

In an example embodiment, for a case that the default BWP and the other BWPs are not overlapped in frequency domain, it may not solve a miss switching problem by restricting the location of the CORESET. For example, the gNB may maintain a timer for a UE. When the timer expires, e.g. there is no data scheduling for the UE for Y ms, or gNB has not received feedback from the UE for Y' ms, the UE may switch to the default BWP, and the gNB may send paging signal or re-schedule the UE in the default BWP.

In an example embodiment, gNB may not fix the default BWP to be the same as initial active BWP. Since the initial active DL BWP may be the SS block bandwidth which is common to UEs in the cell, the traffic load may be very heavy if many UEs fall back to such small bandwidth for data transmission. Configuring the UEs with different default BWPs may help to balance the load in the system bandwidth.

In an example embodiment, on a SCell, there may be no initial active BWP since the initial access is performed on the PCell. For example, the initially activated DL BWP and/or UL BWP when the SCell is activated may be configured or reconfigured by RRC signaling. In an example, the default BWP of the SCell may also be configured or reconfigured by RRC signaling. To strive for a unified design for both PCell and SCell, the default BWP may be configured or reconfigured by the RRC signaling, and the default BWP may be one of the configured BWPs of the UE.

In an example embodiment, gNB may configure UE-specific default DL BWP other than initial active BWP after RRC connection, e.g., for the purpose of load balancing. The default BWP may support other connected mode operations (besides operations supported by initial active BWP) for example fall back and connected mode paging. In this case, the default BWP may comprise common search space, at least the search space needed for monitoring the pre-emption indications. For example, for FDD, the default DL and UL BWPs may be independently configured to the UE.

In an example, the initial active DL/UL BWP may be set as default DL/UL BWP. In an example, a UE may return to default DL/UL BWP in some cases. For example, if a UE does not receive control for a long time, the UE may fallback to default BWP.

In an example embodiment, gNB may configure UE with multiple BWPs. For example, the multiple BWPs may share at least one CORESET including default BWP. For example, CORESET for RMSI may be shared for all configured BWP. Without going back to another BWP or default BWP, the UE may receive control information via the common CORESET. To minimize the ambiguity of resource allocation, the common CORESET may schedule data within only default BWP. For example, frequency region of default BWP may belong to all the configured BWPs.

In an example embodiment, when the configured BWP is associated with a different numerology from default BWP, a semi-static pattern of BWP switching to default BWP may be performed. For example, to check RMSI at least periodically, switching to default BWP may be performed. This may be necessary particularly when BWPs use different numerologies.

In an example embodiment, in terms of reconfiguration of default BWP from initial BWP, it may be considered for RRC connected UEs. For RRC IDLE UEs, default BWP may be same as initial BWP (or, RRC IDLE UE may fallback to initial BWP regardless of default BWP). If a UE performs measurement based on SS block, reconfiguration of default BWP outside of initial BWP may become very inefficient due to frequent measurement gap. In this sense, if default BWP is reconfigured to outside of initial BWP, the following conditions may be satisfied: a UE is in CONNECTED mode, and a UE is not configured with SS block based measurement for both serving cell and neighbor cells.

In an example embodiment, a DL BWP other than the initial active DL BWP may be configured to a UE as the default DL BWP. The reconfiguring the default DL BWP may be due to load balancing and/or different numerologies employed for active DL BWP and initial active DL BWP.

In an example embodiment, a default BWP on PCell may be an initial active DL BWP for transmission of RMSI, comprising RMSI CORESET with CSS. The RMSI CORESET may comprise USS. The initial active/default BWP may remain active BWP for the user also after UE becomes RRC connected.

In an example embodiment, for a paired spectrum, downlink and uplink bandwidth parts may be independently activated while, for an unpaired spectrum downlink and uplink bandwidth parts are jointly activated. In case of bandwidth adaptation, where the bandwidth of the active downlink BWP may be changed, there may, in case of an unpaired spectrum, be a joint activation of a new downlink BWP and new uplink BWP. For example, a new DL/UL BWP pair where the bandwidth of the uplink BWPs may be the same (e.g., no change of uplink BWP).

In an example embodiment, there may be an association of DL BWP and UL BWP in RRC configuration. For example, in case of TDD, a UE may not retune the center frequency of channel BW between DL and UL. In this case, since the RF is shared between DL and UL in TDD, a UE may not retune the RF BW for every alternating DL-to-UL and UL-to-DL switching.

In an example embodiment, making an association between DL BWP and UL BWP may allow that one activation/deactivation command may switch both DL and UL BWPs at once. Otherwise, separate BWP switching commands may be necessary.

In an example embodiment, a DL BWP and a UL BWP may be configured to the UE separately. Pairing of the DL BWP and the UL BWP may impose constrains on the configured BWPs, e.g., the paired DL BWP and UL BWP may be activated simultaneously. For example, gNB may indicate a DL BWP and a UL BWP to a UE for activation in a FDD system. In an example, gNB may indicate a DL BWP and a UL BWP with the same center frequency to a UE for activation in a TDD system. Since the activation/deactivation of the BWP of the UE is instructed by gNB, no paring or association of the DL BWP and UL BWP may be mandatory even for TDD system.

In an example embodiment, the association between DL carrier and UL carrier within a serving cell may be done by carrier association. For example, for TDD system, UE may not be expected to retune the center frequency of channel BW between DL and UL. To achieve it, an association between DL BWP and UL BWP may be needed. For example, a way to associate them may be to group DL BWP configurations with same center frequency as one set of DL BWPs and group UL BWP configurations with same center frequency as one set of UL BWPs. The set of DL BWPs may be associated with the set of UL BWPs sharing the same center frequency.

For an FDD serving cell, there may be no association between DL BWP and UL BWP if the association between DL carrier and UL carrier within a serving cell may be done by carrier association.

In an example embodiment, UE may identify a BWP identity from DCI to simplify the indication process. The total number of bits for BWP identity may depend on the number of bits that may be employed within the scheduling DCI (or switching DCI) and the UE minimum BW. The number of BWPs may be determined by the UE supported minimum BW along with the network maximum BW. For instance, in a similar way, the maximum number of BWP may be determined by the network maximum BW and the UE minimum BW. In an example, if 400 MHz is the network maximum BW and 50 MHz is the UE minimum BW, 8 BWPs may be configured to the UE which means that 3 bits may be needed within the DCI to indicate the BWP. In an example, such a split of the network BW depending on the UE minimum BW may be useful for creating one or more default BWPs from the network side by distributing UEs across the entire network BW, e.g., load balancing purpose.

In an example embodiment, at least 2 DL and 2 UL BWP may be supported by a UE for a BWP adaption. For example, the total number of BWP supported by a UE may be given by 2≤Number of DL/UL BWP≤floor (Network maximum BW/UE minimum DL/UL BW). For example, a maximum number of configured BWPs may be 4 for DL and UL respectively. For example, a maximum number of configured BWPs for UL may be 2.

In an example embodiment, different sets of BWPs may be configured for different DCI formats/scheduling types respectively. For example, some larger BWPs may be configured for non-slot-based scheduling than that for slot-based scheduling. If different DCI formats are defined for slot-based scheduling and non-slot-based scheduling, different BWPs may be configured for different DCI formats. This may provide flexibility between different scheduling types without increasing DCI overhead. The 2-bit bitfield may be employed to indicate a BWP among the four for the DCI format. For example, 4 DL BWPs or [2 or 4] UL BWPs may be configured for each DCI formats. Same or different BWPs may be configured for different DCI formats.

In an example embodiment, a required maximum number of configured BWPs (may be not comprising the initial BWP) may depend on the flexibility needed for a BWP functionality. For example, in the minimal case of supporting bandlimited devices, it may be sufficient to be able to configure one DL BWP and one UL BWP (or a single DL/UL BWP pair in case of unpaired spectrum). For example, to support bandwidth adaptation, there may be a need to configure (at least) two DL BWPs and a single uplink BWP for paired spectrum (or two DL/UL BWP pairs for unpaired spectrum). For example, to support dynamic load-balancing between different parts of the spectrum, there may be a need to configure one or more DL (UL) BWPs that jointly cover different parts of the downlink (uplink) carrier. In an example, for dynamic load balancing, it may be sufficient with two BWPs. In addition to the two BWPs, two additional BWPs may be needed for bandwidth adaptation. For example, a Maximum number of configured BWPs may be four DL BWPs and two UL BWPs for a paired spectrum. For example, a Maximum number of configured BWPs may be four DL/UL BWP pairs for an unpaired spectrum.

In an example embodiment, UE may monitor for RMSI and broadcast OSI which may be transmitted by the gNB within the common search space (CSS) on the PCell. In an example, RACH response and paging control monitoring on the PCell may be transmitted within the CSS. In an example, when a UE is allowed to be on an active BWP configured with UE-specific search space (USSS or USS), the UE may not monitor the common search space.

In an example, for a PCell, at least one of configured DL bandwidth parts may comprise at least one CORESET with a CSS type. For example, to monitor RMSI and broadcast OSI, UE may periodically switch to the BWP containing the CSS. In an example, the UE may periodically switch to the BWP containing the CSS for RACH response and paging control monitoring on the PCell.

In an example, if BWP switching to monitor the CSS happens frequently, it may result in increasing overhead. In an example, the overhead due to the CSS monitoring may depends on overlapping in frequency between any two BWPs. In an example, in a nested BWP configuration where one BWP is a subset of another BWP, the same CORESET configuration may be employed across the BWPs. In this case, unless reconfigured otherwise, a default BWP may be the one containing the CSS, and another BWP may contain the CSS. In an example, the BWPs may be partially overlapping. If the overlapping region is sufficient, a CSS may be across a first BWP and a second BWP. In an example, two non-overlapping BWP configurations may exist.

In an example embodiment, there may be one or more benefits of configuring the same CORESET containing the CSS across BWPs. For example, RMSI and broadcast OSI monitoring may be handled without necessitating BWP switching. In an example, RACH response and paging control monitoring on the PCell may also be handled without switching. For example, if CORESET configuration is the same across BWPs, robustness for BWP switching may improve, because even if gNB and UE are out-of-sync as to which BWP is currently active, the DL control channel may work. In an example, one or more constraints on BWP configuration may not be too much, considering that BWP may be for power saving, even the nested configuration may be very versatile for different applications.

In an example embodiment, NR may support group-common search space (GCSS). For example, the GCSS may be employed as an alternative to CSS for certain information. In an example, gNB may configure GCSS within a BWP for a UE, and information such as RACH response and paging control may be transmitted on GCSS. For example, the UE may monitor GCSS instead of switching to the BWP containing the CSS for such information.

In an example embodiment, for pre-emption indication and other group-based commands on a serving cell, gNB may transmit the information on GCSS. UE may monitor the GCSS for the information.

In an example embodiment, NR may configure a CORESET without using a BWP. For example, NR support to configure a CORESET based on a BWP to reduce signaling overhead. In an example, a first CORESET for a UE during an initial access may be configured based on its default BWP. In an example, a CORESET for monitoring PDCCH for RAR and paging may be configured based on a DL BWP. In an example, the CORESET for monitoring group common (GC)-PDCCH for SFI may be configured based on a DL BWP. In an example, the CORESET for monitoring GC-DCI for pre-emption indication may be configured based on a DL BWP. In an example, the BWP index may be indicated in the CORESET configuration. In an example, the default BWP index may not be indicated in the CORESET configuration.

In an example embodiment, the contention-based random access (CBRA) RACH procedure may be supported via an initial active DL and UL BWPs since the UE identity is unknown to the gNB. In an example, the contention-free random access (CFRA) RACH procedure may be supported via the USS configured in an active DL BWP for the UE. For example, in this case, an additional CSS for RACH purpose may not need to be configured per BWP. For example, idle mode paging may be supported via an initial active DL BWP and the connected mode paging may be supported via a default BWP. No additional configurations for the BWP for paging purposes may not be needed for paging. For the case of pre-emption, a configured BWP (on a serving cell) may have the CSS configured for monitoring the pre-emption indications.

In an example embodiment, for a configured DL BWP, a group-common search space may be associated with at least one CORESET configured for the same DL BWP. For example, depending on the monitoring periodicity of different group-common control information types, it may not be practical for the UE to autonomously switch to a default BWP where a group-common search space is available to monitor for such DCI. In this case, if there is at least one CORESET configured on a DL BWP, it may be possible to configure a group-common search space in the same CORESET.

In an example embodiment, a center frequency of the activated DL BWP may not be changed. In an example, the center frequency of the activated DL BWP may be changed. For example, For TDD, if the center frequency of the activated DL BWP and deactivated DL BWP is not aligned, the active UL BWP may be switched implicitly.

In an example embodiment, BWPs with different numerologies may be overlapped, and rate matching for CSI-RS/SRS of another BWP in the overlapped region may be employed to achieve dynamic resource allocation of different numerologies in FDM/TDM fashion. In an example, for the CSI measurement within one BWP, if the CSI-RS/SRS is collided with data/RS in another BWP, the collision region in another BWP may be rate matched. For example, CSI information over the two BWPs may be known at a gNB side by UE reporting. Dynamic resource allocation with different numerologies in a FDM manner may be achieved by gNB scheduling.

In an example embodiment, PUCCH resources may be configured in a configured UL BWP, in a default UL BWP and/or in both. For instance, if the PUCCH resources are configured in the default UL BWP, UE may retune to the default UL BWP for transmitting an SR. for example, the PUCCH resources are configured per BWP or a BWP other than the default BWP, the UE may transmit an SR in the current active BWP without retuning.

In an example embodiment, if a configured SCell is activated for a UE, a DL BWP may be associated with an UL BWP at least for the purpose of PUCCH transmission, and a default DL BWP may be activated. If the UE is configured for UL transmission in same serving cell, a default UL BWP may be activated.

In an example embodiment, at least one of configured DL BWPs comprises one CORESET with common search space (CSS) at least in primary component carrier. The CSS may be needed at least for RACH response (msg2) and preemption indication.

In an example, for the case of no periodic gap for RACH response monitoring on PCell, one of configured DL BWPs may comprise one CORESET with the CSS type for RMSI & OSI. For PCell, a configured DL BWP may comprise one CORESET with the CSS type for RACH response & paging control for system information update. For a serving cell, a configured DL BWP may comprise one CORESET with the CSS type for pre-emption indication and other group-based commands.

In an example embodiment, BWPs may be configured with respect to common reference point (PRB 0) on a NW carrier. In an example, the BWPs may be configured using TYPE1 RA as a set of contiguous PRBs, with PRB granularity for the START and LENGTH, and the minimum length may be determined by the minimum supported size of a CORESET.

In an example embodiment, a CSS may be configured on a non-initial BWP for RAR and paging.

In an example embodiment, to monitor (group) common channel for RRC CONNECTED UE, an initial DL BWP may comprise control channel for RMSI, OSI and paging and UE switches BWP to monitor such channel. In an example, a configured DL BWP may comprise control channel for Msg2. In an example, a configured DL BWP may comprise control channel for SFI. In an example, a configured DL BWP may comprise pre-emption indication and other group common indicators like power control.

In an example embodiment, a DCI may explicitly indicate activation/deactivation of BWP.

For example, a DCI without data assignment may comprise an indication to activate/deactivate BWP. In an example, UE may receive a first indication via a first DCI to activate/deactivate BWP. In order for the UE to start receiving data, a second DCI with a data assignment may be transmitted by the gNB. A UE may receive the first DCI in a target CORESET in a target BWP. In an example, until there is CSI feedback provided to a gNB, the gNB scheduler may make conservative scheduling decisions.

In an example, a DCI without scheduling for active BWP switching may be transmitted to measure the CSI before scheduling. It may be taken as an implementation issue of DCI with scheduling, for example, the resource allocation field may be set to zero, which means no data may be scheduled. Other fields in this DCI may comprise one or more CSI/SRS request fields.

In an example embodiment, support for a single scheduling DCI to trigger active BWP switching may be motivated by dynamic BWP adaptation for UE power saving during active state (which may comprise ON duration and when inactivity timer is running when C-DRX is configured). For example, with a C-DRX enabled, a UE may consume significant amount of power monitoring PDCCH without decoding any grant. To reduce the power consumption during PDCCH monitoring, two BWPs may be configured: a narrower BWP for PDCCH monitoring, and a wider BWP for scheduled data. In such a case, the UE may switch back-and-forth between the narrower BWP and the wider BWP, depending on the burstiness of the traffic. For example, the UE may be revisiting a BWP that it has dwelled on previously. For this case, combining a BWP switching indication and a scheduling grant may result in low latency and reduced signaling overhead for BWP switching.

In an example embodiment, a SCell activation and deactivation may trigger the corresponding action for its configured BWP. In an example, a SCell activation and deactivation may not trigger the corresponding action for its configured BWP.

In an example embodiment, a dedicated BWP activation/deactivation DCI may impact a DCI format. For example, a scheduling DCI with a dummy grant may be employed. the dummy grant may be constructed by invalidating one or some of the fields, for example, the resource allocation field. In an example, it may be feasible to leverage a fallback scheduling DCI format (which contains a smaller payload) to improve the robustness for BWP DCI signaling, without incurring extra work on introducing a new DCI format.

In an example embodiment, a DCI with data assignment may comprise an indication to activate/deactivate BWP along with a data assignment. For example, a UE may receive a combined data allocation and BWP activation/ deactivation message. For example, a DCI format may comprise a field to indicate BWP activation/deactivation along with a field indicating UL/DL grant. In this case, the UE may start receiving data with a single DCI. In this case, the DCI may need indicate one or more target resources of a target BWP. A gNB scheduler may have little knowledge of the CSI in the target BW and may have to make conservative scheduling decisions.

In an example embodiment, for the DCI with data assignment, the DCI may be transmitted on a current active BWP, and scheduling information may be for a new BWP. For example, there may be a single active BWP. There may be one DCI in a slot for scheduling the current BWP or scheduling another BWP. The same CORESET may be employed for the DCI scheduling the current BWP and the DCI scheduling another BWP. For example, to reduce the number of blind decoding, the DCI payload size for the DCI scheduling current BWP and the scheduling DCI for BWP switching may be the same.

In an example embodiment, to support the scheduling DCI for BWP switching, a BWP group may be configured by gNB, in which a numerology in one group may be the same. In an example, the BWP switching for the BWP group may be configured, in which BIF may be present in the CORESETs for one or more BWPs in the group. For example, scheduling DCI for BWP switching may be configured per BWP group, in which an active BWP in the group may be switched to any other BWP in the group.

In an example, embodiment, a DCI comprising scheduling assignment/grant may not comprise active-BWP indicator. For a paired spectrum, a scheduling DCI may switch UEs active BWP for the transmission direction that the scheduling is valid for. For an unpaired spectrum, a scheduling DCI may switch the UEs active DL/UL BWP pair regardless of the transmission direction that the scheduling is valid for. There may be a possibility for downlink scheduling assignment/grant with "zero" assignment, in practice allowing for switch of active BWP without scheduling downlink or uplink transmission.

In an example embodiment, a timer-based activation/deactivation BWP may be supported. For example, a timer for activation/deactivation of DL BWP may reduce signaling overhead and may enable UE power savings. The activation/deactivation of a DL BWP may be based on an inactivity timer (referred to as a BWP inactive (or inactivity) timer). For example, a UE may start and reset a timer upon reception of a DCI. When the UE is not scheduled for the duration of the timer, the timer may expire. In this case, the UE may activate/deactivate the appropriate BWP in response to the expiry of the timer. For example, the UE may activate the default BWP and may deactivate the active BWP.

For example, a BWP inactive timer may be beneficial for power saving for a UE switching to a default BWP with smaller BW and fallback for a UE missing DCI based activation/deactivation signaling to switch from one BWP to another BWP.

In an example embodiment, triggering conditions of the BWP inactive timer may follow the ones for the DRX timer in LTE. For example, an On-duration of the BWP inactive timer may be configured, and the timer may start when a UE-specific PDCCH is successfully decoded indicating a new transmission during the On-duration. The timer may restart when a UE-specific PDCCH is successfully decoded indicating a new transmission. The timer may stop once the UE is scheduled to switch to the default DL BWP.

In an example embodiment, the BWP inactive timer may start once the UE switches to a new DL BWP. The timer may restart when a UE-specific PDCCH is successfully decoded, wherein the UE-specific PDCCH may be associated with a new transmission, a retransmission or some other purpose, e.g., SPS activation/deactivation if supported.

In an example embodiment, a UE may switch to a default BWP if the UE does not receive any control/data from the network during a BWP inactive timer running. The timer may be reset upon reception of any control/data. For example, the timer may be triggered when UE receives a DCI to switch its active DL BWP from the default BWP to another. For example, the timer may be reset when a UE receives a DCI to schedule PDSCH(s) in the BWP other than the default BWP.

In an example embodiment, a DL BWP inactive timer may be defined separately from a UL BWP inactive timer. For example, there may be some ways to set the timer, e.g., independent timer for DL BWP and UL BWP, or a joint timer for DL and UL BWP. In an example, for the separate timers, assuming both DL BWP and UL BWP are activated, if there is DL data and UL timer expires, UL BWP may not be deactivated since PUCCH configuration may be affected. For example, for the uplink, if there is UL feedback signal related to DL transmission, the timer may be reset (Or, UL timer may not be set if there is DL data). On the other hand, if there is UL data and the DL timer expires, there may be no issue if the DL BWP is deactivated since UL grant is transmitted in the default DL BWP.

In an example embodiment, a BWP inactivity-timer may enable the fallback to default BWP on PCell and SCell.

In an example embodiment, a timer-based activation/deactivation of BWP may be similar to a UE DRX timer. For example, there may not be a separate inactivity timer for BWP activation/deactivation for the UE DRX timer. For example, one of the UE DRX inactivity timer may trigger BWP activation/deactivation.

For example, there may be a separate inactivity timer for BWP activation/deactivation for the UE DRX timer. For example, the DRX timers may be defined in a MAC layer, and the BWP timer may be defined in a physical layer. In an example, If the same DRX inactivity timer is employed for BWP activation/deactivation, UE may stay in a wider BWP for as long as the inactivity timer is running, which may be a long time. For example, the DRX inactivity timer may be set to a large value of 100-200 milliseconds for C-DRX cycle of 320 milliseconds, larger than the ON duration (10 milliseconds). This may imply that power saving due to narrower BWP may not be achievable. To realize potential of UE power saving promised by BWP switching, a new timer may be defined, and it may be configured to be smaller than the DRX inactivity timer. From the point of view of DRX operation, BWP switching may allow UE to operate at different power levels during the active state, effectively providing some more intermediate operating points between the ON and OFF states.

A New Radio (NR) system may support both single beam and multi-beam operations. In a multi-beam system, a base station (e.g., gNB) may perform a downlink beam sweeping to provide coverage for downlink Synchronization Signals (SSs) and common control channels. A User Equipment (UE) may perform an uplink beam sweeping to access a cell.

In a single beam scenario, a gNB may configure time-repetition transmission within one SS block, which may comprise at least Primary Synchronization Signal (PSS), Secondary Synchronization Signal (SSS), and Physical Broadcast Channel (PBCH), with a wide beam. In a multi-beam scenario, a gNB may configure at least some of the above-mentioned signals and physical channels in multiple beams. A UE may identify at least Orthogonal Frequency Division Multiplexing (OFDM) symbol index, slot index in a radio frame and radio frame number from an SS block.

Figure 16:
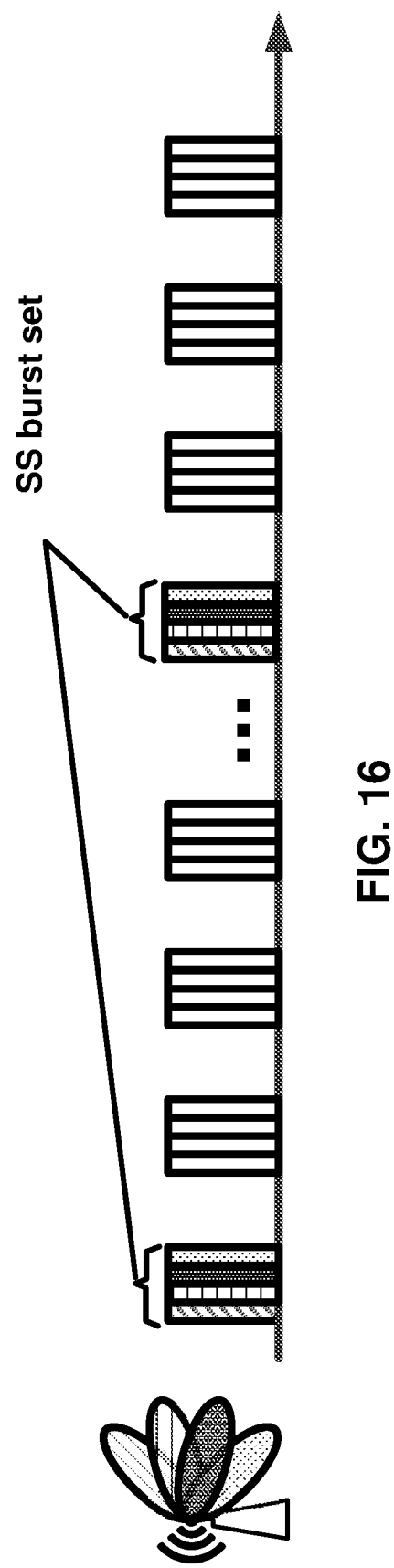
FIG. 16 is an example of configuration of an SS Burst Set as per an aspect of an embodiment of the present disclosure.

In an example, in an RRC_INACTIVE state or RRC_IDLE state, a UE may assume that SS blocks form an SS burst, and an SS burst set. An SS burst set may have a given periodicity. In multi-beam scenarios, SS blocks may be transmitted in multiple beams, together forming an SS burst. One or more SS blocks may be transmitted on one beam. If multiple SS bursts are transmitted with multiple beams, the SS bursts together may form an SS burst set as shown in FIG. 16.

In an example, a UE may detect one or more PSS/SSS/PBCH for cell selection/reselection and/or initial access procedures. PBCH, or a Physical Downlink Shared Channel (PDSCH), indicated by a Physical Downlink Control Channel (PDCCH) in common search space, scheduling a system information, such as System Information Block type 2 (SIB2), may be broadcasted to multiple UEs. In an example, SIB2 may carry one or more Physical Random Access Channel (PRACH) configuration. In an example, a gNB may have one or more Random Access Channel (RACH) configuration which may include PRACH preamble pool, time/frequency radio resources, and other power related parameters. A UE may select a PRACH preamble from a RACH configuration to initiate a contention-based RACH procedure, or a contention-free RACH procedure.

Figures 17A, 17B:
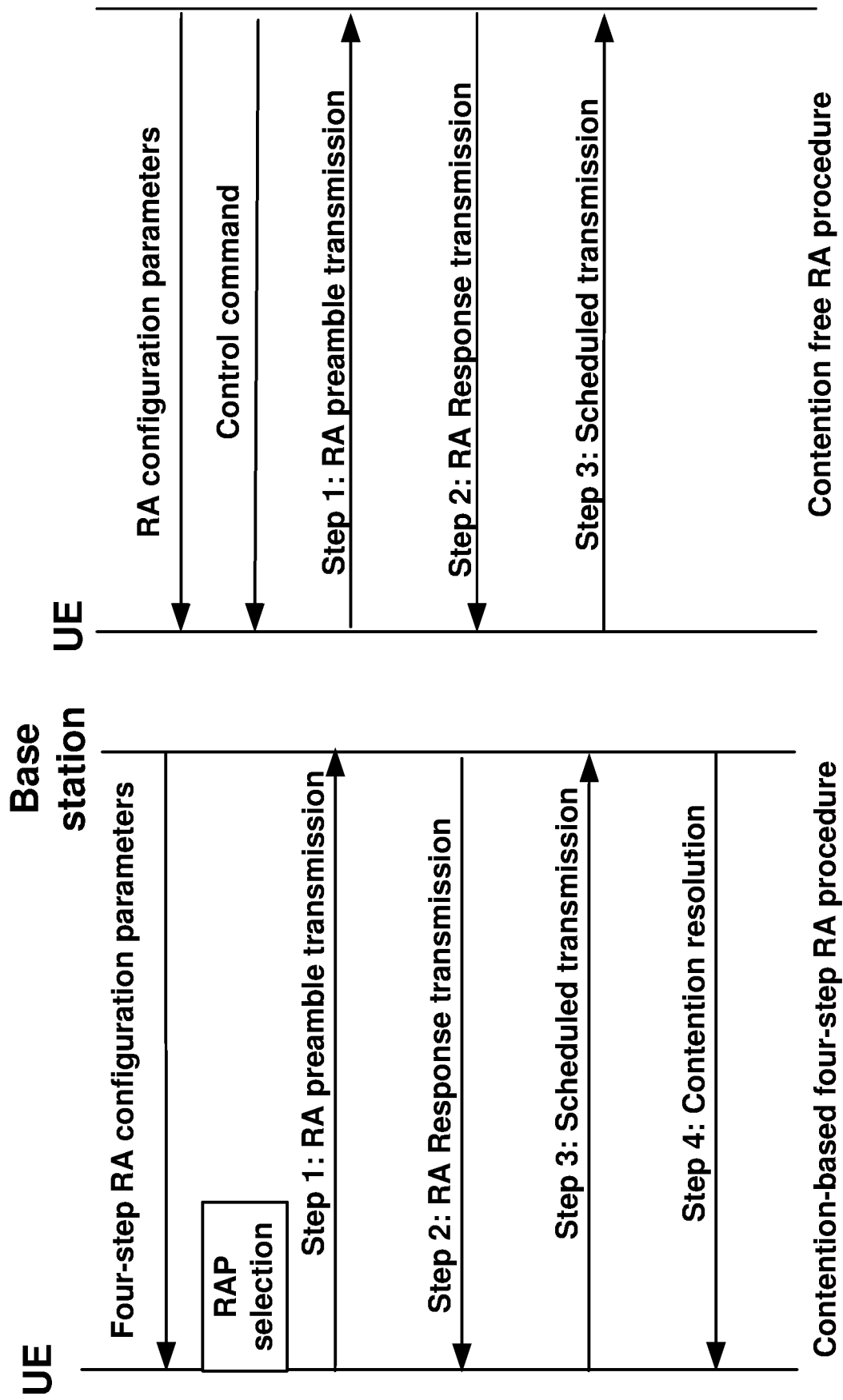
FIG. 17A is an example of contention-based four-step Random Access (RA) procedure as per an aspect of an embodiment of the present disclosure.
FIG. 17B is an example of contention free RA procedure as per an aspect of an embodiment of the present disclosure.

In an example, a UE may perform a 4-step RACH procedure, which may be a contention-based or contention-free RACH procedure. A four-step random access (RA) procedure may comprise RA preamble (RAP) transmission in the first step, random access response (RAR) transmission in the second step, scheduled transmission of one or more transport blocks (TBs) in the third step, and contention resolution in the fourth step as shown in FIG. 17A and FIG. 17B. Specifically, FIG. 17A shows a contention-based 4-step RA procedure, and FIG. 17B shows a contention-free RA procedure.

In the first step, a UE may transmit a RAP using a configured RA preamble format with a Tx beam. RA channel (RACH) resource may be defined as a time-frequency resource to transmit a RAP. Broadcast system information may inform whether a UE needs to transmit one or multiple/repeated preamble within a subset of RACH resources.

A base station may configure an association between DL signal/channel, and a subset of RACH resources and/or a subset of RAP indices, for determining the downlink (DL) transmission in the second step. Based on the DL measurement and the corresponding association, a UE may select the subset of RACH resources and/or the subset of RAP indices. In an example, there may be two RAP groups informed by broadcast system information and one may be optional. If a base station configures the two groups in the four-step RA procedure, a UE may determine which group the UE selects a RAP from, based on the pathloss and a size of the message to be transmitted by the UE in the third step. A base station may use a group type to which a RAP belongs as an indication of the message size in the third step and the radio conditions at a UE. A base station may broadcast the RAP grouping information along with one or more thresholds on system information.

In the second step of the four-step RA procedure, a base station may transmit a RA response (RAR) to the UE in response to reception of a RAP that the UE transmits. A UE may monitor the PDCCH carrying a DCI, to detect RAR transmitted on a PDSCH in a RA Response window. The DCI may be CRC-scrambled by the RA-RNTI (Random Access-RadioNetwork Temporary Identifier). RA-RNTI may be used on the PDCCH when Random Access Response messages are transmitted. It may unambiguously identify which time-frequency resource is used by the MAC entity to transmit the Random Access preamble. The RA Response window may start at the subframe that contains the end of a RAP transmission plus three subframes. The RA Response window may have a length indicated by ra-ResponseWindowSize. A UE may compute the RA-RNTI associated with the PRACH in which the UE transmits a RAP as: RA-RNTI=$1+t\_id+10*f\_id$, where $t\_id$ is the index of the first subframe of the specified PRACH ($0 \le t\_id < 10$), and $f\_id$ is the index of the specified PRACH within that subframe, in ascending order of frequency domain ($0 \le f\_id < 6$). In an example, different types of UEs, e.g. NB-IoT, BL-UE, or UE-EC may employ different formulas for RA-RNTI calculations.

Figure 18:
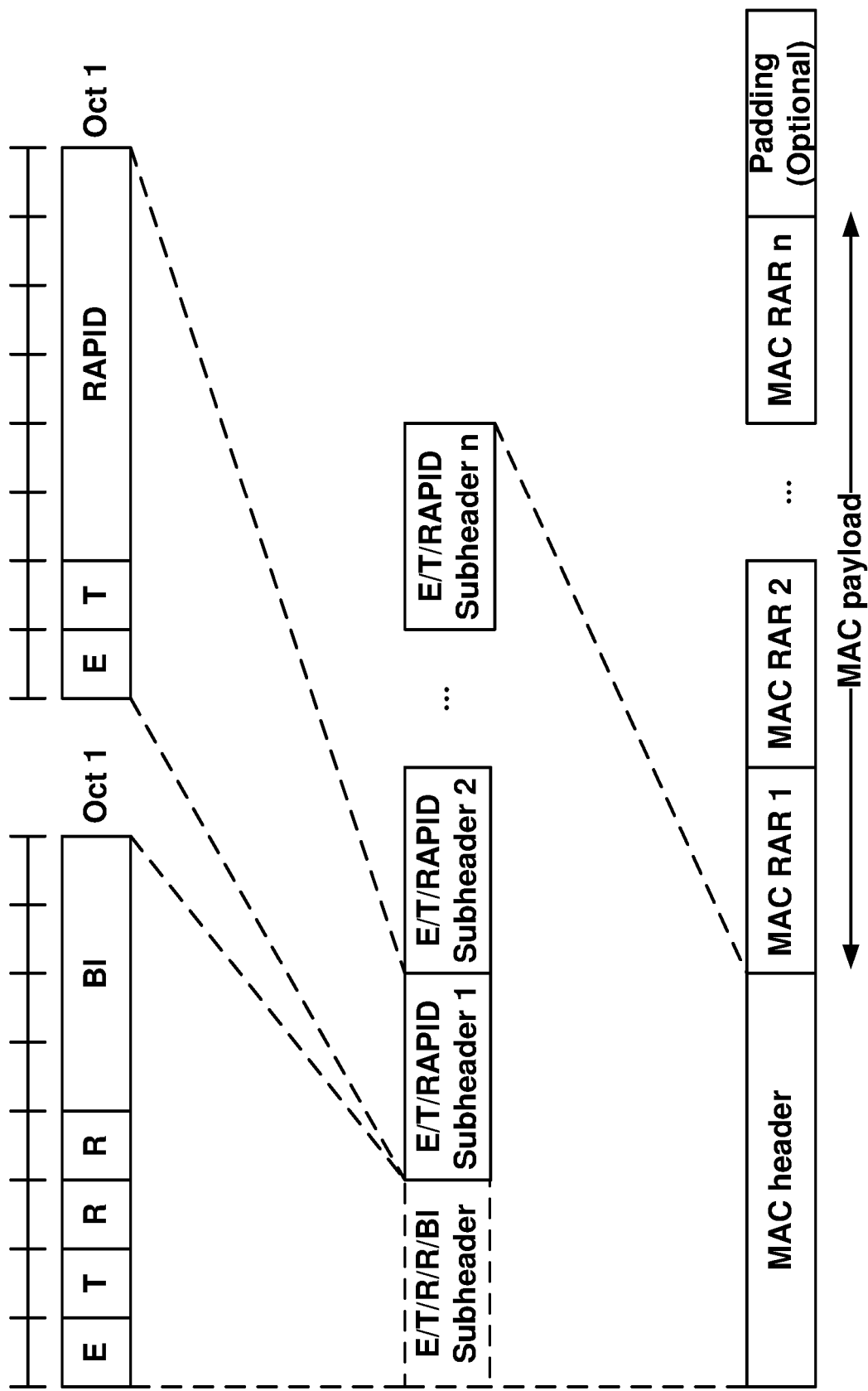
FIG. 18 is an example of MAC PDU comprising a MAC header and MAC RARs as per an aspect of an embodiment of the present disclosure.
Figure 19A:
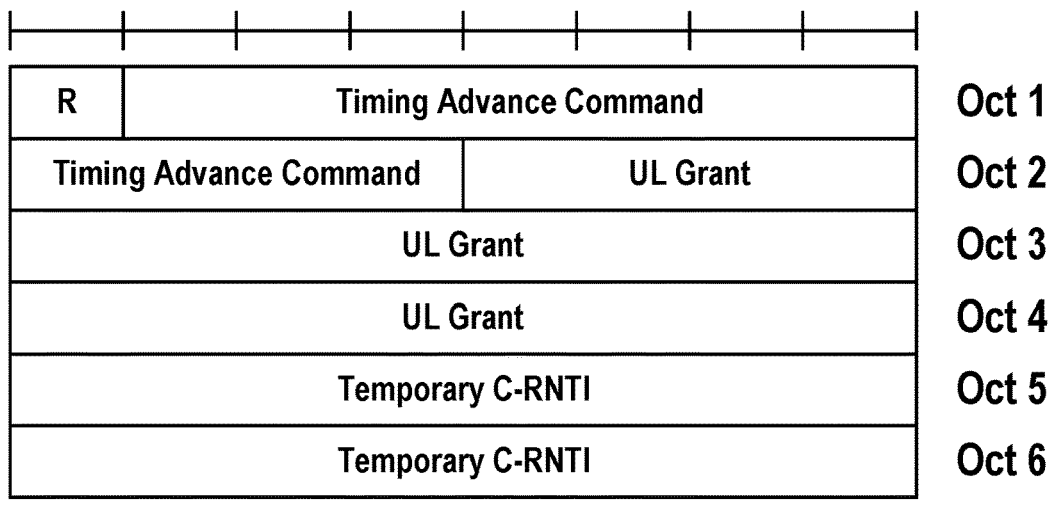
FIG. 19A, FIG. 19B, and FIG. 19C are examples of MAC RARs for different types of UEs as per aspects of embodiments of the present disclosure.
Figure 19B:
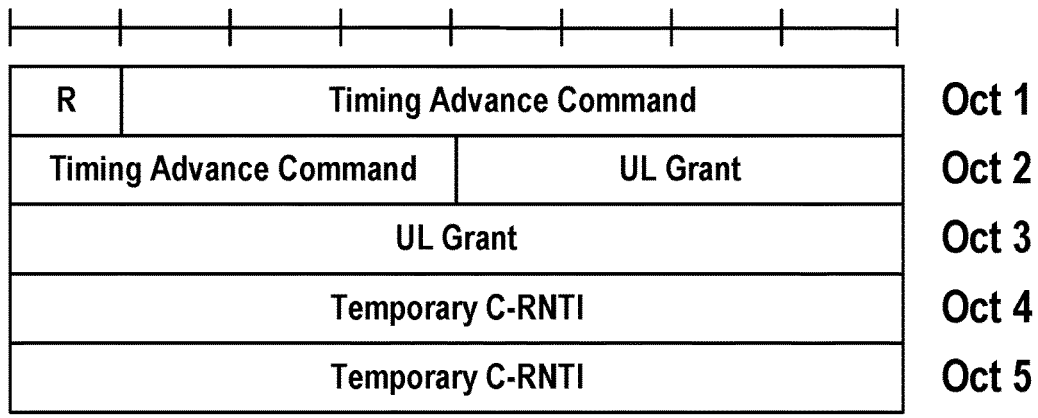
Figure 19C:
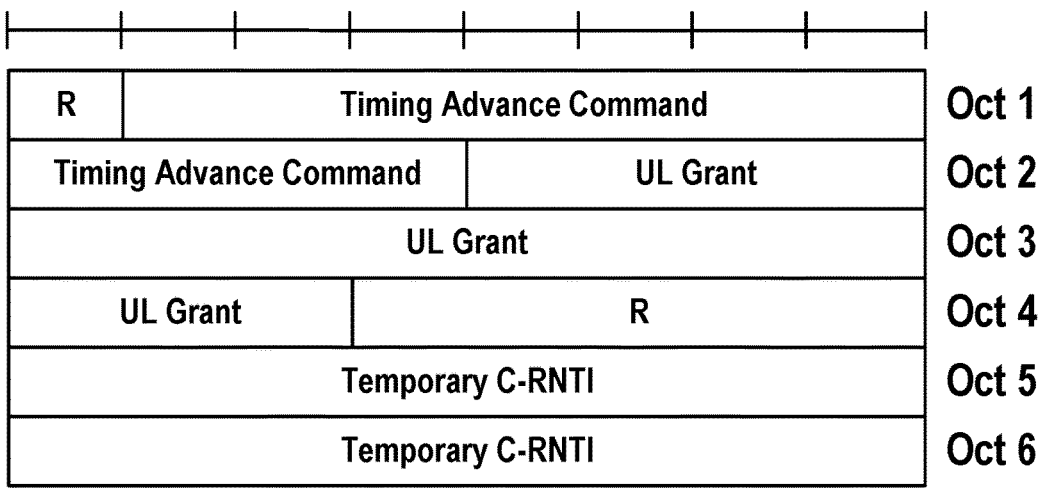

A UE may stop monitoring for RAR(s) after decoding of a MAC packet data unit (PDU) for RAR comprising a RAP identifier (RAPID) that matches the RAP transmitted by the UE. The MAC PDU may comprise one or more MAC RARs and a MAC header that may comprise a subheader having a backoff indicator (BI) and one or more subheader that comprises RAPIDs. FIG. 18 illustrates an example of a MAC PDU comprising a MAC header and MAC RARs for a four-step RA procedure. If a RAR comprises a RAPID corresponding to a RAP that a UE transmits, the UE may process the data, such as a timing advance (TA) command, a UL grant, and a Temporary C-RNTI (TC-RNTI), in the RAR. FIG. 19A, FIG. 19B, and FIG. 19C illustrate contents of a MAC RAR. Specifically, FIG. 19A shows the contents of a MAC RAR of a normal UE, FIG. 19B shows the contents of a MAC RAR of a MTC UE, and FIG. 19C shows the contents of MAC RAR of a NB-IOT UE.

In the third step of the four-step RA procedure, a UE may adjust UL time alignment by using the TA value corresponding to the TA command in the received RAR in the second step and may transmit the one or more TBs to a base station using the UL resources assigned in the UL grant in the received RAR. The TBs that a UE transmits in the third step may comprise RRC signaling, such as RRC connection request, RRC connection Re-establishment request, or RRC connection resume request, and a UE identity. The identity transmitted in the third step is used as part of the contention-resolution mechanism in the fourth step.

The fourth step in the four-step RA procedure may comprise a DL message for contention resolution. In an example, one or more UEs may perform simultaneous RA attempts selecting the same RAP in the first step, and receive the same RAR with the same TC-RNTI in the second step. The contention resolution in the fourth step may be to ensure that a UE does not incorrectly use another UE Identity. The contention resolution mechanism may be based on either C-RNTI on PDCCH or UE Contention Resolution Identity on DL-SCH, depending on whether a UE has a C-RNTI or not. If a UE has C-RNTI, upon detection of C-RNTI on the PDCCH, the UE may determine the success of RA procedure. If a UE does not have C-RNTI pre-assigned, the UE may monitor DL-SCH associated with TC-RNTI that a base station transmits in a RAR of the second step and compare the identity in the data transmitted by the base station on DL-SCH in the fourth step with the identity that the UE transmits in the third step. If the two identities are identical, the UE may determine the success of RA procedure and promote the TC-RNTI to the C-RNTI.

The forth step in the four-step RA procedure may allow HARQ retransmission. A UE may start mac-ContentionResolutionTimer when the UE transmits one or more TBs to a base station in the third step and may restart mac-ContentionResolutionTimer at each HARQ retransmission. When a UE receives data on the DL resources identified by C-RNTI or TC-RNTI in the fourth step, the UE may stop the mac-ContentionResolutionTimer. If the UE does not detect the contention resolution identity that matches to the identity transmitted by the UE in the third step, the UE may determine the failure of RA procedure and discard the TC-RNTI. If mac-ContentionResolutionTimer expires, the UE may determine the failure of RA procedure and discard the TC-RNTI. If the contention resolution is failed, a UE may flush the HARQ buffer used for transmission of the MAC PDU and may restart the four-step RA procedure from the first step. The UE may delay the subsequent RAP transmission by the backoff time randomly selected according to a uniform distribution between 0 and the backoff parameter value corresponding the BI in the MAC PDU for RAR.

In a four-step RA procedure, the usage of the first two steps may be to obtain UL time alignment for a UE and obtain an uplink grant. The third and fourth steps may be used to setup RRC connections, and/or resolve contention from different UEs.

Figure 20:
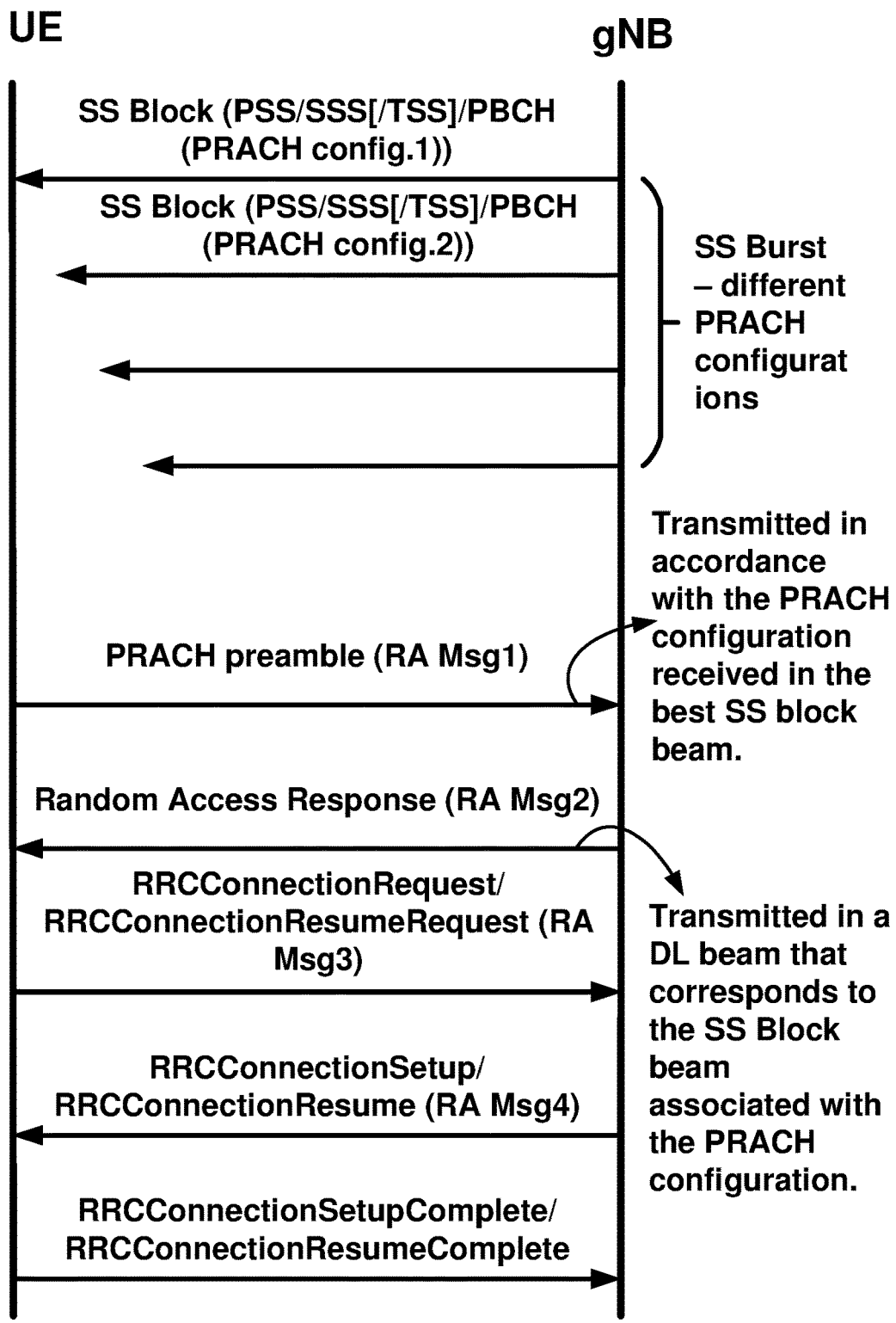
FIG. 20 is an example of RA procedure in a multiple-beam system as per aspects of an embodiment of the present disclosure.

In a multi-beam scenario, for a cell, PSS/SSS/PBCH may be repeated to support cell selection/reselection and initial access procedures. In an example, a RACH process is shown in FIG. 20. For an SS burst, the associated PBCH, or a PDSCH, indicated by a PPDCCH in common search space, scheduling a system information, such as SIB2, may be broadcasted to multiple UEs. In an example, SIB2 may carry a PRACH configuration for a beam. For a beam, a gNB may have a RACH configuration which may include PRACH preamble pool, time/frequency radio resources, and other power related parameters.

In an example, a UE may use a PRACH preamble selected from a RACH configuration to initiate a contention-based RACH procedure, or a contention-free RACH procedure. A UE may perform a 4-step RACH procedure, which may be a contention-based or contention-free RACH procedure. The UE may select a beam associated with an SS block having the best receiving signal quality. When the UE successfully detects the cell ID and decodes system information with RACH configuration, the UE may use one PRACH preamble and select one PRACH resource from the RACH resources indicated by the system information associated with the selected beam.

In an example, a PRACH resource may comprise at least one of: a PRACH index indicating a PRACH preamble; a PRACH format; a PRACH numerology; time or frequency radio resource allocation; power setting of PRACH transmission; and/or other radio resource parameters.

For a contention-free RACH procedure, the PRACH preamble and resource may be indicated in a Downlink Control Information (DCI) or high layer signaling.

Example Channel State Information-Reference Signal (CSI-RS) and downlink beam management and beam failure recovery mechanism A UE may use CSI-RS in a multi-beam system for estimating the beam quality of the links between the UE and a gNB. For example, a UE may, based on measurement of CSI-RS, report Channel State Information (CSI) for downlink channel adaption. A CSI parameter may comprise at least one of: a Precoding Matrix Index (PMI); a Channel Quality Index (CQI) value; and/or a Rank Indicator (RI). A UE may, based on a Reference Signal Received Power (RSRP) measurement on CSI-RS, report a beam index, as indicated in a CSI Resource Indication (CRI) for downlink beam selection, and associated with the RSRP value of the beam.

A CSI-RS may be transmitted on a CSI-RS resource including one or more antenna ports, one or more time or frequency radio resources. A beam may be associated with a CSI-RS. A CSI-RS resource may be configured in a cell-specific way by common RRC signaling, or in a UE-specific way by dedicated RRC signaling, and/or L1/L2 signaling. Multiple UEs covered by a cell may measure a cell-specific CSI-RS resource. A dedicated subset of UEs covered by a cell may measure a UE-specific CSI-RS resource.

A CSI-RS resource may be transmitted periodically, or using aperiodic transmission, or using a multi-shot or semi-persistent transmission. In a periodic transmission, the configured CSI-RS resource may be transmitted using a configured periodicity in time domain. In an aperiodic transmission, the configured CSI-RS resource may be transmitted in a dedicated time slot. In a multi-shot or semi-persistent transmission, the configured CSI-RS resource may be transmitted within a configured period.

A gNB may configure different CSI-RS resources in terms of cell-specific or UE-specific, periodic or aperiodic or multi-shot, for different purposes (for example, beam management, CQI reporting, etc.). FIG. 21 shows that CSI-RSs may be periodically transmitted for a beam. A beam may be transmitted in a predefined order in time domain. Beams used for CSI-RS transmission may have different beam width with the ones used for SS-blocks transmission.

A gNB may transmit one or more Radio Resource Control (RRC) messages comprising CSI-RS resource configuration for one or more CSI-RS. For example, the following parameters may be configured by higher layer signaling for each CSI-RS resource configuration: CSI-RS resource configuration identity, number of CSI-RS ports, CSI RS configuration (symbol and RE locations in a subframe), CSI RS subframe configuration (subframe location, offset and periodicity in radio frame), CSI-RS power parameter, CSI-RS sequence parameter, CDM type parameter, frequency density, transmission comb, QCL parameters (e.g., QCL-scramblingidentity, crs-portscount, mbsfn-subframeconfiglist, csi-rs-configZPid, qcl-csi-rs-configNZPid).

CSI-RS may be configured using common parameters, when a plurality of UEs receive the same CSI-RS signal. CSI-RS may be configured using UE dedicated parameters, when a CSI-RS is configured for a specific UE. Depending on different MIMO beamforming types (e.g., CLASS A or CLASS B), a UE may be configured with one or more CSI-RS resource configurations per CSI process using at least one or more RRC signaling.

For some type of MIMO beamforming, CSI-RS resources may be activated or deactivated by a MAC signaling, over the CSI-RS resources configured by a RRC signaling. The network may activate and deactivate the configured CSI-RS resources of a serving cell by sending the Activation/Deactivation of CSI-RS resources MAC control element. The configured CSI-RS resources are initially deactivated upon configuration and after a handover.

Figure 22A:
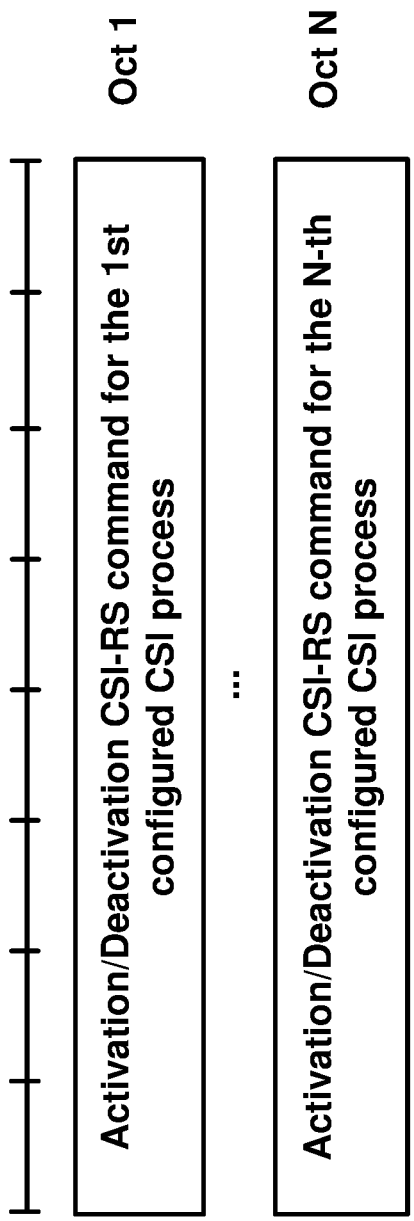
FIG. 22A is an example of activation/Deactivation of CSI-RS resources MAC Control Element as per aspects of an embodiment of the present disclosure.
Figure 22B:
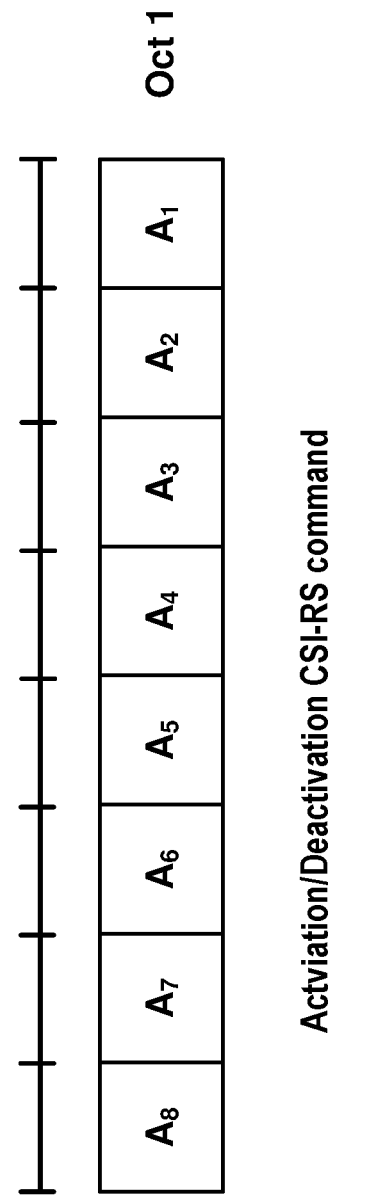
FIG. 22B is an example of activation/deactivation CSI-RS command as per aspects of an embodiment of the present disclosure.

The Activation/Deactivation of CSI-RS resources MAC control element is identified by a MAC PDU subheader with LCID. It has variable size as the number of CSI process configured with csi-RS-NZP-Activation by RRC (N) and the N number of octets with A fields are included in ascending order of CSI process ID, i.e., CSI-ProcessId as shown in FIG. 22A. Activation/Deactivation CSI-RS command is defined in FIG. 22B. The Activation/Deactivation CSI-RS command may activate or deactivate CSI-RS resources for a CSI process. For a UE configured with transmission mode 9, N equals 1. Activation/Deactivation of CSI-RS resources MAC control element applies to the serving cell on which the UE receives the Activation/Deactivation of CSI-RS resources MAC control element.

The Activation/Deactivation of CSI-RS resources MAC control elements are defined, where, "Ai" is this field indicates the activation/deactivation status of the CSI-RS resources configured by upper layers for the CSI process. In an example, A1 corresponds to the 1st entry in the list of CSI-RS specified by csi-RS-ConfigNZP-ApList as configured by upper layers, A2 corresponds to the 2nd entry in this list and so on. The Ai field is set to "1" to indicate that $i^{th}$ entry in the list of CSI-RS specified by csi-RS-ConfigNZP-ApList shall be activated. The Ai field is set to "0" to indicate that ith entry in the list shall be deactivated. For each CSI process, the number of Ai fields (i=1, 2, . . . , 8) which are set to "1" shall be equal to the value of the higher-layer parameter activatedResources.

Example Channel State Information-Reference Signal (CSI-RS) and downlink beam management and beam failure recovery mechanism A UE may use CSI-RS in a multi-beam system for estimating the beam quality of the links between the UE and a gNB. For example, a UE may, based on measurement of CSI-RS, report Channel State Information (CSI) for downlink channel adaption. A CSI parameter may comprise at least one of: a Precoding Matrix Index (PMI), a Channel Quality Index (CQI) value, and/or a Rank Indicator (RI). A UE may, based on a Reference Signal Received Power (RSRP) measurement on CSI-RS, report a beam index, as indicated in a CSI Resource Indication (CRI) for downlink beam selection, and associated with the RSRP value of the beam.

A CSI-RS may be transmitted on a CSI-RS resource including one or more antenna ports, one or more time or frequency radio resources. A beam may be associated with a CSI-RS. A CSI-RS resource may be configured in a cell-specific way by common RRC signaling, or in a UE-specific way by dedicated RRC signaling, and/or L1/L2 signaling. Multiple UEs covered by a cell may measure a cell-specific CSI-RS resource. A dedicated subset of UEs covered by a cell may measure a UE-specific CSI-RS resource.

A CSI-RS resource may be transmitted periodically, or using aperiodic transmission, or using a multi-shot or semi-persistent transmission. In a periodic transmission, the configured CSI-RS resource may be transmitted using a configured periodicity in time domain. In an aperiodic transmission, the configured CSI-RS resource may be transmitted in a dedicated time slot. In a multi-shot or semi-persistent transmission, the configured CSI-RS resource may be transmitted within a configured period.

Figure 24:
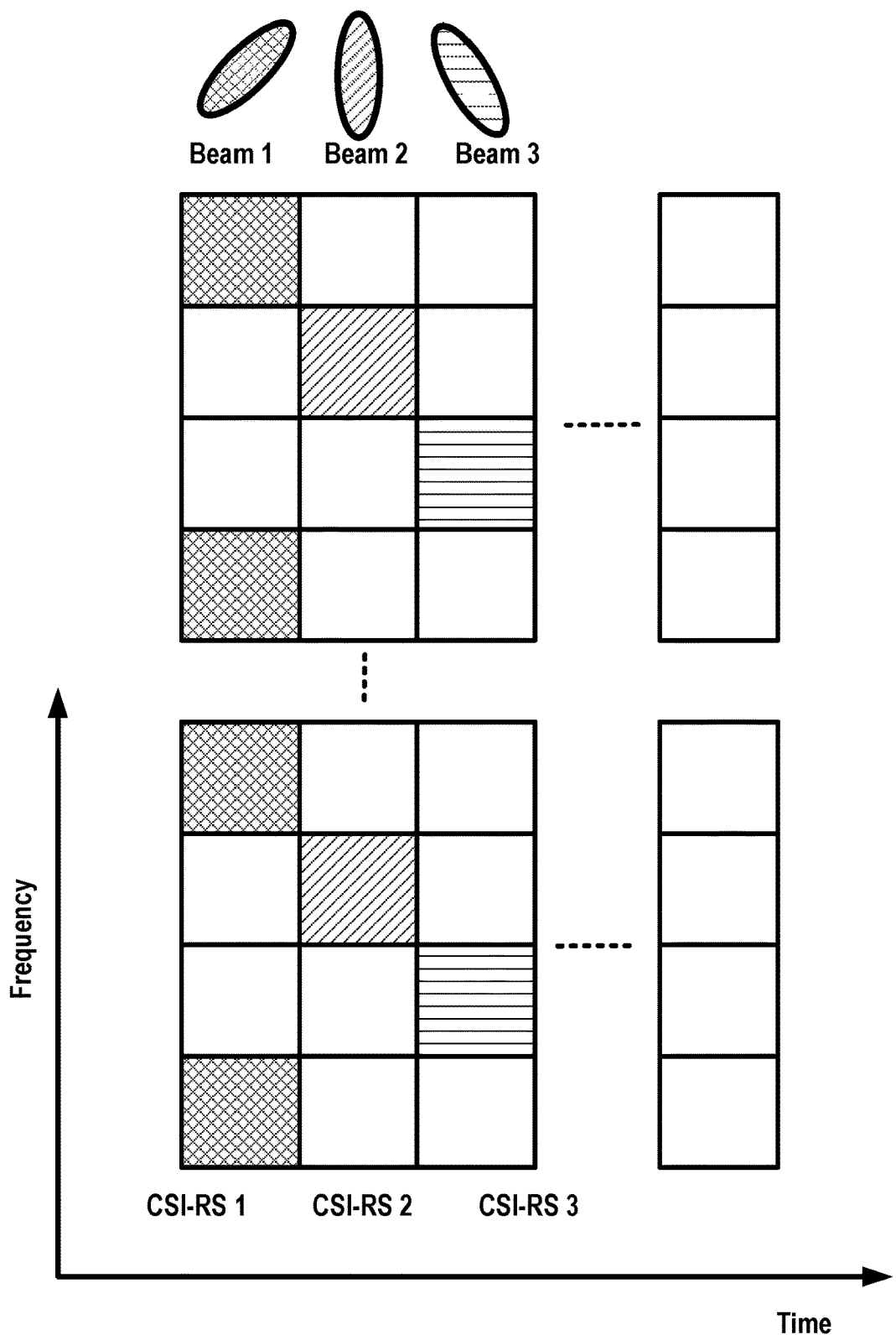
FIG. 24 is an example of CSI-RS mapping in time and frequency domain as per aspects of an embodiment of the present disclosure.

A gNB may configure different CSI-RS resources in terms of cell-specific or UE-specific, periodic or aperiodic or multi-shot, for different purposes (for example, beam management, CQI reporting, etc.). FIG. 24 shows that CSI-RSs may be periodically transmitted for a beam. A beam may be transmitted in a predefined order in time domain. Beams used for CSI-RS transmission may have different beam width with the ones used for SS-blocks transmission.

A gNB may transmit one or more Radio Resource Control (RRC) messages comprising CSI-RS resource configuration for one or more CSI-RS. For example, the following parameters may be configured by higher layer signaling for each CSI-RS resource configuration: CSI-RS resource configuration identity, number of CSI-RS ports, CSI RS configuration (symbol and RE locations in a subframe), CSI RS subframe configuration (subframe location, offset and periodicity in radio frame), CSI-RS power parameter, CSI-RS sequence parameter, CDM type parameter, frequency density, transmission comb, QCL parameters (e.g., QCL-scramblingidentity, crs-portscount, mbsfn-subframeconfiglist, csi-rs-configZPid, qcl-csi-rs-configNZPid).

CSI-RS may be configured using common parameters, when a plurality of UEs receive the same CSI-RS signal. CSI-RS may be configured using UE dedicated parameters, when a CSI-RS is configured for a specific UE. Depending on different MIMO beamforming types (e.g., CLASS A or CLASS B), a UE may be configured with one or more CSI-RS resource configurations per CSI process using at least one or more RRC signaling.

For some type of MIMO beamforming, CSI-RS resources may be activated or deactivated by a MAC signaling, over the CSI-RS resources configured by a RRC signaling. The network may activate and deactivate the configured CSI-RS resources of a serving cell by sending the Activation/Deactivation of CSI-RS resources MAC control element. The configured CSI-RS resources are initially deactivated upon configuration and after a handover.

The Activation/Deactivation of CSI-RS resources MAC control element is identified by a MAC PDU subheader with LCID. It has variable size as the number of CSI process configured with csi-RS-NZP-Activation by RRC (N) and the N number of octets with A fields are included in ascending order of CSI process ID, i.e., CSI-ProcessId as shown in FIG. 21A. Activation/Deactivation CSI-RS command is defined in FIG. 21B. The Activation/Deactivation CSI-RS command may activate or deactivate CSI-RS resources for a CSI process. For a UE configured with transmission mode 9, N equals 1. Activation/Deactivation of CSI-RS resources MAC control element applies to the serving cell on which the UE receives the Activation/Deactivation of CSI-RS resources MAC control element.

The Activation/Deactivation of CSI-RS resources MAC control elements are defined, where, "Ai" is this field indicates the activation/deactivation status of the CSI-RS resources configured by upper layers for the CSI process. In an example, A1 corresponds to the 1st entry in the list of CSI-RS specified by csi-RS-ConfigNZP-ApList as configured by upper layers, A2 corresponds to the 2nd entry in this list and so on. The Ai field is set to "1" to indicate that ith entry in the list of CSI-RS specified by csi-RS-ConfigNZP-ApList shall be activated. The Ai field is set to "O" to indicate that ith entry in the list shall be deactivated. For each CSI process, the number of Ai fields (i=1, 2, . . . , 8) which are set to "1" shall be equal to the value of the higher-layer parameter activatedResources.

After receiving a RRC for CSI-RS configuration and a MAC layer signaling for CSI-RS activation, a UE may be triggered with aperiodic CSI reporting, associated with the CSI-RS resources indicated in a DCI, for example, DCI format 0C. A CSI request field in DCI format 0C indicates for which CSI process and/or CSI-RS resource the CSI reporting is triggered, as shown in FIG. 23.

In an example shown in FIG. 24, three beams may be configured for a UE, in a UE-specific configuration. Beam 1 may be allocated with CSI-RS 1, transmitted in some subcarriers in a resource block (RB) of a first symbol. Beam 2 may be allocated with CSI-RS 2 in a second symbol, and Beam 3 in a third symbol. Not all subcarriers in a RB are necessarily used for transmitting CSI-RS 1 on beam 1. For example, other subcarriers, not used for Beam 1 for the UE, in the same RB, may be used for other CSI-RS transmissions associated with a beam for other UEs, which is called a Frequency Domain Multiplexing (FDM). In an example, beams used for a UE may be configured employing a time domain multiplexing (TDM), e.g., Beam 1, 2 and 3 for the UE may be transmitted using some symbols different from beams of other UEs.

A UE may perform downlink beam management using a UE-specific configured CSI-RS. In a beam management procedure, a UE may monitor a channel quality of a beam pair link. The beam pair link may comprise a transmitting beam from a gNB and a receiving beam by the UE. When multiple CSI-RSs associated with multiple beams are configured, a UE may monitor multiple beam pair links between the gNB and the UE.

A UE may transmit one or more beam management reports to a gNB. In a beam management report, the UE may indicate some beam pair quality parameters, comprising at least, one or more beam identifications; RSRP; PMI/CQI/RI of a subset of configured beams.

Figure 25:
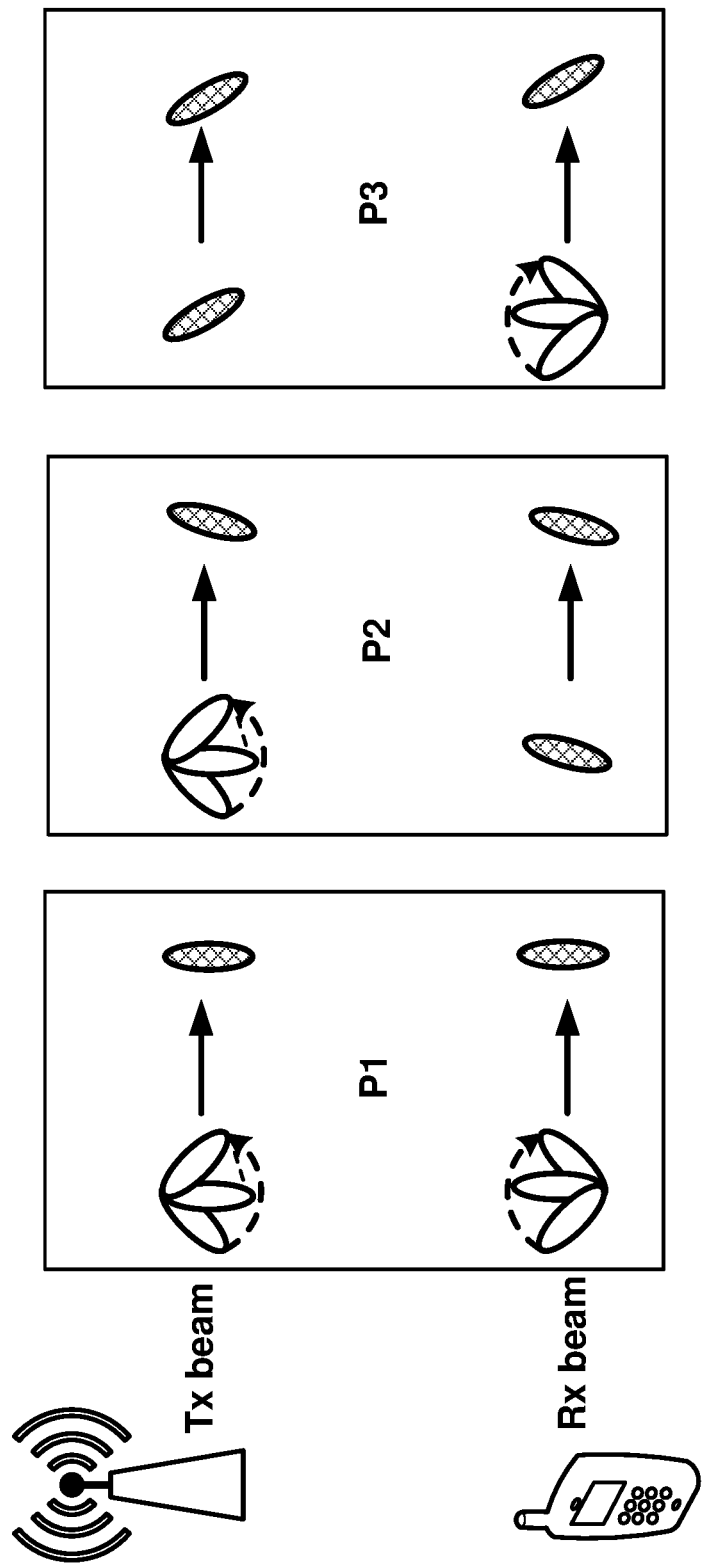
FIG. 25 is an example of downlink beam management procedures as per aspects of an embodiment of the present disclosure.

A gNB and/or a UE may perform a downlink L1/L2 beam management procedure. One or more of the following downlink L1/L2 beam management procedures may be performed within one or multiple Transmission and Receiving Point (TRPs), as shown in FIG. 25. In an example, a P-1 procedure may be used to enable UE measurement on different TRP Tx beams to support selection of TRP Tx beams/UE Rx beam(s). For beamforming at TRP, it typically includes a intra/inter-TRP Tx beam sweep from a set of different beams. For beamforming at UE, it typically includes a UE Rx beam sweep from a set of different beams. In an example, a P-2 procedure may be used to enable UE measurement on different TRP Tx beams to possibly change inter/intra-TRP Tx beam(s). P-2 may be performed on a possibly smaller set of beams for beam refinement than in P-1. P-2 may be a special case of P-1. In an example, a P-3 procedure may be used to enable UE measurement on the same TRP Tx beam to change UE Rx beam in the case UE uses beamforming.

Based on a UE's beam management report, a gNB may transmit to a UE a signal indicating that one or more beam pair links are the one or more serving beams. The gNB may transmit PDCCH and PDSCH for the UE using the one or more serving beams.

In an example, a UE or a gNB may trigger a beam failure recovery mechanism. A UE may trigger a beam failure recovery (BFR) request transmission (e.g. when a beam failure event occurs) when quality of beam pair link(s) of an associated control channel falls below a threshold (e.g. in comparison with a threshold, and/or time-out of an associated timer).

A UE may measure quality of beam pair link using one or more reference signals (RS). One or more SS blocks, or one or more CSI-RS resources, each associated with a CSI-RS Resource Index (CRI), or one or more DM-RSs of PBCH, may be used as RS for measuring quality of a beam pair link. Quality of beam pair link may be defined as a RSRP value, or a Reference Signal Received Quality (RSRQ) value, and/or a CSI value measured on RS resources. A gNB may indicate whether an RS resource, used for measuring beam pair link quality, is QCLed (Quasi-Co-Located) with DM-RSs (demodulation reference signal) of a control channel. The RS resource and the DM-RSs of the control channel may be called QCLed when the channel characteristics from a transmission on an RS to a UE, and that from a transmission on a control channel to the UE, are similar or same under a configured criterion.

A UE may be configured to monitor PDCCH on M beam pair links simultaneously, where M≥1 and the maximum value of M may depend at least on UE capability. This process may increase robustness against beam pair link blocking. A gNB may transmit one or more messages configured to cause a UE to monitor PDCCH on different beam pair link(s) in different PDCCH OFDM symbols.

A gNB may transmit higher layer signaling or MAC CE comprising parameters related to UE Rx beam setting for monitoring PDCCH on multiple beam pair links. A gNB may transmit indication of spatial QCL assumption between an DL RS antenna port(s) (for example, cell-specific CSI-RS, or UE-specific CSI-RS, or SS block, or PBCH with or without DM-RSs of PBCH), and DL RS antenna port(s) for demodulation of DL control channel. Signaling for beam indication for a PDCCH may be MAC CE signaling, or RRC signaling, or DCI signaling, or specification-transparent and/or implicit method, and combination of these signaling methods.

For reception of unicast DL data channel, a gNB may indicate spatial QCL parameters between DL RS antenna port(s) and DM-RS antenna port(s) of DL data channel. A gNB may transmit DCI (downlink grants) comprising information indicating the RS antenna port(s). The information may indicate the RS antenna port(s) which is QCL-ed with DM-RS antenna port(s). Different set of DM-RS antenna port(s) for the DL data channel may be indicated as QCL with different set of RS antenna port(s).

When gNB transmits a signal indicating a spatial QCL parameters between CSI-RS and DM-RS for PDCCH, a UE may use CSI-RSs QCLed with DM-RS for PDCCH to monitor beam pair link quality. If beam failure event occurs, the UE may transmit beam failure recovery request by configuration.

When a UE transmits a beam failure recovery request on an uplink physical channel or signal, a gNB may detect that there is a beam failure event for the UE by monitoring the uplink physical channel or signal. The gNB may initiate a beam recovery mechanism to recover the beam pair link for transmitting PDCCH between the gNB and the UE. A beam recovery mechanism may be a L1 scheme, or a higher layer scheme.

A gNB may transmit one or more messages comprising configuration parameters of an uplink physical channel or signal for transmitting beam failure recovery request. The uplink physical channel or signal may be based one of: on a non-contention based PRACH (so called BFR-PRACH), which uses a resource orthogonal to resources of other PRACH transmissions; a PUCCH (so called BFR-PUCCH); and/or a contention-based PRACH resource. Combinations of these candidate signal/channels may be configured by the gNB.

A gNB may respond a confirmation message to a UE after receiving one or multiple BFR request. The confirmation message may include the CRI associated with the candidate beam the UE indicates in the one or multiple BFR request. The confirmation message may be a L1 control information.

LTE-Advanced introduced Carrier Aggregation (CA) in Release-10. In Release-10 CA, the Primary Cell (PCell) is always activated. In addition to the PCell, an eNB may transmit one or more RRC message comprising configuration parameters for one or more secondary cells. In 3GPP LTE/LTE-A specification, there are many RRC messages used for Scell configuration/reconfiguration. For example, the eNB may transmit a RRCconnectionReconfiguration message for parameters configuration of one or more secondary cells for a UE, wherein the parameters may comprise at least: cell ID, antenna configuration, CSI-RS configuration, SRS configuration, PRACH configuration, etc.

The one or more SCells configured in the RRC message can be activated or deactivated by at least one MAC Control Element (MAC CE). The SCell activation/deactivation processes were introduced to achieve battery power savings. When an SCell is deactivated, the UE may stop receiving downlink signals and stop transmission on the SCell. In LTE-A specification, the default state of an SCell is deactivated when the SCell has been configured/added. Additional activation procedure employing MAC CE Activation Command may be needed to activate the SCell. SCells may be deactivated either by an activation/deactivation MAC CE or by the sCellDeactivationTimer. The UE and eNB maintain one sCellDeactivationTimer per SCell with a common value across SCells. eNB maintains the activation/deactivation status of an SCell for a UE. The same initial timer value may apply to each instance of the sCellDeactivationTimer and it is configured by RRC. sCellDeactivationTimer is included in Mac-MainConfig dedicated parameter in an RRC message. The configured SCells may be initially deactivated upon addition and after a handover.

Figure 26A:
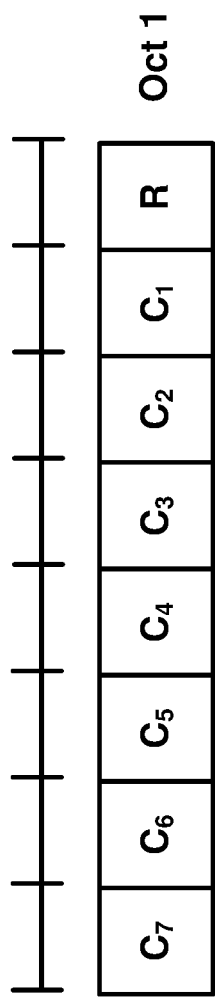
FIG. 26A and FIG. 26B are examples of activation/deactivation MAC control elements as per aspects of an embodiment of the present disclosure.
Figure 26B:
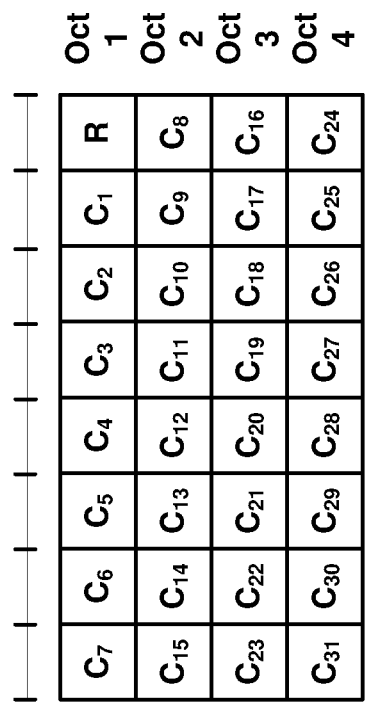

Various implementation of the Activation/Deactivation MAC control element may be possible. In an example embodiment, the Activation/Deactivation MAC control element is identified by a MAC PDU subheader with a pre-assigned LCID. It may have a fixed size and consists of a single octet containing seven C-fields and one R-field as shown in FIG. 26A and FIG. 26B. The Activation/Deactivation MAC control element is defined where, a Ci field indicates the activation/deactivation status of the SCell with SCellIndex i, if there is an SCell configured with SCellIndex i, otherwise the MAC entity may ignore the Ci field. The Ci field is set to "1" to indicate that the SCell with SCellIndex i may be activated. The Ci field is set to "0" to indicate that the SCell with SCellIndex i may be deactivated. And a R bit in the MAC CE is a Reserved bit which may be set to "0".

Other embodiments may be implemented. For example, when UE is configured with more than 5 or 7 carriers, the format may include more than one byte including a longer bitmap as shown in FIG. 26B.

Various deactivation timer management processes may be implemented. In an example embodiment, if PDCCH on the activated SCell indicates an uplink grant or downlink assignment; or if PDCCH on the Serving Cell scheduling the activated SCell indicates an uplink grant or a downlink assignment for the activated SCell: the UE may restart the sCellDeactivationTimer associated with the SCell.

In the current LTE-Advanced transceiver operation, the MAC entity may for each TTI and for each configured SCell perform certain functions related to activation/deactivation of SCell(s). If the MAC entity receives an Activation/Deactivation MAC control element in this TTI activating the SCell, the MAC entity may in the TTI according to the timing defined in LTE-A specification: activate the SCell; start or restart the sCellDeactivationTimer associated with the SCell; and trigger PHR (power headroom). If the MAC entity receives an Activation/Deactivation MAC control element in this TTI deactivating the SCell; or if the sCellDeactivationTimer associated with the activated SCell expires in this TTI: in the TTI according to the timing defined in LTE_A specification: deactivate the SCell; stop the sCellDeactivationTimer associated with the SCell; and/or flush all HARQ buffers associated with the SCell.

In the current LTE-Advanced transceiver operation, when a UE activates the SCell, the UE may apply normal SCell operation including: SRS transmissions on the SCell; CQI/PMI/RI/PTI reporting for the SCell; PDCCH monitoring on the SCell; and/or PDCCH monitoring for the SCell.

If the SCell is deactivated, a UE may perform the following actions: not transmit SRS on the SCell; not report CQI/PMI/RI/PTI for the SCell; not transmit on UL-SCH on the SCell; not transmit on RACH on the SCell; not monitor the PDCCH on the SCell; not monitor the PDCCH for the SCell. When SCell is deactivated, the ongoing Random Access procedure on the SCell, if any, is aborted.

When a UE receives a MAC activation command for a secondary cell in subframe n, the corresponding actions in the MAC layer shall be applied no later than the minimum requirement defined in 3GPP TS 36.133 and no earlier than subframe n+8, except for the following: the actions related to CSI reporting and the actions related to the sCellDeactivationTimer associated with the secondary cell, which shall be applied in subframe n+8. When a UE receives a MAC deactivation command for a secondary cell or the sCellDeactivationTimer associated with the secondary cell expires in subframe n, the corresponding actions in the MAC layer shall apply no later than the minimum requirement defined in 3GPP TS 36.133, except for the actions related to CSI reporting which shall be applied in subframe n+8.

Figure 27:
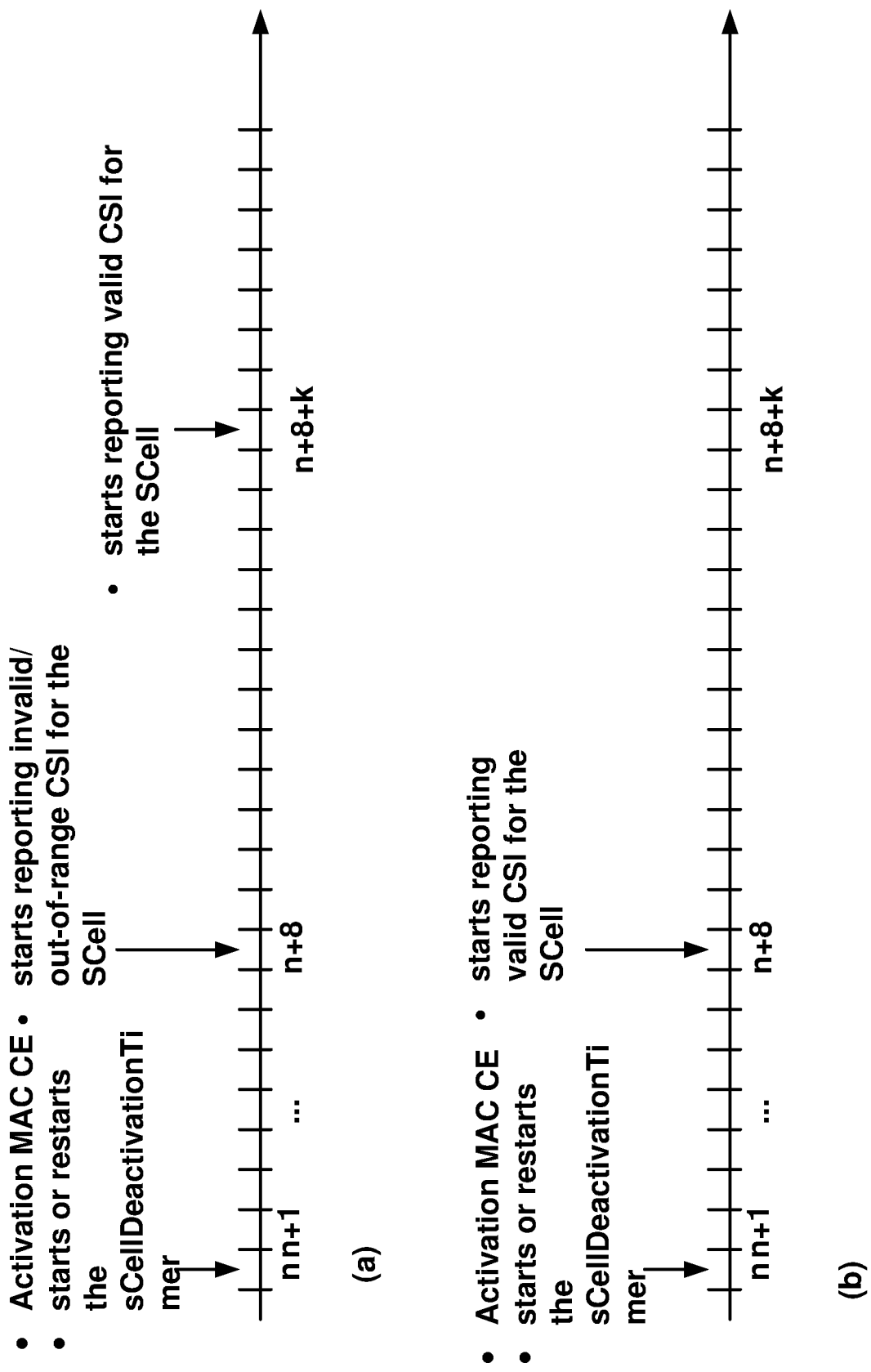
FIG. 27 is an example of sCellDeactivationTimer starting when a SCell activated.

When a UE receives a MAC activation command for a secondary cell in subframe n, the actions related to CSI reporting and the actions related to the sCellDeactivationTimer associated with the secondary cell, are applied in subframe n+8. When a UE receives a MAC deactivation command for a secondary cell or other deactivation conditions are met (e.g. the sCellDeactivationTimer associated with the secondary cell expires) in subframe n, the actions related to CSI reporting are applied in subframe n+8. FIG. 27 shows the timeline when a UE receives a MAC activation command. The UE starts reporting invalid or valid CSI for the Scell at the $(n+8)^{th}$ subframe, and start or restart the sCellDeactivationTimer when receiving the MAC CE activating the SCell in the $n^{th}$ subframe. For some UE having slow activation, it may report an invalid CSI (out-of-range CSI) at the $(n+8)^{th}$ subframe, for some UE having a quick activation, it may report a valid CSI at the $(n+8)^{th}$ subframe.

When a UE receives a MAC activation command for an SCell in subframe n, the UE starts reporting CQI/PMI/RI/PTI for the SCell at subframe n+8 and starts or restarts the sCellDeactivationTimer associated with the SCell at subframe n. It is important to define the timing of these actions for both UE and eNB. For example, sCellDeactivationTimer is maintained in both eNB and UE and it is important that both UE and eNB stop, start and/or restart this timer in the same TTI.

In a NR system, when a UE receives a MAC activation commend for an SCell in subframe (or slot) n, the UE may start or restart the sCellDeactivationTimer associated with the SCell in the same subframe (or slot). The UE may start reporting CQI/PMI/RI/PTI for the SCell at subframe n+m, where m is a value configured by a RRC message, or a predefined value.

In an example, a gNB may transmit a DCI via a PDCCH for scheduling decision and power-control commends. More specifically, the DCI may comprise at least one of: downlink scheduling assignments, uplink scheduling grants, power-control commands. The downlink scheduling assignments may comprise at least one of: PDSCH resource indication, transport format, HARQ information, and control information related to multiple antenna schemes, a command for power control of the PUCCH used for transmission of ACK/NACK in response to downlink scheduling assignments. The uplink scheduling grants may comprise at least one of: PUSCH resource indication, transport format, and HARQ related information, a power control command of the PUSCH.

The different types of control information may correspond to different DCI message sizes. For example, supporting spatial multiplexing with noncontiguous allocation of RBs in the frequency domain may require a larger scheduling message in comparison with an uplink grant allowing for frequency-contiguous allocation only. DCI may be categorized into different DCI formats, where a format corresponds to a certain message size and usage.

In an example, a UE may monitor one or more PDCCH to detect one or more DCI with one or more DCI format. The one or more PDCCH may be transmitted in common search space or UE-specific search space. A UE may monitor PDCCH with only a limited set of DCI format, to save power consumption. For example, a normal UE may not be required to detect a DCI with DCI format 6 which is used for an eMTC UE. The more DCI format to be detected, the more power be consumed at the UE.

In an example, the information in the DCI formats used for downlink scheduling can be organized into different groups, with the field present varying between the DCI formats, including at least one of: resource information, consisting of: carrier indicator (0 or 3 bits), RB allocation; HARQ process number; MCS, NDI, and RV (for the first TB); MCS, NDI and RV (for the second TB); MIMO related information, comprising at least one of: PMI, precoding information, transport block swap flag, power offset between PDSCH and reference signal, reference-signal scrambling sequence, number of layers, and/or antenna ports for the transmission; PDSCH resource-element mapping and QCI; Downlink assignment index (DAI); TPC for PUCCH; SRS request (1 bit), triggering one-shot SRS transmission; ACK/NACK offset; DCI format 0/1A indication, used to differentiate between DCI format 1A and 0, as the two formats have the same message size; and padding if necessary.

In an example, the information in the DCI formats used for uplink scheduling can be organized into different groups, with the field present varying between the DCI formats, including at least one of: resource information, consisting of: carrier indicator, resource allocation type, RB allocation; MCS, NDI (for the first TB); MCS, NDI (for the second TB); Phase rotation of the uplink DMRS; precoding information; CSI request, requesting an aperiodic CSI report; SRS request (2 bit), used to trigger aperiodic SRS transmission using one of up to three preconfigured settings; Uplink index/DAI; TPC for PUSCH; DCI format 0/1A indication; and padding if necessary.

In a NR system, in order to support wide bandwidth operation, a gNB may transmit one or more PDCCH in different control resource sets. A gNB may transmit one or more RRC message comprising configuration parameters of one or more control resource sets. At least one of the one or more control resource sets may comprise at least one of: a first OFDM symbol (e.g., CORESET_StartSymbol); a number of consecutive OFDM symbols (e.g., CORESET_NumSymbol); a set of resource blocks (e.g., CORESET_RBSet); a CCE-to-REG mapping (e.g., CORESET_mapping); and a REG bundle size, in case of interleaved CCE-to-REG mapping (e.g., CORESET_REG_bundle).

With configured control resource sets, a UE may monitor PDCCH for detecting DCI on a subset of control resource sets, to reduce the power consumption.

Figure 28:
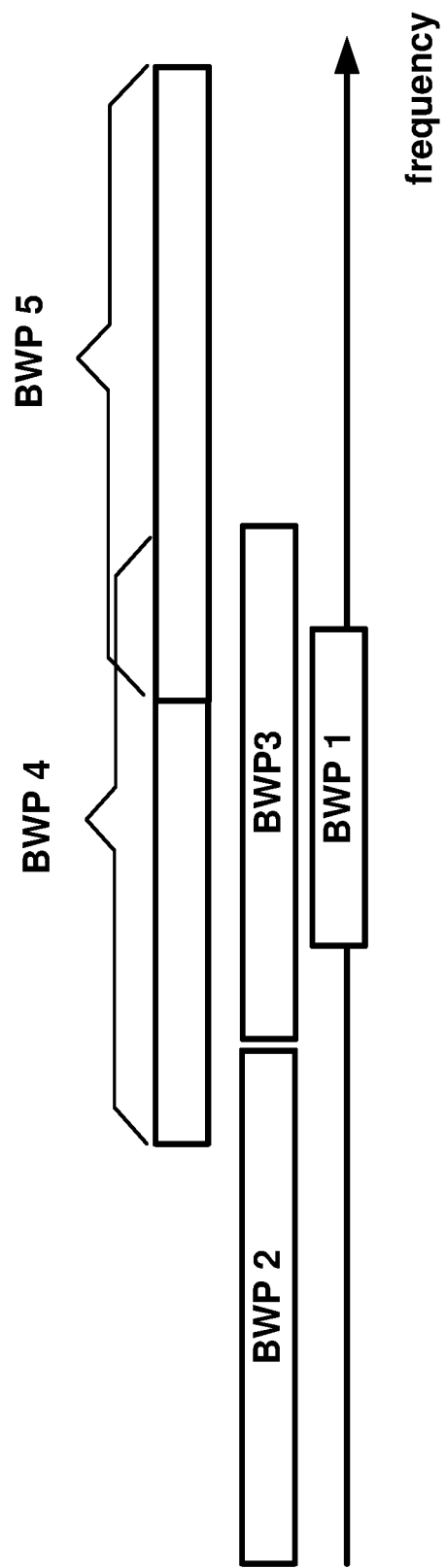
FIG. 28 is an example of multiple Bandwidth Parts (BWPs) configuration in frequency domain as per aspect of an embodiment of the present disclosure.

In an example, a gNB may transmit one or more message comprising configuration parameters of one or more active bandwidth parts (BWP). The one or more active BWPs may have different numerologies. A gNB may transmit one or more control information for cross-BWP scheduling to a UE. FIG. 28 shows example of multiple BWP configuration. One BWP may overlap with another BWP in frequency domain.

A gNB may transmit one or more messages comprising configuration parameters of one or more DL and/or UL BWPs for a cell, with at least one BWP as the active DL or UL BWP, and zero or one BWP as the default DL or UL BWP.

For a PCell, the active DL BWP may be the DL BWP on which the UE may monitor one or more PDCCH, and/or receive PDSCH. The active UL BWP is the UL BWP on which the UE may transmit uplink signal.

For a SCell, the active DL BWP may be the DL BWP on which the UE may monitor one or more PDCCH and receive PDSCH when the SCell is activated by receiving a MAC activation/deactivation CE. The active UL BWP is the UL BWP on which the UE may transmit PUCCH (if configured) and/or PUSCH when the SCell is activated by receiving a MAC activation/deactivation CE.

Configuration of multiple BWPs may be used to save UE's power consumption. When configured with an active BWP and a default BWP, a UE may switch to the default BWP if there is no activity on the active BWP. For example, a default BWP may be configured with narrow bandwidth, an active BWP may be configured with wide bandwidth. If there is no signal transmitting on or receiving from an active BWP, the UE may switch the BWP to the default BWP, which may reduce power consumption.

Switching BWP may be triggered by a DCI or a timer. When a UE receives a DCI indicating DL BWP switching from an active BWP to a new BWP, the UE may monitor PDCCH and/or receive PDSCH on the new BWP. When the UE receives a DCI indicating UL BWP switching from an active BWP to a new BWP, the UE may transmit PUCCH (if configured) and/or PUSCH on the new BWP.

A gNB may transmit one or more messages comprising a BWP inactive timer to a UE. The UE may start the timer when it switches its active DL BWP to a DL BWP other than the default DL BWP. The UE may restart the timer to the initial value when it successfully decodes a DCI to schedule PDSCH(s) in its active DL BWP. The UE may switch its active DL BWP to the default DL BWP when the BWP timer expires.

Figure 29:
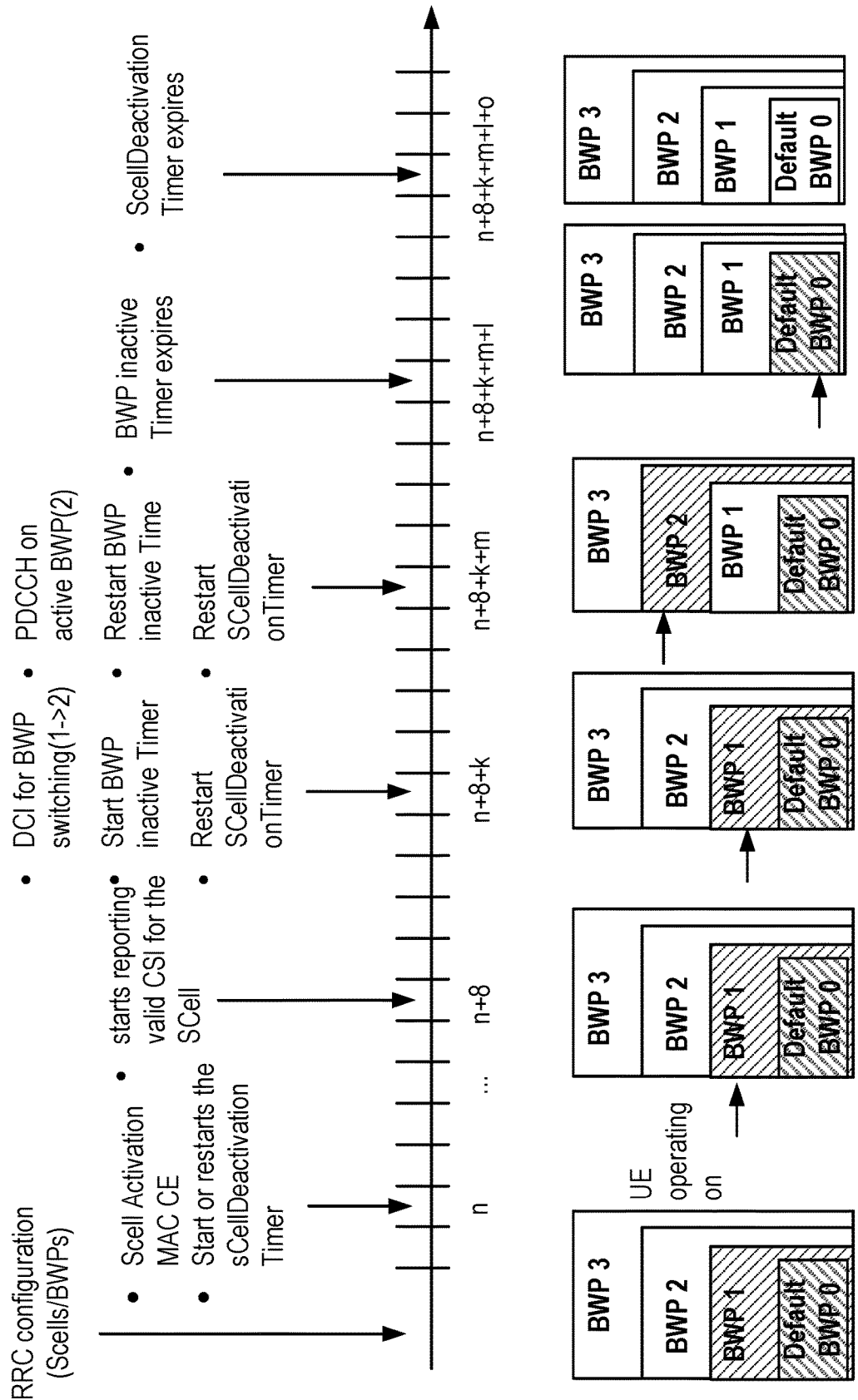
FIG. 29 is an example of BWP inactive timer and sCell-DeactivationTimer relation when a SCell activated as per an aspect of an embodiment of the present disclosure.

FIG. 29 shows example of BWP switching associated with BWP inactive timer. A UE may receive RRC message comprising parameters of a secondary cell (SCell) and one or more BWP configuration associated with the SCell. Among the one or more BWPs, at least one BWP may be configured as the first active BWP (e.g., BWP 1 in the figure), one BWP as the default BWP (e.g., BWP 0 in the figure). The UE may receive a MAC CE to activate the Scell at the $n^{th}$ subframe. The UE may start the sCellDeactivationTimer at the $n^{th}$ subframe, and start reporting CSI for the SCell, or for the initial active BWP of the SCell at the $(n+8)^{th}$ subframe. The UE may start the BWP inactive timer and restart the sCellDeactivationTimer when receiving a DCI indicating switching BWP from BWP 1 to BWP 2, at the $(n+8+k)^{th}$ subframe. When receiving a PDCCH indicating DL scheduling on BWP 2, for example, at the $(n+8+k+m)^{th}$ subframe, the UE may restart the BWP inactive timer and sCellDeactivationTimer. The UE may switch back to the default BWP (0) when the BWP inactive timer expires, at the $(n+8+k+m+1)^{th}$ subframe. The UE may deactivate the SCell when the sCellDeactivationTimer expires at the $(n+8+k+m+l+o)^{th}$ subframe.

In an example, BWP inactive timer may be used to reduce UE's power consumption when configured with multiple cells with each cell having wide bandwidth. The UE may transmit on or receive from a narrow-bandwidth BWP on the PCell or SCell when there is no activity on an active BWP. The UE may deactivate the SCell triggered by sCellDeactivationTimer expiring when there is no activity on the SCell.

In an example, a gNB may transmit one or more RRC message comprising one or more CSI configuration parameters comprising at least: one or more CSI-RS resource settings; one or more CSI reporting settings, and one CSI measurement setting.

In an example, a CSI-RS resource setting may comprise one or more CSI-RS resource sets. In an example, there may be one CSI-RS resource set for periodic CSI-RS, or SP CSI-RS.

In an example, a CSI-RS resource set may comprise at least one of: one CSI-RS type (e.g., periodic, aperiodic, semi-persistent); one or more CSI-RS resources comprising at least one of: CSI-RS resource configuration identity; number of CSI-RS ports; CSI RS configuration (symbol and RE locations in a subframe); CSI RS subframe configuration (subframe location, offset and periodicity in radio frame); CSI-RS power parameter; CSI-RS sequence parameter; CDM type parameter; frequency density; transmission comb; and/or QCL parameters.

In an example, one or more CSI-RS resources may be transmitted periodically, or using aperiodic transmission, or using a semi-persistent transmission.

In a periodic transmission, the configured CSI-RS resource may be transmitted using a configured periodicity in time domain.

In an aperiodic transmission, the configured CSI-RS resource may be transmitted in a dedicated time slot or subframe.

In a semi-persistent transmission, one or more configured CSI-RS resources may be transmitted when triggered by a CSI activation MAC CE or DCI. The transmission of the one or more configured CSI-RS resources may be stopped when triggered by a CSI deactivation MAC CE or DCI. The transmission of the one or more configured CSI-RS resources may be stopped when the transmission duration (if configured) expires.

In an example, a CSI reporting setting may comprise at least one of: one report configuration identifier; one report type; one or more reported CSI parameter(s); one or more CSI Type (I or II); one or more codebook configuration parameters; a report quantity indicator indicating CSI-related or L1-RSRP-related quantities to report; one or more parameters indicating time-domain behavior; frequency granularity for CQI and PMI; and/or measurement restriction configurations. The report type may indicate a time domain behavior of the report (aperiodic, semi-persistent, or periodic). The one of the one or more CSI reporting settings may further comprise at least one of: one periodicity parameter; one duration parameter; and/or one offset (e.g., in unit of slots), if the report type is a periodic or semi-persistent report. The periodicity parameter may indicate the periodicity of a CSI report. The duration parameter may indicate the duration of CSI report transmission. The offset parameter may indicate value of timing offset of CSI report from a reference time.

In an example, a CSI measurement setting may comprise one or more links comprising one or more link parameters. The one or more link parameters may comprise at least one of: one CSI reporting setting indication; CSI-RS resource setting indication; and/or one or more measurement parameters.

In an example, a gNB may trigger a CSI reporting by transmitting a RRC message, or a MAC CE, or a DCI. In an example, a UE may transmit one or more SP CSI report on a PUCCH, with a transmission periodicity, triggered by receiving a MAC CE activating a SP CSI reporting. In an example, a UE may transmit one or more SP CSI report on a PUSCH, triggered by receiving a DCI activating a SP CSI reporting.

Figure 30:
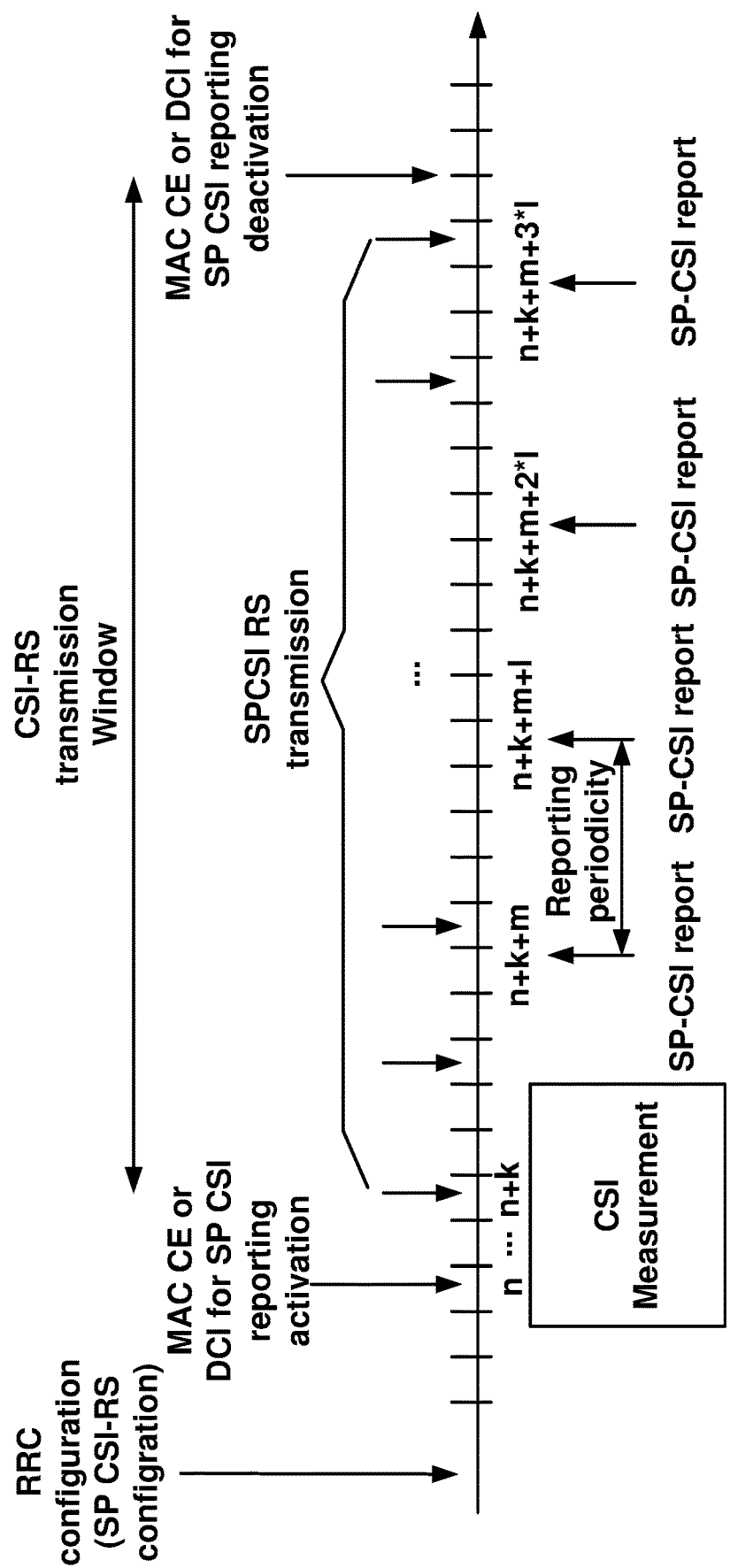
FIG. 30 is an example of SP CSI configuration with a CSI activation MAC CE or DCI and a CSI deactivation MAC CE or DCI as per an aspect of an embodiment of the present disclosure.

FIG. 30 shows an example of the embodiment. In response to transmitting a MAC CE or DCI for triggering a SP CSI reporting at subframe n, a gNB may start transmitting one or more SP CSI-RS at subframe n+k. The value "k" may be zero, or an integer greater than zero, configured by a RRC message. The value "k" may be predefined as a fixed value.

For example, a UE may transmit SP CSI report at subframe n+k+m, n+k+m+l, n+k+m+2*l, n+k+m+3*l, etc., with a periodicity of l subframes. The UE may stop transmitting SP CSI reporting in response to receiving a MAC CE or DCI for deactivating SP CSI reporting.

In an example, the time and frequency resources that maybe used by the UE to report CSI are controlled by the gNB. CSI consists of Channel Quality Indicator (CQI), precoding matrix indicator (PMI), CSI-RS resource indicator (CRI), strongest layer indication (SLI), rank indication (RI) and/or and L1-RSRP.

In an example, for CQI, PMI, CRI, SLI, RI, L1-RSRP, a UE is configured by higher layers with N≥1 ReportConfig Reporting Settings, M≥1 ResourceConfig Resource Settings, and a single MeasConfig measurement setting containing L≥1 Links. A MeasConfig contains a list of reporting configurations (ReportConfigList), a list of resource configurations (ResourceConfigList), a list of link configurations (MeasLinkConfigList) and a list of trigger states (ReportTrigger).

In an example, a Reporting Setting ReportConfig is associated with a single downlink BWP (higher layer parameter bandwidthPartId) and contains the reported parameter(s) for one CSI reporting band: CSI Type (I or II) if reported, codebook configuration including codebook subset restriction, time-domain behavior, frequency granularity for CQI and PMI, measurement restriction configurations, the strongest layer indicator (SLI), the reported L1-RSRP parameter(s), CRI, and SSBRI (SSB Resource Indicator). Each ReportConfig contains a ReportConfigID to identify the ReportConfig, a ReportConfigType to specify the time domain behavior of the report (either aperiodic, semi-persistent, or periodic), a ReportQuantity to indicate the CSI-related or L1-RSRP-related quantities to report, a ReportFreqConfiguration to indicate the reporting granularity in the frequency domain. For periodic/semi-persistent reporting, a ReportConfig contains a ReportSlotConfig to specify the periodicity and slot offset. For aperiodic reporting, a ReportConfig contains an AperiodicReportSlotOffset to specify a set of allowed values of the timing offset for aperiodic reporting (a particular value is indicated in DCI). The ReportFreqConfiguration contains parameters to enable configuration of at least subband or wideband PMI and CQI reporting separately. The ReportConfig may also contain MeasRestrictionConfig-time-channel to specify parameters to enable configuration of time domain measurement restriction for channel. The ReportConfig may also contain MeasRestrictionConfig-time-interference to specify parameters to enable separate configuration of time domain measurement restriction for interference. The ReportConfig may also contain CodebookConfig, which contains configuration parameters for Type-I or Type II CSI including codebook subset restriction.

In an example, a Resource Setting ResourceConfig contains a configuration of S≥1 CSI-RS Resource Sets (higher layer parameter ResourceSetConfig), with each Resource Set consisting of CSI-RS resources (higher layer parameters NZP-CSI-RS-ResourceConfigList and CSI-IM-ResourceConfigList) and SS/PBCH Block resources used for L1-RSRP computation (higher layer parameter resource-config-SS-list). Each Resource setting is located in the BWP identified by the higher layer parameter BWP-info, and all linked Resource Settings of a CSI Report Setting have the same BWP.

In an example for periodic and semi-persistent CSI Resource Settings, S=1. Each set s contains Ks≥1 CSI-RS resources (higher layer parameter CSI-RS-ResourceConfig) each of which includes at least mapping to REs, number of ports and time-domain behavior. The allowable antenna port values and resource mapping patterns are specified in TS 38.211. The time domain behavior of the CSI-RS resources which are part of sets within a CSI-RS Resource Setting are indicated by the higher layer parameter ResourceConfigType and may be aperiodic, periodic, or semi-persistent.

In an example, the following may be configured via higher layer signaling for one or more CSI resource settings for channel and interference measurement: CSI-IM resource for interference measurement, non-zero power CSI-RS resource for interference measurement, and/or non-zero power CSI-RS resource for channel measurement In an example, a Link MeasLinkConfig in the higher layer-configured CSI measurement setting contains the CSI Reporting Setting indication, CSI Resource Setting Indication, and MeasQuantity an indication of the quantity to be measured which maybe either channel measurement or interference measurement. ReportConfigMax indicates the maximum number of report configurations, ResourceConfigMax indicates the maximum number of resource configurations, MeasLinkConfigMax indicates the maximum number of link configurations, ResourceSetMax indicates the maximum number of resources sets per resource configuration, CSI-RS-ResourcePerSetMax indicates the maximum number of NZP-CSI-RS resources per NZP-CSI-RS resource set, NZP-CSI-RS-ResourceMax indicates the maximum number of NZP-CSI-RS resources, CSI-IM-ResourcePerSetMax indicates the maximum number of CSI-IM resources per CSI-IM resource set, CSI-IM-ResourceMax indicates the maximum number of CSI-IM resources, and AperiodicReportTrigger contains trigger states for dynamically selecting one or more aperiodic reporting configurations.

In an example, the Reporting configuration for CSI maybe aperiodic (using PUSCH), periodic (using PUCCH) or semi-persistent (using PUCCH, and DCI activated PUSCH). The CSI-RS Resources maybe periodic, semi-persistent, or aperiodic. Different combinations of CSI Reporting configurations and CSI Resource configurations may be supported, and the CSI Reporting may be triggered for each CSI-RS configuration, see for example FIG. 31. Periodic CSI-RS may be configured by higher layers. Semi-persistent CSI-RS may be activated, and deactivated Aperiodic CSI-RS may be configured and selected.

In an example, when the UE is configured with the higher layer configured parameter Number-CQI set to '1', a single CQI is reported for one codeword per CSI report. When '2' is configured, one CQI for each codeword is reported per CSI report. The Number-CQI is contained in ReportConfig.

In an example, when the UE is configured with a CSI-RS resource set and when the higher layer parameter CSI-RS-ResourceRep is set to 'OFF', the UE may determine a CRI from the supported set of CRI values and report the number in each CRI report. When the higher layer parameter CSI-RS-ResourceRep is set to 'ON', CRI is not reported.

For periodic or semi-persistent CSI reporting, the following periodicities (measured in slots) are configured by the higher layer parameter ReportPeriodicity: {5, 10, 20, 40, 80, 160, 320}.

In an example, when the UE is configured with the higher layer parameter ReportQuantity set to 'CRI/RSRP'
if the UE is configured with the higher layer parameter group-based-beam-reporting set to 'OFF', the UE is not required to update measurements for more than 64 [CSI-RS and or SSB] resources, and the UE may report in a single report nrofReportedRS (higher layer configured) different [CRI and SSBRI (SSB Resource Indicator)] for each report setting. If the higher layer parameter nrofReportedRS is configured to be one, the reported L1-RSRP value is defined by a 7-bit value in the range [−140, −44] dBm with 1 dB step size. If the higher layer parameter nrofReportedRS is configured to be larger than one, the UE may use largest L1-RSRP and differential L1-RSRP based reporting, where the largest value of L1-RSRP uses a 7-bit value and the differential L1-RSRP uses a 4-bit value. The differential L1-RSRP values are computed with 2 dB step size with a reference to the largest L1-RSRP value which is part of the same L1-RSRP reporting instance.
if the UE is configured with the higher layer parameter group-based-beam-reporting set to 'ON', the UE may report in a single reporting instance up to number-of-beams-reporting L1-RSRP and CSI reports, where up to number-of-beams-reporting [CSI-RS and or SSB] resources maybe received simultaneously by the UE either with a single spatial domain receive filter, or with multiple simultaneous spatial domain receive filters.

In an example, for L1-RSRP computation:
the UE may be configured with CSI-RS resources, SS/PBCH Block resources or both CSI-RS and SS/PBCH Block resource.
the UE may be configured with CSI-RS resource setting up to 16 CSI-RS resource sets having up to 64 resources within each set. The total number of different CSI-RS resources over all resource sets is no more than 128.

In an example, a UE configured with a CSI-RS resource, when configured with the higher layer parameter ReportQuantity set to 'No Report', the UE may not report any information, otherwise the UE may report the information as configured by the ReportQuantity.

In an example the ReportFreqConfiguration contained in a ReportConfig indicates the frequency granularity of the CSI Report. For CSI reporting, a UE maybe configured via higher layer signaling with one out of two possible subband sizes, where a subband is defined as $N^{SB}_{PRB}$ contiguous PRBs and depends on the total number of PRBs in the carrier bandwidth part.

In an example, a CSI reporting setting configuration defines a CSI reporting band as a subset of subbands of the bandwidth part, where the ReportFreqConfiguration indicates:
- the CSI-ReportingBand as a contiguous or non-contiguous subset of subbands in the bandwidth part for which CSI maybe reported. The UE is not expected to be configured with a CSI reporting band which contains subbands where reference signals for channel and interference are not present.
- single CQI or multiple CQI reporting, as configured by the higher layer parameter CQI-FormatIndicator. When single CQI reporting is configured, a single CQI is reported for each codeword for the entire CSI reporting band. When multiple CQI reporting is configured, one CQI for each codeword is reported for each subband in the CSI reporting band.
- single PMI or multiple PMI reporting as configured by the higher layer parameter PMI-FormatIndicator. When single PMI reporting is configured, a single PMI is reported for the entire CSI reporting band. When multiple PMI reporting is configured, except with 2 antenna ports, a single wideband indication is reported for the entire CSI reporting band and one subband indication is reported for each subband in the CSI reporting band. When multiple PMIs are configured with 2 antenna ports, a PMI is reported for each subband in the CSI reporting band.

When a UE is configured with higher layer parameter CodebookType set to 'Type1-SinglePanel' and PMI-FormatIndicator is configured for single PMI reporting, the UE may be configured with CSIReportQuantity to report:
- RI/CRI, and a PMI consisting of a single wideband indication for the entire CSI reporting band.
- or, RI/CRI, CQI, and a PMI consisting of a single wideband indication for the entire CSI reporting band. The CQI is calculated assuming PDSCH transmission with $N_p \leq 1$ precoders, where the UE assumes that one precoder is randomly selected from the set of $N_p$ precoders for each PRG on PDSCH, where the PRG size for CQI calculation is configured by the higher layer parameter PUSCH-bundle-size-for-CSI In an example, if a UE is configured with semi-persistent CSI reporting, the UE may report CSI when both CSI-IM and non-zero power CSI-RS resources are configured as periodic or semi-persistent. If a UE is configured with aperiodic CSI reporting, the UE may report CSI when both CSI-IM and non-zero power CSI-RS resources are configured as periodic, semi-persistent or aperiodic.

In an example a trigger state configured using the higher layer parameter ReportTrigger is associated one or multiple ReportConfig where each ReportConfig is linked to periodic, or semi-persistent, or aperiodic resource setting(s):
- When one resource setting is configured, the resource setting is for channel measurement for L1-RSRP computation.
- When two resource settings are configured, the first one resource setting is for channel measurement and the second one is for interference measurement performed on CSI-IM or on non-zero power CSI-RS.
- When three resource settings are configured, the first one resource setting is for channel measurement, the second one is for CSI-IM based interference measurement and the third one is for non-zero power CSI-RS based interference measurement.

In an example, for CSI measurement(s), a UE assumes:
- each non-zero power CSI-RS port configured for interference measurement corresponds to an interference transmission layer.
- all interference transmission layers on non-zero power CSI-RS ports for interference measurement, taking into account the associated EPRE ratios; and
- other interference signal on REs of non-zero power CSI-RS resource for channel measurement, non-zero power CSI-RS resource for interference measurement, or CSI-IM resource for interference measurement"

In an example if a UE is configured with the higher layer parameter ReportQuantity set to 'CRI/RI/CQI':
- the UE is configured with higher layer parameter Non-PMI-PortIndication contained in a ReportConfig, where r ports are indicated in the order of layer ordering for rank r and each CSI-RS resource in the CSI resource setting linked to the ReportConfig in a MeasLinkConfig, based on the order of the associated NZP-CSI-RS-ResourceConfigID in the linked CSI resource setting linked for channel measurement.
- When calculating the CQI for a rank, the UE may use the ports indicated for that rank for the selected CSI-RS resource. The precoder for the indicated ports maybe assumed to be the identity matrix.

In an example, for Resource Sets configured with the higher layer parameter ResourceConfigType set to 'aperiodic', trigger states for Reporting Setting(s) and/or Resource Set(s) for channel and/or interference measurement on one or more component carriers are configured using the higher layer parameter AperiodicReportTrigger. For aperiodic CSI report triggering, a single set of CSI triggering states are higher layer configured, wherein the CSI triggering states may be associated with either candidate DL BWP. A UE is not expected to be triggered with a CSI report for a non-active DL BWP. A trigger state is initiated using the DCI CSI request field.
- When the value of the DCI CSI request field is zero, no CSI is requested.
- When the number of configured CSI triggering states in AperiodicReportTrigger is greater than $2^{N_{TS}}-1$, where $N_{TS}$ is the number of bits in the DCI CSI request field, the UE receives a selection command [10, TS 38.321] used to map up to $2^{N_{TS}}-1$ trigger states to the codepoints of the DCI CSI request field. $N_{TS}$ is configured by the higher layer parameter ReportTriggerSize and $N_{TS} \in \{0, 1,2,3,4,5,6\}$.
- When the number of CSI triggering states in AperiodicReportTrigger is less than or equal to $2^{N_{TS}}-1$, the DCI CSI request field directly indicates the triggering state and the UE's quasi-colocation assumption.
- For each aperiodic CSI-RS resource associated with each CSI triggering state, the UE is indicated the quasi co-location configuration of quasi co-location RS source(s) and quasi co-location type(s) through higher layer signaling of QCL-Info-aPerodicReportingTrigger which contains a list of references to TCI-RS-SetConfig's for the aperiodic CSI-RS resources associated with the CSI triggering state. If a TCI-RS-SetConfig in the list is configured with a reference to an RS associated with QCL-TypeD, that RS may be an SS/PBCH block, or a CSI-RS resource configured as periodic or semi-persistent.

In an example, for a UE configured with the higher layer parameter AperiodicReportTrigger, if a resource setting linked to a ReportConfig has multiple aperiodic resource sets and only a subset of the aperiodic resource sets is associated with the trigger state, a higher layer configured bitmap ResourceSetBitmap is configured per trigger state per resource setting to select the CSI-IM/NZP CSI-RS resource set(s) from the resource setting.

In an example, when aperiodic CSI-RS is used with aperiodic reporting, the CSI-RS offset is configured per resource set in the higher layer parameter AperiodicNZP-CSI-RS-TriggeringOffset. The CSI-RS triggering offset X is measured in slots.

In an example, for semi-persistent reporting on PUSCH, a set of semi-persistent CSI report settings are higher layer configured by Semi-persistent-on-PUSCHReportTrigger and the CSI request field in DCI scrambled with SP-CSI C-RNTI activates one of the semi-persistent CSI reports.

In an example, for semi-persistent reporting on PUCCH, a set of semi-persistent CSI report settings are higher layer configured by reportConfigType with the PUCCH resource used for transmitting the CSI report. Semi-persistent reporting on PUCCH is activated by an activation command, which selects one of the semi-persistent CSI Report settings for use by the UE on the PUCCH. If the field reportConfigType is not present, the UE may report the CSI on PUSCH.

In an example, for a UE configured with the higher layer parameter ResourceConfigType set to 'semi-persistent'.
  when a UE receives an activation command for CSI-RS resource(s) for channel measurement and CSI-IM/NZP CSI-RS resource(s) for interference measurement associated with configured CSI resource setting(s) in slot n, the corresponding actions and the UE assumptions (including quasi-co-location assumptions provided by a reference to a TCI-RS-SetConfig) on CSI-RS/CSI-IM transmission corresponding to the configured CSI-RS/CSI-IM resource configuration(s) maybe applied no later than the minimum requirement.
  when a UE receives a deactivation command for activated CSI-RS/CSI-IM resource(s) associated with configured CSI resource setting(s) in slot n, the corresponding actions and UE assumption on cessation of CSI-RS/CSI-IM transmission corresponding to the deactivated CSI-RS/CSI-IM resource(s) may apply no later than the minimum requirement.
  the UE may assume that the CSI-RS resource(s) for channel measurement and the CSI-IM/NZP CSI-RS resource(s) for interference measurement are spatially quasi co-located.

In an example, the CSI reference resource for a serving cell is defined as follows:
  In the frequency domain, the CSI reference resource is defined by the group of downlink physical resource blocks corresponding to the band to which the derived CQI value relates.
  In the time domain, for a UE configured with a single CSI resource set for the serving cell, the CSI reference resource is defined by a single downlink slot n-nCQI_ref,
  where for periodic and semi-persistent CSI reporting nCQI_ref is the smallest value greater than or equal to a first value, such that it corresponds to a valid downlink slot.
  where for aperiodic CSI reporting, if the UE is indicated by the DCI to report CSI in the same slot as the CSI request, nCQI_ref is such that the reference resource is in the same valid downlink slot as the corresponding CSI request, otherwise nCQI_ref is the smallest value greater than or equal to a second value, such that slot n-nCQI_ref corresponds to a valid downlink slot.

In an example, a slot in a serving cell maybe considered to be a valid downlink slot if:
  it is configured as a downlink slot for that UE, and
  it does not fall within a configured measurement gap for that UE. And
  the active DL BWP in the slot is the same as the DL BWP for which the CSI reporting is performed.

In an example, if there is no valid downlink slot for the CSI reference resource in a serving cell, CSI reporting may be omitted for the serving cell in uplink slot n.

In an example, when deriving CSI feedback, the UE is not expected that a non-zero power CSI-RS resource for channel measurement overlaps with CSI-IM resource for interference measurement or non-zero power CSI-RS resource for interference measurement.

In an example, the CSI reference resource, the UE may assume the following for the purpose of deriving the CQI index, and if also configured, PMI and RI:
  The first 2 OFDM symbols are occupied by control signaling
  The number of PDSCH symbols is equal to 12.
  The bandwidth part subcarrier spacing configured for the PDSCH reception
  The bandwidth as configured for the PDSCH reception
  The reference resource uses the CP length and subcarrier spacing configured for PDSCH reception
  No resource elements used by primary or secondary synchronization signals or PBCH.
  Redundancy Version 0
  The ratio of PDSCH EPRE to CSI-RS EPRE.
  Assume no REs allocated for CSI-RS and zero-power CSI-RS
  Assume the same number of front loaded DM-RS symbols as the maximum front-loaded symbols configured by the higher layer parameter DL-DMRS-max-len.
  Assume the same number of additional DM-RS symbols as the additional symbols configured by the higher layer parameter DL-DMRS-add-pos.
  Assume the PDSCH symbols are not containing DM-RS.
  The PDSCH transmission scheme where the UE may assume that the gNB transmission on the PDSCH would be performed with up to 8 transmission layers on antenna ports [1000-1011].

In an example, a UE may perform aperiodic CSI reporting using PUSCH in slot n+Y on serving cell c upon successful decoding in slot n of an uplink DCI format for serving cell c, where Y is indicated in the decoded uplink DCI. The higher layer parameter AperiodicReportSlotOffset contains the allowed values of Y for a given Reporting Setting. When $N_{Rep} \geq 1$ reports are scheduled, let $Y_{i,j}$ be the ith allowed value for Report Setting j (j=0, . . . , $N_{Rep}$−1). Then the ith codepoint of the DCI field corresponds to the allowed value $$Y_i = \max_j Y_{i,j}.$$

An aperiodic CSI report carried on the PUSCH supports wideband, partial band, and sub-band frequency granularities. An aperiodic CSI report carried on the PUSCH supports Type I and Type II CSI.

A UE may perform semi-persistent CSI reporting on the PUSCH upon successful decoding an uplink DCI format. The uplink DCI format will contain one or more CSI Reporting Setting Indications where the associated CSI Measurement Links and CSI Resource Settings are higher layer configured. Semi-persistent CSI reporting on the PUSCH supports Type I and Type II CSI with wideband, partial band, and sub-band frequency granularities. The PUSCH resources and MCS maybe allocated semi-persistently by an uplink DCI.

In an example, CSI reporting on PUSCH maybe multiplexed with uplink data on PUSCH. CSI reporting on PUSCH may also be performed without any multiplexing with uplink data from the UE.

In an example, Type I CSI feedback is supported for CSI Reporting on PUSCH. Type I subband CSI is supported for CSI Reporting on the PUSCH. Type II CSI is supported for CSI Reporting on the PUSCH.

In an example, for Type I CSI feedback on PUSCH, a CSI report comprises up to two parts. Part 1 contains RI/CRI, CQI for the first codeword. Part 2 contains PMI and contains the CQI for the second codeword when RI>4.

In an example, for Type II CSI feedback on PUSCH, a CSI report comprises up to two parts. Part 1 is used to identify the number of information bits in Part 2. Part 1 may be transmitted in its entirety before Part 2 and may be used to identify the number of information bits in Part 2. Part 1 has a fixed payload size and contains RI, CQI, and an indication of the number of non-zero wideband amplitude coefficients per layer for the Type II. The fields of Part 1—RI, CQI, and the indication of the number of non-zero wideband amplitude coefficients for each layer—are separately encoded. Part 2 contains the PMI of the Type II CSI. Part 1 and 2 are separately encoded. A Type II CSI report that is carried on the PUSCH maybe computed independently from any Type II CSI report that is carried on the Long PUCCH.

In an example, When the higher layer parameter ReportQuantity is configured with one of the values 'CRI/RSRP' or 'SSBRI/RSRP', the CSI feedback consists of a single part.

In an example, when CSI reporting on PUSCH comprises two parts, the UE may omit a portion of the Part 2 CSI. Omission of Part 2 CSI is according to the priority order, where $N^{Rep}$ is the number of CSI reports in one slot. Priority 0 is the highest priority and priority $2^{N_{Rep}}$ is the lowest priority and the CSI report numbers correspond to the order of the associated ReportConfigID. When omitting Part 2 CSI information for a particular priority level, the UE may omit all of the information at that priority level.

In an example, when CSI is multiplexed with UL-SCH on PUSCH, Part 2 CSI is omitted only when the UCI code rate for transmitting all of Part 2 would be greater than a threshold code rate $c_T$, where $$C_T = \frac{c_{MCS}}{\beta_{offset}^{CSI-2}}$$

$C_{MCS}$ is the target PUSCH code rate.
$\alpha_{offset}^{CSI-2}$ is the CSI offset value.
Part 2 CSI is omitted level by level beginning with the lowest priority level until the lowest priority level is reached which causes the UCI code rate to be less than or equal to $c_T$.

In an example, a UE is semi-statically configured by higher layers to perform periodic CSI Reporting on the PUCCH. A UE maybe configured by higher layers for multiple periodic CSI Reports corresponding to one or more higher layer configured CSI Reporting Setting Indications, where the associated CSI Measurement Links and CSI Resource Settings are higher layer configured. Periodic CSI reporting on the short and the long PUCCH supports wideband and partial band frequency granularities. Periodic CSI reporting on the PUCCH supports Type I CSI.

In an example, a UE may perform semi-persistent CSI reporting on the PUCCH upon successfully decoding a selection command. The selection command will contain one or more CSI Reporting Setting Indications where the associated CSI Measurement Links and CSI Resource Settings are configured. Semi-persistent CSI reporting on the PUCCH supports Type I CSI. Semi-persistent CSI reporting on the Short PUCCH supports Type I CSI with wideband and partial band frequency granularities. Semi-persistent CSI reporting on the Long PUCCH supports Type I Subband CSI and Type I CSI with wideband and partial band frequency granularities.

In an example, periodic CSI reporting on the short and long PUCCH supports wideband and partial band frequency granularities. Periodic CSI reporting on the PUCCH supports Type I CSI. When the short and long PUCCH carry Type I CSI with wideband and partial band frequency granularity, the CSI payload carried by the short PUCCH and long PUCCH are identical and the same irrespective of RI/CRI. For type I CSI sub-band reporting on long PUCCH, the payload is split into two parts. The first part contains RI/CRI, CQI for the first codeword. The second part contains PMI and contains the CQI for the second codeword when RI>4.

In an example, a periodic and/or semi-persistent report carried on the Long PUCCH supports Type II CSI feedback, but only Part 1 of Type II CSI feedback. Supporting Type II CSI reporting on the Long PUCCH is a UE capability. A Type II CSI report (Part 1 only) carried on the Long PUCCH may be calculated independently of any Type II CSI reports carried on the PUSCH.

In an example, two CSI reports are said to collide if the time occupancy of the physical channels scheduled to carry the CSI reports overlap in at least one OFDM symbol and are transmitted on the same carrier. When a UE is configured to transmit two colliding CSI reports, the following rules apply (for CSI reports transmitted on PUSCH, for CSI reports transmitted on PUCCH):

If an aperiodic CSI report containing Type I CSI collides with either a periodic CSI report containing Type I CSI or a semi-persistent CSI report containing Type I CSI, then the aperiodic Type I CSI report has priority and the periodic or semi-persistent Type I CSI report may not be sent by the UE.

If a semi-persistent CSI report containing Type II CSI collides with an aperiodic CSI report also containing Type II CSI, then the aperiodic Type II CSI report has priority and the semi-persistent Type II CSI report may not be sent by the UE.

if a semi-persistent CSI report collides with a periodic CSI report for Type I colliding with Type I and Type II colliding with Type II.

If a Type I CSI report to be carried on the PUSCH collides with a Type I CSI report to be carried on the PUCCH, then the Type I CSI report to be carried on the PUSCH has priority, and the Type I CSI report to be carried on the PUCCH may not be sent by the UE.

If a Type II CSI report to be carried on the PUSCH collides with a Type II CSI report to be carried on the PUCCH, then the Type II CSI report to be carried on the PUSCH has priority, and the Type II CSI report to be carried on the PUCCH may not be sent by the UE.

If an aperiodic Type I CSI report intended for the PUSCH collides with a semi-persistent Type I CSI report also intended for the PUSCH, then the aperiodic Type I CSI report has priority and the semi-persistent Type I CSI report may not be sent by the UE.

If an aperiodic Type II CSI report intended for the PUSCH collides with a semi-persistent Type II CSI report also intended for the PUSCH, then the aperiodic Type II CSI report has priority and the semi-persistent Type II CSI report may not be sent by the UE.

If an aperiodic Type I CSI report intended for the PUCCH collides with a Type I CSI report intended for the PUSCH, then the aperiodic Type I CSI report intended for the PUCCH has lower priority and may not be sent by the UE.

If an aperiodic Type II CSI report intended for the PUCCH collides with a Type II CSI report intended for the PUSCH, then the aperiodic Type II CSI report intended for the PUCCH has lower priority and may not be sent by the UE.

In an example, a timing advance group may be a group of Serving Cells that is configured by RRC and that, for the cells with an UL configured, using the same timing reference cell and the same Timing Advance value. A Timing Advance Group containing the SpCell of a MAC entity may be referred to as PTAG, whereas the term STAG refers to other TAGs.

Figure 32:
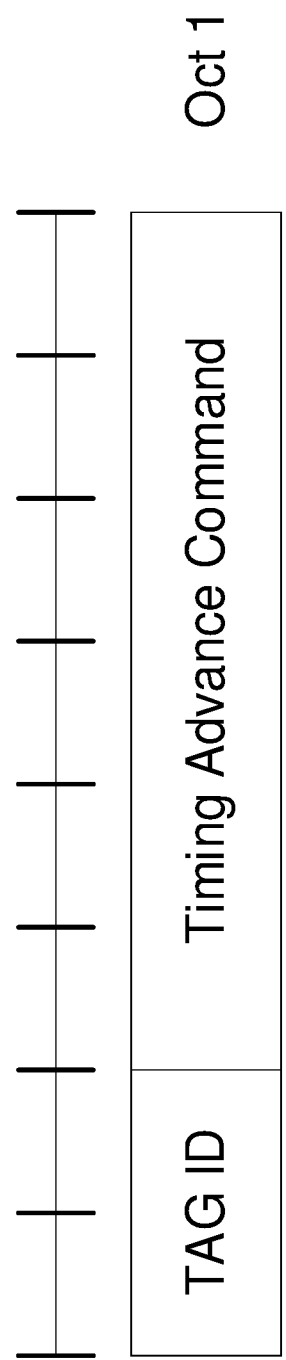
FIG. 32 is an example timing advance command MAC CE format as per an aspect of an embodiment of the present disclosure.

In an example, the Timing Advance Command MAC CE may be identified by MAC PDU subheader with a corresponding LCID. In an example, the Timing Advance Command MAC CE may have a fixed size and may comprise an octet. An example is shown in FIG. 32. In an example the Timing Advance Command MAC CE may comprise a TAG Identity (TAG ID). The TAG ID field may indicate the TAG Identity of the addressed TAG. The TAG containing the SpCell may have the TAG Identity 0. The length of the field may be 2 bits. In an example, the Timing Advance Command MAC CE may comprise a Timing Advance Command field. In an example, the Timing Advance Command field may indicate the index value TA (0, 1, 2 . . . 63) used to control the amount of timing adjustment that MAC entity has to apply. The length of the field may be 6 bits.

In an example, downlink and uplink transmissions may be organized into frames with $T_f=(\Delta f f_{max}/100(\ )_c$ ms) duration, consisting of ten subframes of $T_{sf}=(\Delta f f_{max}/1000(\ )_c$ ms) duration each. The number of consecutive OFDM symbols per subframe may be $N_{symb}^{subframe,\mu}=N_{symb}^{slot}N_{slot}^{subframe,\mu}$. A frame may be divided into two equally-sized half-frames of five subframes each with half-frame 0 consisting of subframes 0-4 and half-frame 1 consisting of subframes 5-9.

Figure 33:
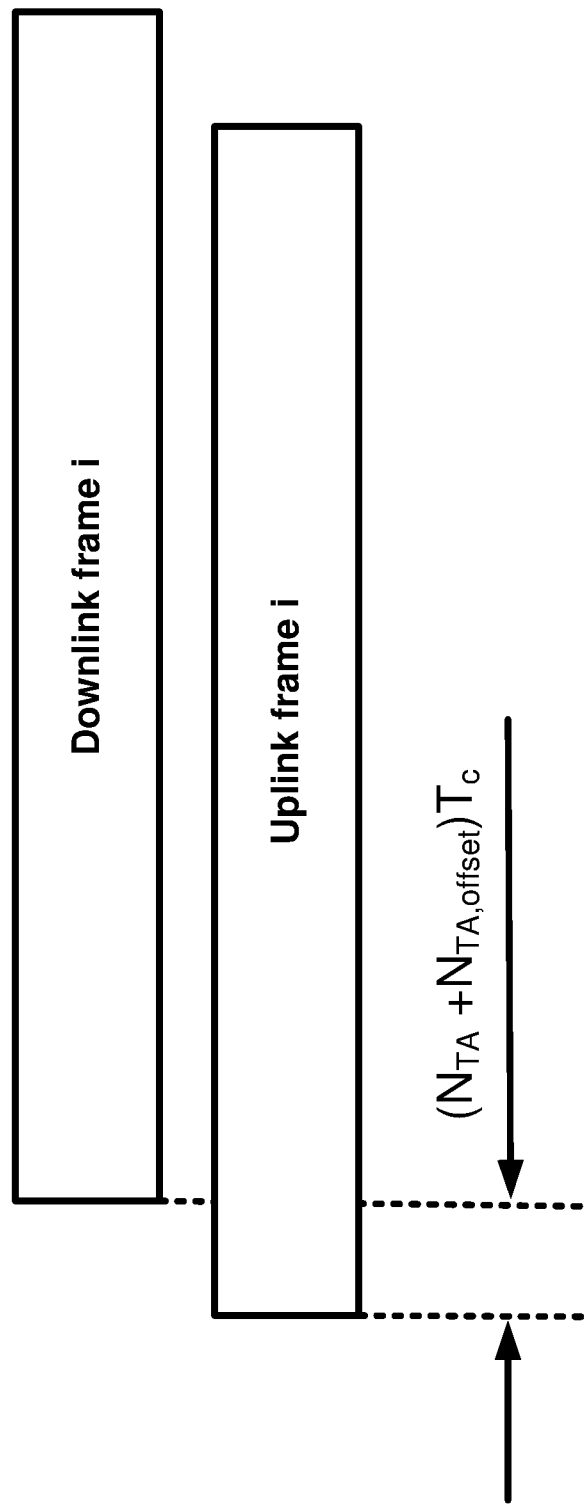
FIG. 33 is an example timing advance for uplink transmission as per an aspect of an embodiment of the present invention disclosure.

In an example, there may be one set of frames in the uplink and one set of frames in the downlink on a carrier. Transmission of uplink frame number i from the UE may start $T_{TA}=(N_{TA}+N_{TA,offset})T_c$ before the start of the corresponding downlink frame at the UE where $N_{TA,offset}$ may depend on the frequency band. An example is shown in FIG. 33.

In an example, in response to receiving a timing advance command for a TAG containing the primary cell or PSCell, the UE may adjust uplink transmission timing for PUCCH/PUSCH/SRS of the primary cell or PSCell based on the received timing advance command.

In an example, the UL transmission timing for PUSCH/SRS of a secondary cell may be the same as the primary cell if the secondary cell and the primary cell belong to the same TAG. If the primary cell in a TAG operates with paired DL/UL spectrum and a secondary cell in the same TAG operates with unpaired DL/UL spectrum, UE may assume that $N_{TA}\geq 624\cdot 64/2^\mu$ for subcarrier spacing of $2^\mu\cdot 15$ kHz, $\mu=0, 1, 2, 3, 4, 5$.

In an example, if the UE is configured with a SCG, the UL transmission timing for PUSCH/SRS of a secondary cell other than the PSCell may be the same as the PScell if the secondary cell and the PSCell belong to the same TAG.

In an example, in response to receiving a timing advance command or a timing adjustment indication for a TAG not containing the primary cell or PSCell, if all the serving cells in the TAG have the same duplex mode type, the UE may adjust uplink transmission timing for PUSCH/SRS of all the secondary cells in the TAG based on the received timing advance command or a timing adjustment indication where the UL transmission timing for PUSCH/SRS is the same for all the secondary cells in the TAG.

In an example, in response to receiving a timing advance command or a timing adjustment indication for a TAG not containing the primary cell or PSCell, if a serving cell in the TAG has a different duplex mode type compared to the duplex mode type of another serving cell in the same TAG, the UE may adjust uplink transmission timing for PUSCH/SRS of all the secondary cells in the TAG by using $N_{TA\_offset}=624\cdot 64/2^\mu$ regardless of the duplex mode type of the serving cells and based on the received timing advance command or a timing adjustment indication where the UL transmission timing for PUSCH/SRS is the same for all the secondary cells in the TAG.

In an example, the timing adjustment indication indicates the initial $N_{TA}$ used for a TAG. For a subcarrier spacing of $2^\mu\cdot 15$ kHz, the timing advance command for a TAG indicates the change of the uplink timing relative to the current uplink timing for the TAG as multiples of $16\cdot 64\cdot T_c/2^\mu$. The start timing of the random access preamble may be specified.

In an example, in case of random access response, a timing advance command, $T_A$, for a TAG may indicate $N_{TA}$ values by index values of $T_A=0, 1, 2, \ldots, 256$ if the UE is configured with a SCG, and $T_A=0, 1, 2, \ldots, 1282$ otherwise, where an amount of the time alignment for the TAG for subcarrier spacing of $2^\mu\cdot 15$ kHz may be given by $N_{TA}=T_A\cdot 16\cdot 64/2^\mu$. In an example, $N_{TA}$ and may be relative to the subcarrier spacing of the first uplink transmission from the UE after the reception of the random access response.

In an example, a timing advance command, $T_A$, for a TAG may indicate adjustment of the current $N_{TA}$ value, $N_{TA\_old}$, to the new $N_{TA}$ value, $N_{TA\_new}$, by index values of $T_A=0, 1, 2, \ldots, 63$, where for a subcarrier spacing of $2^\mu$. 15 kHz, $N_{TA\_new}=N_{TA\_old}+(T_A-31)\cdot 16\cdot 64/2^\mu$. In an example, if a UE is configured with two UL carriers in a serving cell, where the subcarrier spacing for a first UL carrier is different than the subcarrier spacing for a second carrier, the timing advance command value is relative to the smaller subcarrier spacing.

In an example, adjustment of $N_{TA}$ value by a positive or a negative amount may indicate advancing or delaying the uplink transmission timing for the TAG by a given amount, respectively.

In an example, for a timing advance command received on slot n, the corresponding adjustment of the uplink transmission timing may apply from the beginning of slot n+6. In an example, f the received downlink timing changes and is not compensated or is only partly compensated by the uplink timing adjustment without timing advance command, the UE may change $N_{TA}$ accordingly.

In an example, a wireless device may receive one or more messages comprising a MAC-CellGroupConfig IE. The MAC-CellGroupConfig IE may comprise a TAG-config IE.

The TAG-config IE may comprise a tag-ToAddModList IE and/or a tag-ToReleaseList IE. The tag-ToAddModList IE may comprise ID(s) for one or more TAGs that are added and/or modified and/or their corresponding timealignment-timer timer value(s). The tag-ToReleaseList IE may comprise ID(s) for one or more TAGs that are released. In an example, maxNrofTAGs may indicate maximum number of TAGs.

RRC may configure one or more parameters for the maintenance of UL time alignment. In an example, the one or more parameters may comprise timeAlignmentTimer (per TAG) which controls how long the MAC entity may consider Serving Cells belonging to an associated TAG to be uplink time aligned.

In an example, when a Timing Advance Command MAC CE is received, and if a NTA has been maintained with the indicated TAG, the MAC entity/wireless device may apply the Timing Advance Command for the indicated TAG. The MAC entity start or restart the timeAlignmentTimer associated with the indicated TAG.

In an example, when a Timing Advance Command is received in a Random Access Response message for a serving cell belonging to a TAG, if the Random Access Preamble was not selected by the MAC entity, the MAC entity/wireless device may apply the Timing Advance Command for this TAG. The MAC entity/wireless device may start or restart the timeAlignmentTimer associated with this TAG.

In an example, when a Timing Advance Command is received in a Random Access Response message for a serving cell belonging to a TAG, if the timeAlignmentTimer associated with this TAG is not running, the MAC entity/wireless device may apply the Timing Advance Command for this TAG. The MAC entity/wireless device may start the timeAlignmentTimer associated with this TAG. When the contention resolution is considered not successful, the MAC entity/wireless device may stop timeAlignmentTimer associated with this TAG. Otherwise, if the timeAlignmentTimer associated with this TAG is running, the MAC entity/wireless device may ignore the received Timing Advance Command.

In an example, when a timeAlignmentTimer expires, if the timeAlignmentTimer is associated with the PTAG, the MAC entity/wireless device may flush all HARQ buffers for all serving cells; notify RRC to release PUCCH for all serving cells, if configured; notify RRC to release SRS for all serving cells, if configured; clear any configured downlink assignments and configured uplink grants; consider all running timeAlignmentTimers as expired; and maintain NTA of all TAGs.

In an example, when a timeAlignmentTimer expires, if the timeAlignmentTimer is associated with an STAG, then for all Serving Cells belonging to this TAG, the MAC entity/wireless device may flush all HARQ buffers; notify RRC to release PUCCH, if configured; notify RRC to release SRS, if configured; clear any configured downlink assignments and configured uplink grants; maintain NTA of this TAG.

In an example, when the MAC entity stops uplink transmissions for an SCell due to the fact that the maximum uplink transmission timing difference or the maximum uplink transmission timing difference the UE can handle between TAGs of any MAC entity of the UE is exceeded, the MAC entity considers the timeAlignmentTimer associated with the SCell as expired.

In an example, the MAC entity may not perform a uplink transmission on a Serving Cell except the Random Access Preamble transmission when the timeAlignmentTimer associated with the TAG to which this Serving Cell belongs is not running. In an example, when the timeAlignmentTimer associated with the pTAG is not running, the MAC entity/wireless device may not perform uplink transmission on a Serving Cell except the Random Access Preamble transmission on the SpCell.

In an example, a wireless device may receive one or more parameters for the maintenance of UL time alignment. In an example, the one or more parameters may comprise timeAlignmentTimer (per TAG) which controls how long the MAC entity may consider Serving Cells belonging to an associated TAG to be uplink time aligned. In an example, a timeAlignmentTimer IE may indicate one of a plurality of timer values for example 500 ms, 750 ms, 1280 ms, 1920 ms, 2560 ms, 5129 ms, 10240 ms, infinity. In an example, a ServingCellConfigDedicated IE may comprise one or more timeAlignmentTimer IEs. In an example, the ServingCellConfigDedicated IE may be used to configure (add or modify) the UE with a serving cell, which may be the SpCell or an SCell of an MCG or SCG. In an example, the MAC-CellGroupConfig IE may comprise one or more time-alignmenttimers. In an example, a TAG-config IE may comprise a TAG ID and a timealignmenttimer timer value. In an example, a timeAlignmentTimer may be for a TAG with ID 0 (e.g. primary TAG and/or TAG comprising SpCell) or for a TAG with ID tag-id.

In an example, random access preamble sequences, of two different lengths may be supported. Long sequence length 839 may be applied with subcarrier spacings of 1.25 and 5 kHz and short sequence length 139 may be applied with sub-carrier spacings 15, 30, 60 and 120 kHz. In an example, long sequences may support unrestricted sets and restricted sets of Type A and Type B, while short sequences may support unrestricted sets.

In an example, multiple RACH preamble formats may be defined with one or more RACH OFDM symbols, and different cyclic prefix and guard time. In an example, the PRACH preamble configuration to use may be provided to the UE in the system information.

In an example, the UE may calculate the PRACH transmit power for the retransmission of the preamble based on the most recent estimate pathloss and power ramping counter. If the UE conducts beam switching, the counter of power ramping may remain unchanged.

In an example, the system information may inform the UE of the association between the SS blocks and the RACH resources. The threshold of the SS block for RACH resource association may be based on the RSRP and network configurable.

Figure 34:
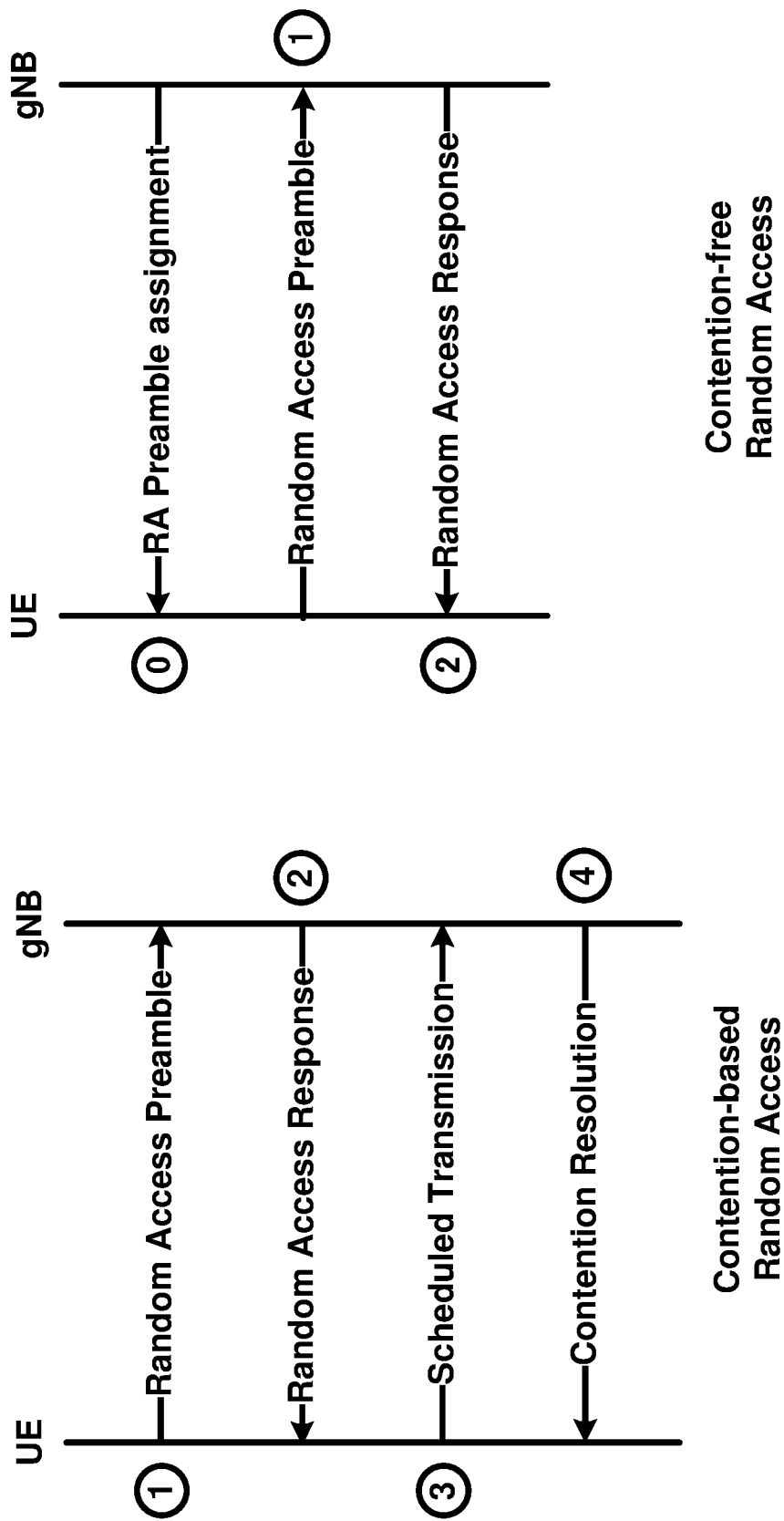
FIG. 34 are example random access processes as per an aspect of an embodiment of the present invention disclosure.

In an example, the random access procedure is triggered by a number of events, such as Initial access from RRC_IDLE; RRC Connection Re-establishment procedure; Handover; DL or UL data arrival during RRC_CONNECTED when UL synchronization status is non-synchronized; Transition from RRC_INACTIVE; Request for Other SI. In an example, the random access procedure may take be contention based or non-contention. Normal DL/UL transmission may take place after the random access procedure. Example procedures for contention-free and contention-based random access are shown in FIG. 34.

A wireless device may be configured with semi-persistent channel state information (SP-CSI) reporting. The SP-CSI reporting may be on PUSCH or PUCCH. The wireless device may activate a plurality of SP-CSI resources for transmission of SP-CSI signals via PUSCH in response to receiving an SP-CSI activation DCI. The wireless device may be configured with one or more timing advance groups (TAGs). A TAG in the one or more TAGs may be configured with a time alignment timer. The wireless device may (re)start the time alignment timer associated with a TAG in response to receiving timing advance command MAC CEs comprising timing advance commands for the TAG or random access response comprising timing advance commands for the TAG. In response to the time alignment timer associated with a TAG expiring, the wireless device may not be capable of uplink transmission on the TAG or on all configured cells (for example depending on whether the TAG is a PTAG or STAG). The legacy procedure lead to transmission of SP-CSI signals on one or more cells of the TAG or one or more of the configured cells even if the wireless device is not uplink synchronized. The legacy procedures lead to inefficient uplink transmission and increased error rate for SP-CSI signals due to unsynchronized uplink. Example embodiments enhance the procedures in response to time alignment timer associated with a TAG expiring.

In an example embodiment, a wireless device may receive one or more messages comprising configuration parameters. In an example, the one or more messages may comprise RRC messages. The one or more messages may comprise configuration parameters for one or more cells. The one or more cells may comprise a primary cell. In an example, the one or more cells may comprise one or more secondary cells. In an example, the one or more messages may comprise configuration parameters for one or more TAGs comprising a first TAG. The one or more messages may comprise first configuration parameters for a first timer associated with the first TAG. In an example, the first timer may be a time alignment timer associated with the first TAG. The configuration parameters for the first timer may comprise a first value for the first timer. An IE (e.g., a timealignmenttimer IE) may indicate a value for the first timer. The first TAG may comprise one or more first cells. In an example, the one or more first cells may have same timing advance for their uplink transmissions. In an example, the first TAG may be a primary TAG (PTAG). The first TAG may comprise PCell/PSCell. In an example, the first TAG may be a secondary TAG (STAG). In an example, the secondary TAG may comprise one or more secondary cells. The one or more messages may comprise second configuration parameters for one or more semi-persistent channel state information (SP-CSI) configurations. In an example, a SP-CSI configuration may comprise one or more parameters indicating periodicity and/or time domain and/or frequency domain resources (e.g., resource blocks/elements) for a plurality of SP-CSI resources for transmission of SP-CSI signals. In an example, configuration parameters for a SP-CSI configuration may comprise a reporting index. In an example, a reporting index may indicate the SP-CSI resources and/or MCS and/or one or more power control parameters and/or one or more cells for which SP-CSI is reported and/or one or more offset parameters (e.g., to determine SP-CSI resources) corresponding to a SP-CSI configuration. In an example, the second configuration parameters may comprise a plurality of reporting indexes for a plurality of SP-CSI configurations.

In an example, in response to receiving the SP-CSI configuration parameters, the wireless device may activate a plurality of SP-CSI resources. The SP-CSI configuration parameters may indicate periodicity of SP-CSI resources, the time domain and frequency domain resources, modulation and coding scheme for transmission of SP-CSI signals, power control parameters, one or more offset parameters indicating time domain position of resources, etc. The wireless device may determine and/or activate the SP-CSI resources in response to receiving the SP-CSI configuration parameters.

In an example, the wireless device may receive one or more downlink control information (DCIs) indicating activation of resources corresponding to the one or more SP-CSI configurations. The activation of the one or more SP-CSI configurations may activate a plurality of configured SP-CSI resources. In an example, a DCI may activate SP-CSI resources corresponding to a plurality of SP-CSI configurations. The wireless device may determine the plurality of SP-CSI resources based on the SP-CSI configuration parameters and the one or more DCIs. In an example, the one or more DCIs may indicate the modulation and coding scheme and/or frequency domain and/or time domain resources of the plurality of SP-CSI resources.

In an example, the first TAG may comprise one or more cells. The plurality of configured SP-CSI resources may be activated on the one or more cells. In an example, the one or more messages may comprise configuration parameters for a plurality of cells comprising the first TAG. The plurality of SP-CSI resources may be activated on the plurality of cells.

In an example, a DCI may comprise one or more fields, the one or more fields indicating one or more indexes for activation of resources associated with one or more SP-CSI configurations corresponding to the one or more indexes. In an example, a DCI may comprise one or more fields, a value of the one or more fields indicating activation of SP-CSI on one or more cells. In an example, one or more first cells of the one or more cells may be in the first TAG. In an example, a DCI may comprise one or more fields indicating activation of SP-CSI resources corresponding to one or more reporting indexes on one or more cells. In an example, one or more first cells of the one or more cells may be in the first TAG.

In an example embodiment, in response to the first timer associated with the first TAG expiring, the wireless device may clear the plurality of configured SP-CSI resources corresponding to the one or more SP-CSIs. In an example, the plurality of configured SP-CSI resources corresponding to the one or more SP-CSIs may be activated and cleared (e.g., in response to the first timer expiring) on one or more cells in the first TAG (for example, in response to the first TAG being a STAG). In an example, the plurality of configured SP-CSI resources corresponding to the one or more SP-CSIs may be activated and cleared (e.g., in response to the first timer expiring) on one or more cells in the first TAG and/or other TAGs (for example, in response to the first TAG being a PTAG). The base station may schedule the wireless device on the cleared SP-CSI resources. In an example the wireless device may start first timer associated with the first TAG in response to receiving a timing advance MAC CE. In an example, the wireless device may start the first timer associated with the first TAG in response to receiving a timing advance command in a random access response. In an example, the wireless device may start the first timer with the first value of the first timer (e.g., the timealignmenttimer value). In an example, the base station may transmit one or more second DCIs to activate a second plurality of SP-CSI resources in response to the first timer associated with the first TAG running.

In an example embodiment, in response to the first timer associated with the first TAG expiring, the wireless device may release the second configuration parameters corresponding to the one or more SP-CSIs. In an example, a plurality of SP-CSI resources corresponding to the one or more SPCIs may be activated for the wireless device. The wireless device may clear the plurality of SP-CSI resources corresponding to the one or more SP-CSIs in response to releasing the second configuration parameters of the one or more SP-CSIs. In an example, the wireless device may receive a reconfiguration message comprising configuration parameters for one or more SP-CSIs in response to the first timer associated with the first TAG running. In an example, the wireless device may receive one or more second DCIs to activate a second plurality of SP-CSI resources in response to the first timer associated with the first TAG running.

In an example, in response to the first timer associated with the first TAG expiring, the wireless device may suspend the plurality of configured SP-CSI resources corresponding to the one or more SP-CSIs. In an example, the plurality of configured SP-CSI resources corresponding to the one or more SP-CSIs may be activated and suspended (e.g., in response to the first timer expiring) on one or more cells in the first TAG (for example, in response to the first TAG being a STAG). In an example, the plurality of configured SP-CSI resources corresponding to the one or more SP-CSIs may be activated and suspended (e.g., in response to the first timer expiring) on one or more cells in the first TAG and/or other TAGs (for example, in response to the first TAG being a PTAG). In an example, the wireless device may receive one or more DCIs to resume a plurality of SP-CSI resources in response to the first timer associated with the first TAG running.

In an example, the wireless device may transmit a random access preamble in response to the first timer associated with the first TAG expiring. The wireless device may transmit the preamble via a first cell of the first TAG. In an example, the wireless device may transmit the preamble via the PCell/PSCell in response to the first TAG being PTAG. In an example, the wireless device may transmit the preamble in response to receiving a DCI indicating the preamble index and/or the cell to transmit the preamble. In an example, the wireless device/MAC entity may select the preamble to transmit. In an example, the first cell may belong to the first TAG. In an example, the first Cell may not belong to the first TAG. The wireless device may determine a random access RNTI based on the resources on the first cell used for transmission of the preamble. The wireless device may monitor the control channel for the random access RNTI in a time window in response to transmitting the preamble. The wireless device may receive a random access response in the time window. The random access response may comprise a timing advance command. The wireless device may determine the timing advance for the first TAG based on the timing advance command in the random access response. The wireless device may (re)start the first timer associated with the first TAG in response to receiving the timing advance command. In an example, the wireless device may start the first timer with the first value of the first timer (e.g., the timealignmenttimer value).

In an example, the wireless device may receive a timing advance command MAC CE. The timing advance command MAC CE may comprise a field indicating a timing advance for the first TAG. The timing advance command MAC CE may comprise a field indicating an ID for the first TAG. The wireless device may (re)start the timer associated with the first TAG in response to receiving the timing advance command MAC CE. In an example, the wireless device may start the first timer with the first value of the first timer (e.g., the timealignmenttimer value).

In an example embodiment, in response to the first timer associated with the first TAG running, the wireless device may receive a reconfiguration message (e.g., RRC reconfiguration message) indicating configuration parameters for one or more first SP-CSI configurations. In an example, in response to the first timer associated with the first TAG running, the wireless device may receive one or more first DCIs indicating activation of a plurality of SP-CSI resources corresponding to one or more first SP-CSI configurations.

In an example embodiment, the one or more messages may comprise one or more radio network temporary identifiers (RNTIs). The one or more RNTIs may correspond to the one or more SP-CSI configurations. In an example, the one or more DCIs indicating activation of the one or more SP-CSI configurations may correspond to (e.g., be scrambled with) the one or more RNTIs. The one or more RNTIs may be one or more SP-CSI RNTIs. In an example, the wireless device may determine that the one or more DCIs are for activation of the one or more SP-CSI configurations at least based on the one or more RNTIs corresponding to the one or more DCIs. In an example, the wireless device may determine that the one or more DCIs are for activation of the one or more SP-CSI configurations further based on one or more fields (e.g., TPC field and/or cyclic shift field and/or NDI field, etc.) in the one or more DCIs. In an example, the wireless device may compare the one or more fields in the one or more DCIs with predetermined values to validate the one or more DCIs as SP-CSI activation DCIs.

Figure 35:
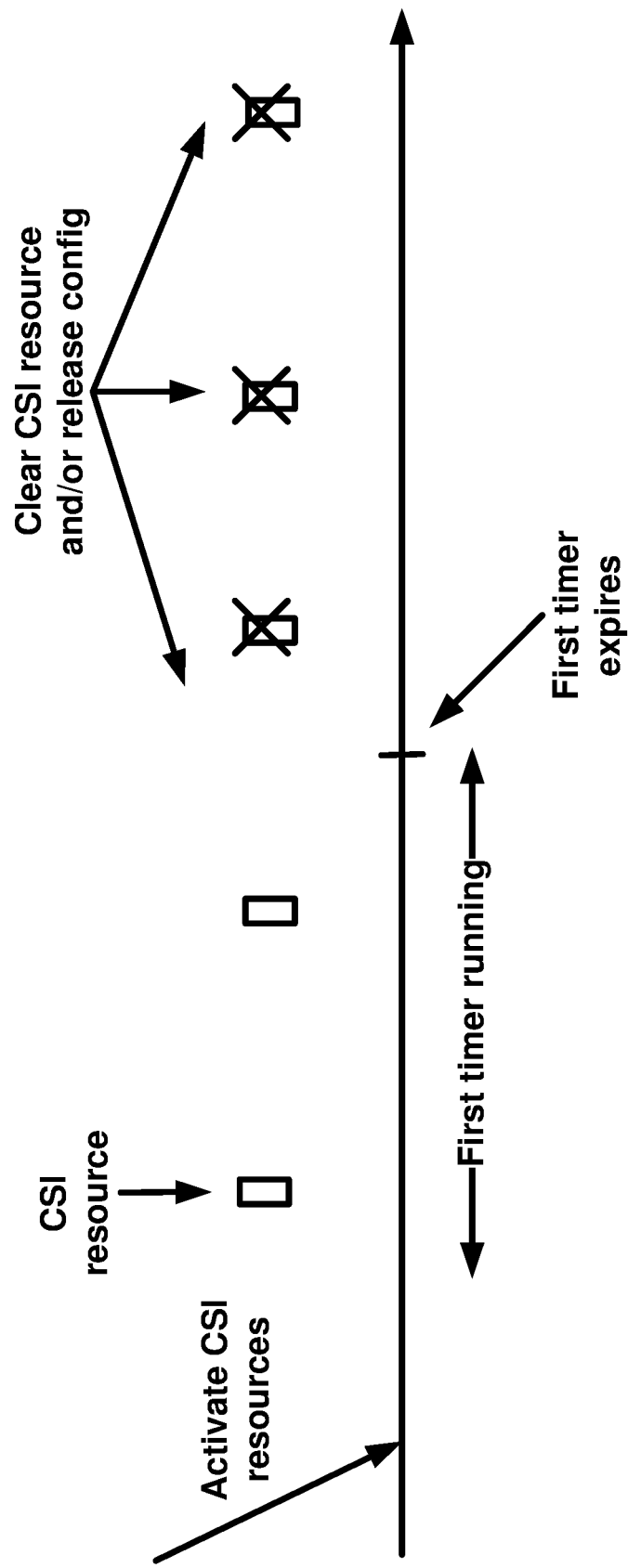
FIG. 35 is an example CSI transmission procedure as per an aspect of an embodiment of the present invention disclosure.
Figure 36:
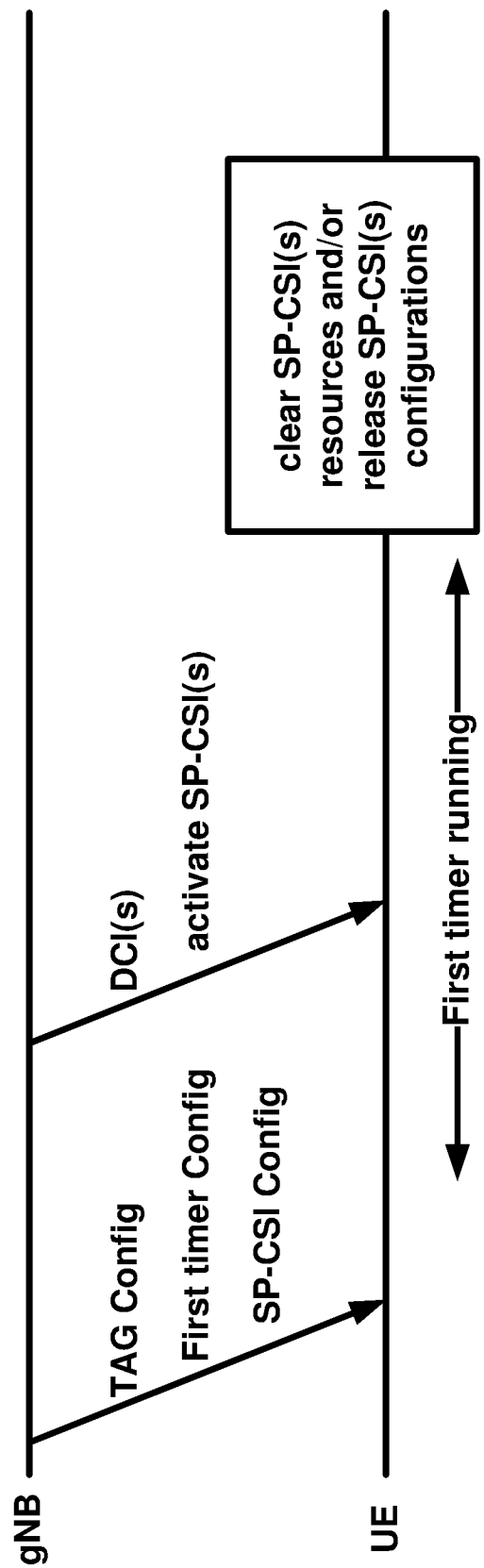
FIG. 36 is an example CSI transmission procedure as per an aspect of an embodiment of the present invention disclosure.

FIG. 35 and FIG. 36 show example processes as per aspects of embodiments. The wireless device may receive one or more messages comprising configuration parameters. The configuration parameters may comprise configuration parameters for one or more TAGs (e.g., PTAG and zero or more STAGs), configuration parameters for a first timer (e.g., a time alignment timer) and one or more SP-CSI configurations. In an example, the wireless device may determine and may activate a plurality of SP-CSI resources in response to receiving the configuration parameters for the one or more SP-CSI configurations. In an example, the wireless device may receive one or more DCIs indicating activation of a plurality of SP-CSI resources. The wireless device may determine the SP-CSI resources based on the SP-CSI configurations or based on the SP-CSI configurations and the one or more DCIs indicating the activation of the one or more SP-CSIs. The wireless device may employ the plurality of SP-CSI resources to transmit SP-CSI signals. In an example, in response to a timer associated with a TAG (e.g., a time alignment timer) expiring, the wireless device may clear a first plurality of SP-CSI resources of the plurality of SP-CSI resources (e.g., SP-CSI resources occurring on and/or after the timer expiring). In an example, in response to a timer associated with a TAG (e.g., a time alignment timer) expiring, the wireless device may suspend a first plurality of SP-CSI resources of the plurality of SP-CSI resources (e.g., SP-CSI resources occurring on and/or after the timer expiring). In an example, in response to a timer associated with a TAG (e.g., a time alignment timer) expiring, the wireless device may release the configuration (e.g., RRC configuration) of the one or more SP-CSI configurations and/or CSI configurations.

In an example, a wireless device may use a method comprising receiving one or more messages comprising: first configuration parameter for a first timer associated with a first timing advance group (TAG); and second configuration parameters for one or more semi-persistent channel state information (SP-CSIs). The method may comprise receiving one or more downlink control information (DCIs) indicating activation of the one or more SP-CSIs, wherein the activation of the one or more SP-CSIs activates a plurality of configured SP-CSI resources. In an example, the method may comprise clearing the plurality of configured SP-CSI resources in response to the first timer expiring. In an example, the method may comprise suspending the plurality of configured SP-CSI resources in response to the first timer expiring. The method may comprise transmitting a random access preamble on a first cell of the first TAG in response to the clearing/suspending the plurality of configured SP-CSI resources.

In an example, a wireless device may use a method comprising receiving one or more messages comprising: first configuration parameter for a first timer associated with a first timing advance group (TAG); and second configuration parameters for one or more semi-persistent channel state information (SP-CSIs). The method may comprise receiving one or more downlink control information (DCIs) indicating activation of the one or more SP-CSIs, wherein the activation of the one or more SP-CSIs activates a plurality of configured SP-CSI resources. The method may comprise releasing the second configuration parameters in response to the first timer expiring. The method may comprise transmitting a random access preamble on a first cell of the first TAG in response to releasing the second configuration parameters.

A base station may configure periodic CSI reporting using RRC messages. Periodic CSI reporting may include CSI reporting or semi-persistent CSI reporting. A wireless device may transmit periodic CSI reporting of a cell via PUCCH when the wireless device is configured with periodic CSI reporting and the cell is activated. Semi-persistent CSI reporting is a process for a wireless device to report CSI with a pre-configured periodicity on a cell in response to SP-CSI reporting being activated. A base station may configure semi-persistent CSI reporting by transmitting one or more RRC messages and dynamically activate and deactivate SP-CSI reporting.

In an example scenario, a cell with CSI resources may belong to a timing advance group comprising a plurality of cells. The plurality of cells belonging to the timing advance group transmit their uplink signals using a same transmission timing (e.g., with a same timing advance to downlink timing reference). The timing advance group may be associated with a time alignment timer and the wireless device may assume that the cells belonging to the timing advance group are uplink synchronized if the time alignment timer is running. In an example scenario, a time alignment timer for a timing advance group may expire. The timing advance group may be out-of-sync when time alignment of a timing advance group expires.

In legacy mechanisms, MAC layer notifies higher layer (RRC) to release CSI configuration and CSI resources (PUCCH resources) for periodic CSI reporting in response to a time alignment timer of a timing advance group being expired. Implementation of legacy periodic CSI mechanism for SP-CSI leads to releasing RRC configuration for CSI resources for SP-CSI reporting. This may lead to inefficient network performance. A subsequent activation of semi-persistent CSI reporting requires RRC reconfiguration of semi-persistent CSI reporting that leads to increased delay. On the other hand, if RRC configuration for SP-CSI is not released and after the time alignment timer expires, the wireless device continues transmitting the semi-persistent reports via the activated resources. The wireless device may transmit the semi-persistent reports with inaccurate timing advance that leads to incorrect decoding at the base station. Moreover, the activated resources may not be available for scheduling of other wireless devices by the base station. There is a need to enhance the legacy processes for semi-persistent CSI reporting on a cell when a time alignment timer of the cell expires. Example embodiments enhance the legacy semi-persistent reporting processes in a carrier aggregation scenario. In an example embodiment, a wireless may maintain RRC configuration for SP-CSI reporting while clearing SP-CSI resources after a time alignment expires. In an example, an example embodiment may enable a faster re-activation of SP-CSI, an improved uplink resource utilization with reduced interference.

Figure 37:
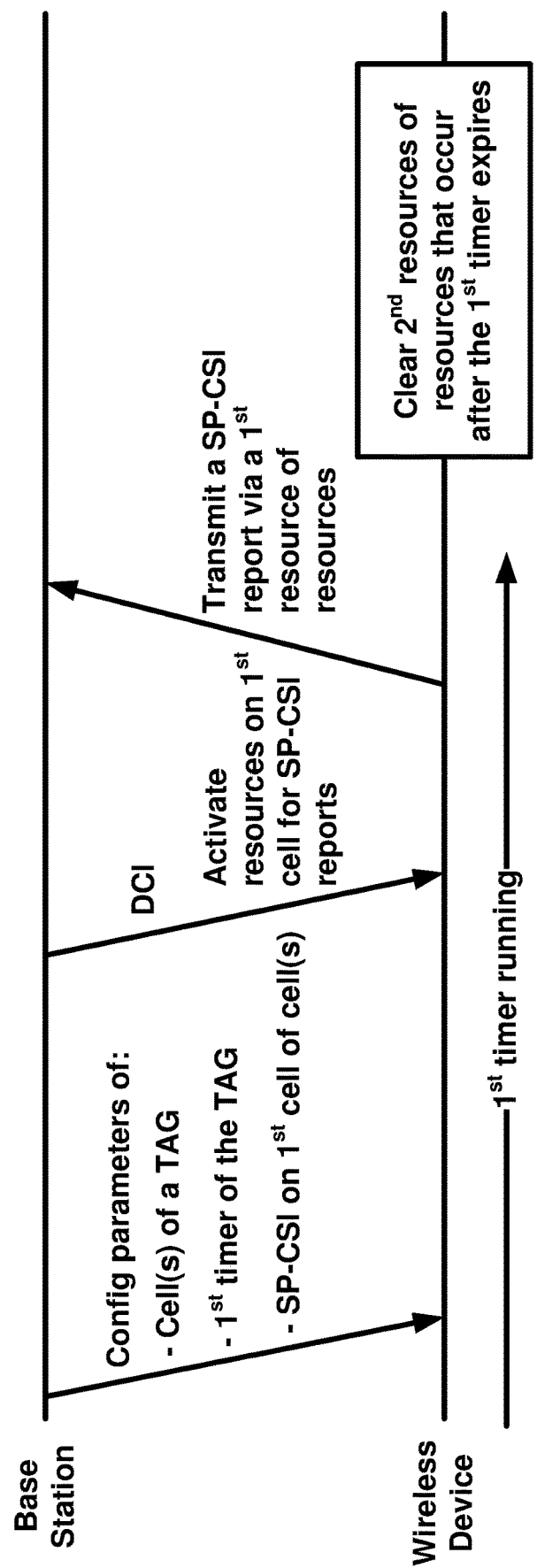
FIG. 37 is an example CSI transmission procedure as per an aspect of an embodiment of the present invention disclosure.

In an example embodiment as shown in FIG. 37, a wireless device may receive from a base station one or more messages comprising configuration parameters. The one or more messages may comprise one or more RRC messages. The one or more messages may comprise first configuration parameters of one or more cells grouped into a timing advance group. In an example, the timing advance group may be a primary timing advance group comprising a primary cell and one or more secondary cell. In an example, the timing advance group may be a secondary timing advance group comprising one or more secondary cell. The wireless device may transmit uplink signals via the one or more cells of the timing advance group with a same timing advance. A timing advance indicates an offset to a downlink timing. The timing advance group may be associated with a time alignment timer. The wireless device may assume that the one or more cells of the timing advance group are uplink synchronized if the time alignment timer associated with the timing advance group is running. The one or more messages may comprise second configuration parameters of the time alignment timer of the timing advance group. The one or more messages may further comprise third configuration parameters of semi-persistent channel state information (CSI) reports for transmission via a first cell of the one or more cells. The third configuration parameters may comprise a first radio network temporary identifier (e.g., SP-CSI RNTI). In an example, the third configuration parameters may comprise a periodicity and offset parameter indicating resources for transmission of the semi-persistent CSI reports. In an example, the third configuration parameters may comprise a set of trigger states for semi-persistent SCI reporting.

In an example, the wireless device may receive a first downlink control information indicating activation of a plurality of resources of the first cell for the semi-persistent CSI reports. The first downlink control information may be associate with the first radio network temporary identifier (e.g., a CRC of the first downlink control information may be scrambled with the SP-CSI RNTI). In an example, the plurality of resources may be PUSCH resources. In an example, a wireless device may perform semi-persistent CSI reporting on the PUSCH upon successful decoding of a DCI format 0_1. In an example, the DCI may activate a semi-persistent CSI trigger state. The DCI format 0_1 may contain a CSI request field which indicates the semi-persistent CSI trigger state to activate or deactivate. The semi-persistent trigger state may be from a set of trigger states configured by RRC. Semi-persistent CSI reporting on the PUSCH may support Type I and Type II CSI with wideband, and sub-band frequency granularities. The PUSCH resources and MCS may be allocated semi-persistently by an uplink DCI.

The wireless device may transmit a semi-persistent CSI report, of the semi-persistent CSI reports, via a first resource of the plurality of resources. In an example, in response to the time alignment timer expiring, the wireless device may clear the second resources of the plurality of resources that occur after the time alignment expires. The clearing of second resources indicates that the radio resources activated for transmission of the SP-SI reports are not utilized for SP-CSI reporting by the wireless device. The cleared resources may be available for the base station for example for scheduling other wireless devices. The RRC configuration parameters of the SP-SI reports (e.g., third configuration parameters) may remain active (e.g., not released) despite the physical layer clearing of the second resources. For example, the base station may transmit a second physical layer activation for activating a second plurality of resources of the first cell for second semi-persistent reports. The base station may transmit the second physical layer activation after the time alignment is running. For example, the wireless device may start the time alignment timer in response to receiving a timing advance control element. The second plurality of resources may be activated based on the second physical layer signaling and third configuration parameters. The base station does not need to transmit RRC reconfiguration of the semi-persistent CSI parameters. The second plurality of resources for the second semi-persistent CSI reports may be activated based on the third configuration parameters.

In an example embodiment, a wireless device may receive one or more messages comprising configuration parameters. The one or more messages may comprise one or more RRC messages. In an example, the configuration parameters may comprise configuration parameters for a primary cell and one or more secondary cells. The one or more secondary cells may comprise a first secondary cell. In an example, the configuration parameters may comprise bandwidth part (BWP) configuration parameters for a plurality of BWPs. The plurality of BWPs may comprise a first plurality of BWPs of the primary cell comprising a first BWP and a second BWP. The plurality of BWPs may comprise a second plurality of BWPs of the first secondary cell comprising a third BWP and a fourth BWP. In an example, the wireless device may transmit a random access preamble via the third BWP (e.g., active BWP) of the first secondary cell to initiate a random access process on the first secondary cell. In an example, the random access preamble may be dedicated to the wireless. In an example, the random access preamble may be UE-specific and may be configured for the wireless device by the base station. In an example, the random access process may be initiated in response to determining a beam failure and starting a beam failure recovery process. In an example, the wireless device may determine a beam failure and may start the beam failure recovery process in response to the determining. In an example, the base station may not be aware that the wireless device has started or intends to start a random access process and/or beam failure recovery process. The base station may transmit one or more DCI to the wireless device before or during the random access process by the wireless device on the first secondary cell.

In an example, the wireless device may receive a DCI indicating switching from the first BWP of the primary cell to the second BWP of the primary cell. In an example, the wireless device may receive the DCI on the primary cell. In an example, the wireless device may receive the DCI on a cell other than the primary cell (e.g., cross-carrier/BWP switching indication). In an example, the wireless device may receive the DCI before transmitting the random access preamble. In an example, the wireless device may receive the DCI after transmitting the random access preamble. In an example, the wireless device may receive the DCI during the random access process and while the random access process is ongoing. In an example, the DCI may comprise a BWP indicator. The wireless device may determine that the DCI indicates BWP switching in response to the BWP indicator indicating a BWP different from the current active BWP of the primary cell. In an example, the DCI may comprise an uplink grant or a downlink assignment. In an example, the DCI may indicating switching a downlink BWP of the primary cell. In an example, the DCI may indicate a timing for switching. In an example, the timing for switching may be a timing for a downlink assignment or a timing for an uplink grant. In an example, the DCI may comprise a field indicating the timing for uplink grant or downlink assignment (e.g., a symbol/slot/subframe/timing for transmitting a packet based on the uplink grant or a symbol/slot/subframe/ timing for receiving a packet based on the downlink assignment). In an example, the timing for switching may be based on the timing for uplink grant or downlink assignment. In an example, a plurality of timing values may be configured in RRC and the DCI may indicate an index for/pointing to one of the plurality of RRC configured timing values. In an example, the timing (e.g., time duration between receiving the DCI and switching the BWP) may be pre-configured and/or may have a fixed value. In an example, the timing (e.g., time duration between receiving the DCI and switching the BWP) may depend on a first TTI/numerology of the first BWP and/or a second TTI/numerology of the second BWP. In an example, the timing may indicate a TTI/symbol/ slot/subframe for the wireless device to switch from the first BWP of the primary cell to the second BWP of the primary cell.

Figure 38:
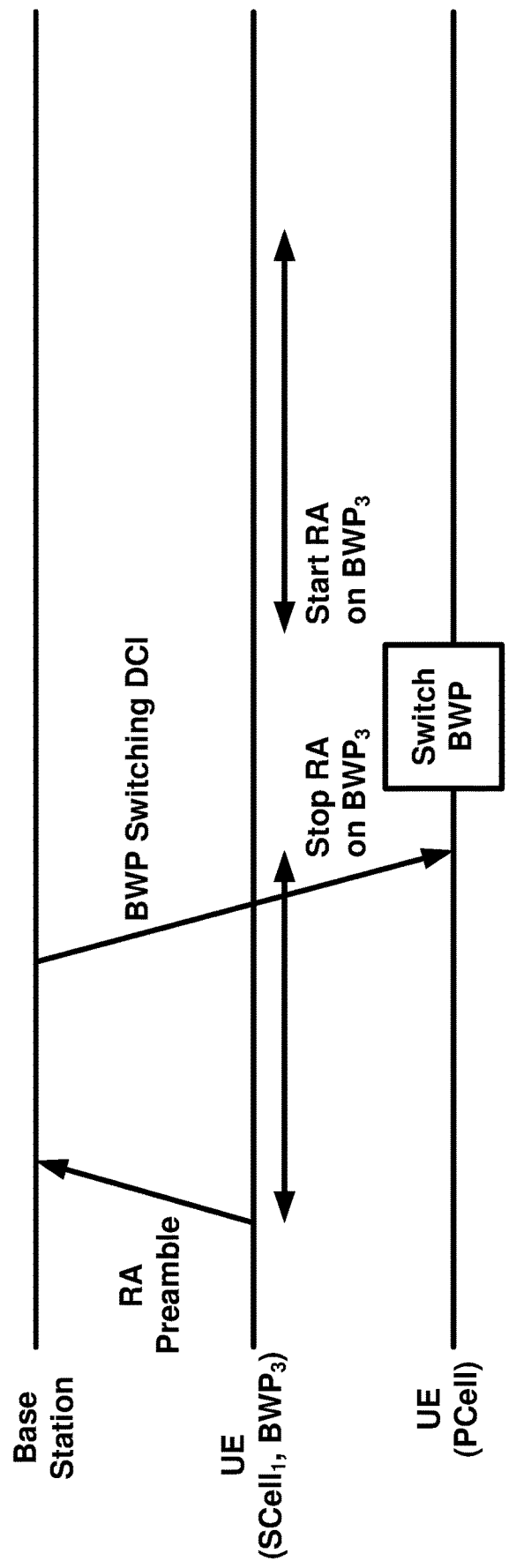
FIG. 38 is an example random access and bandwidth part operation procedure as per an aspect of an embodiment of the present invention disclosure.

An example embodiment is shown in FIG. 38. The wireless device may transmit a random access preamble via the third BWP (e.g., active BWP) of the first secondary cell in response to starting a beam failure recovery process and/or a random access process e.g., as part of a beam failure recovery process. The wireless device may receive a DCI indicating BWP switching from first BWP of the primary cell to the second BWP of the primary cell while the beam failure recovery process and/or the random access process (e.g., as part of the beam failure recovery process) is ongoing. In an example, the wireless device may stop/abort the random access process on the third BWP of the secondary cell in response to receiving the DCI. The wireless device may restart/reset one or more counters (e.g., preamble transmission counter, preamble power ramping counter, etc.) and/or one or more timers (e.g., random access contention resolution timer, etc.) in response to stopping/ aborting the random access. The wireless device may switch from the first BWP of the primary cell to the second BWP of the primary cell (e.g., at the timing indicated by the DCI or at the pre-configured timing) in response to receiving the DCI. The wireless device may (re-)start the random access on the third BWP of the secondary cell in response to switching from the first BWP of the primary cell to the second BWP of the primary cell. In an example, a timing between switching from the first BWP of the primary cell to the second BWP of the primary cell and starting the random access on the third BWP of the first secondary cell may be pre-configured and/or configured and/or dynamically indicated.

Figure 39:
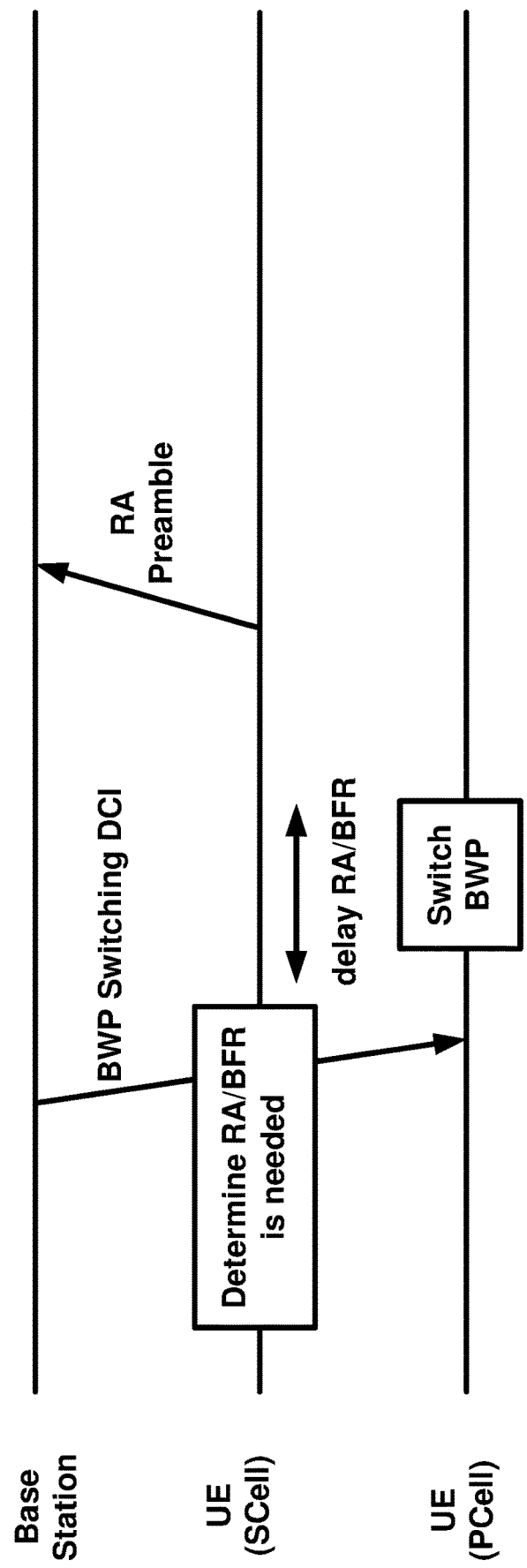
FIG. 39 is an example random access and bandwidth part operation procedure as per an aspect of an embodiment of the present invention disclosure.

An example embodiment is shown in FIG. 39. In an example, the wireless device may determine that a random access process and/or a beam failure recovery process is needed for the first secondary cell. In an example, the determining may be based on detecting beam failure on a serving SSB(s)/CSI-RS(s) and the wireless device may start the beam failure recovery process and/or the random access process to indicate to a serving base station of a new SSB or CSI-RS. The beam failure may be detected by the lower layers and may be indicated to the MAC entity. The wireless device may receive a DCI indicating switching from the first BWP of the primary cell to the second BWP of the primary cell. The wireless device may not have started the random access process on the third BWP of the secondary cell when the wireless device received the DCI. The wireless device may delay/postpone the random access process and/or the beam failure recovery process on the first secondary cell in response to receiving the DCI. The wireless device may delay/postpone the random access process and/or the beam failure recovery process on the first secondary cell in response to receiving the DCI even if the wireless device is configured with (e.g., dedicated) RACH resources that can be used for transmitting the random access preamble. The wireless device may switch from the first BWP of the primary cell to the second BWP of the primary cell, in response to receiving the DCI, at a timing e.g., indicated by the DCI or at the pre-configured timing. The wireless device may transmit a random access preamble (e.g., a dedicated random access preamble and via dedicated RACH resource) via a third BWP (e.g., active BWP) of the first secondary cell in response to switching from the first BWP of the primary cell to the second BWP of the primary cell.

Figure 40:
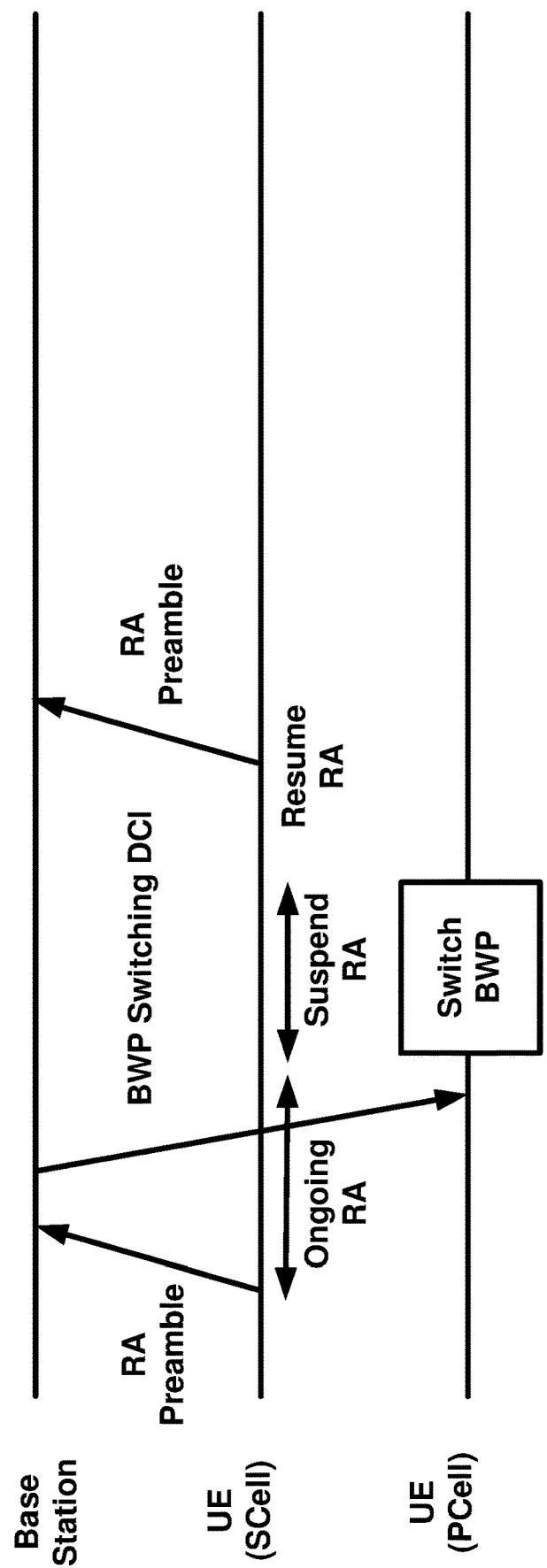
FIG. 40 is an example random access and bandwidth part operation procedure as per an aspect of an embodiment of the present invention disclosure.

An example embodiment is shown in FIG. 40. In an example, the wireless device may transmit a random access preamble e.g., via a third BWP (e.g., active BWP) of the first secondary cell to initiate a random access process on the third BWP of the secondary cell. In an example, the random access process may be as part of a beam failure recovery process on the first secondary cell of the wireless device. The wireless device may receive a DCI indicating switching from the first BWP of the primary cell to the second BWP of the primary cell while the random access process on the third BWP of the first secondary cell is ongoing. The wireless device may switch from the first BWP of the primary cell to the second BWP of the primary cell, in response to receiving the DCI, at a timing indicated by the DCI and/or the preconfigured timing. The wireless device may suspend the random access process on the third BWP of the first secondary cell while the wireless device switches from the first BWP of the primary cell to the second BWP of the secondary cell. In an example, the wireless device may suspend the random access process on the third BWP of the first secondary cell for a configurable and/or pre-configured and/or dynamically indicated time window/duration. The wireless device may resume the random access process on the third BWP of the first secondary cell in response to switching from the first BWP of the primary cell to the second BWP of the primary cell.

In an example, the wireless device may freeze one or more timers (e.g., random access contention resolution timer, etc.) and/or one or more counters (e.g., preamble transmission counter, preamble power ramping counter, etc.) in response to suspending the random access process on the third BWP of the first secondary cell. In an example, the wireless device may resume the one or more timers and/or the one or more counters in response to resuming the random access process on the third BWP of the first secondary cell.

In an example, the wireless device may stop one or more timers (e.g., random access contention resolution timer, etc.) and/or one or more counters (e.g., preamble transmission counter, preamble power ramping counter, etc.) in response to the suspending the random access process on the third BWP of the first secondary cell. In an example, the wireless device may (re-)start the one or more timers and/or the one or more counters in response to resuming the random access process on the third BWP of the first secondary cell.

In an example embodiment, the wireless device may receive the DCI indicating switching from the first BWP of the primary cell to the second BWP of the primary cell in a first symbol/slot/TTI/subframe/timing. In an example, the first symbol/slot/TTI/subframe/timing may be indicated in the DCI. In an example, RRC may configure a plurality of symbols/slots/TTIs/subframes/timings and the DCI may comprise an index to the first symbol/slot/TTI/subframe/timing. In an example, the first symbol/slot/TTI/subframe/timing may be based on a pre-configured symbol/slot/TTI/subframe/timing.

In an example embodiment, a method may be used comprising receiving, by a wireless device, configuration parameters for a primary cell and a secondary cell, the configuration parameters comprising bandwidth part (BWP) configuration parameters for a plurality of BWPs comprising: a first plurality of BWPs of the primary cell comprising a first BWP and a second BWP; and a second plurality of BWPs of the secondary cell comprising a third BWP and a fourth BWP. The method may comprise transmitting a random access preamble on the third BWP to initiate a random access process on the secondary cell. In an example, the method may comprise receiving a downlink control information (DCI) indicating switching from the first BWP of the primary cell to the second BWP of the primary cell. The method may comprise stopping the random access process on the third BWP of the secondary cell, and switching from the first BWP of the primary cell to the second BWP of the primary cell, and starting the random access on the third BWP of the secondary cell in response to the switching.

Figure 41:
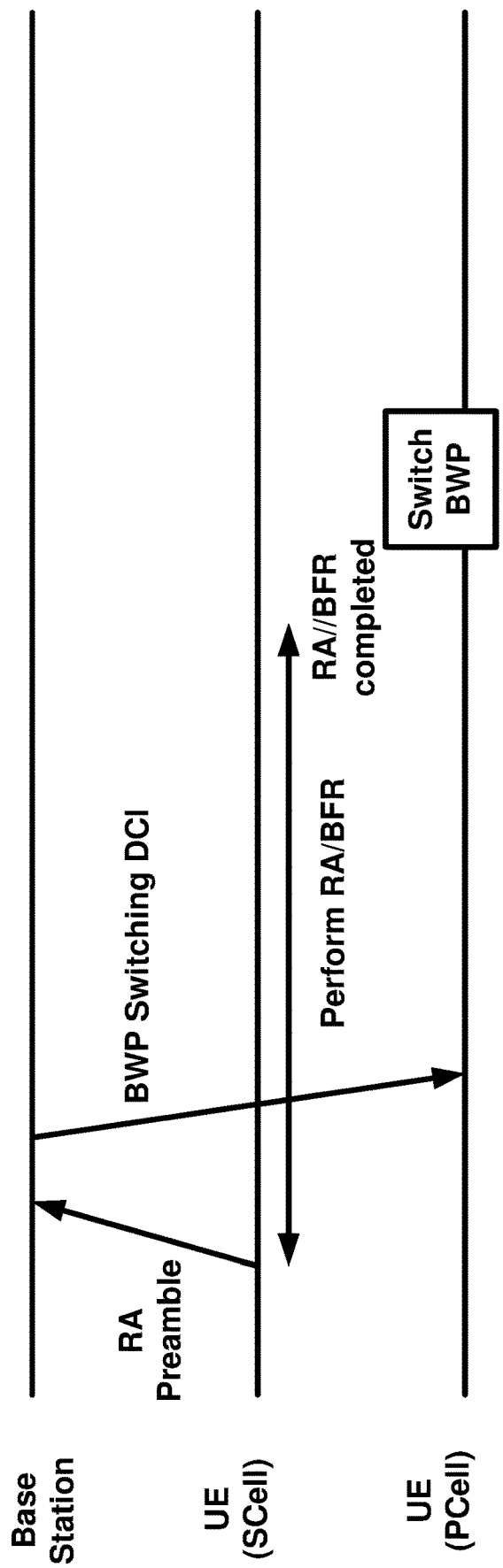
FIG. 41 is an example random access and bandwidth part operation procedure as per an aspect of an embodiment of the present invention disclosure.

An example embodiment is shown in FIG. 41. The wireless device may transmit a random access preamble via the third BWP of the first secondary cell to start a random access process on the first secondary cell. In an example, the random access process may be part of and/or in response to a beam failure recovery process. In an example, while the random access and/or the beam failure recovery process is ongoing, the wireless device may receive the DCI indicating switching, on the first symbol/slot/TTI/subframe/timing, from the first BWP of the primary cell to the second BWP of the primary cell. The first symbol/slot/TTI/subframe/timing may be during the random access process and/or the beam failure recovery process. In an example, the wireless device may postpone/delay the switching of the first BWP of the primary cell to the second BWP of the primary cell until the random access process and/or the beam failure recovery process on the secondary cell is completed (e.g., successfully and/or unsuccessfully). In an example, the timing between completing the random access process and/or the beam failure recovery process and switching the first BWP of the primary cell to the second BWP of the primary cell may be pre-configured and/or configured and/or dynamically indicated.

In an example embodiment, a method may be used comprising receiving, by a wireless device, configuration parameters for a primary cell and a secondary cell, the configuration parameters comprising bandwidth part (BWP) configuration parameters for a plurality of BWPs comprising: a first plurality of BWPs of the primary cell comprising a first BWP and a second BWP; and a second plurality of BWPs of the secondary cell comprising a third BWP and a fourth BWP. The method may comprise receiving a downlink control information (DCI) indicating switching from the first BWP of the primary cell to the second BWP of the primary cell. The method may further comprise delaying/postponing a random access process on the third BWP of the secondary cell, and switching from the first BWP of the primary cell to the second BWP of the primary cell, and starting the random access on the third BWP of the secondary cell in response to the switching.

Figure 42:
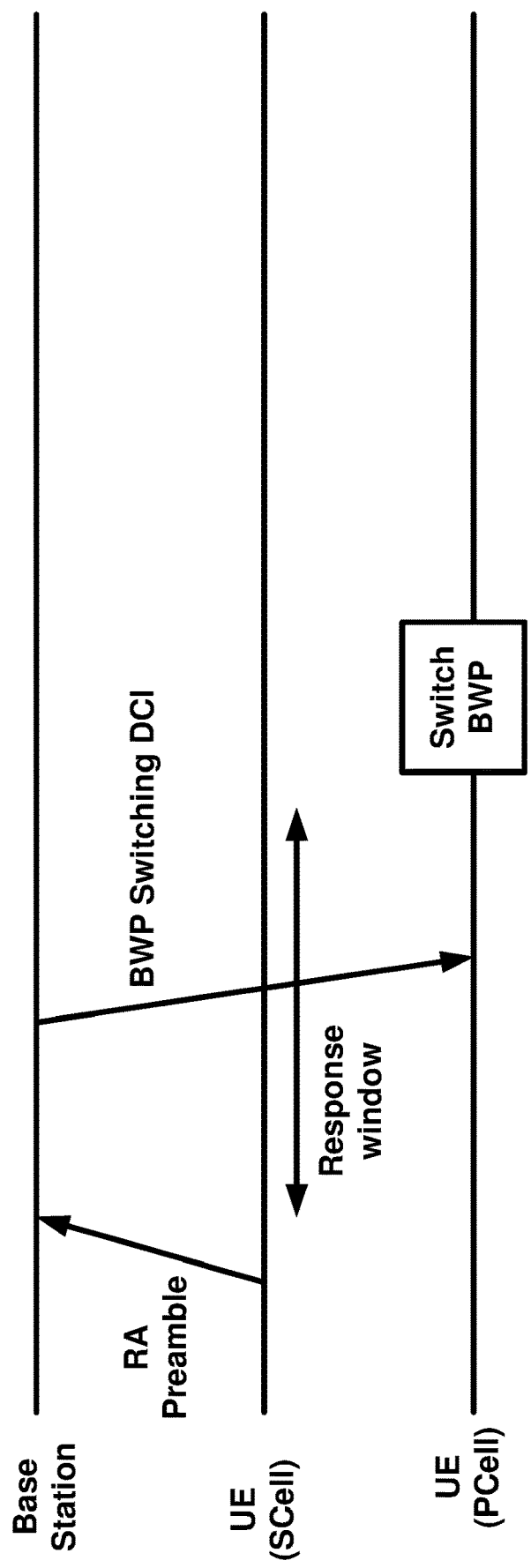
FIG. 42 is an example random access and bandwidth part operation procedure as per an aspect of an embodiment of the present invention disclosure.
Figure 43:
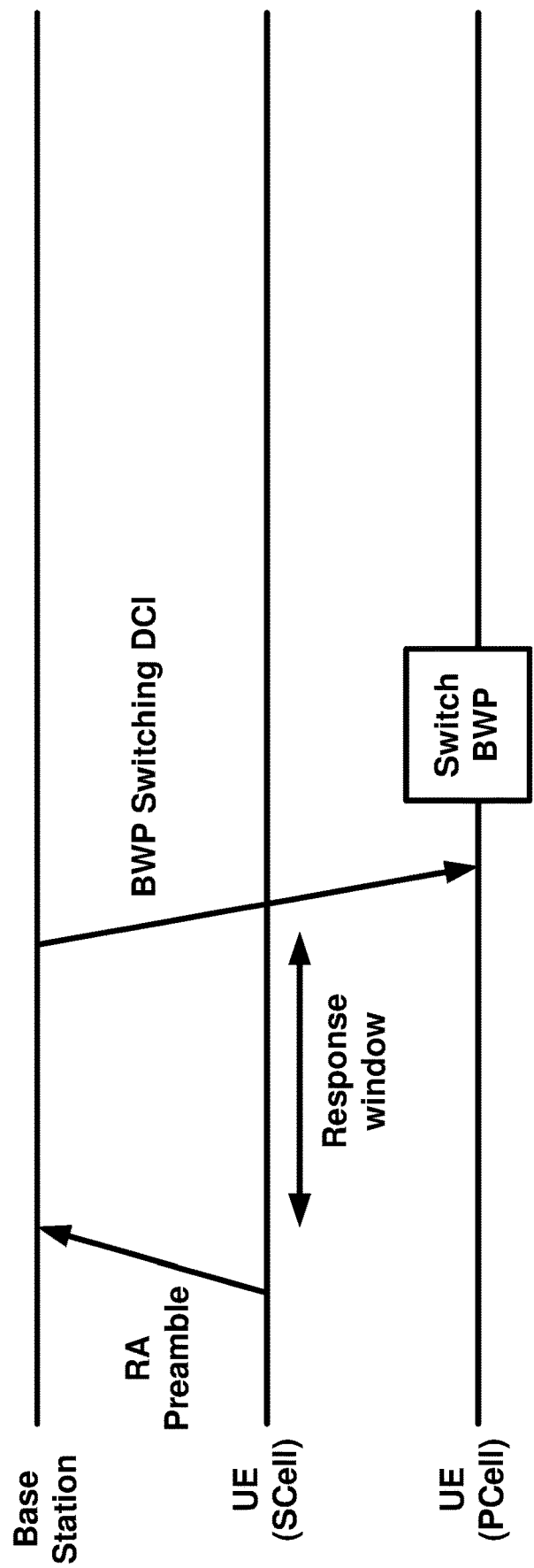
FIG. 43 is an example random access and bandwidth part operation procedure as per an aspect of an embodiment of the present invention disclosure.

Example embodiments are shown in FIG. 42 and FIG. 43. The wireless device may transmit a random access preamble via the third BWP of the first secondary cell to start a random access process on the first secondary cell. In an example, the random access process may be part of and/or in response to a beam failure recovery process. In an example, while the random access and/or the beam failure recovery process is ongoing, the wireless device may receive the DCI indicating switching, on the first symbol/slot/TTI/subframe/timing, from the first BWP of the primary cell to the second BWP of the primary cell. In an example, in response to the first symbol/slot/TTI/subframe/timing being within a response window (e.g., random access response window or beam failure recovery response window), the wireless device may postpone/delay the BWP switching until an end of the response window (see for example, FIG. 42) or an offset after the end of the response window. In an example, the offset may be pre-configured and/or configurable (e.g., RRC configurable). The wireless device may monitor a downlink control channel (e.g., PDCCH) during the response window to receive a DCI (e.g., comprising an uplink grant and/or timing advance command). The wireless device may switch from the first BWP of the primary cell to the second BWP of the primary cell in response to the response window being ended/elapsed. In an example, in response to the first symbol/slot/TTI/subframe/timing not being within the response window (e.g., random access response window or beam failure recovery response window), the wireless device may switch the first BWP of the primary cell to the second BWP of the primary cell in response to receiving the DCI indicating the switching (see for example, FIG. 43).

In an example embodiment, a method may be used comprising receiving, by a wireless device, configuration parameters for a primary cell and a secondary cell. The configuration parameters may comprise bandwidth part (BWP) configuration parameters for a plurality of BWPs comprising a first plurality of BWPs of the primary cell comprising a first BWP and a second BWP; and a second plurality of BWPs of the secondary cell comprising a third BWP and a fourth BWP. In an example, the method may comprise transmitting a random access preamble on the third BWP to initiate a random access process on the secondary cell. The method may comprise receiving a downlink control information (DCI) indicating switching from the first BWP of the primary cell to the second BWP of the primary cell in a first symbol/slot/TTI/timing. In an example, the method may comprise postponing/delaying the switching until the random access/BFR is completed/successful. In an example, the method may comprise in response to the first symbol/slot/TTI/timing being within a bfr-ResponseWindow, postponing/delaying the switching until an end of the bfr-ResponseWindow, otherwise switching the first BWP of the primary cell to the second BWP of the primary cell in the first symbol/slot/TTI/timing.

Figure 44:
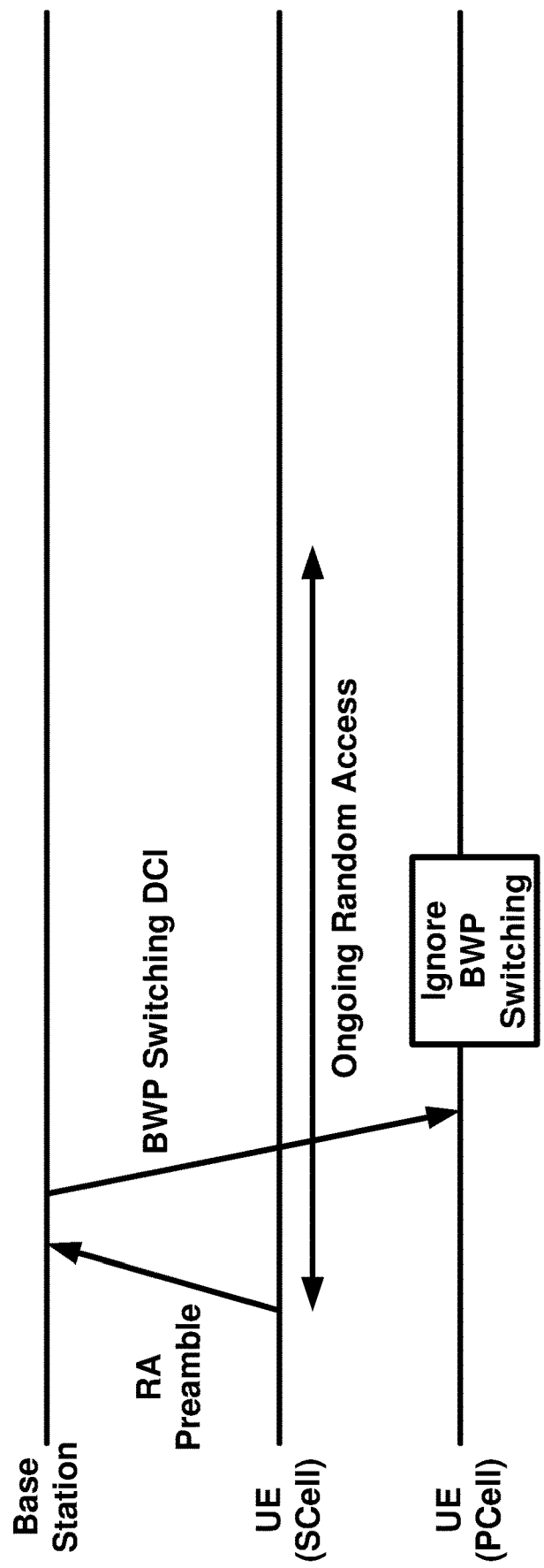
FIG. 44 is an example random access and bandwidth part operation procedure as per an aspect of an embodiment of the present invention disclosure.

In an example embodiment, the wireless device may transmit a random access preamble via the third BWP of the first secondary cell to start a random access process on the first secondary cell. In an example, the random access process may be part of and/or in response to a beam failure recovery process. The wireless device may receive a DCI indicating one of: (i) switching from the first BWP of the primary cell to the second BWP of the primary cell; or (ii) switching from the third BWP of the first secondary cell to the fourth BWP of the first secondary cell. In an example, in response to the DCI indicating the switching from the third BWP of the first secondary cell to the fourth BWP of the first secondary cell, the wireless device may perform one of: (i) stopping the random access on the third BWP of the first secondary cell, and switching from the third BWP of the first secondary cell to the fourth BWP of the first secondary cell, and starting the random access via the fourth BWP of the first secondary cell; or (ii) ignoring the switching from the third BWP of the first secondary cell to the fourth BWP of the first secondary cell. In an example, as shown in FIG. 44, in response to the DCI indicating switching from the first BWP of the primary cell to the second BWP of the primary cell, the wireless device may ignore the switching from the first BWP of the primary cell to the second BWP of the primary cell. The wireless device may continue the random access process on the third BWP of the first secondary cell.

In an example embodiment, a method may be used comprising receiving, by a wireless device, configuration parameters for a primary cell and a secondary cell. The configuration parameters may comprise BWP configuration parameters for a plurality of BWPs comprising: a first plurality of BWPs of the primary cell comprising a first BWP and a second BWP; and a second plurality of BWPs of the secondary cell comprising a third BWP and a fourth BWP. The method may comprise transmitting a random access preamble on the third BWP to initiate a random access process om the secondary cell. The method may comprise receiving a DCI indicating one of: (i) switching from the first BWP of the primary cell to the second BWP of the primary cell; or (ii) switching from the third BWP of the secondary cell to the fourth BWP of the secondary cell. The method may comprise, in response to the DCI indicating switching from the third BWP of the secondary cell to the fourth BWP of the secondary cell, performing one of: stopping the random access process on third BWP of the secondary cell, and switching from the third BWP of the secondary cell to the fourth BWP of the secondary cell, and starting the random access on the fourth BWP of the secondary cell; or ignoring the switching from the third BWP of the secondary cell to the fourth BWP of the secondary cell; otherwise ignoring the switching from the first BWP of the primary cell to the second BWP of the primary cell.

Figure 45:
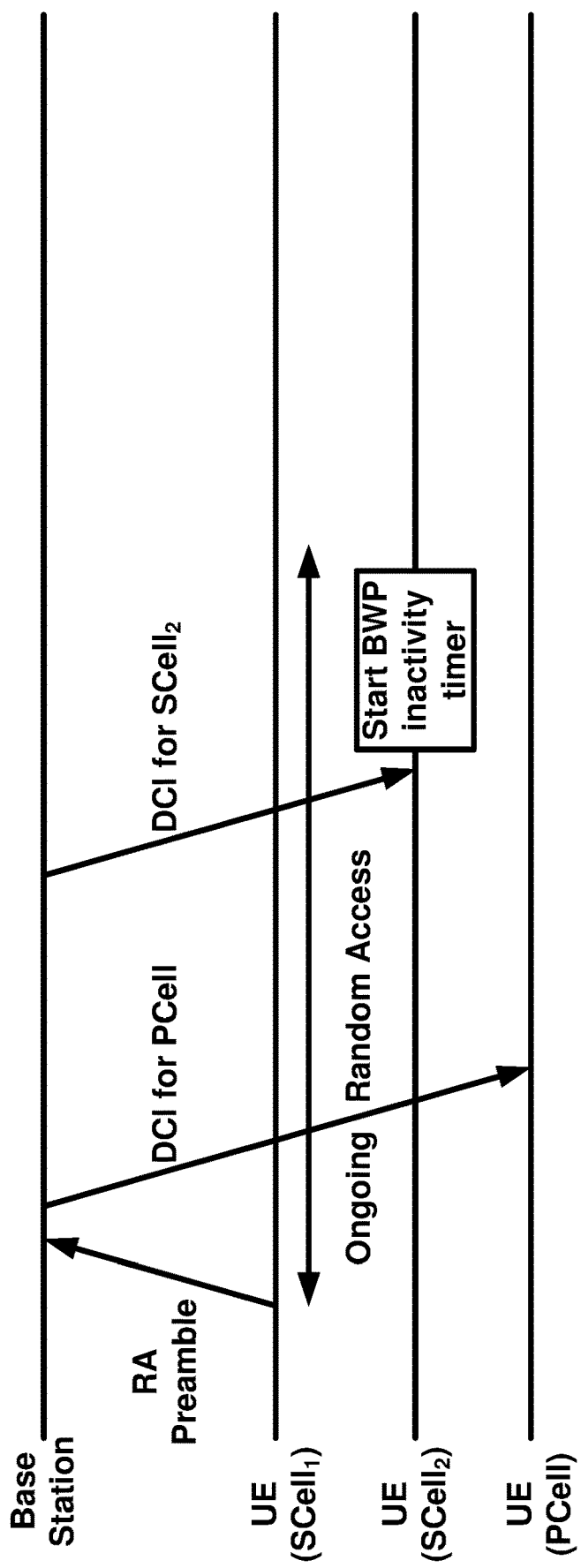
FIG. 45 is an example random access and bandwidth part operation procedure as per an aspect of an embodiment of the present invention disclosure.

In an example embodiment as shown in FIG. 45, a wireless device may receive one or more messages comprising configuration parameters. In an example, the one or more messages may comprise RRC messages. In an example, the configuration parameters may comprise configuration parameters for a plurality of cells comprising a primary cell, a first secondary cell and a second secondary cell. In an example, the configuration parameters may comprise BWP configuration parameters indicating at least a plurality of BWPs on the primary cell and the second secondary cell. In an example, the BWP configuration parameters may comprise a first BWP inactivity timer for the primary cell and a second BWP inactivity timer for the second secondary cell. The first BWP inactivity timer for the primary cell may be configured with a first value. The second BWP inactivity timer for the secondary may be configured with a second value. In an example, the first value and the second value may be same. In an example, the first BWP inactivity timer and the second BWP inactivity timer may be configured with one and/or same value. The wireless device may transmit a random access preamble via the first secondary cell. The wireless device may receive a DCI on one of the primary cell or the second secondary cell.

In an example, the DCI may indicate uplink grant or downlink assignment. In an example, the DCI may be received in a UE-specific search space. In an example, the DCI may be received in a common search space. The wireless device may start the second BWP inactivity timer in response to receiving the DCI on the second secondary cell. Otherwise, in response to receiving the DCI on the primary cell, the wireless device may not start the first BWP inactivity timer.

In an example embodiment, a method may be used comprising: receiving, by a wireless device, one or more messages comprising configuration parameters for a plurality of cells comprising a primary cell, a first secondary cell and a second secondary cell. In an example, the configuration parameters may comprise a first BWP inactivity timer for the primary cell and a second BWP inactivity timer for the second secondary cell. In an example, the method may comprise transmitting by the wireless device a random access preamble on the first secondary cell. The method may comprise receiving, by the wireless device, a DCI on one of the primary cell or the second secondary cell. The method may comprise starting, by the wireless device, the second BWP inactivity timer in response to receiving the DCI on the second secondary cell, otherwise not starting the first BWP inactivity timer.

A wireless device may be configured with a plurality of cells. A cell in the plurality of cells may comprise a plurality of bandwidth parts. In legacy mechanisms, the bandwidth part operation for a cell is based on processes of the same cell. For example, the wireless device may switch an active bandwidth part of the cell in response to receiving a DCI indicating switching the active bandwidth part of the cell or in response to expiration of an inactivity timer of the active bandwidth part of the cell. In an example, the wireless device may switch the active bandwidth part of the cell in response to starting a random access process on the cell. In legacy mechanisms, the processes performed on a second cell of the wireless device may not impact the bandwidth part switching operation of the cell.

Implementation of existing mechanism leads to inefficient random access process of a secondary cell. This may result in inefficient network performance. For example, the wireless device may initiate a random access process on a secondary cell by transmitting a random access preamble via the secondary cell. The wireless device expects to receive a random access response in a common search space of the primary cell. Implementation of legacy mechanism may lead to switching the active bandwidth part of the primary cell while the random access is ongoing on the secondary cell. For example, the legacy mechanisms may lead to starting an inactivity timer of an active bandwidth part of the primary and switching the active bandwidth part of the primary cell to a default bandwidth part of the primary cell while the random access process is ongoing on the secondary cell. In an example, the wireless device may receive a DCI indicating switching active bandwidth part of the primary cell while the random access is ongoing on the secondary cell. This leads to disruption of the random access process on the secondary cell and inefficient network performance. There is a need to enhance the random access process on secondary cells and bandwidth part operations on the primary cell. Example embodiments enhance the random access process on secondary cells and bandwidth part operations on the primary cell.

Figure 46:
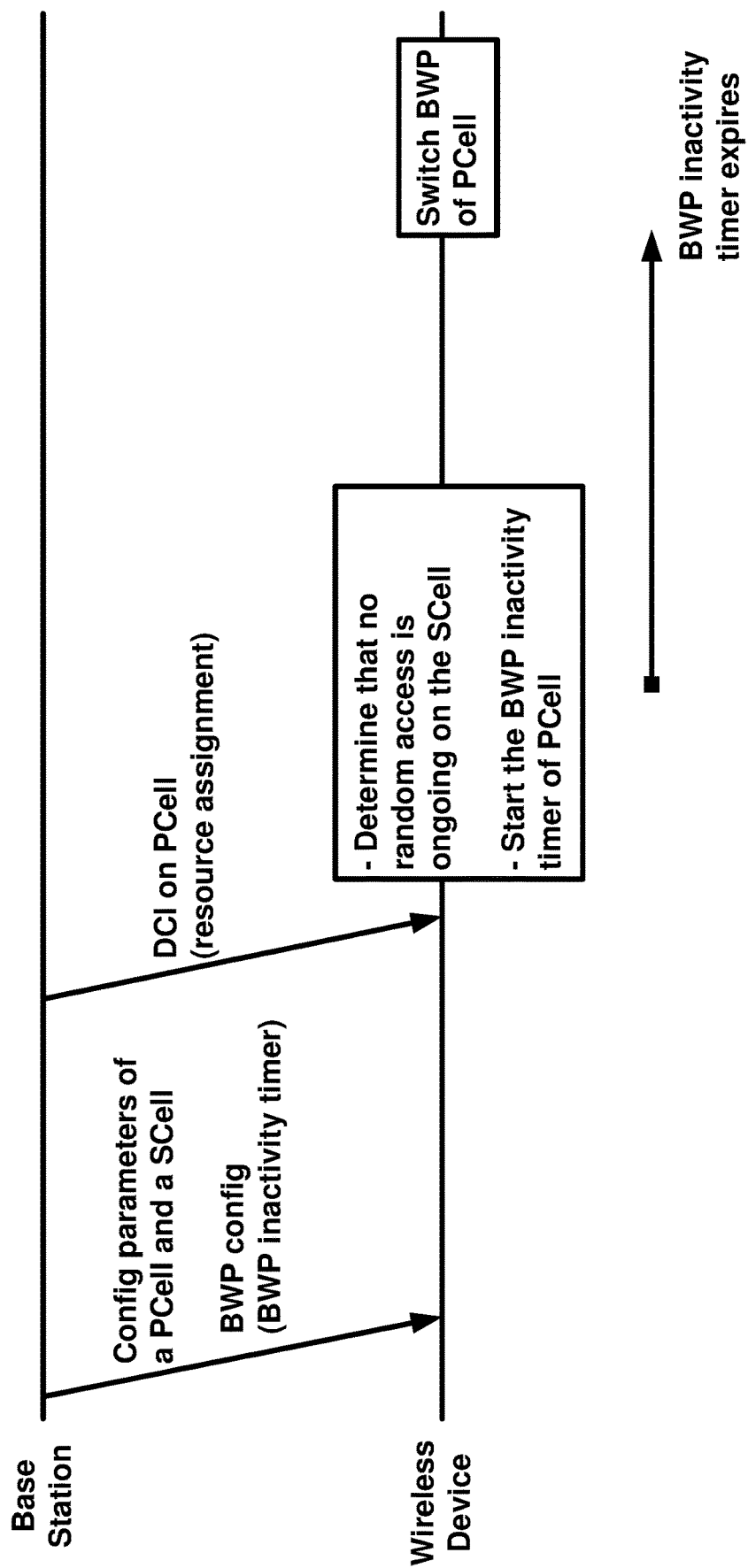
FIG. 46 is an example random access and bandwidth part operation procedure as per an aspect of an embodiment of the present invention disclosure.

In an example embodiment as shown in FIG. 46, a wireless device may receive one or more messages comprising configuration parameters. The one or more messages may comprise one or more RRC messages. The one or more messages may comprise first configuration parameters of a plurality of cells comprising a primary cell and a secondary cell. The one or more messages may comprise bandwidth part configuration parameters. The bandwidth part configuration parameters may comprise configuration parameter of a plurality of bandwidth parts of the primary cell. The bandwidth part configuration parameters may comprise a value for a bandwidth part inactivity timer. The wireless device may switch an active bandwidth part based on the bandwidth part inactivity timer. In an example, the bandwidth part configuration parameters may further indicate an initial active bandwidth part. In an example, the bandwidth part configuration parameters may comprise an identifier of the initial active bandwidth part. In an example, the bandwidth part configuration parameters may further indicate a default bandwidth part. In an example, the bandwidth part configuration parameters may comprise an identifier of the default bandwidth part.

In an example, the wireless device may receive a downlink control information on an active bandwidth part of the primary cell. The downlink control information may indicate a resource assignment. In an example, the resource assignment may be an uplink grant for uplink scheduling and transmitting uplink data. In an example, the resource assignment may be downlink resource assignment for reception of downlink data. In an example, the downlink control information may be received via a wireless device specific search space of the primary cell. In an example, the downlink control information may have a format for uplink scheduling (e.g., format 0_0 or 0_1) or downlink resource assignment (e.g., format 1_0 or 1_1). The downlink control information may comprise transmission of parameters of a transport block. The transmission parameters may comprise radio resource parameters (e.g., radio resource time-frequency parameters), HARQ related parameters (e.g., HARQ process number, NDI, RV, etc.).

In an example, in response to receiving the downlink control information, the wireless device may check if there is an ongoing random access on the secondary cell. In an example, the checking may be based on whether the wireless device has initiated a random access process on the secondary cell. In an example, the checking may be based on whether the wireless device has transmitted a random access preamble on the secondary cell. The wireless device may determine, in response to receiving the downlink control information, that no random access procedure is ongoing the secondary cell. In an example, the determining may be based on whether the wireless device has initiated a random access process on the secondary cell. In an example, the wireless device may determine that no random access procedure is ongoing on the secondary cell in response to not initiating a random access process on the secondary cell. In an example, the determining may be based on whether the wireless device has transmitted a random access preamble on the secondary cell. In an example, the wireless device may determine that no random access procedure is ongoing on the secondary cell in response to not transmitting a random access preamble on the secondary cell. The wireless device may start the bandwidth part inactivity timer of the active bandwidth part of the primary cell in response to the determining. The wireless device may start the bandwidth part inactivity timer with the value. The wireless device may switch from the active bandwidth part to a default bandwidth part in response to an expiry of the active bandwidth part inactivity timer. In an example, the default bandwidth part may be an initial active bandwidth part in response to no active bandwidth part being configured. In an example, the active bandwidth part and the default bandwidth part may have different numerologies.

Figure 47:
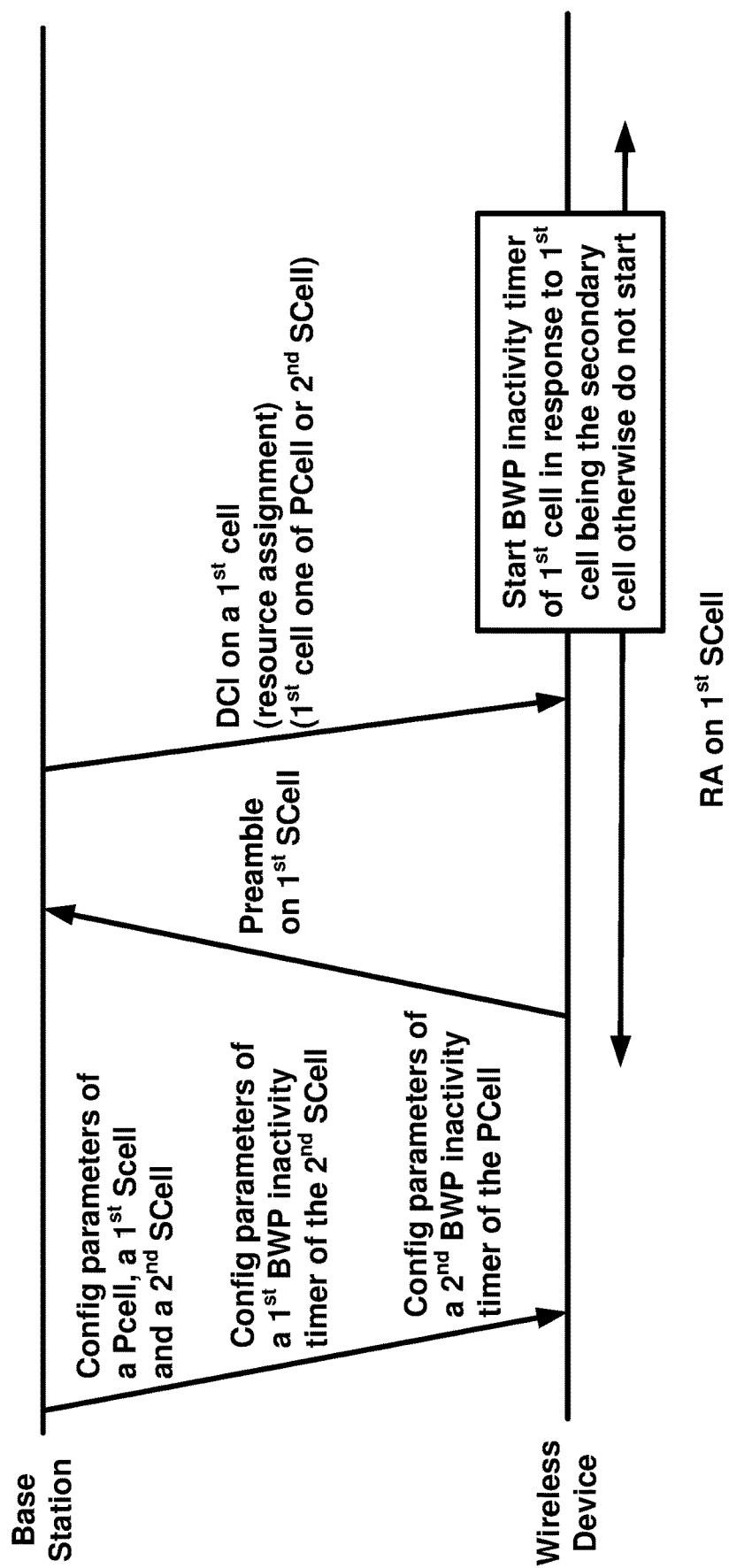
FIG. 47 is an example random access and bandwidth part operation procedure as per an aspect of an embodiment of the present invention disclosure.

In an example embodiment as shown in FIG. 47, a wireless device may receive one or more messages comprising configuration parameters. The one or more messages may comprise one or more RRC messages. The one or more messages may comprise first configuration parameters of a plurality of cells comprising a primary cell, a first secondary cell and a second secondary cell. The one or more messages may comprise bandwidth part configuration parameters. The bandwidth part configuration parameters may comprise configuration parameter of a plurality of bandwidth parts of the primary cell, the first secondary cell and the second secondary cell. The bandwidth part configuration parameters may comprise second configuration parameters of a first bandwidth part inactivity timer of the second secondary cell. The bandwidth part configuration parameters may comprise third configuration parameters of a second bandwidth part inactivity timer of the primary cell. The wireless device may switch an active bandwidth part of a cell based on the bandwidth part inactivity timer of the cell.

In an example, the wireless device may transmit a random access preamble on the first secondary cell in response to starting a random access process. The wireless device may transmit the random access process on a random access occasion of the secondary cell. The one or more messages may comprise random access configuration parameters. The random access occasion of the secondary cell may be based on the random access configuration parameters. In an example, the wireless device may transmit the random access preamble in response to starting a contention-based random access process. The wireless device may select the random access preamble in response to the random access process being a contention-based random access process. In an example, the wireless device may transmit the random access preamble in response to starting a contention-free random access process. The base station may indicate the wireless device to start the random access process by transmitting a PDCCH order. The PDCCH order may indicate the random access preamble. The wireless device may employ the random access preamble indicated by the PDCCH order in response to the random access process being a contention-free random access process.

In an example, the wireless device may receive a downlink control information on an active bandwidth part of a first cell indicating a resource assignment. In an example, the resource assignment may be an uplink grant for uplink scheduling and transmitting uplink data. In an example, the resource assignment may be downlink resource assignment for reception of downlink data. In an example, the downlink control information may be received via a wireless device specific search space of the first cell. In an example, the downlink control information may have a format for uplink scheduling (e.g., format 0_0 or 0_1) or downlink resource assignment (e.g., format 1_0 or 1_1). The downlink control information may comprise transmission of parameters of a transport block. The transmission parameters may comprise radio resource parameters (e.g., radio resource time-frequency parameters), HARQ related parameters (e.g., HARQ process number, NDI, RV, etc.).

The first cell may be one of the primary cell or the second secondary cell. The wireless device may receive the downlink control information while the random access process is ongoing on the first secondary cell. The wireless device may start a bandwidth inactivity timer of the first cell in response to the first cell being the second secondary cell. Otherwise, the wireless device may not start the bandwidth part inactivity timer of the first cell. In an example, the random access process on the first secondary cell may impact the bandwidth part operation of the primary cell (e.g., starting or not starting a bandwidth part inactivity timer in response to receiving a resource assignment DCI) while the random access process on the first secondary cell may not impact the bandwidth part operation of the primary cell.

Figure 48:
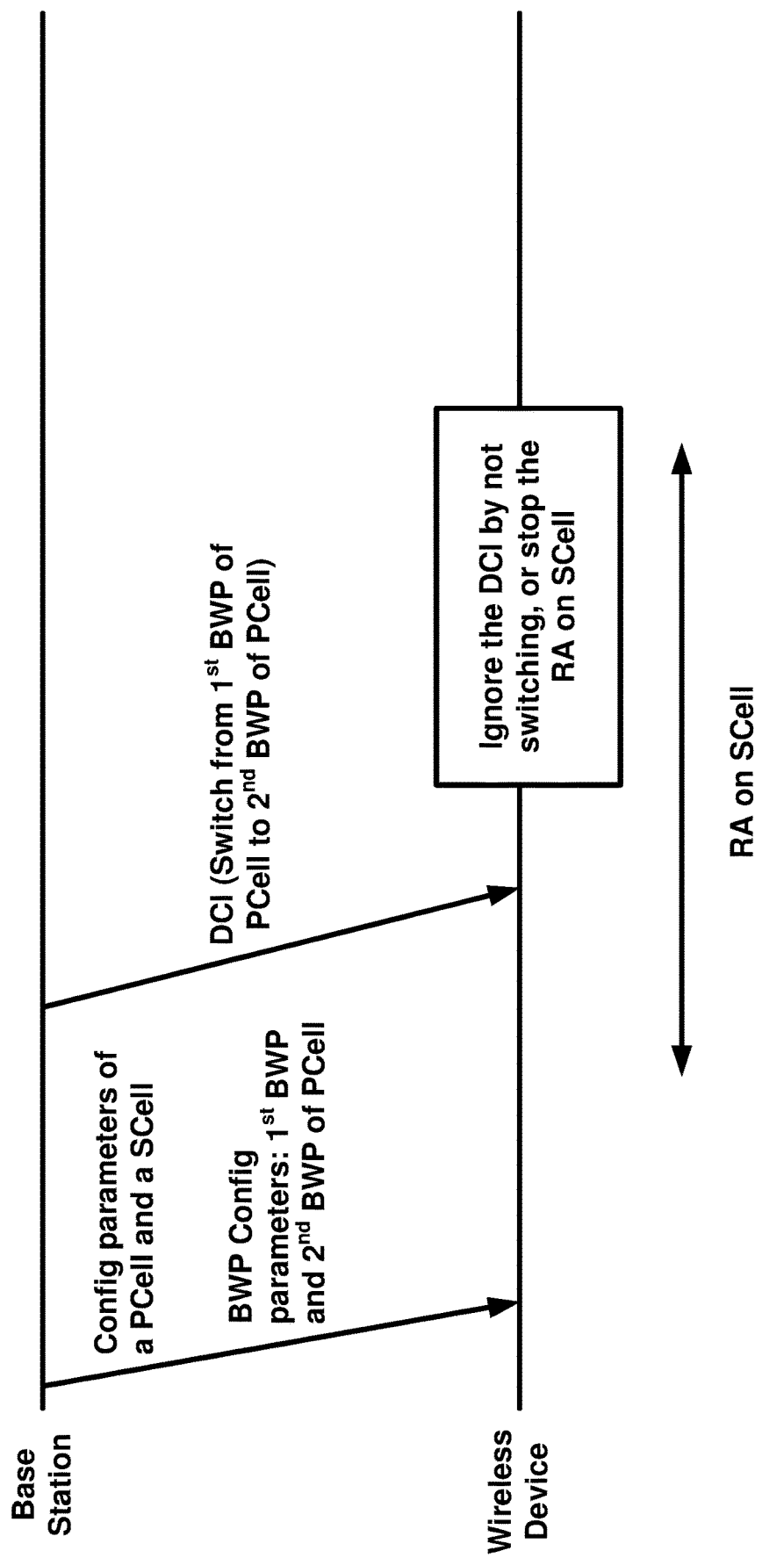
FIG. 48 is an example random access and bandwidth part operation procedure as per an aspect of an embodiment of the present invention disclosure.

In an example embodiment as shown in FIG. 48, a wireless device may receive one or more messages comprising configuration parameters. The one or more messages may comprise one or more RRC messages. The one or more messages may comprise first configuration parameters of a plurality of cells comprising a primary cell and a secondary cell. The one or more messages may comprise bandwidth part configuration parameters. The bandwidth part configuration parameters may comprise configuration parameter of a plurality of bandwidth parts of the primary cell comprising a first bandwidth part and a second bandwidth part. In an example, the configuration parameters may comprise a first identifier of the first bandwidth part and a second identifier of the second bandwidth part.

The wireless device may receive a downlink control information indicating switching from the first bandwidth part of the primary cell to the second bandwidth part of the primary cell. In an example, the downlink control information may further indicate resource assignment (e.g., an uplink grant or downlink assignment). In an example, the downlink control information may indicate a first timing of the resource assignment (e.g., the uplink grant or the downlink assignment). A second timing of the switching from the first bandwidth part of the primary cell to the second bandwidth part of the primary cell may be based on the first timing. The downlink control information may be received while the first bandwidth part is an active bandwidth part of the primary cell. In an example, the downlink control information may be received via the primary cell. In an example, the downlink control information may be received via a second cell that is different from the primary cell. The downlink control information may comprise a field indicating an identifier of the second bandwidth part. The downlink control information may be received while a random access process is ongoing on the secondary cell. In an example, the random access process may be a contention-free random access process. In an example, the random access process may be for beam failure recovery. In response to the receiving the downlink control information the wireless device may ignore the downlink control information or stop the random access process on the secondary cell. In an example, the ignoring the downlink control information may be by not switching from the first bandwidth part of the primary cell to the second bandwidth part of the primary cell.

In an example, the stopping the random access process on the secondary cell may further comprise switching from the first bandwidth part of the primary cell to the second bandwidth part of the primary cell. In an example, the stopping the random access process on the secondary cell may further comprise starting a second random access process in response to switching from the first bandwidth part of the primary cell to the second bandwidth part of the primary cell. In an example, the stopping the random access process on the secondary cell may further comprise stopping one or more timers associated with the random access process and resetting one or more counters associated with the random access process.

In an example, the ignoring the downlink control information may further comprise continuing the random access process on the secondary cell.

According to various embodiments, a device such as, for example, a wireless device, a base station, base station central unit, a base station distributed unit, a core network entity, and/or the like, may comprise one or more processors and memory. The memory may store instructions that, when executed by the one or more processors, cause the device to perform a series of actions. Embodiments of example actions are illustrated in the accompanying figures and specification. Features from various embodiments may be combined to create yet further embodiments.

FIG. 49 is an example flow diagram as per an aspect of an embodiment of the present disclosure. At 4910, a wireless device may receive one or more messages from a base station. The one or more messages may comprise first configuration parameters of one or more cells grouped into a timing advance group. The one or more messages may comprise second configuration parameters of a time alignment timer for the timing advance group. The one or more messages may comprise third configuration parameters of semi-persistent channel state information (CSI) reports for transmission via a first cell of the one or more cells. At 4920, a first downlink control information indicating activation of a plurality of resources of the first cell for the semi-persistent CSI reports may be received. At 4930, a semi-persistent CSI report, of the semi-persistent CSI reports, may be transmitted via a first resource of the plurality of resources. In response to the time alignment timer expiring (4940), second resources of the plurality of resources that occur after the time alignment timer expires may be cleared at 4950.

According to an example embodiment, the time alignment timer may be started in response to receiving a timing advance control element. According to an example embodiment, a second downlink control information may be received. The second downlink control information may indicate activation of a second plurality of resources of the first cell for second semi-persistent CSI reports. The second plurality of resources may be determined based on the third configuration parameters. According to an example embodiment, the timing advance group may be a primary timing advance group comprising a primary cell and one or more secondary cells. According to an example embodiment, the timing advance group may be a secondary timing advance group comprising one or more secondary cells. According to an example embodiment, the plurality of resources may be for transmission of the semi-persistent CSI reports via a physical uplink shared channel. According to an example embodiment, the second resources may be available for uplink scheduling by the base station in response to the clearing the second resources. According to an example embodiment, the third configuration parameters may comprise a first radio network temporary identifier. According to an example embodiment, the first downlink control information may be associated with the first radio network temporary identifier. According to an example embodiment, the third configuration parameters may comprise a periodicity and offset parameter indicating resources for transmission of the semi-persistent CSI reports. According to an example embodiment, the third configuration parameters may comprise a set of trigger states for semi-persistent CSI reporting. According to an example embodiment, the first downlink control information may indicate a first trigger state in the set of trigger states.

FIG. 50 is an example flow diagram as per an aspect of an embodiment of the present disclosure. At 5010, a base station may transmit one or more messages to a wireless device. The one or more messages may comprise first configuration parameters of one or more cells grouped into a timing advance group. The one or more messages may comprise second configuration parameters of a time alignment timer for the timing advance group. The one or more messages may comprise third configuration parameters of semi-persistent channel state information (CSI) reports for transmission via a first cell of the one or more cells. At 5010, a first downlink control information indicating activation of a plurality of resources of the first cell for the semi-persistent CSI reports may be transmitted. At 5010, a semi-persistent CSI report, of the semi-persistent CSI reports, may be received via a first resource of the plurality of resources. In response to the time alignment timer expiring (5040), second resources of the plurality of resources that occur after the time alignment timer expires may be cleared (5030).

According to an example embodiment, the time alignment timer may be started in response to transmitting a timing advance control element. According to an example embodiment, a second downlink control information indicating activation of a second plurality of resources of the first cell for second semi-persistent CSI reports may be transmitted. The second plurality of resources may be determined based on the third configuration parameters. According to an example embodiment, the timing advance group may be a primary timing advance group comprising a primary cell and one or more secondary cells. According to an example embodiment, the timing advance group may be a secondary timing advance group comprising one or more secondary cells. According to an example embodiment, the plurality of resources may be for reception of the semi-persistent CSI reports via a physical uplink shared channel. According to an example embodiment, the second resources may be available for uplink scheduling by the base station in response to the clearing the second resources. According to an example embodiment, the third configuration parameters may comprise a first radio network temporary identifier. According to an example embodiment, the first downlink control information may be associated with the first radio network temporary identifier. According to an example embodiment, the third configuration parameters may comprise a periodicity and offset parameter indicating resources for transmission of the semi-persistent CSI reports. According to an example embodiment, the third configuration parameters may comprise a set of trigger states for semi-persistent CSI reporting. According to an example embodiment, the first downlink control information may indicate a first trigger state in the set of trigger states.

Figure 51:
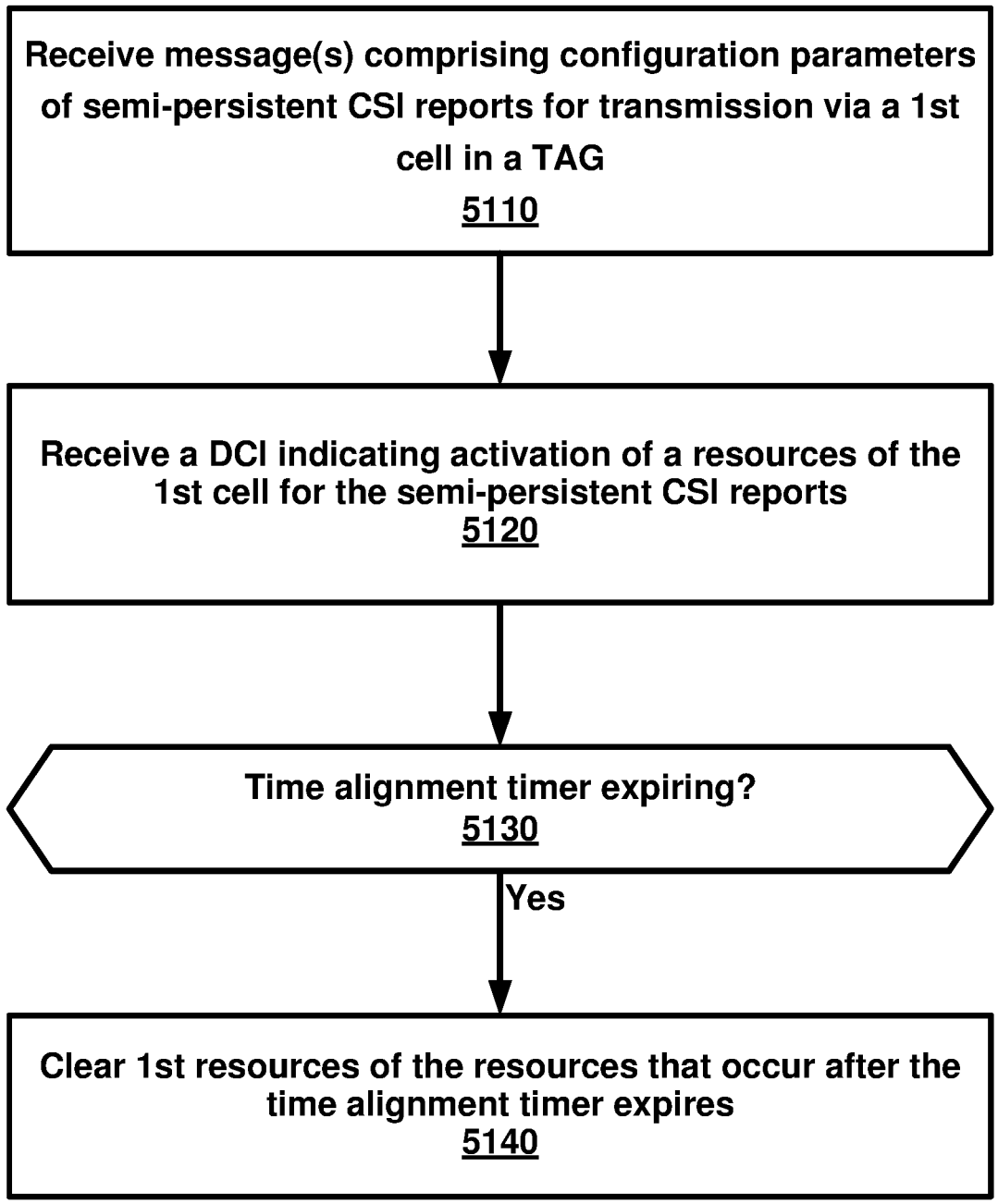
FIG. 51 is an example flow diagram of an aspect of an embodiment of the present invention disclosure.

FIG. 51 is an example flow diagram as per an aspect of an embodiment of the present disclosure. At 5110, a wireless device may receive one or more messages. the one or more messages may comprise configuration parameters of semi-persistent channel state information (CSI) reports for transmission via a first cell in a timing advance group. At 5120, a downlink control information indicating activation of a plurality of resources of the first cell for the semi-persistent CSI reports may be received. In response to a time alignment timer of the timing advance group expiring (5130), first resources of the plurality of resources that occur after the time alignment timer expires may be cleared (5140). According to an example embodiment, a first semi-persistent CSI report, of the semi-persistent CSI reports, may be transmitted via a second resource of the plurality of resources. According to an example embodiment, the one or more messages may comprise first configuration parameters of one or more cells grouped into the timing advance group.

According to an example embodiment, the one or more messages may comprise second configuration parameters of the time alignment timer for the timing advance group.

Figure 52:
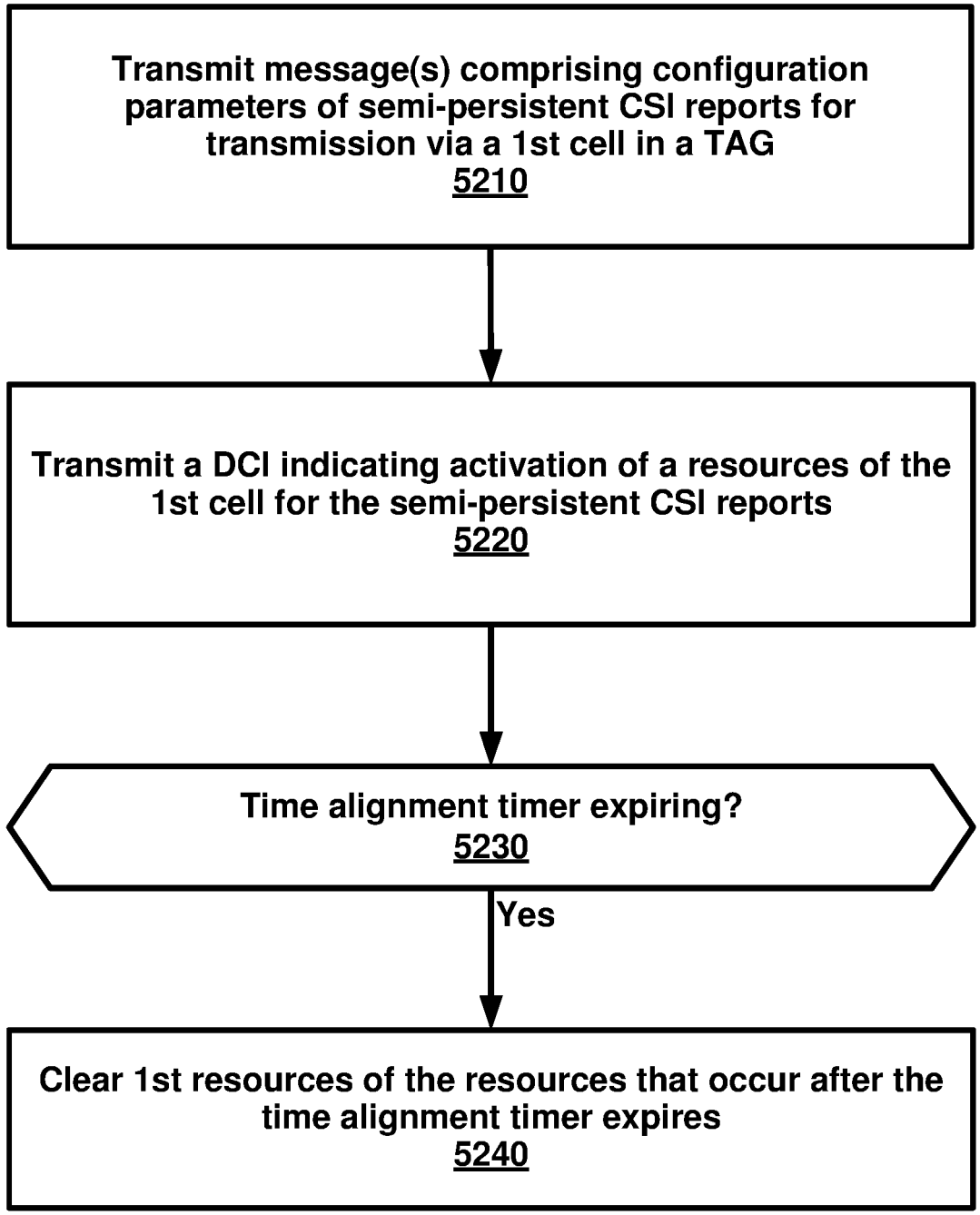
FIG. 52 is an example flow diagram of an aspect of an embodiment of the present invention disclosure.

FIG. 52 is an example flow diagram as per an aspect of an embodiment of the present disclosure. At 5210, a base station may transmit one or more messages. The one or more messages may comprise configuration parameters of semi-persistent channel state information (CSI) reports for transmission via a first cell in a timing advance group. At 5220, a downlink control information may be transmitted. The downlink control information may indicate activation of a plurality of resources of the first cell for the semi-persistent CSI reports. In response to a time alignment timer of the timing advance group expiring (5230), first resources of the plurality of resources that occur after the time alignment timer expires may be cleared (5240). According to an example embodiment, the base station may receive a first semi-persistent CSI report, of the semi-persistent CSI reports, via a second resource of the plurality of resources. According to an example embodiment, the one or more messages may comprise first configuration parameters of one or more cells grouped into the timing advance group. According to an example embodiment, the one or more messages may comprise second configuration parameters of the time alignment timer for the timing advance group.

FIG. 53 is an example flow diagram as per an aspect of an embodiment of the present disclosure. At 5310, a wireless device may receive one or more messages. The one or more messages may comprise first configuration parameters of a plurality of cells comprising a primary cell and a secondary cell. The one or more messages may comprise bandwidth part configuration parameters comprising a value for a bandwidth part inactivity timer. At 5320, a downlink control information may be received on an active bandwidth part of the primary cell. The downlink control information may indicate a resource assignment. At 5330, in response to the receiving the downlink control information, it may be determined that no random access procedure is ongoing on the secondary cell. At 5340, the bandwidth part inactivity timer of the active bandwidth part of the primary cell may be started in response to the determining. At 5360, a switch may be made from the active bandwidth part to a default bandwidth part in response to an expiry of the bandwidth part inactivity timer (5350).

According to an example embodiment, the resource assignment may be for an uplink grant or a downlink assignment. According to an example embodiment, the bandwidth part configuration parameters may indicate an initial active bandwidth part. According to an example embodiment, the downlink control information may be received via a wireless device specific search space of a downlink control channel. According to an example embodiment, the determining may comprise determining that no random access procedure is ongoing based on no random access preamble being transmitted via the secondary cell. According to an example embodiment, the starting the bandwidth part inactivity timer may be with the value. According to an example embodiment, the downlink control information may have a format for uplink scheduling or downlink scheduling. According to an example embodiment, the downlink control information may comprise transmission parameters of a transport block. The transmission parameters may comprise radio resources and a hybrid automatic repeat request process number. According to an example embodiment, the default bandwidth part may be set to an initial active bandwidth part in response to no default bandwidth part being configured. According to an example embodiment, the active bandwidth part may have a different numerology than the default bandwidth part. According to an example embodiment, the bandwidth part configuration parameters may indicate an identifier of the default bandwidth part.

Figure 54:
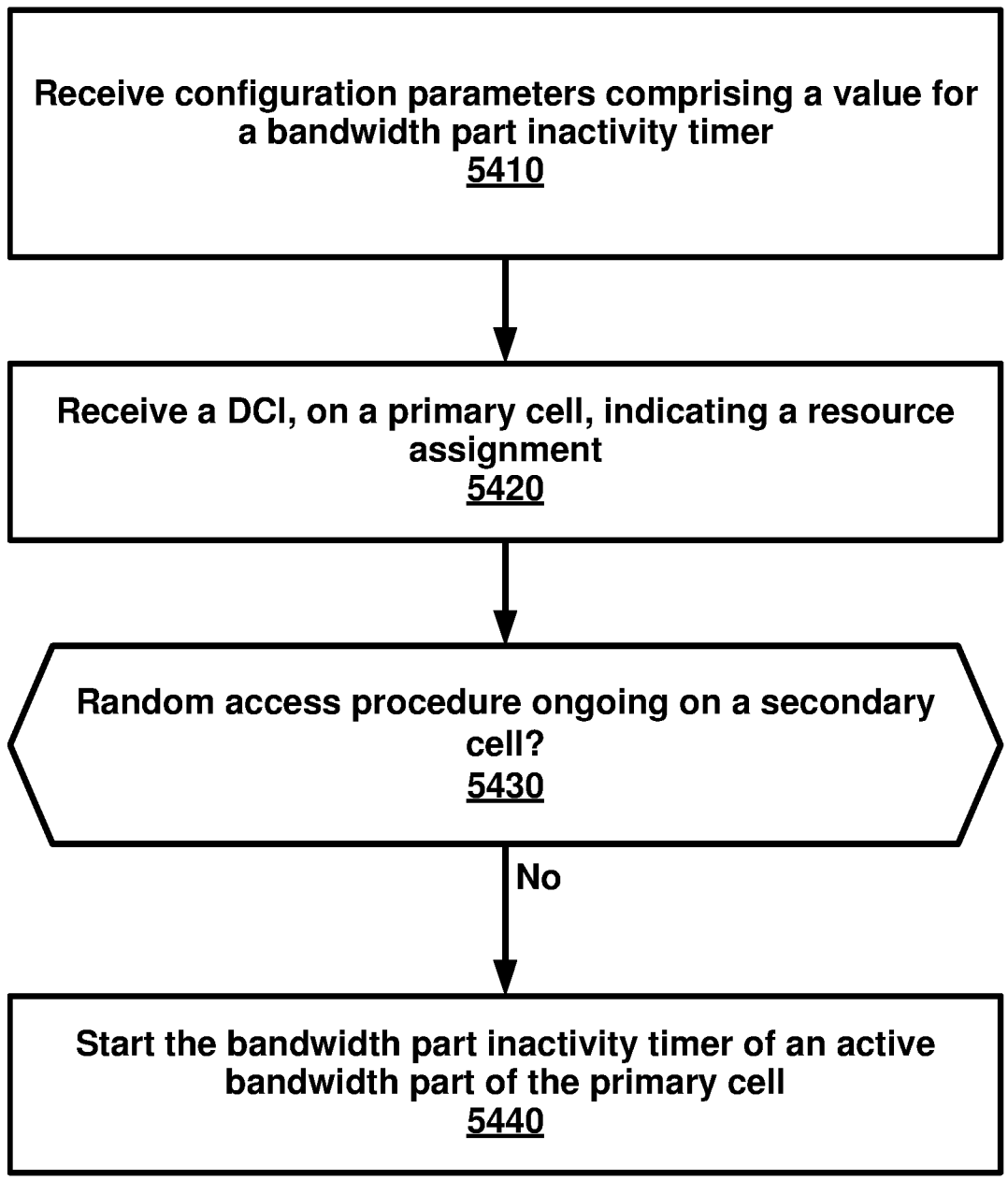
FIG. 54 is an example flow diagram of an aspect of an embodiment of the present invention disclosure.

FIG. 54 is an example flow diagram as per an aspect of an embodiment of the present disclosure. At 5410, a wireless device may receive configuration parameters. The configuration parameters may comprise a value for a bandwidth part inactivity timer. At 5420, a downlink control information may be received on a primary cell. The downlink control information may indicate a resource assignment. At 5430, determine may be made that no random access procedure is ongoing on a secondary cell. At 5440, the bandwidth part inactivity timer of an active bandwidth part of the primary cell may be started in response to the determining (5430). According to an example embodiment, a switch may occur from the active bandwidth part to a default bandwidth part in response to an expiry of the bandwidth part inactivity timer.

Figure 55:
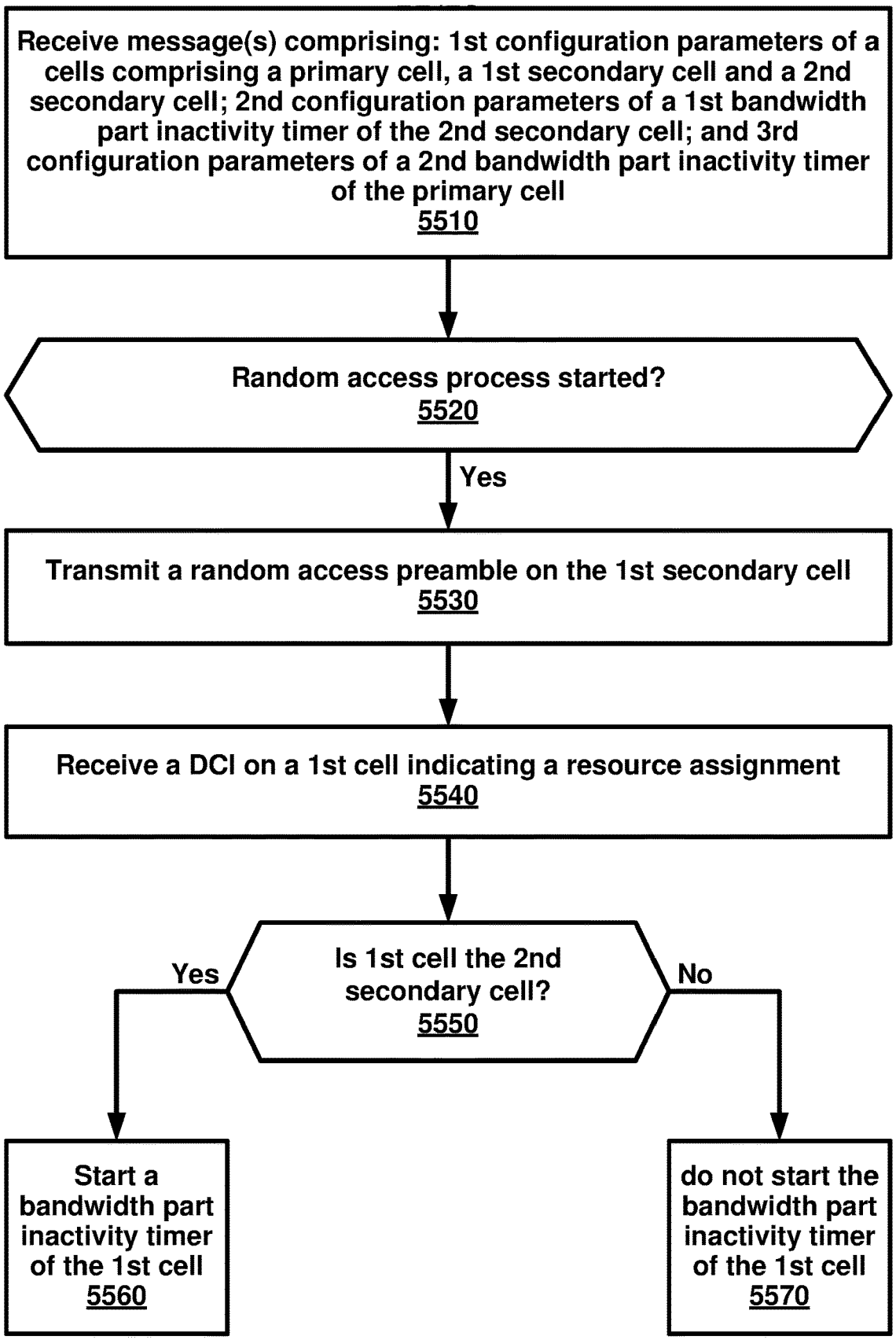
FIG. 55 is an example flow diagram of an aspect of an embodiment of the present invention disclosure.

FIG. 55 is an example flow diagram as per an aspect of an embodiment of the present disclosure. At 5510, a wireless device may receive one or more messages. The one or more messages may comprise first configuration parameters of a plurality of cells. The plurality of cells may comprise a primary cell. The plurality of cells may comprise a first secondary cell. The plurality of cells may comprise a second secondary cell. The one or more messages may comprise second configuration parameters of a first bandwidth part inactivity timer of the second secondary cell. The one or more messages may comprise third configuration parameters of a second bandwidth part inactivity timer of the primary cell. At 5530, a random access preamble may be transmitted on the first secondary cell in response to starting a random access process (5520). At 5540, a downlink control information may be received on a first cell. The downlink control information may indicate a resource assignment. The first cell may be one of the primary cell or the second secondary cell. The downlink control information may be received on the first secondary cell while the random access process is ongoing. At 5560, a bandwidth part inactivity timer of the first cell may be started in response to first cell being the second secondary cell (5550). Otherwise, at 4570, the bandwidth part inactivity timer of the first cell may not be started.

Figure 56:
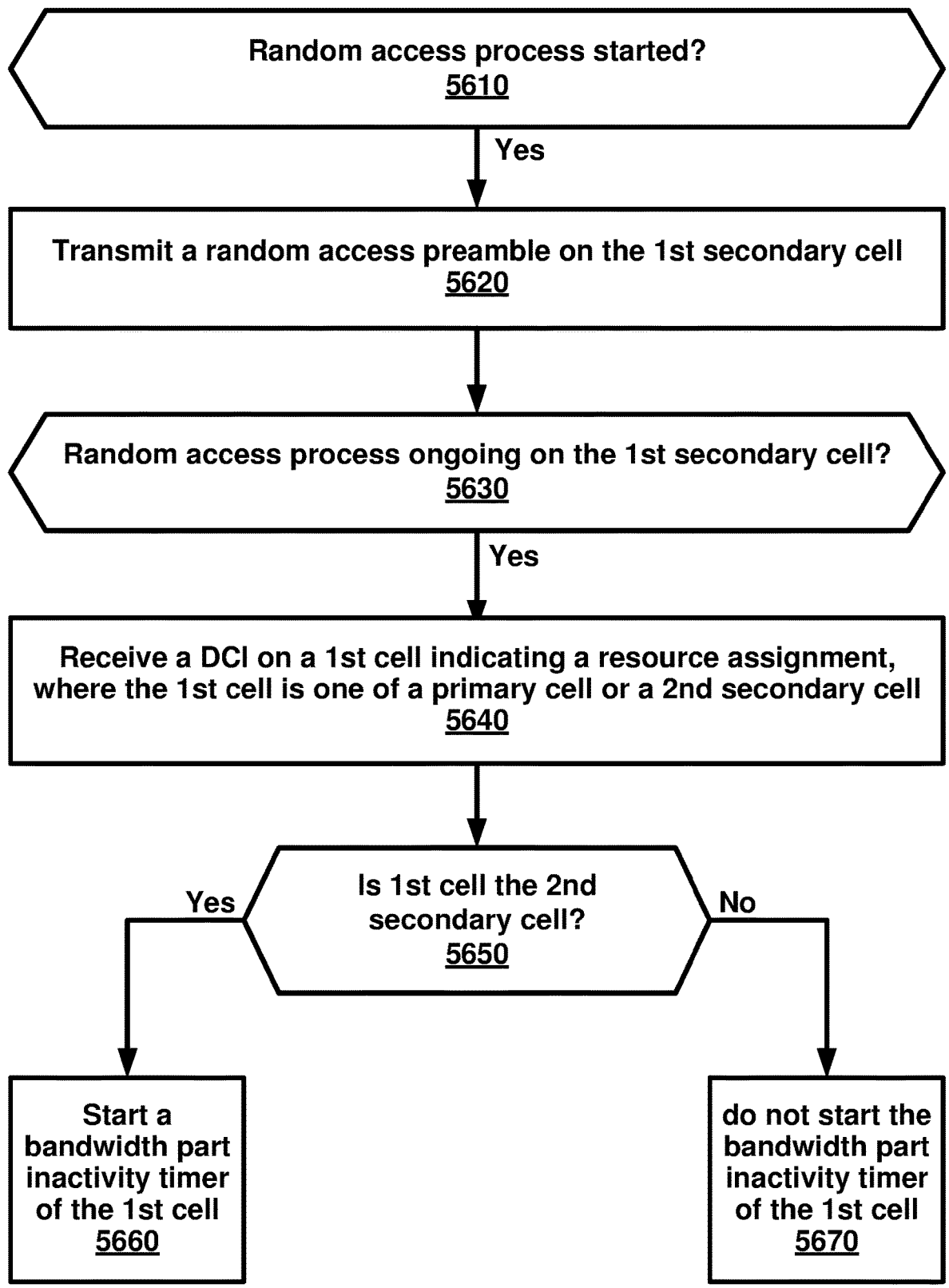
FIG. 56 is an example flow diagram of an aspect of an embodiment of the present invention disclosure.

FIG. 56 is an example flow diagram as per an aspect of an embodiment of the present disclosure. At 5620, a random access preamble may be transmitted on a first secondary cell in response to starting a random access process (5610). While the random access process is ongoing on the first secondary cell (5630), a downlink control information may be received on a first cell indicating a resource assignment. The first cell may be one of a primary cell or a second secondary cell. At 5660, a bandwidth part inactivity timer of the first cell may be started in response to first cell being the second secondary cell (5650). Otherwise, at 5670, the bandwidth part inactivity timer of the first cell may not be started.

Figure 57:
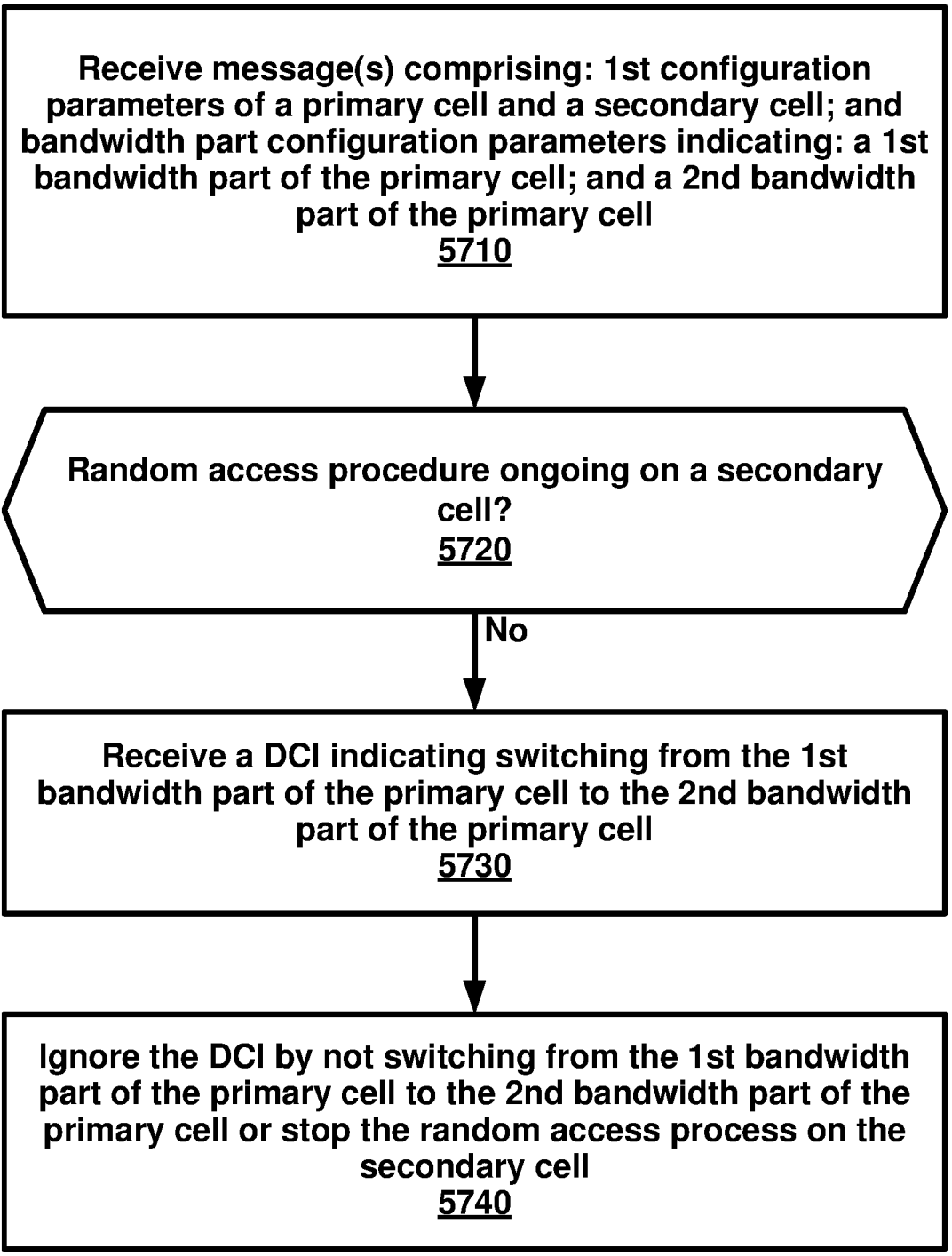
FIG. 57 is an example flow diagram of an aspect of an embodiment of the present invention disclosure.

FIG. 57 is an example flow diagram as per an aspect of an embodiment of the present disclosure. At 5710, a wireless device may receive, one or more messages. The one or more messages may comprise first configuration parameters of a primary cell and a secondary cell. The one or more messages may comprise bandwidth part configuration parameters. The bandwidth part configuration parameters may indicate a first bandwidth part of the primary cell. The bandwidth part configuration parameters may indicate a second bandwidth part of the primary cell. At 5730, a downlink control information may be received. The downlink control information may indicate switching from the first bandwidth part of the primary cell to the second bandwidth part of the primary cell while a random access process is ongoing on the secondary cell (5720). At 5740, in response to the receiving the downlink control information, the downlink control information may be ignored by not switching from the first bandwidth part of the primary cell to the second bandwidth part of the primary cell. In response to the receiving the downlink control information, the random access process on the secondary cell may be stopped.

According to an example embodiment, the stopping the random access process on the secondary cell may comprise switching from the first bandwidth part of the primary cell to the second bandwidth part of the primary cell. According to an example embodiment, the stopping the random access process on the secondary cell may comprise starting a second random access process in response to switching from the first bandwidth part of the primary cell to the second bandwidth part of the primary cell. According to an example embodiment, the stopping the random access process may comprise stopping one or more timers associated with the random access process. According to an example embodiment, the stopping the random access process may comprise resetting one or more counters associated with the random access process. According to an example embodiment, the ignoring the downlink control information may comprise continuing the random access process on the secondary cell. According to an example embodiment, the downlink control information may comprise a field indicating an identifier of the second bandwidth part of the primary cell. According to an example embodiment, the downlink control information may comprise an uplink grant or a downlink assignment. According to an example embodiment, the downlink control information may indicate a first timing of the uplink grant or the downlink assignment. According to an example embodiment, the downlink control information may indicate a second timing of the switching from the first bandwidth part of the primary cell to the second bandwidth part of the primary cell is based on the first timing. According to an example embodiment, the downlink control information may be received via a second cell that is different from the primary cell. According to an example embodiment, the random access process may be for a beam failure recovery process.

Figure 58:
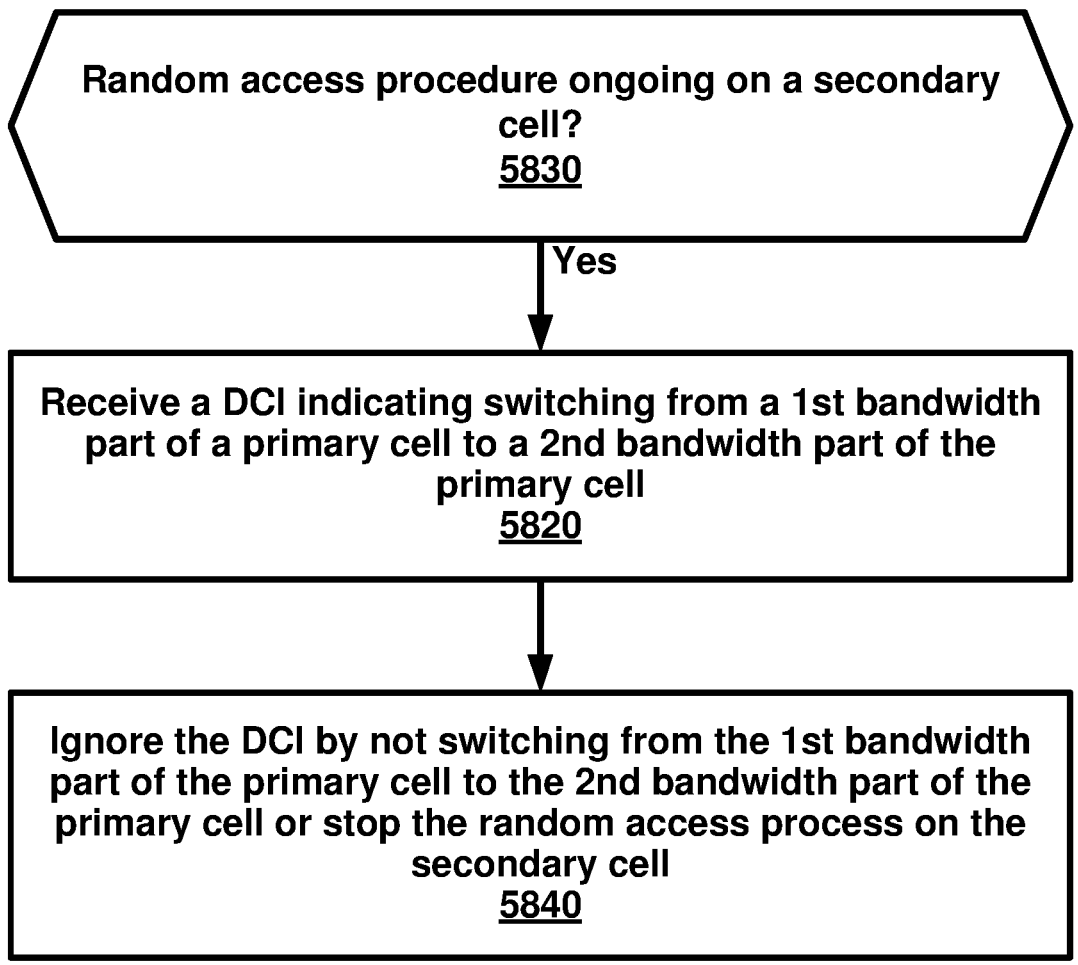
FIG. 58 is an example flow diagram of an aspect of an embodiment of the present invention disclosure.

FIG. 58 is an example flow diagram as per an aspect of an embodiment of the present disclosure. At 5810, a downlink control information may be received. The downlink control information may indicate switching from a first bandwidth part of a primary cell to a second bandwidth part of the primary cell while a random access process is ongoing on a secondary cell (5830). At 5820, in response to the receiving the downlink control information, the downlink control information may be ignored by not switching from the first bandwidth part of the primary cell to the second bandwidth part of the primary cell. The random access process on the secondary cell may be stopped. According to an example embodiment, one or more messages may be received. The one or more messages may comprise first configuration parameters of the primary cell and the secondary cell. The one or more messages may comprise bandwidth part configuration parameters. The bandwidth part configuration parameters may indicate the first bandwidth part of the primary cell. The bandwidth part configuration parameters may indicate the second bandwidth part of the primary cell.

Embodiments may be configured to operate as needed. The disclosed mechanism may be performed when certain criteria are met, for example, in a wireless device, a base station, a radio environment, a network, a combination of the above, and/or the like. Example criteria may be based, at least in part, on for example, wireless device or network node configurations, traffic load, initial system set up, packet sizes, traffic characteristics, a combination of the above, and/or the like. When the one or more criteria are met, various example embodiments may be applied. Therefore, it may be possible to implement example embodiments that selectively implement disclosed protocols.

A base station may communicate with a mix of wireless devices. Wireless devices and/or base stations may support multiple technologies, and/or multiple releases of the same technology. Wireless devices may have some specific capability(ies) depending on wireless device category and/or capability(ies). A base station may comprise multiple sectors. When this disclosure refers to a base station communicating with a plurality of wireless devices, this disclosure may refer to a subset of the total wireless devices in a coverage area. This disclosure may refer to, for example, a plurality of wireless devices of a given LTE or 5G release with a given capability and in a given sector of the base station. The plurality of wireless devices in this disclosure may refer to a selected plurality of wireless devices, and/or a subset of total wireless devices in a coverage area which perform according to disclosed methods, and/or the like. There may be a plurality of base stations or a plurality of wireless devices in a coverage area that may not comply with the disclosed methods, for example, because those wireless devices or base stations perform based on older releases of LTE or 5G technology.

In this disclosure, "a" and "an" and similar phrases are to be interpreted as "at least one" or "one or more." Similarly, any term that ends with the suffix "(s)" is to be interpreted as "at least one" or "one or more." In this disclosure, the term "may" is to be interpreted as "may, for example." In other words, the term "may" is indicative that the phrase following the term "may" is an example of one of a multitude of suitable possibilities that may, or may not, be employed to one or more of the various embodiments. If A and B are sets and every element of A is also an element of B, A is called a subset of B. In this specification, only non-empty sets and subsets are considered. For example, possible subsets of B={cell1, cell2} are: {cell1}, {cell2}, and {cell1, cell2}. The phrase "based on" is indicative that the phrase following the term "based on" is an example of one of a multitude of suitable possibilities that may, or may not, be employed to one or more of the various embodiments. The phrase "in response to" is indicative that the phrase following the phrase "in response to" is an example of one of a multitude of suitable possibilities that may, or may not, be employed to one or more of the various embodiments. The terms "including" and "comprising" should be interpreted as meaning "including, but not limited to."

In this disclosure and the claims, differentiating terms like "first," "second," "third," identify separate elements without implying an ordering of the elements or functionality of the elements. Differentiating terms may be replaced with other differentiating terms when describing an embodiment.

In this disclosure, various embodiments are disclosed. Limitations, features, and/or elements from the disclosed example embodiments may be combined to create further embodiments within the scope of the disclosure.

In this disclosure, parameters (Information elements: IEs) may comprise one or more objects, and each of those objects may comprise one or more other objects. For example, if parameter (IE) N comprises parameter (IE) M, and parameter (IE) M comprises parameter (IE) K, and parameter (IE) K comprises parameter (information element) J, then, for example, N comprises K, and N comprises J. In an example embodiment, when one or more messages comprise a plurality of parameters, it implies that a parameter in the plurality of parameters is in at least one of the one or more messages, but does not have to be in each of the one or more messages.

Furthermore, many features presented above are described as being optional through the use of "may" or the use of parentheses. For the sake of brevity and legibility, the present disclosure does not explicitly recite each and every permutation that may be obtained by choosing from the set of optional features. However, the present disclosure is to be interpreted as explicitly disclosing all such permutations. For example, a system described as having three optional features may be embodied in seven different ways, namely with just one of the three possible features, with any two of the three possible features or with all three of the three possible features.

Many of the elements described in the disclosed embodiments may be implemented as modules. A module is defined here as an isolatable element that performs a defined function and has a defined interface to other elements. The modules described in this disclosure may be implemented in hardware, software in combination with hardware, firmware, wetware (i.e. hardware with a biological element) or a combination thereof, all of which are behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. Additionally, it may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. Finally, it needs to be emphasized that the above mentioned technologies are often used in combination to achieve the result of a functional module.

The disclosure of this patent document incorporates material which is subject to copyright protection. The copyright owner has no objection to the facsimile reproduction by anyone of the patent document or the patent disclosure, as it appears in the Patent and Trademark Office patent file or records, for the limited purposes required by law, but otherwise reserves all copyright rights whatsoever.

While various embodiments have been described above, it should be understood that they have been presented by way of example, and not limitation. It will be apparent to persons skilled in the relevant art(s) that various changes in form and detail can be made therein without departing from the scope. In fact, after reading the above description, it will be apparent to one skilled in the relevant art(s) how to implement alternative embodiments. Thus, the present embodiments should not be limited by any of the above described exemplary embodiments.

In addition, it should be understood that any figures which highlight the functionality and advantages, are presented for example purposes only. The disclosed architecture is sufficiently flexible and configurable, such that it may be utilized in ways other than that shown. For example, the actions listed in any flowchart may be re-ordered or only optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112. Claims that do not expressly include the phrase "means for" or "step for" are not to be interpreted under 35 U.S.C. 112.

What is claimed is:

1. A method comprising:
   receiving, by a wireless device from a base station, one or more messages comprising:
      first configuration parameters of one or more cells grouped into a timing advance group;
      second configuration parameters of a time alignment timer for the timing advance group; and
      third configuration parameters of semi-persistent channel state information (CSI) reports for transmission via a first cell of the one or more cells;
   receiving a first downlink control information indicating activation of a plurality of resources of the first cell for the semi-persistent CSI reports;
   transmitting a semi-persistent CSI report, of the semi-persistent CSI reports, via a first resource of the plurality of resources; and
   in response to the time alignment timer expiring, clearing second resources of the plurality of resources that occur after the time alignment timer expires.

2. The method of claim 1, further comprising receiving a second downlink control information indicating activation of a second plurality of resources of the first cell for second semi-persistent CSI reports, wherein the second plurality of resources are determined based on the third configuration parameters.

3. The method of claim 1, further comprising starting the time alignment timer in response to receiving a timing advance control element.

4. The method of claim 3, further comprising receiving a second downlink control information indicating activation of a second plurality of resources of the first cell for second semi-persistent CSI reports, wherein the second plurality of resources are determined based on the third configuration parameters.

5. The method of claim 1, wherein the timing advance group is a primary timing advance group comprising a primary cell and one or more secondary cells.

6. The method of claim 1, wherein the plurality of resources are for transmission of the semi-persistent CSI reports via a physical uplink shared channel.

7. The method of claim 1, wherein the timing advance group is a secondary timing advance group comprising one or more secondary cells.

8. The method of claim 7, further comprising receiving a second downlink control information indicating activation of a second plurality of resources of the first cell for second semi-persistent CSI reports, wherein the second plurality of resources are determined based on the third configuration parameters.

9. The method of claim 7, further comprising starting the time alignment timer in response to receiving a timing advance control element.

10. The method of claim 9, further comprising receiving a second downlink control information indicating activation of a second plurality of resources of the first cell for second semi-persistent CSI reports, wherein the second plurality of resources are determined based on the third configuration parameters.

11. The method of claim 7, wherein the timing advance group is a primary timing advance group comprising a primary cell and one or more secondary cells.

12. The method of claim 7, wherein the plurality of resources are for transmission of the semi-persistent CSI reports via a physical uplink shared channel.

13. The method of claim 7, wherein the second resources are available for uplink scheduling by the base station in response to the clearing the second resources.

14. The method of claim 7, wherein:
the third configuration parameters comprise a first radio network temporary identifier; and
the first downlink control information is associated with the first radio network temporary identifier.

15. The method of claim 7, wherein the third configuration parameters comprise a periodicity and offset parameter indicating resources for transmission of the semi-persistent CSI reports.

16. The method of claim 7, wherein:
the third configuration parameters comprise a set of trigger states for semi-persistent CSI reporting; and
the first downlink control information indicates a first trigger state in the set of trigger states.

17. The method of claim 1, wherein the second resources are available for uplink scheduling by the base station in response to the clearing the second resources.

18. The method of claim 1, wherein:
the third configuration parameters comprise a first radio network temporary identifier; and
the first downlink control information is associated with the first radio network temporary identifier.

19. The method of claim 1, wherein the third configuration parameters comprise a periodicity and offset parameter indicating resources for transmission of the semi-persistent CSI reports.

20. The method of claim 1, wherein:
the third configuration parameters comprise a set of trigger states for semi-persistent CSI reporting; and
the first downlink control information indicates a first trigger state in the set of trigger states.

* * * * *